(12) United States Patent
Shen et al.

(10) Patent No.: US 12,025,862 B2
(45) Date of Patent: *Jul. 2, 2024

(54) OPTICAL MODULATION FOR OPTOELECTRONIC PROCESSING

(71) Applicant: Lightelligence PTE. Ltd., Singapore (SG)

(72) Inventors: Yichen Shen, Hangzhou (CN); Huaiyu Meng, Medford, MA (US); Arash Hosseinzadeh, Andover, MA (US); Yelong Xu, Allston, MA (US); Yanfei Bai, Shanghai (CN); Ronald Gagnon, North Grafton, MA (US); Cheng-Kuan Lu, Littleton, MA (US); Jonathan Terry, Cambridge, MA (US); Jingdong Deng, Acton, MA (US); Maurice Steinman, Marlborough, MA (US)

(73) Assignee: Lightelligence PTE. Ltd., Singapore (SG)

(*) Notice: Subject to any disclaimer, the term of this patent is extended or adjusted under 35 U.S.C. 154(b) by 717 days.

This patent is subject to a terminal disclaimer.

(21) Appl. No.: 17/112,369

(22) Filed: Dec. 4, 2020

(65) Prior Publication Data

US 2021/0173238 A1 Jun. 10, 2021

Related U.S. Application Data

(60) Provisional application No. 62/943,756, filed on Dec. 4, 2019, provisional application No. 63/017,211, filed
(Continued)

(51) Int. Cl.
*G02F 1/025* (2006.01)
*G02F 1/225* (2006.01)
(Continued)

(52) U.S. Cl.
CPC ............ *G02F 1/025* (2013.01); *G02F 1/2257* (2013.01); *H04B 10/5161* (2013.01); *H04B 10/524* (2013.01); *H04B 10/541* (2013.01)

(58) Field of Classification Search
CPC ... G02F 1/025; G02F 1/2257; H04B 10/5161; H04B 10/524; H04B 10/541; H04B 10/5051; H04B 10/506
See application file for complete search history.

(56) References Cited

U.S. PATENT DOCUMENTS 3,944,820 A 3/1976 Stotts
4,567,569 A 1/1986 Caulfield et al.
(Continued)

FOREIGN PATENT DOCUMENTS

CN 1150479 5/1997
CN 1713027 12/2005
(Continued)

OTHER PUBLICATIONS

Abdeldayem et al., "Optical Computing: Need and Challenge", *Communications of the ACM*, vol. 50, No. 9. pp. 60-62 (Sep. 2007).
(Continued)

*Primary Examiner* — Leslie C Pascal
(74) *Attorney, Agent, or Firm* — Fish & Richardson P.C.

(57) ABSTRACT

A system including at least one input optical waveguide configured to receive an optical wave, at least one digital input port configured to receive a series of digital input values, each digital input value including two or more bits, and an optical modulator coupled to the input optical waveguide. The optical modulator includes an optical waveguide portion that includes multiple optical waveguide segments associated with diode sections positioned along the optical waveguide segments, in which the diode sections are configured to apply different respective modulation contribu-
(Continued)

tions to an optical wave propagating through the optical waveguide portion.

37 Claims, 47 Drawing Sheets

Related U.S. Application Data on Apr. 29, 2020, provisional application No. 63/048,439, filed on Jul. 6, 2020, provisional application No. 63/061,995, filed on Aug. 6, 2020.

(51) Int. Cl.
  *H04B 10/516* (2013.01)
  *H04B 10/524* (2013.01)
  *H04B 10/54* (2013.01)

(56) References Cited

U.S. PATENT DOCUMENTS

| | | | |
|---|---|---|---|
| 4,588,255 A | 5/1986 | Tur et al. | |
| 4,603,398 A | 7/1986 | Bocker et al. | |
| 4,633,428 A | 12/1986 | Byron | |
| 4,809,204 A | 2/1989 | Dagenais et al. | |
| 5,004,309 A | 4/1991 | Caulfield et al. | |
| 5,008,833 A | 4/1991 | Agranat et al. | |
| 5,077,619 A | 12/1991 | Toms | |
| 5,095,459 A | 3/1992 | Ohta et al. | |
| 5,220,643 A | 6/1993 | Collings | |
| 5,428,711 A | 6/1995 | Akiyama et al. | |
| 5,671,302 A | 9/1997 | Skeie | |
| 5,699,449 A | 12/1997 | Javidi | |
| 5,784,309 A | 7/1998 | Budil | |
| 5,832,155 A | 11/1998 | Rasch et al. | |
| 6,005,998 A | 12/1999 | Lee | |
| 6,178,020 B1 | 1/2001 | Schultz et al. | |
| 6,307,854 B1 | 10/2001 | Webb | |
| 6,493,483 B2 | 12/2002 | Gomes et al. | |
| 7,173,272 B2 | 2/2007 | Ralph | |
| 7,251,386 B1 | 7/2007 | Dickinson et al. | |
| 7,259,031 B1 | 8/2007 | Dickinson et al. | |
| 7,515,778 B2 | 4/2009 | Mosinskis et al. | |
| 7,536,431 B2 | 5/2009 | Goren et al. | |
| 7,660,533 B1 | 2/2010 | Meyers et al. | |
| 7,667,995 B1 | 2/2010 | Leuenberger et al. | |
| 7,876,248 B2 | 1/2011 | Berkley et al. | |
| 7,985,965 B2 | 7/2011 | Barker et al. | |
| 8,018,244 B2 | 9/2011 | Berkley | |
| 8,023,828 B2 | 9/2011 | Beausoleil et al. | |
| 8,027,587 B1 | 9/2011 | Watts | |
| 8,035,540 B2 | 10/2011 | Berkley et al. | |
| 8,129,670 B2 | 3/2012 | Laycock et al. | |
| 8,190,553 B2 | 5/2012 | Routt | |
| 8,213,751 B1 | 7/2012 | Ho et al. | |
| 8,223,414 B2 | 7/2012 | Goto et al. | |
| 8,386,899 B2 | 2/2013 | Goto et al. | |
| 8,560,282 B2 | 10/2013 | Macready et al. | |
| 8,604,944 B2 | 12/2013 | Berkley et al. | |
| 8,620,855 B2 | 12/2013 | Bonderson | |
| 8,837,544 B2 | 9/2014 | Santori et al. | |
| 8,953,950 B2 | 2/2015 | Nazarathy et al. | |
| 9,159,861 B2 | 10/2015 | Zhang et al. | |
| 9,250,391 B2 | 2/2016 | McLaughlin et al. | |
| 9,354,039 B2 | 5/2016 | Mower et al. | |
| 9,391,708 B2 | 7/2016 | Fincato et al. | |
| 9,438,970 B2 | 9/2016 | Jones et al. | |
| 9,594,394 B2 | 3/2017 | New | |
| 9,791,258 B2 | 10/2017 | Mower et al. | |
| 9,858,531 B1 | 1/2018 | Monroe et al. | |
| 9,893,816 B2 | 2/2018 | Kim et al. | |
| 9,900,096 B2 | 2/2018 | Hajimiri et al. | |
| 10,009,135 B2 | 6/2018 | Tait et al. | |
| 10,139,280 B2 | 11/2018 | Tack et al. | |
| 10,268,232 B2 | 4/2019 | Carolan et al. | |
| 10,359,272 B2 | 7/2019 | Mower et al. | |
| 10,608,663 B2 | 3/2020 | Gould et al. | |
| 10,634,851 B2 | 4/2020 | Steinbrecher et al. | |
| 10,908,634 B1 | 2/2021 | Chang et al. | |
| 11,474,409 B2 | 10/2022 | Sobu et al. | |
| 11,719,963 B2 * | 8/2023 | Lu .................. G06N 3/0675 385/3 | |
| 2003/0086138 A1 | 5/2003 | Pittman et al. | |
| 2003/0235363 A1 | 12/2003 | Pfeiffer | |
| 2004/0223768 A1 | 11/2004 | Shastri et al. | |
| 2004/0243657 A1 | 12/2004 | Goren et al. | |
| 2007/0180586 A1 | 8/2007 | Amin | |
| 2008/0031566 A1 | 2/2008 | Matsubara et al. | |
| 2008/0037936 A1 | 2/2008 | Lee et al. | |
| 2008/0212186 A1 | 9/2008 | Zoller et al. | |
| 2008/0273835 A1 | 11/2008 | Popovic | |
| 2009/0024816 A1 | 1/2009 | Thibadeau et al. | |
| 2009/0028554 A1 | 1/2009 | Anderson | |
| 2009/0128228 A1 | 5/2009 | Yeh | |
| 2011/0064419 A1 | 3/2011 | Chen et al. | |
| 2012/0045162 A1 | 2/2012 | Li | |
| 2012/0171619 A1 | 7/2012 | Heyderman et al. | |
| 2013/0011093 A1 | 1/2013 | Goh et al. | |
| 2013/0046716 A1 | 2/2013 | Chan et al. | |
| 2014/0241657 A1 | 8/2014 | Manouvrier | |
| 2014/0299743 A1 | 10/2014 | Miller | |
| 2015/0009548 A1 | 1/2015 | Bienstman et al. | |
| 2015/0354938 A1 | 12/2015 | Mower et al. | |
| 2015/0382089 A1 | 12/2015 | Mazed | |
| 2016/0103281 A1 | 4/2016 | Matsumoto | |
| 2016/0118106 A1 | 4/2016 | Yoshimura et al. | |
| 2016/0139485 A1 | 5/2016 | Winzer et al. | |
| 2016/0162798 A1 | 6/2016 | Marandi et al. | |
| 2017/0285373 A1 | 10/2017 | Zhang et al. | |
| 2017/0351293 A1 | 12/2017 | Carolan et al. | |
| 2018/0024299 A1 | 1/2018 | Leijtens et al. | |
| 2018/0059445 A1 | 3/2018 | Miyazaki et al. | |
| 2018/0107237 A1 | 4/2018 | Andregg et al. | |
| 2018/0267937 A1 | 9/2018 | Pelc et al. | |
| 2018/0274900 A1 | 9/2018 | Mower et al. | |
| 2018/0335574 A1 | 11/2018 | Steinbrecher et al. | |
| 2018/0341164 A1 * | 11/2018 | Williams .............. G02F 1/2257 | |
| 2019/0019100 A1 | 1/2019 | Roques-Carmes et al. | |
| 2019/0049680 A1 | 2/2019 | Sharma et al. | |
| 2019/0094648 A1 | 3/2019 | Williams et al. | |
| 2019/0227351 A1 | 7/2019 | Behroozpour et al. | |
| 2019/0266508 A1 | 8/2019 | Bunyk et al. | |
| 2019/0318234 A1 | 10/2019 | Abel et al. | |
| 2019/0370652 A1 | 12/2019 | Shen et al. | |
| 2019/0371226 A1 | 12/2019 | Iwaki | |
| 2020/0018193 A1 | 1/2020 | Neiser | |
| 2020/0110992 A1 | 4/2020 | Hosseinzadeh et al. | |
| 2020/0228077 A1 | 7/2020 | Harris et al. | |
| 2021/0201126 A1 | 7/2021 | Meng et al. | |
| 2021/0341765 A1 | 11/2021 | Lu et al. | |

FOREIGN PATENT DOCUMENTS

| | | |
|---|---|---|
| CN | 101578544 | 11/2009 |
| CN | 101630178 | 1/2010 |
| CN | 102023672 | 4/2011 |
| CN | 102164017 | 8/2011 |
| CN | 102741671 | 10/2012 |
| CN | 102866876 | 1/2013 |
| CN | 103473213 | 12/2013 |
| CN | 105046325 | 11/2015 |
| CN | 105917257 | 8/2016 |
| CN | 108700707 | 10/2018 |
| CN | 109477938 | 3/2019 |
| DE | 102004014658 | 7/2010 |
| EP | 0 594 088 | 12/1988 |
| EP | 0 330 710 | 9/1989 |
| KR | 10-2017-0117557 | 10/2017 |
| TW | 256884 B | 9/1995 |
| TW | 384403 B | 3/2000 |
| TW | 200912905 | 3/2009 |
| TW | I522935 | 2/2016 |
| TW | 201837894 | 10/2018 |
| TW | 202001694 A | 1/2020 |

(56) References Cited

FOREIGN PATENT DOCUMENTS

| | | |
|---|---|---|
| WO | WO 2005029404 | 3/2005 |
| WO | WO 2006023067 | 3/2006 |
| WO | WO 2008069490 | 6/2008 |
| WO | WO 2018098230 | 5/2018 |
| WO | WO 2019/236591 | 12/2019 |
| WO | WO 2020/191217 | 9/2020 |

OTHER PUBLICATIONS

International Search Report and Written Opinion of the International Searching Authority for International Application No. PCT/US2019/035403 dated Sep. 18, 2019.
International Search Report and Written Opinion of the International Searching Authority for International Application No. PCT/US2019/064554 dated Jun. 23, 2020.
International Search Report and Written Opinion of the International Searching Authority for International Application No. PCT/US2020/023674 dated Jul. 8, 2020.
Taiwan Office Action for Taiwan Application No. TW 108119388 dated May 13, 2020 (with English Translation).
Debnath, Kapil et al., "All-silicon carrier accumulation modulator based on a lateral metal-oxide-semiconductor capacitor", *Photonics Research*, vol. 6, No. 5, pp. 373-379 (May 2018).
Green, William M.J. et al., "Ultra-compact, low RF power, 10 GB/s silicon Mach-Zehnder modulator", *Optics Express*, vol. 15, No. 25, pp. 17106-17113 (Dec. 10, 2007).
Guha et al., "Architectural Issues in Designing Symbolic Processors in Optics", ISCA '87 *Proceedings of the 14th annual international symposium on Computer architecture*, pp. 145-151 (1987).
Hamerly et al., "Large-Scale Optical Neural Networks based on Photoelectric Multiplication", arXiv:1812.07614v1 (cs.ET] (Nov. 12, 2018).
Harris et al., "Linear programmable nanophotonic processors", *Optica*, vol. 5, No. 12, pp. 1623-1631 (Dec. 2018).
Hughes et al., "Training of photonic neural networks through in situ backpropagation", *Optica*, vol. 5, Issue 7, pp. 864-871 (2018).
Ishihara et al., "An Integrated Nanophotonic Parallel Adder", *ACM Journal on Emerging Technologies in Computing Systems*, vol. 14, No. 2, Article 26, pp. 26:1-26:20 (Jul. 2018).
Jing et al., "Tunable Efficient Unitary Neural Networks (EUNN) and their application to RNNs", https://arxiv.org/abs/1612.05231v3, (Dec. 15, 2016).
Lin et al., "All-Optical Machine Learning Using Diffractive Deep Neural Networks", Science, vol. 361, Issue 6406, pp. 1004-1008, DOI: 10.1126/science.aat8084 (Sep. 7, 2018).
Patel, David et al., "Silicon Photonic Segmented Modulator-Based Electro-Optic DAC for 100 Gb/s PAM-4 Generation", *IEEE Photonics Technology Letters*, vol. 27, No. 23, pp. 2433-2435 (Dec. 1, 2015).
Peurifoy et al., "Nanophotonic particle simulation and inverse design using artificial neural networks", Science Advances, vol. 4, eaar4206, pp. 1-7 (2018).
Saade et al., "Random Projections through multiple optical scattering: Approximating kernels at the speed of light", *Proceedings of the 2016 IEEE International Conference on Acoustics, Speech and Signal Processing (ICASSP)*, pp. 6215-6219 (Oct. 2015).
Sahni et al., "Models and Algorithms for Optical and Optoelectronic Parallel Computers", *International Journal of Foundations of Computer Science*, vol. 12, No. 3, (Nov. 2011).
Shen et al., "Deep learning with coherent nanophotinic circuits", Nature Photonics, DOI: 10.1038/NPHOTON.2017.93 (Jun. 12, 2017).
Tahersima, M. et al., "Deep Neural Network Inverse Design of Integrated Photonic Power Splitters", *Scientific Reports*, Article No. 9:1368, (Feb. 4, 2019).
Tamir et al., "High-speed and low-power electro-optical DSP coprocessor", *J. Opt. Soc. Am. A*, vol. 26, No. 8, pp. A11-A20 (Aug. 2009).
Wu, Xiaotie et al., "A 20Gb/s NRZ/PAM-4 1V Transmitter in 40nm CMOS Driving a Si-Photonic Modulator In 0.13µm CMOS", *2013 IEEE International Solid-State Circuits Conference*, pp. 128-129 (Feb. 19, 2013).
Xu, K. et al., "All passive photonic power divider with arbitrary split ratio", arXiv, 1609.03823v1 (Sep. 13, 2016).
Yang et al., "On-chip CMOS-compatible optical signal processor", *Optics Express*, vol. 20, No. 12, pp. 13560-13565 (Jun. 4, 2012).
Younger et al., "Computing by Means of Physical-Based Optical Neural Networks", *EPTCS 26*, pp. 159-167 (2010).
Notice of Allowance and Search Report issued by the Taiwan Patent Office for Application No. TW 111105772, dated May 4, 2022 (with English Translation).
Taiwan IPO Examination Report and Search Report for Application No. 110115269 dated Jun. 7, 2022 (with English Translation).
Aaronson, S. et al., "Computational complexity of linear optics", in *Proceedings of the 43rd Annual ACM Symposium on Theory of Computing* (ACM, New York, NY, USA, 2011), STOC '11, pp. 333-342, ISBN 978-1-4503-0691-1.
Abu-Mostafa et al., "Optical Neural Computers," *Scientific American*, vol. 256, Issue 3 (1987), pp. 88-95.
Albert et al., "Statistical mechanics of complex networks", *Reviews of Modern Physics*, vol. 74, pp. 47-97, Jan. 2002.
Almeida, V. R., et al., "All-optical control of light on a silicon chip", *Nature*, vol. 431, (Aug. 6, 2004), pp. 1081-1084.
Amir, A. et al., "Classical diffusion of a quantum particle in a noisy environment", *Physical Review*, E 79, 050105 (Feb. 5, 2009), 5 pages.
Amit et al., "Spin-glass models of neural networks", *Physical Review A*, vol. 32, No. 2, pp. 1007-1018, Aug. 1985.
Anitha et al., "Comparative Study of High performance Braun's Multiplier Using FPGAs", *IOSR Journal of Electronics and Communication Engineering (IOSRJECE)*, vol. 1, Issue 4, pp. 33-37 (May-Jun. 2012).
Appeltant et al., "Information processing using a single dynamical node as complex system", Nature Communications, 6 pages (2011).
Arjovsky et al., "Unitary Evolution Recurrent Neural Networks", arXiv:1511.06464, 9 pages (2015).
Aspuru-Guzik A. et al., "Simulated Quantum Computation of Molecular Energies", *Science*, vol. 309, Issue 5741, pp. 1704-1707 (2005).
Aspuru-Guzik, A. et al., "Photonic quantum simulators", *Nature Physics*, vol. 8, No. 4, pp. 285-291 (2012).
Atabaki et al., "Integrating photonics with silicon nanoelectronics for the next generation of systems on a chip", *Nature*, vol. 556, pp. 349-358 (2018).
Baehr-Jones et al., "A 25 Gb/s Silicon Photonics Platform", *arXiv reprints*. URL http://adsabs.harvard.edu/abs/2012arXiv1203.0767B, 1203.0767, 11 pages (2012).
Bao et al., "Atomic-Layer Graphene as a Saturable Absorber for Ultrafast Pulsed Lasers", *Advanced Functional Materials*, vol. 19, pp. 3077-3083 (2009).
Bao et al., "Monolayer graphene as a saturable absorber in a mode-locked laser", *Nano Res.*, vol. 4, No. 3, pp. 297-307 (2011).
Barahona, "On the computational complexity of Ising spin glass models", *Journal of Physics A: Mathematical and General*, vol. 15, pp. 3241-3253, (Oct. 1982).
Bertsimas et al., "Robust optimization with simulated annealing", *Journal of Global Optimization*, vol. 48, pp. 323-334 (2010).
Bewick, "Fast multiplication: algorithms and implementation". Ph.D. Thesis, Stanford University (1994), 170 pages.
Bonneau et al., "Quantum interference and manipulation of entanglement in silicon wire waveguide quantum circuits", *New Journal of Physics*, vol. 14 (2012): 045003, 13 pages.
Brilliantov, "Effective magnetic Hamiltonian and Ginzburg criterion for fluids", *Physical Review E*, vol. 58, No. 2, pp. 2628-2631, (Aug. 1998).
Bromberg, Y. et al., "Bloch oscillations of path-entangled photons", *Phys. Rev. Lett.*, vol. 105, (May 18, 2011), 5 pages.
Bromberg, Y. et al., "Quantum and Classical Correlations in Waveguide Lattices", *Phys. Rev. Lett.*, vol. 102, (Jun. 26, 2009), pp. 253904-1-253904-4.
Broome, M. A. et al., "Photonic Boson Sampling in a Tunable Circuit", *Science*, vol. 339, pp. 794-798, (Jan. 12, 2013).

(56) References Cited

OTHER PUBLICATIONS

Bruck et al., "On the power of neural networks for solving hard problems", *Journal of Complexity*, vol. 6, pp. 129-135, (Jun. 1990).
Canziani et al., "Evaluation of neural network architectures for embedded systems", *2017 IEEE International Symposium on Circuits and Systems (ISCAS)*, (May 28-31, 2017).
Cardenas et al., "Low loss etchless silicon photonic waveguides", *Optics Express*, vol. 17, No. 6, pp. 4752-4757 (2009).
Carolan et al., "Universal linear optics", *Science*, vol. 349, Issue 6249, pp. 711-716, (Aug. 14, 2015).
Caves, "Quantum-mechanical noise in an interferometer", *Physical Review D*, vol. 23, No. 8, pp. 1693-1708 (Apr. 15, 1981).
Centeno et al., "Optical bistability in finite-size nonlinear bidimensional photonic crystals doped by a microcavity", *Physical Review B*, vol. 62, No. 12, pp. R7683- R7686 (Sep. 15, 2000).
Chan, "Optical flow switching networks", *Proceedings of the IEEE*, vol. 100, No. 5, pp. 1079-1091, (May 2012).
Chen et al., "DianNao: A small-footprint high-throughput accelerator for ubiquitous machine-learning", *ASPLOS '14: Proceedings of the 19th international conference on Architectural support for programming languages and operating systems*, pp. 269-284 (Feb. 2014).
Chen, J. et al., "Efficient photon pair sources based on silicon-on-insulator microresonators", *SPIE*, vol. 7815, pp. 78150H-1-78150H-9, (2010).
Chen, J. et al., "Frequency-bin entangled comb of photon pairs from a Silicon-on-Insulator micro-resonator", *Optics Express*, vol. 19, No. 2, (Jan. 17, 2011), pp. 1470-1483.
Chen, L. et al., "Compact, low-loss and low-power 8×8 broadband silicon optical switch," *Optics Express*, vol. 20, No. 17, pp. 18977-18985 (Aug. 13, 2012).
Chen, Q. et al., "A Universal method for constructing N-port non-blocking optical router based on 2×2 optical switch", *Progress In Electromagnetics Research Symposium Proceedings*, Guangzhou, China, Aug. 25-28, 2014, pp. 357-361.
Cheng et al., "In-Plane Optical Absorption and Free Carrier Absorption in Graphene-on-Silicon Waveguides," *IEEE Journal of Selected Topics in Quantum Electronics*, vol. 20, No. 1, pp. 43-48, (Jan./Feb. 2014).
Chetlur et al., "cuDNN: Efficient primitives for deep learning", *arXiv preprint arXiv:1410.0759* (2014). 9 pages.
Childs, A. et al., "Spatial search by quantum walk", *Physical Review A*, vol. 70, Issue 2, (Aug. 23, 2004), 12 pages.
Chung et al., "A monolithically integrated large-scale optical phased array in silicon-on-insulator CMOS", *IEEE Journal of Solid-State Circuits*, vol. 53, No. 1, pp. 275-296 (Jan. 2018).
Cincotti, "Prospects on planar quantum computing", *Journal of Lightwave Technology*, vol. 27, No. 24, pp. 5755-5766 (Dec. 15, 2009).
Clements et al., "Optimal design for universal multiport interferometers," *Optica*, vol. 3, No. 12, pp. 1460-1465 (Dec. 2016).
Chinese Office Action and English Translation in Chinese Patent Application No. 201780043808.X dated Feb. 3, 2020, 12 pages.
Crespi, A. et al., "Integrated multimode interferometers with arbitrary designs for photonic boson sampling", *Nature Photonics*, vol. 7, pp. 545-549 (May 26, 2013).
Crespi, et al., "Anderson localization of entangled photons in an integrated quantum walk", *Nature Photonics*, vol. 7, Issue 4, pp. 322-328 (Apr. 2013).
Dai, D. et al., "Novel concept for ultracompact polarization splitter-rotator based on silicon nanowires", *Optics Express*, vol. 19, No. 11, (May 23, 2011 ), pp. 10940-10949.
Di Giuseppe, G. et al., "Einstein-Podolsky-Rosen Spatial Entanglement in Ordered and Anderson Photonic Lattices", *Physical Review Letters*, PRL 110, (Apr. 12, 2013), pp. 150503-1-150503-5.
Dunningham et al., "Efficient comparison of path-lengths using Fourier multiport devices", *Journal of Physics B: Atomic, Molecular and Optical Physics*, vol. 39 (2006), pp. 1579-1586.
EP Extended European Search Report in European Patent Application No. 17807562.8, dated May 6, 2020, 14 pages.
EP Partial Supplemental European Search Report in European Patent Application No. 17807562.8 dated Jan. 17, 2020, 12 pages.
Esser et al., "Convolutional networks for fast, energy-efficient neuromorphic computing", *Proceedings of the National Academy of Sciences*, vol. 113, No. 41, pp. 11441-11446 (Oct. 2016).
Farht et al., "Optical implementation of the Hopfield model", *Applied Optics*, vol. 24, No. 10, pp. 1469-1475 (May 15, 1985).
Feinberg et al., "Making memristive neural network accelerators reliable", *2018 IEEE International Symposium on High Performance Computer Architecture (HPCA)*, pp. 52-65 (2018).
Fushman, I. et al., "Controlled Phase Shifts with a Single Quantum Dot", *Science*, vol. 320, (May 9, 2008), pp. 769-772.
George et al., "A programmable and configurable mixed-mode FPAA Soc", *IEEE Transactions on Very Large Scale Integration (VLSI) Systems*, vol. 24, No. 6, pp. 2253-2261 (Jun. 2016).
Gilmer et al., "Neural message passing for quantum chemistry", *arXiv preprint arXiv: 1704.01212* (2017). 14 pages.
Golub et al., "Calculating the singular values and pseudo-inverse of a matrix", *Journal of the Society for Industrial and Applied Mathematics Series B Numerical Analysis*, vol. 2, No. 2, pp. 205-224 (1965).
Graves et al., "Hybrid computing using a neural network with dynamic external memory," *Nature*, vol. 538, (Oct. 27, 2016), 21 pages.
Green, W. et al., "CMOS Integrated Silicon Nanophotonics: Enabling Technology for Exascale Computational System", IBM Corporation, Invited Talk at SEMICON 2010, Dec. 1, Tokyo, (2010) 30 pages.
Grote et al., "First long-term application of squeezed states of light in a gravitational-wave observatory", *Physical Review Letters*, PRL 110, 181101 (May 3, 2013). 5 pages.
Gruber et al., "Planar-integrated optical vector-matrix multiplier", *Applied Optics*, vol. 39, No. 29, p. 5367-5373 (Oct. 10, 2000).
Gullans et al., "Single-Photon Nonlinear Optics with Graphene Plasmons", *Physical Review Letters*, PRL 111, pp. 247401-1-247401-5 (Dec. 13, 2013) 7 pages.
Gunn, C., "CMOS photonics for high-speed interconnects", *IEEE Micro*, (Mar.-Apr. 2006), pp. 58-66.
Haffner et al., "Low-loss plasmon-assisted electro-optic modulator", *Nature*, vol. 556, pp. 483-486 (2018).
Halasz et al., "Phase diagram of QCD", *Physical Review D*, vol. 58, pp. 096007-1-096007-11, (1998).
Hamerly et al., "Scaling advantages of all-to-all connectivity in physical annealers: the Coherent Ising Machine vs. DWave 2000Q", *arXiv:1805.05217*, (May 2018), 17 pages.
Harris et al. "Integrated source of spectrally filtered correlated photons for large-scale quantum photonic systems", *Physical Review X*, vol. 4, Issue 4, pp. 041047-1-041047-10 (2014).
Harris et al., "Bosonic transport simulations in a large-scale programmable nanophotonic processor", *arXiv:1507.03406v2*, 8 pages (2015).
Harris et al., "Efficient, compact and low loss thermos-optic phase shifter in silicon", *Optics Express*, vol. 22, No. 9, pp. 10487-10493 (2014).
Hinton et al., "Reducing the dimensionality of data with neural networks", *Science*, vol. 313, pp. 504-507 (Jul. 28, 2006).
Hochberg, M. et al., "Silicon Photonics: The Next Fabless Semiconductor Industry", *IEEE Solid-State Circuits Magazine*, pp. 48-58 (Winter 2013).
Honerkamp-Smith et al., "An introduction to critical points for biophysicists; observations of compositional heterogeneity in lipid membranes", *Biochimica et Biophysica Acta 1788*, pp. 53-63, (2009).
Hong, C. K. et al., "Measurement of subpicosecond time intervals between two photons by interference", *Physical Review Letters*, vol. 59, No. 18, (Nov. 2, 1987), pp. 2044-2046.
Hopefield et al., "Neural computation of decisions in optimization problems", *Biological Cybernetics*, vol. 52, No. 3, pp. 141-152 (1985).
Hopefield, "Neural networks and physical systems with emergent collective computational abilities", *Proceedings of the National Academy of Sciences of the United States of America*, vol. 79, pp. 2554-2558 (Apr. 1982).

(56) References Cited

OTHER PUBLICATIONS

Horowitz, M., "Computing's energy problem (and what we can do about it)", *2014 IEEE International Solid-State Circuits Conference*, Digest of Technical Papers, ISSCC 2014, Session 1, Plenary / 1.1 (Feb. 2014).
Horst, F. et al., "Cascaded Mach-Zehnder wavelength filters in silicon photonics for low loss and flat pass-band WDM (de-)multiplexing", *Optics Express*, vol. 21, No. 10, pp. 11652-11658 (2013).
Humphreys, P. C. et al., "Linear Optical Quantum Computing in a Single Spatial Mode", *arXiv:1305.3592*, (Nov. 21, 2014), 7 pages.
Inagaki et al., Large-scale Ising spin network based on degenerate optical parametric oscillators, *Nature Photonics*. vol. 10, pp. 415-419 (Jun. 2016).
Isichenko, "Percolation, statistical topography, and transport in random media", *Reviews of Modern Physics*, vol. 64, No. 4, pp. 961-1043, (Oct. 1992).
Ising, "Beitrag zur Theorie des Ferromagnetismus," *Z. Phys.*, pp. 253-258 (Dec. 1924).
Jaekel et al., "Quantum limits in interferometric measurements", *Europhysics Letters*, vol. 13, No. 4, pp. 301-306 (Oct. 1990).
Jalali, B. et al., "Silicon Photonics", *Journal of Lightwave Technology*, vol. 24, No. 12, pp. 4600-4615 (Dec. 2006).
Jia et al., "Caffe: Convolutional architecture for fast feature embedding", Proceedings of the 22nd ACM International Conference on Multimedia (Multimedia 2014), Orlando, Florida, pp. 675-678 URL http://doi.acm. org/1 O.1145/264 7868 .2654889 (2014).
Jiang, L. et al., "A planar ion trapping microdevice with integrated waveguides for optical detection", *Optics Express*, vol. 19, No. 4, pp. 3037-3043 (Feb. 2011).
Jonsson, "An empirical approach to finding energy efficient ADC architectures", *2011 International Workshop on ADC Modelling, Testing and Data Converter Analysis and Design and IEEE 2011 ADC Forum Jun. 30-Jul. 1, 2011. Orvieto, Italy* (2011).
Jouppi et al. "In-datacenter performance analysis of a tensor processing unit", *2017 ACM/IEEE 44th Annual International Symposium on Computer Architecture (ISCA)* (Jun. 24-28, 2017).
Kahn et al., "Communications expands its space", *Nature Photonics*, vol. 11, pp. 5-8 (Jan. 2017).
Kardar et al., "Dynamic Scaling of Growing Interfaces", *Physical Review Letters*, vol. 56, No. 9, pp. 889-892 (Mar. 3, 1986).
Karpathy, A., "CS231n: Convolutional Neural Networks for Visual Recognition", Class notes. Jan. 2018, http://cs231 n.github.io/. Accessed Oct. 31, 2018. 2 pages.
Keckler et al., "GPUs and the future of parallel computing", *IEEE Micro*, pp. 7-17 (2011).
Kieling, K. et al., "On photonic Controlled Phase Gates", *New Journal of Physics*, vol. 12, (2010), 9 pages.
Kilper et al., "Optical networks come of age", *Optics and Photonics News*, vol. 25, pp. 50-57, (Sep. 2014).
Kim et al., "A functional hybrid memristor crossbar-array/CMOS system for data storage and neuromorphic applications" *Nano Letters*, vol. 12, pp. 389-395 (2012).
Kirkpatrick et al., "Optimization by simulated annealing", *Science*, vol. 220, No. 4598, pp. 671-680 (May 13, 1983).
Knill et al., "The Bayesian brain: the role of uncertainty in neural coding and computation", *Trends in Neurosciences*, vol. 27, No. 12, pp. 712-719 (Dec. 2004).
Knill, E. et al., "A scheme for efficient quantum computation with linear optics", *Nature*, vol. 409, pp. 46-52 (Jan. 4, 2001).
Knill, E., "Quantum computing with realistically noisy devices", *Nature*, vol. 434, pp. 39-44 (Mar. 3, 2005).
Kok et al. "Linear optical quantum computing with photonic qubits", Reviews of Modern Physics, vol. 79, pp. 135-174 (2007).
Koos et al., "Silicon-organic hybrid (SOH) and plasmonic-organic hybrid (POH) integration", *Journal of Lightwave Technology*, vol. 34, No. 2, pp. 256-268 (2016).
Krizhevsky et al., "ImageNet classification with deep convolutional neural networks", *NIPS'12: Proceedings of the 25th International Conference on Neural Information Processing Systems*, pp. 1097-1105, (Dec. 2012).
Kucherenko, S. et al., "Application of Deterministic Low-Discrepancy Sequences in Global Optimization", *Computational Optimization and Applications*, vol. 30, pp. 297-318, (2005).
Kwack, M-J et al., "Monolithic InP strictly non-blocking 8×8 switch for high-speed WDM optical interconnection", *Optics Express*, vol. 20, No. 27, pp. 28734-28741, (Dec. 2012).
Lahini, Y. et al., "Anderson Localization and Nonlinearity in One Dimensional Disordered Photonic Lattices", *Physical Review Letters*, vol. 100, (Feb. 2008), 4 pages.
Lahini, Y. et al., "Quantum Correlations in Two-Particle Anderson Localization", *Physical Review Letters*, Phys. Rev. Lett. 105, pp. 163905-1-163905-4 (Oct. 15, 2010).
Laing, A. et al., "High-fidelity operation of quantum photonic circuits", *Applied Physics Letters*, vol. 97, No. 21, (Apr. 2010), 5 pages.
Landauer, "Irreversibility and heat generation in the computing process", *IBM Journal of Research and Development*, pp. 183-191, (Jul. 1961).
Lanyon, B. P. et al., "Towards quantum chemistry on a quantum computer", *Nature Chemistry*, vol. 2, pp. 106-111, (May 8, 2009).
Lawson et al., "Basic linear algebra subprograms for Fortran usage", *ACM Transactions on Mathematical Software*, vol. 5, No. 3, pp. 308-323, (Sep. 1979).
Lecun et al., "Deep learning", *Nature*, vol. 521, pp. 436-444, (May 2015).
Lecun et al., "Gradient-based learning applied to document recognition", *Proceedings of the IEEE*, vol. 86, No. 11, pp. 2278-2324 (Nov. 1998).
Levi, L. et al., "Hyper-transport of light and stochastic acceleration by evolving disorder", *Nature Physics*, vol. 8, pp. 912-917 (Dec. 2012).
Li et al., "Efficient and self-adaptive in-situ learning in multilayer memristor neural networks", *Nature Communications*, vol. 9, No. 1, (Jun. 2018), 8 pages.
Little, "The existence of persistent states in the brain", *Mathematical Biosciences*, vol. 19, Nos. 101-120, pp. 145-165 (1974).
Lu et al., "16×16 non-blocking silicon optical switch based on electro-optic Mach-Zehnder interferometers", *Optics Express*, vol. 24, No. 9, pp. 9295-9307, (2016).
Ma et al., "Optical switching technology comparison: optical MEMS vs. Other technologies", *IEEE Optical Communications*, vol. 41, No. 11, pp. S16-S23 (2003).
Macready et al., "Criticality and Parallelism in Combinatorial Optimization", *Science*, vol. 271, pp. 56-59, (Jan. 1996).
Marandi et al., "Network of time-multiplexed optical parametric oscillators as a coherent Ising machine", *Nature Photonics*, vol. 8, pp. 937-942 (Dec. 2014).
Martin-Lopez, E. et al., "Experimental realization of Shor's quantum factoring algorithm using qubit recycling", Nature Photonics, vol. 6, (Oct. 24, 2012), 7 pages.
McMahon et al., "A fully programmable 100-spin coherent Ising machine with all-to-all connections.," *Science*, vol. 354, Issue 6312, pp. 614-617, (Nov. 2016).
Mead, "Neuromorphic electronic systems", *Proceedings of the IEEE*, vol. 78, No. 10, pp. 1629-1636 (Oct. 1990).
Migdall, A. L. et al., "Tailoring single and multiphoton probabilities of a single photon on-demand source", *Physical Review A*, vol. 66, pp. 053805-1- 053805-4 (2002).
Mikkelsen, J.C. et al., "Dimensional variation tolerant silicon-on-insulator directional couplers", *Optics Express*, vol. 22, No. 3, pp. 3145-3150 (2014).
Miller, "Are optical transistors the logical next step?", *Nature Photonics*, vol. 4, pp. 3-5 (2010).
Miller, "Attojoule optoelectronics for low-energy information processing and communications", *Journal of Lightwave Technology*, vol. 35, No. 3, pp. 346-396 (Feb. 2017).
Miller, D. A. B., "Perfect optics with imperfect components", *Optica*, vol. 2, No. 8, pp. 747-750 (Aug. 2015).

(56) References Cited

OTHER PUBLICATIONS

Miller, D. A. B., "Reconfigurable add-drop multiplexer for spatial modes", *Optics Express*, vol. 21, No. 17, pp. 20220-20229, (Aug. 2013).
Miller, D. A. B., "Self-aligning universal beam coupler", *Optics Express*, vol. 21, No. 5 (Aug. 2013), 6 pages.
Miller, D. A. B., "Self-configuring universal linear optical component [invited]", *Photonics Research*, vol. 1, No. 1, pp. 1-15 (Jun. 2013).
Miller, "Energy consumption in optical modulators for interconnects", *Optics Express*, vol. 20, No. S2, pp. A293-A308 (2012).
Misra et al., "Artificial neural networks in hardware: A survey of two decades of progress", *Neurocomputing*, vol. 74, pp. 239-255 (2010).
Mohseni, M. et al., "Environment-assisted quantum walks in energy transfer of photosynthetic complexes", The Journal of Chemical Physics, vol. 129, (2008), 8 pages.
Moore, "Cramming more components onto integrated circuits", *Proceedings of the IEEE*, vol. 86, No. 1, pp. 82-85 Jan. 1998).
Mower et al., "High-fidelity quantum state evolution in imperfect photonic integrated circuits", *Physical Review A*, vol. 92, No. 3, pp. 032322-1-032322-7 (2015).
Mower, J. et al., "Efficient generation of single and entangled photons on a silicon photonic integrated chip", *Physical Review A*, vol. 84, (2011), 8 pages.
Nagamatsu et al., "A 15 NS 32×32-bit CMOS multiplier with an improved parallel structure", *Custom Integrated Circuits Conference*, Proceedings of the IEEE 1989, (1989), 4 pages.
Najafi, F. et al., "On-Chip Detection of Entangled Photons by Scalable Integration of Single-Photon Detectors", *arXiv:1405.4244 [physics.optics]* (May 16, 2014), 27 pages.
Nozaki et al., "Sub-femtojoule all-optical switching using a photonic-crystal nanocavity", *Nature Photonics*, vol. 4, pp. 477-483 (2010).
O'Brien, J. L. et al., "Demonstration of an all-optical quantum controlled-NOT gate", Nature, vol. 426, (2003), 5 pages.
Onsager, "Crystal Statistics. I. A Two-Dimensional Model with an Order-Disorder Transition", *Physical Review*, vol. 65, Nos. 3 and 4, pp. 117-149 (Feb. 1944).
Orcutt, J. S. et al., "Nanophotonic integration in state-of-the-art CMOS foundries", *Optics Express*, vol. 19, No. 3, pp. 2335-2346 (2011).
Patel et al., "Silicon Photonic Segmented Modulator-Based Electro-Optic DAC for 100 Gb/s PAM-4 Generation", *IEEE Photonics Technology Letters*, vol. 27, No. 23, pp. 2433-2436 (Dec. 1, 2015).
PCT International Preliminary Report on Patentability for International Application No. PCT/US2019/035403 dated Dec. 8, 2020, 10 pages.
PCT International Search Report and Written Opinion in PCT/US2018/041640 mailed Nov. 7, 2018, 10 pages.
PCT International Search Report and Written Opinion mailed Sep. 28, 2017 from International Application No. PCT/US2017/035668, 19 pages.
Pelissetto et al., "Critical phenomena and renormalization-group theory", *Physics Reports*, vol. 368, pp. 549-727, (2002).
Peng, "Implementation of AlexNet with Tensorflow", https://github.com/ykpengba/AlexNet-A-Practical-Implementation (2018), Accessed Dec. 3, 2018, 2 pages.
Peretto, "Collective properties of neural networks: A statistical physics approach", Biological Cybernetics, vol. 50, pp. 51-62 (1984).
Pernice, W. et al., "High-speed and high-efficiency travelling wave single-photon detectors embedded in nanophotonic circuits", *Nature Communications*, vol. 3, (2012), 23 pages.
Peruzzo, A., et al., "Quantum walk of correlated particles", *Science*, vol. 329, Issue 5998 (2010), 8 pages.
Politi, A. et al., "Integrated Quantum Photonics", *IEEE Journal of Selected Topics in Quantum Electronics*, vol. 5, Issue 6, (2009), 12 pages.
Politi, A. et al., "Silica-on-Silicon Waveguide Quantum Circuits", *Science*, vol. 320, (2008), 5 pages.

Poon et al., "Neuromorphic silicon neurons and large-scale neural networks: challenges and opportunities", *Frontiers in Neuroscience*, vol. 5, Article 108, 3 pages (2011).
Prucnal et al., "Recent progress in semiconductor excitable lasers for photonic spike processing", *Advances in Optics and Photonics*, vol. 8, No. 2, pp. 228-299 (Jun. 2016).
Psaltis et al., "Holography in artificial neural networks", *Nature*, vol. 343, pp. 325-330 (Jan. 1990).
Qiao et al., "16×16 non-blocking silicon electro-optic switch based on Mach Zehnder interferometers", *2016 Optical Fiber Communications Conference and Exhibition (OFC)*, (2016), 3 pages.
Ralph, T. C. et al., "Linear optical controlled-NOT gate in the coincidence basis", *Physical Review A*, vol. 65, pp. 062324-1-062324-5 (2002).
Ramanitra et al., "Scalable and multi-service passive optical access infrastructure using variable optical splitters", *Optical Fiber Communication Conference. Optical Society of America*, (2006), 3 pages.
Raussendorf, R. et al., "A one-way quantum computer", *Physical Review Letters*, vol. 86, No. 22, pp. 5188-5191 (2001).
Rechtsman et al., "Photonic floquet topological insulators", *Optical Society of America*, Technical Digest, 2 pages (2013).
Reck et al., "Experimental realization of any discrete unitary operator," *Physical Review Letters*, vol. 73, No. 1, pp. 58-61 (1994).
Reed, G. T. et al., "Silicon optical modulators", *Nature Photonics*, vol. 4, pp. 518-526 (2010).
Rendl et al., "Solving Max-Cut to optimality by intersecting semidefinite and polyhedral relaxations", *Mathematical Programming*, vol. 121, pp. 307-335, (2010).
Rios et al., "Integrated all-photonic non-volatile multilevel memory", *Nature Photonics*, vol. 9, pp. 725-732 (Nov. 2015).
Rogalski, "Progress in focal plane array technologies", *Progress in Quantum Electronics*, vol. 36, pp. 342-473 (2012).
Rohit, A et al., "8×8 space and wavelength selective cross-connect for simultaneous dynamic multi-wavelength routing", *Optical Fiber Communication Conference/National Fiber Optic Engineers Conference 2013*, (2013), 3 pages.
Rosenblatt, "The perceptron: a probabilistic model for information storage and organization in the brain", *Psychological Review*, vol. 65, No. 6, (1958) 23 pages.
Russakovsky et al. "ImageNet Large Scale Visual Recognition Challenge", *International Journal of Computer Vision (IJCV)*, vol. 115, pp. 211-252 (2015).
Salandrino, A. et al., "Analysis of a three-core adiabatic directional coupler", *Optics Communications*, vol. 282, pp. 4524-4526 (2009).
Schaeff et al., "Scalable fiber integrated source for higher-dimensional path-entangled photonic quNits", *Optics Express*, vol. 20, No. 15 pp. 16145-16153 (2012).
Schell et al., "DAC-free Generation of M-QAM Signals with InP Segmented Mach-Zehnder Modulators", *Optical Fiber Communication Conference*, OSA Technical Digest (online) (Optical Society of America, 2017), paper W4G.4.
Schirmer et al., "Nonlinear mirror based on two-photon absorption", *Journal of Optical Society of America B*, vol. 14, Issue 11, pp. 2865-2868 (1997).
Schmidhuber, J., "Deep learning in neural networks: An overview", *Neural Networks*, vol. 61, pp. 85-117 (2015).
Schreiber, A. et al., "Decoherence and Disorder in Quantum Walks: From Ballistic Spread to Localization", *Physical Review Letters*, vol. 106, (2011), 5 pages.
Schwartz, T. et al., "Transport and Anderson localization in disordered two-dimensional photonic lattices", *Nature*, vol. 446, pp. 52-55 (Mar. 1, 2007).
Selden, "Pulse transmission through a saturable absorber", *British Journal of Applied Physics*, vol. 18, (1967) 7 pages.
Shafiee et al., "ISAAC: A convolutional neural network accelerator with in-situ analog arithmetic in crossbars," *2016 ACM/IEEE 43rd Annual International Symposium on Computer Architecture*, (2016) 13 pages.
Shoji, Y. et al., "Low-crosstalk 2×2 thermo-optic switch with silicon wire waveguides", *Optics Express*, vol. 18, No. 9, pp. 9071-9075, (Apr. 2010).

(56) References Cited

OTHER PUBLICATIONS

Silver et al. "Mastering chess and shogi by self-play with a general reinforcement learning algorithm", *arXiv preprint arXiv:1712. 01815* (2017) 19 pages.
Silver et al., "Mastering the game of GO with deep neural networks and tree search", *Nature*, vol. 529, pp. 484-489 (2016).
Silverstone, J. et al., "On-chip quantum interference between silicon photon-pair sources", *Nature Photonics*, vol. 8, pp. 104-108 (2014).
Smith et al., "Phase-controlled integrated photonic quantum circuits", *Optics Express*, vol. 17, No. 16, pp. 13516-13525 (2009).
Soljacic et al., "Optimal bistable switching in nonlinear photonic crystals", *Physical Review E*, vol. 66, pp. 055601-1-055601-4 (2002).
Solli et al., "Analog optical computing", *Nature Photonics*, vol. 9, pp. 704-706 (Nov. 2015).
Spring, J. B. et al., "Boson sampling on a photonic chip", *Science*, vol. 339, (2013), 24 pages.
Srinivasan et al., "56 Gb/s germanium waveguide electro-absorption modulator", *Journal of Lightwave Technology*, vol. 34, No. 2, pp. 419-424 (Jan. 15, 2016).
Steinkraus et al., "Using GPUs for machine learning algorithms", *Proceedings of the 2005 Eight International Conference on Document Analysis and Recognition (ICDAR'05)*, pp. 1115-1120 (2005).
Suda et al., "Quantum interference of photons in simple networks", *Quantum Information Processing*, vol. 12, pp. 1915-1945 (2013).
Sun et al., "Large-scale nanophotonic phased array", *Nature*, vol. 493, pp. 195-199 (2013).
Sun et al., "Single-chip microprocessor that communicates directly using light", *Nature*, vol. 528, pp. 534-538 (2015).
Suzuki, K. et al., "Ultra-compact 8×8 strictly-non-blocking Si-wire PILOSS switch", *Optics Express*, vol. 22, No. 4, pp. 3887-3894 (2014).
Sze et al., "Efficient processing of deep neural networks: A tutorial and survey", *Proceedings of the IEEE*, vol. 105, No. 12, pp. 2295-2329 (2017).
Tabia, "Experimental scheme for qubit and qutrit symmetric informationally complete positive operator-valued measurements using multiport devices", *Physical Review A*, vol. 86, pp. 062107-1-062107-8 (2012).
Tait et al., "Broadcast and weight: An integrated network for scalable photonic spike processing", *Journal of Lightwave Technology*, vol. 32, No. 21, pp. 3427-3439, (2014).
Tait et al., "Photonic Neuromorphic Signal Processing and Computing", *Nanophotonic Information Physics*, pp. 183-222, Springer, Berlin, Heidelberg, (2014).
Tait et al., "Neuromorphic photonic networks using silicon photonic weight banks", *Scientific Reports*, vol. 7, Article No. 7430 (2017), 10 pages.
Tanabe et al., "Fast bistable all-optical switch and memory on a silicon photonic crystal on-chip", *Optics Letters*, vol. 30, No. 19, pp. 2575-2577 (Oct. 1, 2005).
Tanizawa, K. et al., "Ultra-compact 32×32 strictly-non-blocking Si-wire optical switch with fan-out LGA interposer", *Optics Express*, vol. 23, No. 13, pp. 17599-17606 (2015).
Thompson, M. G. et al., "Integrated waveguide circuits for optical quantum computing", *IET Circuits, Devices & Systems*, vol. 5, Issue 2, pp. 94-102 (2011).
Timurdogan et al., "An ultralow power athermal silicon modulator", *Nature Communications 5*, Article No. 4008 (2014) 11 pages.
Taiwan Office Action for Taiwan Application No. TW 109109209, dated Mar. 4, 2021, 9 pages (With English Translation).

Vandoorne et al., "Experimental demonstration of reservoir computing on a silicon photonics chip", *Nature Communications*, vol. 5, (2014) 6 pages.
Vazquez et al., "Optical NP problem solver on laser-written waveguide platform", *Optics Express*, vol. 26, No. 2, pp. 702-710 (Jan. 2018).
Vivien et al., "Zero-bias 40Gbit/s germanium waveguide photodetector on silicon", *Optics Express*, vol. 20, No. 2, pp. 1096-1101 (2012).
Wang et al., "Coherent Ising machine based on degenerate optical parametric oscillators" *Physical Review A*, vol. 88, pp. 063853-1-063853-9 (2013).
Wang et al., "Deep learning for identifying metastatic breast cancer", *arXiv:1606.05718* (2016) 6 pages.
Werbos, "Beyond regression: New tools for prediction and analysis in the behavioral sciences", *Ph.D. dissertation, Harvard University* (1974) 454 pages.
Whitfield, J. D. et al., "Simulation of electronic structure Hamiltonians using quantum computers", *Molecular Physics*, vol. 109, pp. 735-750 (2010).
Wu et al., "A 20Gb/s NRZ/PAM-4 1V Transmitter in 40nm CMOS Driving a Si- Photonic Modulator in 0.13μm CMOS", *IEEE International Solid-State Circuits Conference*, Session 7, Optical Transceivers and Silicon Photonics, 7.7, pp. 128-130 (2013).
Wu et al., "An optical fiber network oracle for NP-complete problems", *Light: Science & Applications*, vol. 3, (2014).
Xia, F., et al., "Mode conversion losses in silicon-on-insulator photonic wire based racetrack resonators", *Optics Express*, vol. 14, No. 9, pp. 3872-3886 (2006).
Xu et al., "Experimental observations of bistability and instability in a two-dimensional nonlinear optical superlattice", *Physical Review Letters*, vol. 71, No. 24, pp. 3959-3962 (Dec. 13, 1993).
Yang, M. et al., "Non-Blocking 4×4 Electro-Optic Silicon Switch for On-Chip Photonic Networks", *Optics Express*, vol. 19, No. 1, pp. 47-54 (2010).
Yao et al., "Serial-parallel multipliers", *Signals, Systems and Computers*, Conference Record of The Twenty-Seventh Asilomar Conference, pp. 359-363 (1993).
Young et al., "Recent trends in deep learning based natural language processing", *IEEE Computational Intelligence Magazine*, pp. 55-75 (Aug. 2018).
Zhou, X.-Q., et al., "Calculating Unknown Eigenvalues with a Quantum Algorithm", *Nature Photonics 7*, pp. 223-228 (2013).
Taiwan Office Action for Taiwan Application No. TW 109142936 dated Jul. 29, 2021 (With English Translation).
Patel, David et al., "Silicon Photonic Segmented Modulator-Based Electro-Optic DAC for 100 Gb/s PAM-4 Generation", IEEE Photonics Technology Letters, vol. 27, No. 23, pp. 2433-2436 (Dec. 1, 2015).
Huang, K., "A Digital Optical Cellular Image Processor (DOCIP): Theory, Architecture and Implementation", A Dissertation Presented to the Faculty of the Graduate School University of Southern California, (Sep. 1988).
Office Action in Chinese Appln. No. 202110474047.1, dated Jan. 6, 2024, 8 pages (with English translation).
Office Action in Chinese Appln. No. 202110477941.4, dated Nov. 24, 2023, 13 pages (with English translation).
U.S. Appl. No. 63/048,439, filed Jul. 6, 2020, Meng et al.
U.S. Appl. No. 63/061,995, filed Aug. 6, 2020, Meng et al.
U.S. Appl. No. 63/123,338, filed Dec. 9, 2020, Wu et al.

\* cited by examiner

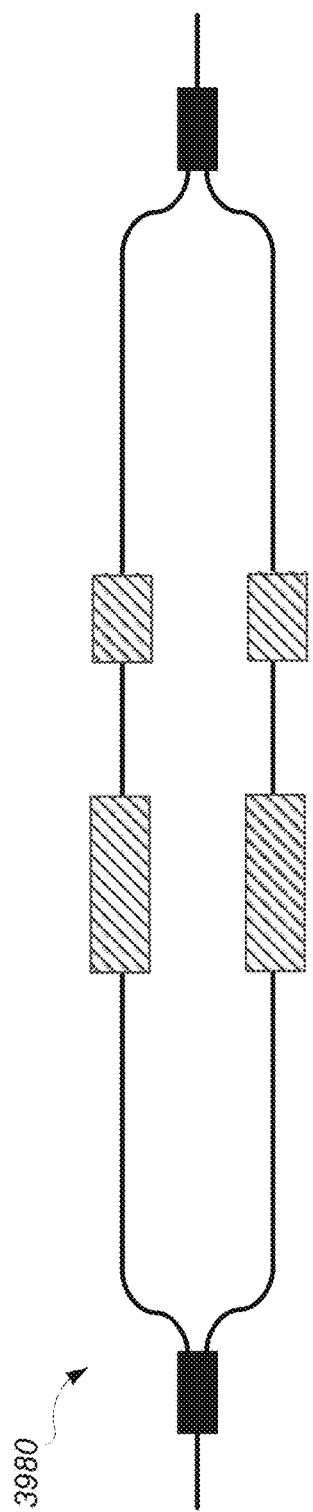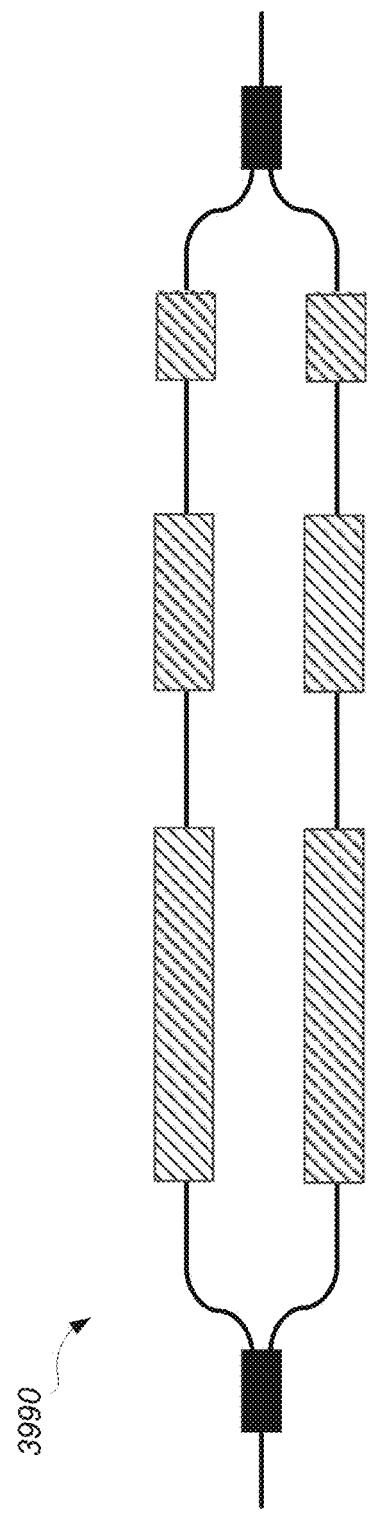

OPTICAL MODULATION FOR OPTOELECTRONIC PROCESSING

CROSS-REFERENCE TO RELATED APPLICATIONS

This application claims priority to U.S. Provisional Application 62/943,756, filed on Dec. 4, 2019, U.S. Provisional Application 63/017,211, filed on Apr. 29, 2020, U.S. Provisional Application 63/048,439, filed on Jul. 6, 2020, and U.S. Provisional Application 63/061,995, filed on Aug. 6, 2020. The entire disclosures of the above applications are hereby incorporated by reference.

TECHNICAL FIELD

This disclosure relates to optical modulation for optoelectronic processing.

BACKGROUND

Neuromorphic computing is an approach of approximating the operation of a brain in the electronic domain. A prominent approach to neuromorphic computing is an artificial neural network (ANN), which is a collection of artificial neurons that are interconnected in specific ways to process information in a way similar to how a brain functions. ANNs have found uses in a wide range of applications including artificial intelligence, speech recognition, text recognition, natural language processing, and various forms of pattern recognition.

An ANN has an input layer, one or more hidden layers, and an output layer. Each of the layers have nodes, or artificial neurons, and the nodes are interconnected between the layers. Each node of the hidden layers performs a weighted sum of the signals received from nodes of a previous layer, and performs a nonlinear transformation ("activation") of the weighted sum to generate an output. The weighted sum can be calculated by performing a matrix multiplication step. As such, computing an ANN typically involves multiple matrix multiplication steps, which are typically performed using electronic integrated circuits.

Computation performed on electronic data, encoded in analog or digital form on electrical signals (e.g., voltage or current), is typically implemented using electronic computing hardware, such as analog or digital electronics implemented in integrated circuits (e.g., a processor, application-specific integrated circuit (ASIC), or a system on a chip (SoC)), electronic circuit boards, or other electronic circuitry. Optical signals have been used for transporting data, over long distances, and over shorter distances (e.g., within data centers). Operations performed on such optical signals often take place in the context of optical data transport, such as within devices that are used for switching or filtering optical signals in a network. Use of optical signals in computing platforms has been more limited. Various components and systems for all-optical computing have been proposed. For example, such systems can include conversion from and to electrical signals at the input and output, respectively, but not use both types of signals (electrical and optical) for significant operations that are performed in computations.

SUMMARY

In general, in a first aspect, a system includes at least one input optical waveguide configured to receive an optical wave; at least one digital input port configured to receive a series of digital input values over successive time intervals, each digital input value comprising two or more bits; and an optical modulator coupled to the input optical waveguide. The optical modulator includes an optical waveguide portion including multiple diode sections positioned along the optical waveguide portion. The diode sections apply different respective modulation contributions to an optical wave propagating through the optical waveguide portion, and each respective diode section includes a semiconductor diode that has an optical path length of less than about one millimeter, and electrical contacts for applying an electrical signal to the semiconductor diode in a forward-biased state in which an optical property of the diode section is modulated in response to a value of a corresponding bit of the digital input value. The optical modulator includes signal conditioning circuitry configured to shape an amplitude change in an electrical signal applied to at least one of the semiconductor diodes in association with a corresponding change between successive digital input values in the series of digital input values.

Aspects can include one or more of the following features.

Shaping the amplitude changes in electrical signals applied to the semiconductor diodes in association with successive digital input values in the series of digital input values can include: increasing a size of an amplitude change between a first electrical signal level associated with a first time interval and a second electrical signal level associated with a second time interval for an initial portion of the second time interval.

Shaping the amplitude changes in electrical signals applied to the semiconductor diodes in association with successive digital input values in the series of digital input values can further include: decreasing a size of the amplitude change between the first electrical signal level and a second electrical signal level for a final portion of the second time interval.

Shaping the amplitude changes in electrical signals applied to the semiconductor diodes in association with successive digital input values in the series of digital input values can further include: decreasing a size of the amplitude change between the first electrical signal level and a second electrical signal level for a final portion of the second time interval.

Shaping the amplitude changes in electrical signals applied to the semiconductor diodes in association with successive digital input values in the series of digital input values can include: applying an electrical signal to the semiconductor diode through a matching electrical circuit that is configured to match an impedance associated with the semiconductor diode without significantly changing an amplitude of the applied electrical signal.

The matching electrical circuit can include a passive electrical circuit.

The matching electrical circuit can consists essentially of an inductor.

Shaping the amplitude changes in electrical signals applied to the semiconductor diodes for successive digital input values in the series of digital input values can include: applying an electrical signal to the semiconductor diode through circuitry configured to pump current between the semiconductor diode and a capacitor connected in series between the semiconductor diode and a circuit providing the series of digital input values, in which a quantity of charge transferred by the pumped current is determined based at least in part on a voltage that is constant over a plurality of successive time intervals in which the series of digital input values are provided.

The optical modulator can include an interferometric optical modulator that further includes an optical interference portion configured to provide a level of destructive optical interference that results in a predetermined amplitude reduction based on the cumulative modulation contributions of the diode sections.

The optical interference portion can include an optical combiner.

The optical waveguide portion can include: at least two optical waveguide segments that each receives an optical wave split from the same optical splitter coupled to the input optical waveguide, and provides an optical wave to the optical combiner.

The optical property of the diode section can include an effective refractive index of the diode section, and the different respective modulation contributions can include different respective phase shifts.

An optical path length of a first semiconductor diode of a first diode section can be about twice an optical path length of a second semiconductor diode of a second diode section.

Shaping the amplitude changes in electrical signals applied to the semiconductor diodes for successive digital input values in the series of digital input values can include: applying, to electrical contacts of the first diode section and to electrical contacts of the second diode section, a first predetermined shape of an electrical signal amplitude in response to a change in a value of a corresponding bit from zero to one, and a second predetermined shape of an electrical signal amplitude in response to a change in a value of a corresponding bit from one to zero.

Shaping the amplitude changes in electrical signals applied to the semiconductor diodes for successive digital input values in the series of digital input values can include: applying an electrical signal to electrical contacts of the first diode section through a first matching electrical circuit that is configured to match an impedance associated with the first semiconductor diode, and applying an electrical signal to electrical contacts of the second diode section through a second matching electrical circuit that is configured to match an impedance associated with the second semiconductor diode.

The first matching electrical circuit and the second matching electrical circuit can each consist essentially of an inductor.

The input optical waveguide can be coupled to an optical demultiplexer that separates at least two optical waves of different wavelengths.

The optical modulator can include an absorption optical modulator configured to provide a level of absorbance that results in a predetermined amplitude reduction based on the cumulative modulation contributions of the diode sections.

The optical property of the diode section can include an absorption coefficient of the diode section, and the different respective modulation contributions can include different respective absorbances.

The at least one input optical waveguide can include a plurality of input optical waveguides, a plurality of optical modulators can each be coupled to different respective input optical waveguides of the plurality of input optical waveguides, and outputs from the plurality of optical modulators can be combined to provide a result of vector-matrix multiplication.

In another general aspect, a system includes: at least one input optical waveguide configured to receive an optical wave; at least one digital input port configured to receive a series of digital input values over successive time intervals, each digital input value comprising two or more bits; and an interferometric optical modulator coupled to the input optical waveguide. The interferometric optical modulator includes an optical waveguide portion including a diode section along the optical waveguide portion. The diode section modulates an optical wave propagating through the optical waveguide portion, and the diode section includes: a semiconductor diode that has an optical path length of less than about one millimeter, and electrical contacts for applying an electrical signal to the semiconductor diode in a forward-biased state in which an optical property of the diode section is modulated in response to the digital input value. The interferometric optical modulator includes signal conditioning circuitry configured to shape an amplitude change in an electrical signal applied to the semiconductor diode in association with a corresponding change between successive digital input values in the series of digital input values. The signal conditioning circuitry includes: a first signal conditioning path that provides an unconditioned electrical signal corresponding to the series of digital input values, a second signal conditioning path that provides a delayed, scaled, and/or inverted version of the unconditioned electrical signal, and a third signal conditioning path that provides a delayed, scaled, and/or inverted version of the unconditioned electrical signal. The interferometric optical modulator further includes an optical interference portion configured to provide a level of destructive optical interference that results in a predetermined amplitude reduction based on the modulation of the optical property of the diode section.

Aspects can include one or more of the following features. The optical interference portion can include coupling portions of each optical waveguide of a pair of optical waveguides, in which the coupling portions of each optical waveguide are in proximity to each other.

The optical waveguide portion can include a first optical waveguide of the pair of optical waveguides that is formed in a closed path.

In another general aspect, a system includes at least one input optical waveguide configured to receive an optical wave; at least one digital input port configured to receive a series of digital input values, each digital input value including two or more bits; and an optical modulator coupled to the input optical waveguide, the optical modulator including an optical waveguide portion that includes multiple diode sections positioned along the optical waveguide portion, in which the diode sections are configured to apply different respective modulation contributions to an optical wave propagating through the optical waveguide portion.

Aspects can include one or more of the following features. The optical modulator can include signal conditioning circuitry configured to shape an amplitude change in an electrical signal applied to at least one of the diode sections in association with a corresponding change between successive digital input values in the series of digital input values.

Each diode section can include: a semiconductor diode, and electrical contacts for applying an electrical signal to the semiconductor diode in a forward-biased state in which an optical property of the diode section is modulated in response to a value of a corresponding bit of the digital input value.

Each semiconductor diode can have an optical path length of less than about one millimeter.

In another general aspect, a system includes: at least one input optical waveguide configured to receive an optical wave; at least one digital input port configured to receive a series of digital input values, each digital input value including two or more bits; and an interferometric optical modulator coupled to the at least one input optical waveguide. The interferometric optical modulator includes an optical waveguide portion including a diode section positioned along the optical waveguide portion, in which the diode section is configured to modulate an optical wave propagating through the optical waveguide portion. The interferometric optical modulator includes signal conditioning circuitry configured to shape an amplitude change in an electrical signal applied to the diode section in association with a corresponding change between successive digital input values in the series of digital input values. The signal conditioning circuitry includes: a first signal conditioning path that provides an unconditioned electrical signal corresponding to the series of digital input values, a second signal conditioning path that provides a delayed, scaled, and/or inverted version of the unconditioned electrical signal, and a third signal conditioning path that provides a delayed, scaled, and/or inverted version of the unconditioned electrical signal.

Aspects can include one or more of the following features. The diode section can include a semiconductor diode that has an optical path length of less than about one millimeter.

The interferometric optical modulator can include an optical interference portion configured to provide a level of destructive optical interference that results in a predetermined amplitude reduction based on the modulation of the optical property of the diode section.

The diode section can include: a semiconductor diode, and electrical contacts for applying an electrical signal to the semiconductor diode in a forward-biased state in which an optical property of the diode section is modulated in response to the digital input value.

The semiconductor diode can have an optical path length of less than about one millimeter.

In another general aspect, a system includes an optical modulator configured to modulate an optical wave representing a series of digital input values, each digital input value including two or more bits. The optical modulator includes an optical waveguide portion that includes multiple diode sections positioned along the optical waveguide portion. The diode sections are configured to apply different respective modulation contributions to the optical wave as the optical wave propagates through the optical waveguide portion. Each diode section includes a semiconductor diode that is configured to operate in a forward-biased state in which an optical property of the diode section is modulated in response to a value of a corresponding bit of the digital input value. The optical modulator includes signal conditioning circuitry configured to shape an amplitude change in an electrical signal applied to at least one of the diode sections in association with a corresponding change between successive digital input values in the series of digital input values.

Aspects can include the following feature. Each semiconductor diode can have an optical path length of less than about one millimeter.

In another general aspect, a system includes: a first unit configured to generate a first set of modulator control signals, a second unit configured to generate a second set of modulator control signals, and a processor unit. The processor unit includes a light source or port configured to provide a plurality of light outputs, and a first set of optical modulators coupled to the light source or port and the first unit. The optical modulators in the first set are configured to generate an optical input vector by modulating the plurality of light outputs provided by the light source or port based on digital input values corresponding to the first set of modulator control signals, the optical input vector comprising a plurality of optical signals. The processor unit also includes a matrix multiplication unit that includes a second set of optical modulators. The matrix multiplication unit is coupled to the second unit, and is configured to transform the optical input vector into an analog output vector based on a plurality of digital weight values corresponding to the second set of modulator control signals. At least one optical modulator in the first set of optical modulators includes a first optical waveguide portion that includes multiple diode sections positioned along the first optical waveguide portion. The diode sections are configured to apply different respective modulation contributions to an optical wave propagating through the first optical waveguide portion based on different respective single bits of one of the digital input values. At least one optical modulator in the second set of optical modulators includes a second optical waveguide portion that includes a single diode section configured to apply a modulation to an optical wave propagating through the second optical waveguide portion based on multiple bits of one of the digital weight values.

Aspects can include the following feature. Each respective diode section includes a semiconductor diode configured to operate in a forward-biased state in which an optical property of the diode section is modulated in response to a value of a corresponding bit of one of the digital input values.

In another general aspect, a system includes: at least one input optical waveguide configured to receive an optical wave; at least one digital input port configured to receive a series of digital input values over successive time intervals, each digital input value including two or more bits; and an optical modulator coupled to the input optical waveguide. The optical modulator includes: an optical waveguide portion including multiple optical waveguide segments that are associated with multiple diode sections positioned along the corresponding optical waveguide segment, the optical waveguide segments being part of a continuous optical waveguide, in which the diode sections are configured to apply different respective modulation contributions to an optical wave propagating through the optical waveguide segments. Each respective diode section includes: a semiconductor diode that is associated with an optical path length of less than about one millimeter, and electrical contacts for applying an electrical signal to the semiconductor diode in a forward-biased state in which an optical property of the optical waveguide segment associated with the diode section is modulated in response to a value of a corresponding bit of the digital input value, and signal conditioning circuitry configured to shape an amplitude change in an electrical signal applied to at least one of the semiconductor diodes in association with a corresponding change between successive digital input values in the series of digital input values.

In another general aspect, a system includes: at least one input optical waveguide configured to receive an optical wave; at least one input port configured to receive a series of modulator control signals; and an optical modulator coupled to the input optical waveguide configured to provide pulse amplitude modulation with four or more amplitude levels. The optical modulator includes a first modulator arm and a second modulator arm, at least one of the first or second modulator arm includes an optical waveguide and multiple phase shifters positioned along the optical waveguide, the phase shifters are configured to apply different respective modulation contributions to an optical wave propagating through the optical waveguide, each phase shifter is coupled to a respective signal conditioning circuitry configured to provide enhanced bandwidth for binary modulation, and different phase shifters are coupled to different signal conditioning circuitry. Each phase shifter includes a semiconductor diode or a capacitor that is associated with an optical path length of less than about one millimeter. The system includes control circuitry configured to, for each phase shifter, at least one of (i) provide an electrical signal to the semiconductor diode to cause the semiconductor diode to be forward-biased in which an optical property of the optical waveguide associated with the phase shifter is modulated in response to the modulator control signals, or (ii) provide an electrical signal to the capacitor to cause electric charges to accumulate at the capacitor in which an optical property of the optical waveguide associated with the phase shifter is modulated in response to the modulator control signals.

In another general aspect, a system includes: an optical modulator configured to modulate an optical wave representing a series of digital input values, each digital input value comprising two or more bits, the optical modulator comprising an optical waveguide portion that includes multiple diode sections positioned along the optical waveguide portion, in which the diode sections are configured to apply different respective modulation contributions to the optical wave as the optical wave propagates through the optical waveguide portion. Each diode section includes a semiconductor diode that is configured to operate in a forward-biased state in which an optical property of the diode section is modulated in response to a value of a corresponding bit of the digital input value. The optical modulator includes a plurality of signal conditioning circuits configured to shape an amplitude change in an electrical signal applied to each of the diode sections in association with a corresponding change between successive digital input values in the series of digital input values, in which each signal conditioning circuit is associated with one of the diode sections, and different diode sections are associated with different signal conditioning circuits.

In another general aspect, a system includes: a first set of optical modulators configured to generate an optical input vector by modulating a plurality of input light signals based on modulator control signals, the optical input vector comprising a plurality of optical signals; and a matrix processing unit comprising a second set of optical modulators, the matrix processing unit is coupled to the modulator array and is configured to transform the optical input vector into an analog output vector based on a plurality of weight values. At least one optical modulator in the first set of optical modulators includes a first modulator arm and a second modulator arm, at least one of the first or second modulator arm includes an optical waveguide and at least two phase shifters positioned along the optical waveguide, each phase shifter is configured to apply a modulation contribution to an optical wave propagating through the optical waveguide based on one of the modulation control signals, different phase shifters are configured to apply different respective modulation contributions to the optical wave propagating through the optical waveguide in response to the same modulation control signal level. At least one optical modulator in the second set of optical modulators includes a first modulator arm and a second modulator arm, each of the first and second modulator arms includes an optical waveguide, at least one of the first and second modulator arms includes a single phase shifter positioned along the optical waveguide, each of the first and second modulator arms includes no more than one phase shifter.

In another general aspect, a system includes: a first unit configured to generate a plurality of modulator control signals; and a processor unit. The processor unit includes: a light source configured to provide a plurality of light outputs, a modulator array, and a matrix processing unit. The modulator array includes a first set of plurality of optical modulators coupled to the light source and the first unit, the plurality of optical modulators being configured to generate an optical input vector by modulating the plurality of light outputs provided by the light source based on the plurality of modulator control signals, the optical input vector including a plurality of optical signals, in which each of the plurality of optical modulators has a segmented design and includes two or more phase shifters, and each of the phase shifters is associated with a signal conditioning circuit configured to implement pre-emphasis and de-emphasis of the phase shifter to enhance an operating bandwidth of the phase shifter. The matrix processing unit is coupled to the modulator array and the first unit, the matrix processing unit being configured to transform the optical input vector into an analog output vector based on a plurality of weight control signals, in which the matrix processing unit includes a second set of plurality of optical modulators that have a non-segmented design, each optical modulator has a single phase shifter in at least one modulator arm, each modulator arm has no more than one phase shifter. The system includes a second unit coupled to the matrix multiplication unit and configured to convert the analog output vector into a digitized output vector; and a controller including integrated circuitry configured to perform operations including: receiving an artificial neural network computation request including an input dataset that includes a first digital input vector; receiving a first plurality of neural network weights; and generating, through the first unit, a first plurality of modulator control signals based on the first digital input vector and a first plurality of weight control signals based on the first plurality of neural network weights.

In another general aspect, an ANN computing method includes: receiving a digital electronic input vector; converting the digital electronic input vector to an analog optical input vector using a modulator array comprising a first set of optical modulators using a segmented design; processing the analog optical input vector using a matrix processing unit that comprises a second set of optical modulators using a non-segmented design; and driving the first set of optical modulators using charge-pump bandwidth enhancement circuits based on the digital electronic input vector or a processed version of the digital electronic input vector. The first set of optical modulators are reconfigured at a first frequency, the second set of optical modulators are reconfigured at a second frequency, and the first frequency is greater than the second frequency.

In another general aspect, an ANN computing method includes: receiving a digital electronic input value having at least a first bit and a second bit; generating a first modulator control signal based on the first bit of the digital electronic input value; generating a second modulator control signal based on the second bit of the digital electronic input value; controlling a first phase shifter of an optical modulator based on the first modulator control signal to cause the first phase shifter to impart a first amount of phase shift to an optical wave propagating in a first waveguide; and controlling a second phase shifter of the optical modulator based on the second modulator control signal to cause the second phase shifter to impart a second amount of phase shift to the optical wave propagating in the first waveguide. The second amount of phase shift imparted by the second phase shifter is weighted twice the first amount of phase shift imparted by the first phase shifter. The method includes driving the first phase shifter using a first charge-pump bandwidth enhancement circuit based on the first modulator control signal; and driving the second phase shifter using a second charge-pump bandwidth enhancement circuit based on the first modulator control signal.

Aspects can have one or more of the following advantages.

In some embodiments described herein, the type of components that are used to perform optical modulation, and/or the characteristics of those components, are selected to provide performance improvements or other design advantages in the resulting optoelectronic computing system. In a system that is fabricated using a silicon photonics technology, an optical waveguide can be formed in the silicon and there are various types of semiconductor diode structures that can be formed by doping the silicon in proximity to the waveguide to enable modulation of an optical wave propagating in the waveguide. For example, PIN diode structures or metal-oxide-semiconductor (MOS) capacitors can be designed to enable free-carrier-based modulation by carrier injection, carrier depletion, or carrier accumulation, using different doping profiles. Carrier injection uses a forward-biased PIN diode structure that typically has a relatively small size (e.g., shorter than 1 mm) due to the high modulation efficiency but provides lower-speed modulation (e.g., less than around 1 Gb/s), and carrier depletion uses a reverse-biased PIN diode structure that typically has a larger size (e.g., longer than 1 mm) but provides higher-speed modulation (e.g., greater than around 1 Gb/s). In some examples, carrier accumulation uses a capacitor to store charges in which the capacitor includes a thin vertical insulation layer. The thin vertical insulation layer can be difficult to fabricate for some semiconductor processes. Thus, for some semiconductor manufacturing processes, the forward-biased PIN diode structure for implementing carrier injection can be easier to fabricate.

Carrier injection provides both small size and low power characteristics that are useful in large scale optoelectronic computing system that has a dense array of modulators. Using a segmented modulator design for multi-bit modulation (e.g., PAM modulation) in combination with a carrier injection PIN diode structure, as described in more detail below, it is possible to use bandwidth-enhancement techniques to overcome the bandwidth limitations (e.g., increasing the bandwidth by around a factor of 10) in a simple and compact design that is suitable for the dense arrangement of modulators within the system. Since the resulting enhanced bandwidth does not necessarily need to be as high as can be achieved in a carrier depletion or carrier accumulation modulator, the combination of simple bandwidth enhancement enabled by the segmented modulator and the compact size of a carrier injection modulator synergistically provide advantages that are especially useful in some of the system embodiments described herein. Some forms of bandwidth enhancement, such as pre-emphasis, can be challenging to implement when there are more than two amplitude levels. But, with a segmented modulator, individual binary pre-emphasis can be implemented for the two amplitude levels of each bit of a multi-bit modulation, as described in more detail below.

Additionally, because of the computations being performed using the modulated optical signals, the number of analog amplitude levels of the results of those computations being sampled when converting to digital signals (e.g., 8-bit signals using PAM-256 modulation) can be larger than the number of levels of the inputs to those computations (e.g., 4-bit signals using PAM-16 modulation). For example, a 4-bit value multiplied by another 4-bit value can result in a value that is suitably represented by 8 bits. So, the use of bandwidth-enhancement to increase the signal to noise ratio is also motivated by the need for effective analog-to-digital conversion in the context of the increase in resolution needed after the input signals are processed by the optoelectronic computing system.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 10 to 16 are diagrams of example Mach-Zehnder modulators.

Like reference numbers and designations in the various drawings indicate like elements.

DETAILED DESCRIPTION

Figure 1:
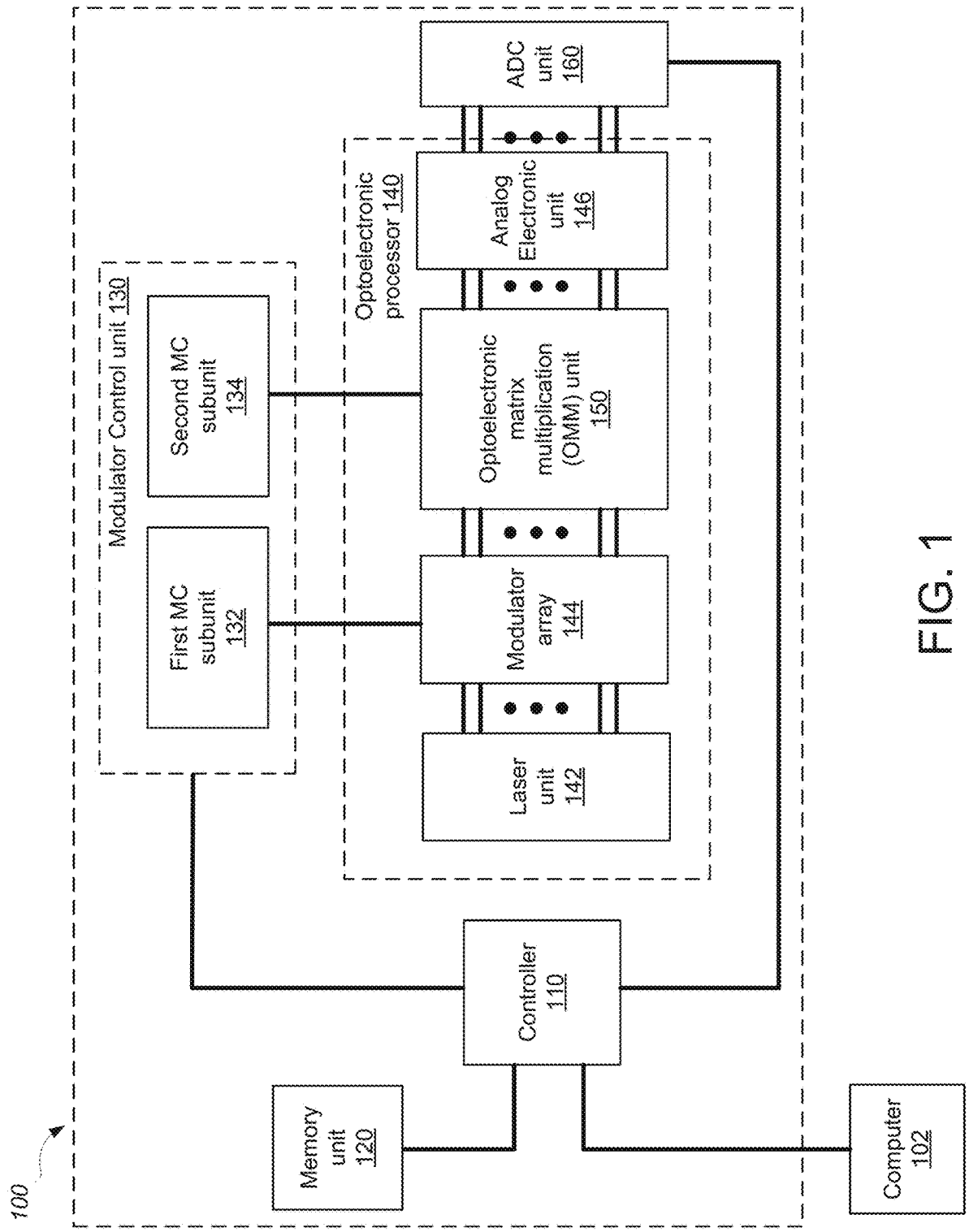
FIG. 1 is a schematic diagram of an example of an artificial neural network (ANN) computation system.

FIG. 1 shows a schematic diagram of an example of an artificial neural network (ANN) computation system 100. The system 100 includes a controller 110, a memory unit 120, a modulator control (MC) unit 130, an optoelectronic processor 140, and an analog-to-digital converter (ADC) unit 160. The controller 110 is coupled to a computer 102, the memory unit 120, the MC unit 130, and the ADC unit 160. The controller 110 includes integrated circuitry that is configured to control the operation of the ANN computation system 100 to perform ANN computations.

The integrated circuitry of the controller 110 can be an application specific integrated circuit specifically configured to perform the steps of an ANN computation process. For example, the integrated circuitry can implement a microcode or a firmware specific to performing the ANN computation process. As such, the controller 110 can have a reduced set of instructions relative to a general purpose processor used in conventional computers, such as the computer 102. In some implementations, the integrated circuitry of the controller 110 can include two or more circuitries configured to perform different steps of the ANN computation process.

In an example operation of the ANN computation system 100, the computer 102 can issue an artificial neural network computation request to the ANN computation system 100. The ANN computation request can include neural network weights that define an ANN, and an input dataset to be processed by the provided ANN. The controller 110 receives the ANN computation request, and stores the input dataset and the neural network weights in the memory unit 120.

The input dataset can correspond to various digital information to be processed by the ANN. Examples of the input dataset include image files, audio files, LiDAR point cloud, biological data files, and GPS coordinates sequences, and the operation of the ANN computation system 100 will be described based on receiving an image file as the input dataset. In general, the size of the input dataset can vary greatly, from hundreds of data points to millions of data points or larger. For example, a digital image file with a resolution of 1 megapixel has approximately one million pixels, and each of the one million pixels can be a data point to be processed by the ANN. Due to the large number of data points in a typical input dataset, the input dataset is typically divided into multiple digital input vectors of smaller size to be individually processed by the optoelectronic processor 140. As an example, for a greyscale digital image, the elements of the digital input vectors can be 8-bit values representing the intensity of the image, and the digital input vectors can have a length that ranges from 10's of elements (e.g., 32 elements, 64 elements) to hundreds of elements (e.g., 256 elements, 512 elements). In general, input dataset of arbitrary size can be divided into digital input vectors of a size suitable for processing by the optoelectronic processor 140. In cases where the number of elements of the input dataset is not divisible by the length of the digital input vector, zero padding can be used to fill out the data set to be divisible by the length of the digital input vector. The processed outputs of the individual digital input vectors can be processed to reconstruct a complete output that is a result of processing the input dataset through the ANN. In some implementations, the dividing of the input data set into multiple input vectors and subsequent vector-level processing can be implemented using block matrix multiplication techniques.

The neural network weights are a set of values that define the connectivity of the artificial neurons of the ANN, including the relative importance, or weights, of those connections. An ANN can include one or more hidden layers with respective sets of nodes. In the case of an ANN with a single hidden layer, the ANN can be defined by two sets of neural network weights, one set corresponding to the connectivity between the input nodes and the nodes of the hidden layer, and a second set corresponding to the connectivity between the hidden layer and the output nodes. Each set of neural network weights that describes the connectivity corresponds to a matrix to be implemented by the optoelectronic processor 140. For ANNs with two or more hidden layers, additional sets of neural network weights are needed to define the connectivity between the additional hidden layers. As such, in general, the neural network weights included in the ANN computation request can include multiple sets of neural network weights that represent the connectivity between various layers of the ANN.

As the input dataset to be processed is typically divided into multiple smaller digital input vectors for individual processing, the input dataset is typically stored in a digital memory. However, the speed of memory operations between a memory and a processor of the computer 102 can be significantly slower than the rate at which the ANN computation system 100 can perform ANN computations. For example, the ANN computation system 100 can perform tens to hundreds of ANN computations during a typical memory read cycle of the computer 102. As such, the rate at which ANN computations can be performed by the ANN computation system 100 can be limited below its full processing rate if an ANN computation by the ANN computation system 100 involves multiple data transfers between the system 100 and the computer 102 during the course of processing an ANN computation request. For example, if the computer 102 were to access the input dataset from its own memory and provide the digital input vectors to the controller 110 when requested, the operation of the ANN computation system 100 would likely be greatly slowed down by the time needed for the series of data transfers that would be needed between the computer 102 and the controller 110. It should be noted that a memory access latency of the computer 102 is typically non-deterministic, which further complicates and degrades the speed at which digital input vectors can be provided to the ANN computation system 100. Further, the processor cycles of the computer 102 can be wasted on managing the data transfer between the computer 102 and the ANN computation system 100.

Instead, in some implementations, the ANN computation system 100 stores the entire input dataset in the memory unit 120, which is a part of and is dedicated for use by the ANN computation system 100. The dedicated memory unit 120 allows transactions between the memory unit 120 and the controller 110 to be specifically adapted to allow a smooth and uninterrupted flow of data between the memory unit 120 and the controller 110. Such uninterrupted flow of data can significantly improve the overall throughput of the ANN computation system 100 by allowing the optoelectronic processor 140 to perform matrix multiplication at its full processing rate without being limited by slow memory operations of a conventional computer such as the computer 102. Further, because all of the data needed in performing the ANN computation can be provided by the computer 102 to the ANN computation system 100 in a single transaction, the ANN computation system 100 is able to perform its ANN computation in a self-contained manner independent of the computer 102. This self-contained operation of the ANN computation system 100 offloads the computation burden from the computer 102 and removes external dependencies in the operation of the ANN computation system 100, improving the performances of both the system 100 and the computer 102.

Example implementations of the optoelectronic processor 140 and the MC unit 130 will now be described. In some implementations, the optoelectronic processor 140 includes a laser unit 142, a modulator array 144, an optoelectronic matrix multiplication (OMM) unit 150, and an analog electronic unit 146. The modulator array 144 modulates optical waves received from the laser unit 142 to provide an optical input vector of length N based on encoded input data (e.g., digital input data) provided by the MC unit 130, and the optical input vector propagates to the OMNI unit 150. The OMM unit 150 receives the optical input vector of length N and performs, in the optical domain, a matrix multiplication on the received optical input vector. The matrix multiplication can be an N×N matrix multiplication that is determined by an internal configuration of the OMM unit 150. The internal configuration of the OMNI unit 150 can be controlled by electrical signals, such as those generated by the MC unit 130.

Figure 2:
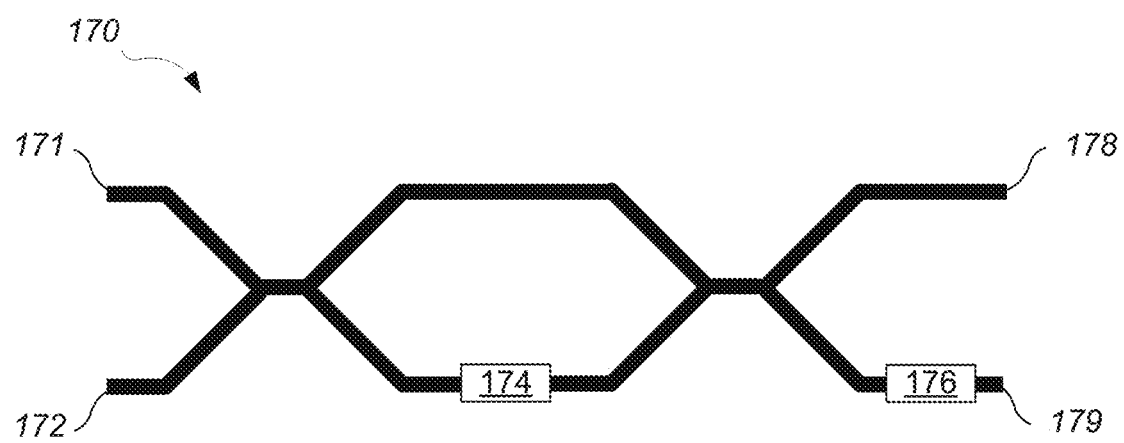
FIG. 2 is a schematic diagram of an example of an MZI.

The OMNI unit 150 can be implemented in various ways. For example, optical modulation that is used by the modulator array 144 and/or the OMM unit 150 can include a plurality of interconnected Mach-Zehnder interferometers (MZIs). FIG. 2 shows a schematic diagram of an example of an MZI 170. The MZI 170 includes a first input waveguide 171, a second input waveguide 172, a first output waveguide 178, and a second output waveguide 179. Further, each MZI 170 in the plurality of interconnected MZIs includes at least a first phase shifter 174 in one of the arms configured to change a splitting ratio of the MZI 170, and in some examples can include phase shifters in both arms configured for push-pull operation. In some implementations, a second phase shifter 176 is configured to shift a phase of one output of the MZI 170, such as the light exiting the MZI 170 through the second output waveguide 179. The first phase shifters 174 and the second phase shifters 176 of the MZIs 170 are coupled to the plurality of weight control signals generated by the MC unit 130. The first and second phase shifters 174 and 176 are examples of reconfigurable elements of the OMM unit 150. Examples of the reconfiguring elements include thermo-optic phase shifters or electro-optic phase shifters. Thermo-optic phase shifters operate by heating the waveguide to change the refractive index of the waveguide and cladding materials, which translates to a change in phase. Electro-optic phase shifters operate by applying an electric field (e.g., $LiNbO_3$, reverse biased PN junctions) or electrical current (e.g., forward biased PIN junctions), which changes the refractive index of the waveguide material. By varying the weight control signals, the phase delays of the first and second phase shifters 174 an 176 of each of the interconnected MZIs 170 can be varied, which reconfigures the optical interference unit 154 of the OMNI unit 150 to implement a particular matrix multiplication that is determined by the phase delays set across the entire optical interference unit 154. Additional embodiments of the OMM unit 150 and the optical interference unit 154 are disclosed in U.S. Patent Publication No. US 2017/0351293 A1, titled "APPARATUS AND METHODS FOR OPTICAL NEURAL NETWORK," U.S. Patent Publication No. US 20190370652 A1, titled "OPTOELECTRONIC COMPUTING SYSTEMS," U.S. Patent Publication No. US 20200110992 A1, titled "OPTOELECTRONIC COMPUTING SYSTEMS," and PCT Publication No. WO 2020191217 A1, titled "OPTOELECTRONIC COMPUTING SYSTEMS," which are fully incorporated by reference herein.

The optical input vector is generated through the laser unit 142 and the modulator array 144. The optical input vector of length N has N independent optical signals that each have an intensity that corresponds to the value of respective element of a digital input vector of length N. As an example, the laser unit 142 can generate N light outputs. In this example, the N light outputs are of the same wavelength, and are coherent. Optical coherence of the light outputs allow the light outputs to optically interfere with each other, which is a property utilized by the OMNI unit 150 (e.g., in the operation of the MZIs). Further, the light outputs of the laser unit 142 can be substantially identical to each other. For example, the N light outputs can be substantially uniform in their intensities (e.g., within 5%, 3%, 1%, 0.5%, 0.1% or 0.01%) and in their relative phases (e.g., within 10 degrees, 5 degrees, 3 degrees, 1 degree, 0.1 degree). The uniformity of the light outputs can improve the faithfulness of the optical input vector to the digital input vector, improving the overall accuracy of the optoelectronic processor 140. In some implementations, the light outputs of the laser unit 142 can have optical powers that range from 0.1 mW to 50 mW per output, wavelengths in the near infrared range (e.g., between 900 nm and 1600 nm), and linewidths less than 1 nm. The light outputs of the laser unit 142 can be single transverse-mode light outputs.

In some implementations, the laser unit 142 includes a single laser source and an optical power splitter. The single laser source is configured to generate laser light. The optical power splitter is configured to split the light generated by the laser source into N light outputs of substantially equal intensities and phase. By splitting a single laser output into multiple outputs, optical coherence of the multiple light outputs can be achieved. The single laser source can be, for example, a semiconductor laser diode, a vertical-cavity surface-emitting laser (VCSEL), a distributed feedback (DFB) laser, or a distributed Bragg reflector (DBR) laser. The optical power splitter can be, for example, a 1:N multimode interference (MMI) splitter, a multi-stage splitter including multiple 1:2 MMI splitter or directional-couplers, or a star coupler. In some other implementations, a master-slave laser configuration can be used, in which the slave lasers are injection locked by the master laser to have a stable phase relationship to the master laser.

The light outputs of the laser unit 142 are coupled to the modulator array 144. The modulator array 144 is configured to receive the light inputs from the laser unit 142 and modulate the intensities of the received light inputs based on modulator control signals, which are electrical signals. Examples of modulators include Mach-Zehnder Interferometer (MZI) modulators, ring resonator modulators, and electro-absorption modulators. For example, an electro-absorption modulator includes electrodes that apply an electric field to a waveguide segment to modulate the absorption spectrum of the waveguide segment and thereby modulate the intensity of light propagating in the waveguide segment. The modulator array 144 has N modulators that each receives one of the N light outputs of the laser unit 142. A modulator receives a control signal that corresponds to an element of the digital input vector and modulates the intensity of the light. The control signal can be generated by the MC unit 130.

The MC unit 130 is configured to generate multiple modulator control signals and to generate multiple weight control signals under the control of the controller 110. For example, the MC unit 130 receives, from the controller 110, a first modulator control signal that corresponds to the digital input vectors to be processed by the optoelectronic processor 140. The MC unit 130 generates, based on the first modulator control signal, the modulator control signals, which are analog signals suitable for driving the modulator array 144 and the OMNI 150. The analog signals can be voltages or currents, for example, depending on the technology and design of the modulators of the array 144 and the OMNI 150. The voltages can have an amplitude that ranges from, e.g., ±0.1 V to ±10 V, and the current can have an amplitude that ranges from, e.g., 100 µA to 100 mA. In some implementations, the MC unit 130 can include modulator drivers that are configured to buffer, amplify, or condition the analog signals so that the modulators of the array 144 and the OMNI 150 can be adequately driven. For example, some types of modulators can be driven with a differential control signal. In such cases, the modulator drivers can be differential drivers that produce a differential electrical output based on a single-ended input signal.

In some implementations, the optoelectronic processor 140 can include some types of modulators that have a 3 dB bandwidth that is less than a desired processing rate of the optoelectronic processor 140. In such cases, the modulator drivers can include pre-emphasis circuits or other bandwidth-enhancing circuits that are designed to extend the operating bandwidth of the modulators. Such bandwidth-enhancement can be useful, for example, with modulators that are based on PIN diode structures forward-biased to use carrier injection for modulating a refractive index of a portion of a waveguide that is guiding an optical wave being modulated. For example, if the modulator is an MZI modulator, the PIN diode structure can be used to implement a phase shifter in one or both arms of the MZI modulator. Configuring the phase shifter for forward-biased operation facilitates shorter modulator lengths and more compact overall design. Either one or both of the modulator array 144 and the OMNI unit 150 can include modulators that are based on PIN diode structures forward-biased to use carrier injection for modulation. This is useful for making the modulator array 144 and/or the OMNI unit 150 (which can have a large number of modulators) more compact.

In some implementations, either one or both of the modulator array 144 and the OMNI unit 150 can use modulators that use carrier accumulation designs that incorporate MOS-type capacitor structures into the optical waveguides, e.g., MOS-capacitor-based MZI modulators. The selection of which type of modulator to use, such as whether to use carrier injection or carrier accumulation, can be based in part on the overall semiconductor manufacturing process used to fabricate the optoelectronic processor 140.

For example, in a pre-emphasis form of bandwidth-enhancement, an analog electrical signal (e.g., voltage or current) that drives a modulator can be shaped to include a transient pulse that overshoots a change in an analog signal level that represents a given digital data value of a modulator control signal in a series of digital data values. Each digital data value can have any number of bits, including a single 1-bit data value, as assumed for the rest of this example. Thus, if a value of a bit is the same as a previous value, the analog electrical signal driving a modulator is maintained at a steady-state level (e.g., a signal level $X_0$ for a bit value of 0, and a higher signal level $X_1$ for a bit value of 1). However, if a bit changes from 0 to 1, the corresponding analog electrical signal used to drive the modulator can include a transient pulse with a peak value of $X_1+(X_1-X_0)$ at the onset of the bit transition before leveling off to a steady state value of $X_1$. Likewise, if a bit changes from 1 to 0, the corresponding analog electrical signal used to drive the modulator can include a transient pulse with a peak value of $X_0+(X_0-X_1)$ at the onset of the bit transition before leveling off to a steady state value of $X_0$. The size and length of the transient pulse can be selected to optimize the bandwidth enhancement (e.g., maximizing an open area of an eye diagram of a non-return-to-zero (NRZ) modulation pattern).

Figure 3:
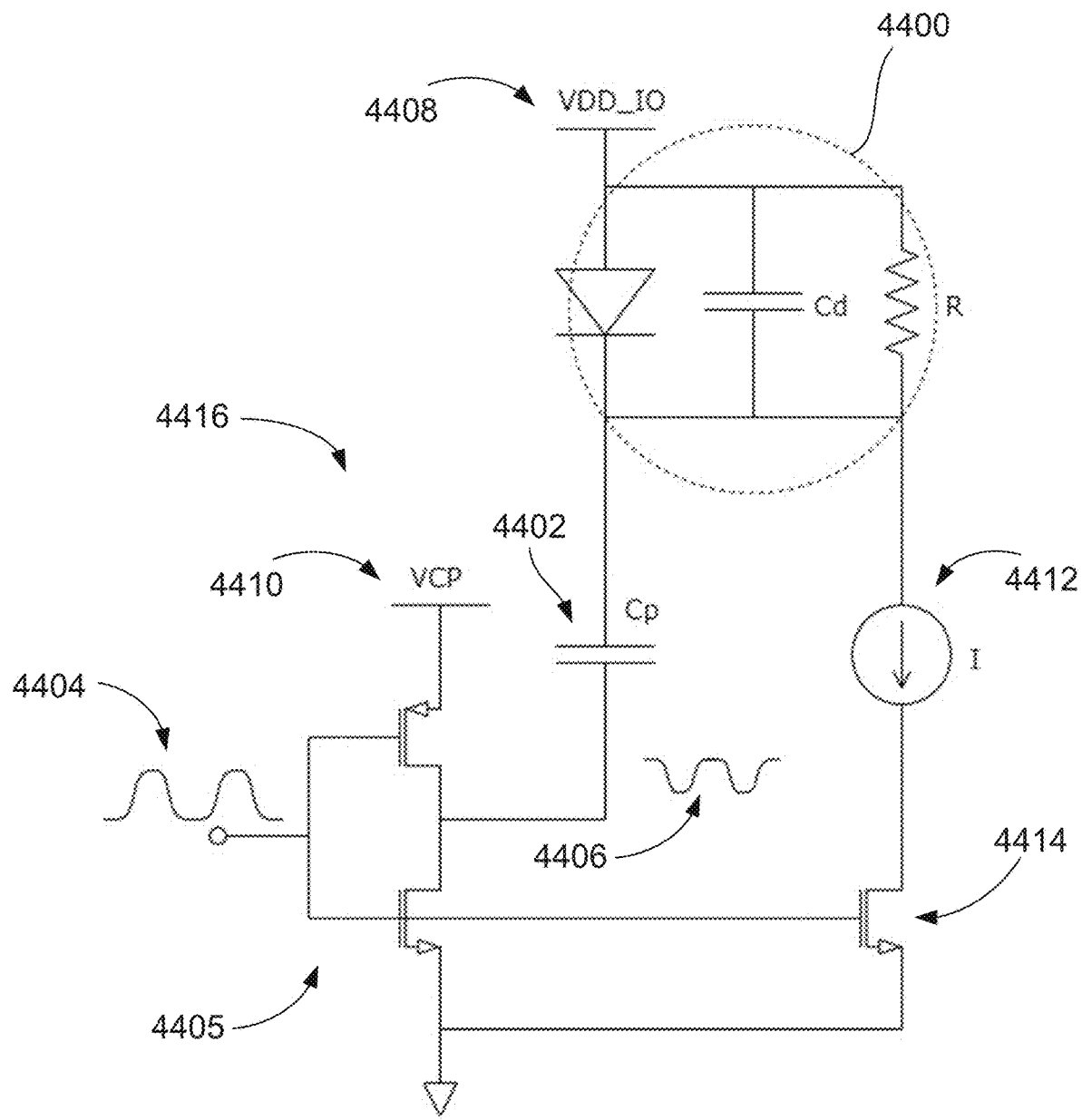
FIG. 3 is a schematic diagram of an example charge-pump bandwidth-enhancing circuit.

In a charge-pump form of bandwidth enhancement, an analog current signal that drives a modulator can be shaped to include a transient pulse that moves a precisely determined amount of charge. FIG. 3 shows an example implementation a charge-pump bandwidth-enhancing circuit 4416 that uses a capacitor connected in series between a voltage source and a modulator for precise control of charge flow. A portion of the circuit shown in FIG. 3 can be included in the modulator drivers discussed above. In this example, the modulator is represented by a modulator circuit 4400 that models the electrical characteristics of the modulator's phase shifter as a PIN diode. The modulator circuit 4400 includes a parallel connection of an ideal diode, a capacitor having capacitance Ca, and a resistor having resistance R. A pump capacitor 4402 has a capacitance $C_p$. A control voltage waveform 4404 is provided to an inverter circuit 4405 to generate a driving voltage waveform 4406 whose amplitude can be precisely calibrated to move a predetermined amount of charge to or from the modulator circuit 4400 via the pump capacitor 4402. The PIN diode modeled by the modulator circuit 4400 is forward-biased by applying a constant voltage VDD_IO at a terminal 4408. A charge-pump control voltage VCP is applied at a terminal 4410 of the inverter 4405 to control the amount of charge pumped upon transitions in the driving voltage waveform 4406, and the corresponding optical phase shift applied by the modulator.

The value of the voltage VCP can be tuned before operation such that a nominal charge Q stored in the charge pump capacitor 4402 is precisely calibrated based on a measured value of the capacitance $C_p$ (which can have some variability due to uncertainties during manufacturing, for example). For example, the voltage VCP can be equal to the nominal charge Q divided by the capacitance $C_p$. The resulting change in the refractive index of a portion of a waveguide intersecting the PIN diode can then provide a shift in phase of a guided optical wave that is linearly proportional to the amount of charge Q that is moved between the PIN diode (e.g., stored via the internal capacitance $C_d$) and the charge pump capacitor 4402. If the driving voltage is changing from a low value to a high value, an inflow of current from the charge pump capacitor 4402 to the PIN diode delivers a predetermined quantity of charge in a short amount of time (i.e., the integral of the positive current over time). If the driving voltage is changing from a high value to a low value, an outflow of current from the PIN diode to the charge pump capacitor 4402 removes a predetermined quantity of charge in a short amount of time (i.e., the integral of the negative current over time). After this relatively short switching time, a steady state current is provided by a current source 4412, controlled by a switch 4414, to replace the charge that was lost due to the internal capacitor losing current through the internal resistance R while the driving voltage is held (e.g., during a hold time of a particular digital value). The use of such a charge-pump configuration can have advantages such as better precision over other techniques (including some pre-emphasis techniques) since the amount of charge that moves in the short switching time is dependent on a constant physical parameter ($C_p$) and a steady state control value (VCP), and therefore is precisely controllable and repeatable.

Other forms of bandwidth enhancement are also possible. For example, a matching electrical circuit can be used to shape the amplitude changes in electrical signals applied to the semiconductor diode modulating an optical wave. A control electrical signal can be applied to the semiconductor diode through a matching electrical circuit that is configured to match an impedance associated with the semiconductor diode without significantly changing an amplitude of the applied electrical signal (e.g., without introducing the amplitude changes of pre-emphasis/de-emphasis).

In some implementations, the matching electrical circuit is a passive electrical circuit, such as a circuit that consists essentially of an inductor. For example, one terminal of the inductor is connected to a voltage source and another terminal of the inductor is connected to a terminal of the modulator circuit 4400. An advantage of an inductor over a passive matching electrical circuit that uses, for example, an RC network of resistor(s) and capacitor(s) is consistency of fabrication. Design of a suitable RC network typically relies on cancellation between a pole and a corresponding zero in a transfer function to make the transfer function close to one, but the design tolerances needed to achieve the cancellation make the device more susceptible to fabrication errors. For example, the cancellation would require fine-tuning the products of different resistance and capacitance values to be equal to each other. Instead, by using an inductor with an appropriate value of inductance (e.g., 1 to 10 nH), the matching can be achieved without such fine-tuning in way that is more tolerant to fabrication errors.

In some cases, the modulators of the array 144 and/or the OMNI 150 can have nonlinear transfer functions. For example, an MZI optical modulator can have a nonlinear relationship (e.g., a sinusoidal dependence) between the applied control voltage and its transmission. In such cases, the first modulator control signals can be adjusted, or compensated, based on the nonlinear transfer function of the modulators such that a linear relationship between the digital input vectors and the generated optical input vectors can be maintained. Maintaining such linearity is typically important in ensuring that the input to the OMNI unit 150 is an accurate representation of the digital input vector. In some implementations, the compensation of the first modulator control signal can be performed by the controller 110 by a lookup table that maps a value of the digital input vector to a value to be output by the MC unit 130 such that the resulting modulated optical signals are linearly proportional to the elements of the digital input vector. The lookup table can be generated by characterizing the nonlinear transfer function of the modulator and calculating an inverse function of the nonlinear transfer function.

In some implementations, the nonlinearity of the modulators and resulting nonlinearity in the generated optical input vectors can be compensated by ANN computation algorithms.

The optical input vector generated by the modulator array 144 is input to the OMNI unit 150. The optical input vector can be N spatially separated optical signals that each have an optical power corresponding to the elements of the digital input vector. The optical power of the optical signals typically range from, e.g., 1 µW to 10 mW. The OMNI unit 150 receives the optical input vector and performs a matrix multiplication based on its internal configuration. The internal configuration is controlled by electrical signals generated by the MC unit 130. For example, the MC unit 130 receives, from the controller 110, a second modulator control signal that corresponds to the neural network weights to be implemented by the OMM unit 150. The MC unit 130 generates, based on the second modulator control signal, the weight control signals, which are analog signals suitable for controlling the reconfigurable elements within the OMM unit 150. The analog signals can be voltages or currents, for example, depending on the type of the reconfiguring elements of the OMNI unit 150. The voltages can have an amplitude that ranges from, e.g., 0.1 V to 10 V, and the current can have an amplitude that ranges from, e.g., 100 µA to 10 mA.

The modulator array 144 can operate at a modulation rate that is different from a reconfiguration rate at which the OMNI unit 150 can be reconfigured. The optical input vector generated by the modulator array 144 propagates through the OMM unit at a substantial fraction of the speed of light (e.g., 80%, 50%, or 25% of the speed of light), depending on the optical properties (e.g., effective index) of the OMNI unit 150. For a typical OMNI unit 150, the propagation time of the optical input vector is in the range of 1 to 10's of picoseconds, which corresponds to 10's to 100's of GHz in processing rate. As such, the rate at which the optoelectronic processor 140 can perform matrix multiplication operations is limited in part by the rate at which the optical input vector can be generated. Modulators having bandwidths of 10's of GHz are readily available, and modulators having bandwidth exceeding 100 GHz are being developed. As such, the modulation rate of the modulator array 144 can range, for example, from 5 GHz, 8 GHz, or 10's of GHz to 100's of GHz. In order to sustain the operation of the modulator array 144 at such modulation rate, the integrated circuitry of the controller 110 can be configured to output control signals for the MC unit 130 at a rate greater than or equal to, for example, 5 GHz, 8 GHz, 10 GHz, 20 GHz, 25 GHz, 50 GHz, or 100 GHz.

The reconfiguration rate of the OMNI unit 150 can be significantly slower than the modulation rate depending on the type of the reconfigurable elements implemented by the OMNI unit 150. For example, the reconfigurable elements of the OMNI unit 150 can be a thermo-optic type that uses a micro-heater to adjust a temperature of an optical waveguide of the OMM unit 150, which in turn affects the phase of an optical signal within the OMM unit 150 and leads to matrix multiplication. Due to the thermal time constants associated with heating and cooling of structures, the reconfiguration rate can be limited to 100's of kHz to 10's of MHz, for example. As such, the modulator control signals for controlling the modulator array 144 and the weight control signals for reconfiguring the OMM unit 150 can have significantly different requirements in speed. Further, the electrical characteristics of the modulator array 144 can differ significantly from those of the reconfigurable elements of the OMM unit 150.

To accommodate the different characteristics of the modulator control signals and the weight control signals, in some implementations, the MC unit 130 can include a first MC subunit 132, and a second MC subunit 134. The first MC subunit 132 can be specifically configured to generate the modulator control signals for the input vector, and the second MC subunit 134 can be specifically configured to generate weight control signals for the matrix multiplication. For example, the modulation rate of the modulator array 144 can be 25 GHz, and the first MC subunit 132 can have a per-channel output update rate of 25 giga-samples per second (GSPS) and a resolution of 8 bits or higher. The reconfiguration rate of the OMNI unit 150 can be 1 MHz, and the second MC subunit 134 can have an output update rate of 1 mega-samples per second (MSPS) and a resolution of 10 bits. Implementing separate MC subunits 132 and 134 allows independent optimization of the MC subunits for respective signals, which can reduce the total power consumption, complexity, cost, or combination thereof of the MC unit 130. It should be noted that while the MC subunits 132 and 134 are described as sub elements of the MC unit 130, in general, the MC subunits 132 and 134 can be integrated on a common chip, or be implemented as separate chips.

Based on the different characteristics of the first MC subunit 132 and the second MC subunit 134, in some implementations, the memory unit 120 can include a first memory subunit and a second memory subunit. The first memory subunit can be a memory dedicated to storing of the input dataset and the digital input vectors, and can have an operating speed sufficient to support the modulation rate. The second memory subunit can be a memory dedicated to storing of the neural network weights, and can have an operation speed sufficient to support the reconfiguration rate of the OMNI unit 150. In some implementations, the first memory subunit can be implemented using SRAM and the second memory subunit can be implemented using DRAM. In some implementations, the first and second memory subunits can be implemented using DRAM. In some implementations, the first memory unit can be implemented as a part of or as a cache of the controller 110. In some implementations, the first and second memory subunits can be implemented by a single physical memory device as different address spaces.

The OMNI unit 150 outputs an output vector of length N, which corresponds to the result of the N×N matrix multiplication of the optical input vector and the neural network weights. In some implementations, the output vector can comprise electrical signals (e.g., voltages or currents), and in other implementations the output vector can comprise optical signals. The OMM unit 150 is coupled to the analog electronic unit 146, which is configured to perform any analog electronic processing for implementations in which the output vector is an optical output vector, can also be configured to perform optical-to-electrical conversion. For example, the analog electronic unit 146 can include an array of N photodetectors configured to absorb the optical signals and generate photocurrents, and an array of N transimpedance amplifiers configured to convert the photocurrents into the output voltages. Alternatively, if an electrical output vector is received from the OMM unit 150, there can be photodetectors and transimpedance amplifiers within the OMNI unit 150. The bandwidths of the photodetectors and the transimpedance amplifiers can be set based on the modulation rate of the modulator array 144. The photodetectors can be formed from various materials based on the wavelengths of the optical output vector being detected. Examples of the materials for photodetectors include germanium, silicon-germanium alloy, and indium gallium arsenide (InGaAs).

The analog electronic unit 146 is coupled to the ADC unit 160. The ADC unit 160 is configured to convert the N electrical signals output from the analog electronic unit 146 into N digitized optical outputs, which are quantized digital representations of the output voltages. For example, the ADC unit 160 can be an N channel ADC. The controller 110 can obtain, from the ADC unit 160, the N digitized optical outputs corresponding to the optical output vector of the optical matrix multiplication unit 150. The controller 110 can form, from the N digitized optical outputs, a digital output vector of length N that corresponds to the result of the N×N matrix multiplication of the input digital vector of length N. In some implementations, if no analog electronic processing is needed and the OMM unit 150 provides electrical output signals, the analog electronic unit 146 can be omitted and the OMNI unit 150 can be connected directly to the ADC unit 160.

Various electrical components of the ANN computation system 100 can be integrated in various ways. For example, the controller 110 can be an application specific integrated circuit that is fabricated on a semiconductor die. Other electrical components, such as the memory unit 120, the MC unit 130, the ADC unit 160, or combination thereof can be monolithically integrated on the semiconductor die on which the controller 110 is fabricated. As another example, two or more electrical components can be integrated as a System-on-Chip (SoC). In a SoC implementation, the controller 110, the memory unit 120, the MC unit 130, and the ADC unit 160 can be fabricated on respective dies, and the respective dies can be integrated on a common platform (e.g., an interposer) that provides electrical connections between the integrated components. Such SoC approach can allow faster data transfer between the electronic components of the ANN computation system 100 relative to an approach where the components are separately placed and routed on a printed circuit board (PCB), thereby improving the operating speed of the ANN computation system 100. Further, the SoC approach can allow use of different fabrication technologies optimized for different electrical components, which can improve the performance of the different components and reduce overall costs over a monolithic integration approach. While the integration of the controller 110, the memory unit 120, the MC unit 130, and the ADC unit 160 has been described, in general, a subset of the components can be integrated while other components are implemented as discrete components for various reasons, such as performance or cost. For example, in some implementations, the memory unit 120 can be integrated with the controller 110 as a functional block within the controller 110.

Various optical components of the ANN computation system 100 can also be integrated in various ways. Examples of the optical components of the ANN computation system 100 include the laser unit 142, the modulator array 144, the OMM unit 150, and the photodetectors of the analog electronic unit 146. These optical components can be integrated in various ways to improve performance and/or reduce cost. For example, the laser unit 142, the modulator array 144, the OMM unit 150, and the photodetectors can be monolithically integrated on a common semiconductor substrate as a photonic integrated circuit (PIC). On a photonic integrated circuit formed based on a compound semiconductor material system (e.g., III-V compound semiconductors such as InP), lasers, modulators such as electro-absorption modulators, waveguides, and photodetectors can be monolithically integrated on a single die. Such monolithic integration approach can reduce the complexities of aligning the inputs and outputs of various discrete optical components, which can require alignment accuracies ranging from sub-micron to a few microns. As another example, the laser source of the laser unit 142 can be fabricated on a compound-semiconductor die, while the optical power splitter of the laser unit 142, the modulator array 144, the OMNI unit 150, and the photodetectors of the analog electronic unit 146 can be fabricated on a silicon die. PICs fabricated on a silicon wafer, which can be referred to as silicon photonics technology, typically has a greater integration density, higher lithographic resolution, and lower cost relative to the III-V based PICs. Such greater integration density can be beneficial in fabrication of the OMM unit 150, as the OMM unit 150 typically includes 10's to 100's of optical components such as power splitters and phase shifters. Further, the higher lithographic resolution of the silicon photonics technology can reduce fabrication variation of the OMM unit 150, improving the accuracy of the OMNI unit 150.

The ANN computation system 100 can be implemented in a variety of form factors. For example, the ANN computation system 100 can be implemented as a co-processor that is plugged into a host computer. Such system 100 can have, for example, a form factor of a PCI express card and communicate with the host computer over the PCIe bus. The host computer can host multiple co-processor type ANN computation systems 100, and be connected to the computer 102 over a network. This type of implementation can be suitable for use in a cloud datacenter where racks of servers can be dedicated to processing ANN computation requests received from other computers or servers. As another example, the co-processor type ANN computation system 100 can be plugged directly into the computer 102 issuing the ANN computation requests.

In some implementations, the controller 110, the memory unit 120, the modulator control unit 130, the ADC unit 160, and a microprocessor can be monolithically integrated on a semiconductor die. In some implementations, the controller 110, the memory unit 120, the modulator control unit 130, the ADC unit 160, the microprocessor, and the system main memory can be integrated as system-on-chip. For example, this allows the artificial neural network computation system 100 to be used in a portable device, such as a laptop computer, a tablet computer, or a mobile phone. The microprocessor can include, e.g., multiple high-performance processor cores, multiple high-efficiency processor cores, multiple graphics processors, multiple electronic neural engine cores, level 1 cacheb731, and level 2 cacheb731. The microprocessor can use the electronic neural engine cores to execute artificial neural network computation instructions that have been optimized for conventional electronic neural engine cores, and use the ANN computation system 100 to execute artificial neural network computation instructions that have been optimized for the optical processing performed by the optoelectronic processor 140. The microprocessor can be, e.g., a reduced instruction set computer or a complex instruction set computer. The operating system can be designed to take into account the ANN computation system 100, e.g., powering up the ANN computation system 100 to perform specific tasks that are more suitable to be performed by the ANN computation system 100, and powering down the ANN computation system 100 or placing the ANN computation system 100 in a standby mode when not performing such tasks, thereby achieving overall high computation performance and low power consumption.

In some implementations, the ANN computation system 100 can be integrated onto a physical system that requires real-time ANN computation capability. For example, systems that rely heavily on real-time artificial intelligence tasks such as autonomous vehicles, autonomous drones, object- or face-recognizing security cameras, and various Internet-of-Things (IoT) devices can benefit from having ANN computation system 100 directly integrated with other subsystems of such systems. Having directly-integrated ANN computation system 100 can enable real-time artificial intelligence in devices with poor or no internet connectivity, and enhance the reliability and availability of mission-critical artificial intelligence systems.

While the MC unit 130 and the ADC unit 160 are illustrated to be coupled to the controller 110, in some implementations, the MC unit 130, the ADC unit 160 or both can alternatively, or additionally, be coupled to the memory unit 120. For example, a direct memory access (DMA) operation by the MC unit 130 or the ADC unit 160 can reduce the computation burden on the controller 110 and reduce latency in reading from and writing to the memory unit 120, further improving the operating speed of the ANN computation unit 100.

Figure 4:
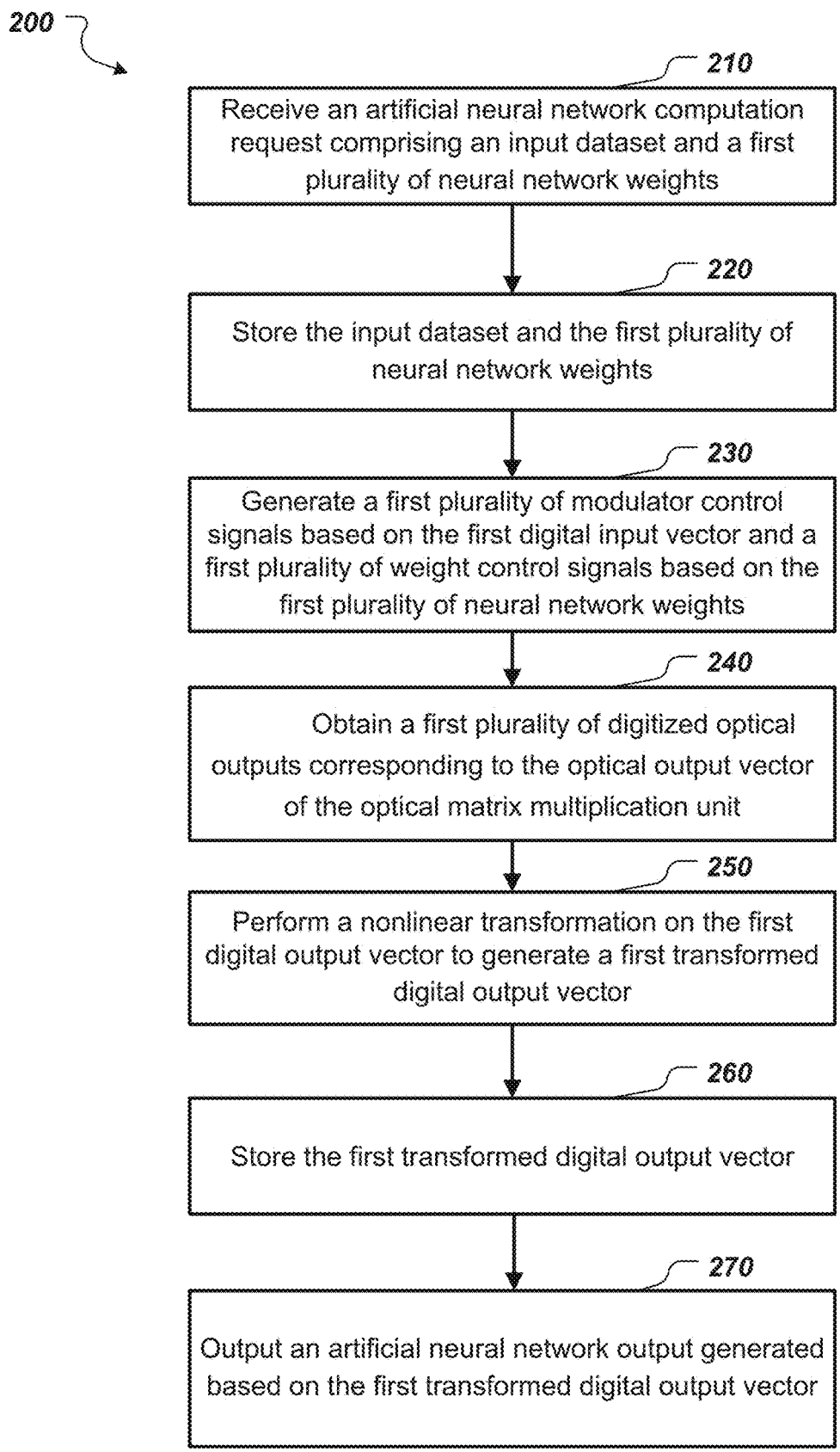
FIG. 4 is a flowchart showing an example of a method for performing an ANN computation.

FIG. 4 shows a flowchart of an example of a process 200 for performing an ANN computation. The steps of the process 200 can be performed by the controller 110. In some implementations, various steps of the process 200 can be run in parallel, in combination, in loops, or in any order.

At 210, an artificial neural network (ANN) computation request comprising an input dataset and a first plurality of neural network weights is received. The input dataset includes a first digital input vector. The first digital input vector is a subset of the input dataset. For example, it can be a sub-region of an image. The ANN computation request can be generated by various entities, such as the computer 102. The computer can include one or more of various types of computing devices, such as a personal computer, a server computer, a vehicle computer, and a flight computer. The ANN computation request generally refers to an electrical signal that notifies or informs the ANN computation system 100 of an ANN computation to be performed. In some implementations, the ANN computation request can be divided into two or more signals. For example, a first signal can query the ANN computation system 100 to check whether the system 100 is ready to receive the input dataset and the first plurality of neural network weights. In response to a positive acknowledgement by the system 100, the computer can send a second signal that includes the input dataset and the first plurality of neural network weights.

At 220, the input dataset and the first plurality of neural network weights are stored. The controller 110 can store the input dataset and the first plurality of neural network weights in the memory unit 120. Storing of the input dataset and the first plurality of neural network weights in the memory unit 120 can allow flexibilities in the operation of the ANN computation system 100 that, for example, can improve the overall performance of the system. For example, the input dataset can be divided into digital input vectors of a set size and format by retrieving desired portions of the input dataset from the memory unit 120. Different portions of the input dataset can be processed in various order, or be shuffled, to allow various types of ANN computations to be performed. For example, shuffling can allow matrix multiplication by block matrix multiplication technique in cases where the input and output matrix sizes are different. As another example, storing of the input dataset and the first plurality of neural network weights in the memory unit 120 can allow queuing of multiple ANN computation requests by the ANN computation system 100, which can allow the system 100 to sustain operation at its full speed without periods of inactivity.

In some implementations, the input dataset can be stored in the first memory subunit, and the first plurality of neural network weights can be stored in the second memory subunit.

At 230, a first plurality of modulator control signals are generated based on the first digital input vector, and a first plurality of weight control signals are generated based on the first plurality of neural network weights. The controller 110 can send a first modulator control signal to the MC unit 130 for generating the first plurality of modulator control signals. The MC unit 130 generates the first plurality of modulator control signals based on the first modulator control signal, and the modulator array 144 generates the optical input vector representing the first digital input vector.

The first modulator control signal can include multiple digital values to be converted by the MC unit 130 into the first plurality of modulator control signals. The multiple digital values are generally in correspondence with the first digital input vector, and can be related through various mathematical relationships or look-up tables. For example, the multiple digital values can be linearly proportional to the values of the elements of the first digital input vector. As another example, the multiple digital values can be related to the elements of the first digital input vector through a look-up table configured to maintain a linear relationship between the digital input vector and the optical input vector generated by the modulator array 144.

The controller 110 can send a second modulator control signal to the MC unit 130 for generating the first plurality of weight control signals. The MC unit 130 generates the first plurality of weight control signals based on the second modulator control signal, and the OMNI unit 150 is reconfigured according to the first plurality of weight control signals, implementing a matrix corresponding to the first plurality of neural network weights.

The second modulator control signal can include multiple digital values to be converted by the MC unit 130 into the first plurality of weight control signals. The multiple digital values are generally in correspondence with the first plurality of neural network weights, and can be related through various mathematical relationships or look-up tables. For example, the multiple digital values can be linearly proportional to the first plurality of neural network weights. As another example, the multiple digital values can be calculated by performing various mathematical operations on the first plurality of neural network weights to generate weight control signals that can configure the OMNI unit 150 to perform a matrix multiplication corresponding to the first plurality of neural network weights.

At 240, a first plurality of digitized optical outputs corresponding to the optical output vector of the optical matrix multiplication unit is obtained. The optical input vector generated by the modulator array 144 is processed by the OMNI unit 150 and transformed into an optical or electrical output vector. If the output vector is an optical output vector, the optical output vector is detected by the analog electronic unit 146 and converted into electrical signals that can be converted into digitized values by the ADC unit 160. The controller 110 can, for example, send a conversion request to the ADC unit 160 to begin a conversion of the voltages output by the analog electronic unit 146 into digitized optical outputs. Once the conversion is complete, the ADC unit 160 can send the conversion result to the controller 110. Alternatively, the controller 110 can retrieve the conversion result from the ADC unit 160. The controller 110 can form, from the digitized optical outputs, a digital output vector that corresponds to the result of the matrix multiplication of the input digital vector. For example, the digitized optical outputs can be organized, or concatenated, to have a vector format.

In some implementations, the ADC unit 160 can be set or controlled to perform an ADC conversion based on a modulator control signal issued to the MC unit 130 by the controller 110. For example, the ADC conversion can be set to begin at a preset time following the generation of the modulation control signal by the MC unit 130. Such control of the ADC conversion can simplify the operation of the controller 110 and reduce the number of necessary control operations.

At 250, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN can implement various types of differentiable, nonlinear transformations. Examples of nonlinear transformation functions include a rectified linear unit (RELU) function, a Sigmoid function, a hyperbolic tangent function, an $X^2$ function, and a |X| function. Such nonlinear transformations are performed on the first digital output by the controller 110 to generate the first transformed digital output vector. In some implementations, the nonlinear transformations can be performed by a specialized digital integrated circuitry within the controller 110. For example, the controller 110 can include one or more modules or circuit blocks that are specifically adapted to accelerate the computation of one or more types of nonlinear transformations.

At 260, the first transformed digital output vector is stored. The controller 110 can store the first transformed digital output vector in the memory unit 120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 100 to perform and store additional computations on other digital input vectors of the input dataset to later be aggregated into a single ANN output.

At 270, an artificial neural network output generated based on the first transformed digital output vector is output. The controller 110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but can further include additional transformed digital outputs that correspond to other portions of the input dataset. Once the ANN output is generated, the generated output is sent to a computer, such as the computer 102, that originated the ANN computation request.

Various performance metrics can be defined for the ANN computation system 100 implementing the process 200. Defining performance metrics can allow a comparison of performance of the ANN computation system 100 that implements the optoelectronic processor 140 with other systems for ANN computation that instead implement electronic matrix multiplication units. In one aspect, the rate at which an ANN computation can be performed can be indicated in part by a first loop period defined as a time elapsed between the step 220 of storing, in the memory unit, the input dataset and the first plurality of neural network weights, and the step 260 of storing, in the memory unit, the first transformed digital output vector. This first loop period therefore includes the time taken in converting the electrical signals into optical signals (e.g., step 230), performing the matrix multiplication in the optical domain, and converting the result back into the electrical domain (e.g., step 240). Steps 220 and 260 both involves storing of data into the memory unit 120, which are steps shared between the ANN computation system 100 and conventional ANN computation systems without the optoelectronic processor 140. As such, the first loop period measuring the memory-to-memory transaction time can allow a realistic or fair comparison of ANN computation throughput to be made between the ANN computation system 100 and ANN computation systems without the optoelectronic processor 140, such as systems implementing electronic matrix multiplication units.

Due to the rate at which the optical input vectors can be generated by the modulator array 144 (e.g., at 25 GHz) and the processing rate of the OMNI unit 150 (e.g., greater than 100 GHz), the first loop period of the ANN computation system 100 for performing a single ANN computation of a single digital input vector can approach the reciprocal of the speed of the modulator array 144, e.g., 40 ps. After accounting for latencies associated with the signal generation by the MC unit 130 and the ADC conversion by the ADC unit 160, the first loop period can, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to $M^2-1$ processor clock cycles. For M=32, such multiplication would take approximately 1024 cycles, which at 3 GHz clock speed results in an execution time exceeding 300 ns, which is orders of magnitude slower than the first loop period of the ANN computation system 100.

In some implementations, the process 200 further includes a step of generating a second plurality of modulator control signals based on the first transformed digital output vector. In some types of ANN computations, a single digital input vector can be repeatedly propagated through, or processed by, the same ANN. An ANN that implements multi-pass processing can be referred to as a recurrent neural network (RNN). A RNN is a neural network in which the output of the network during a (k)th pass through the neural network is recirculated back to the input of the neural network and used as the input during the (k+1)th pass. RNNs can have various applications in pattern recognition tasks, such as speech or handwriting recognition. Once the second plurality of modulator control signals are generated, the process 200 can proceed from step 240 through step 260 to complete a second pass of the first digital input vector through the ANN. In general, the recirculation of the transformed digital output to be the digital input vector can be repeated for a preset number of cycles depending on the characteristics of the RNN received in the ANN computation request.

In some implementations, the process 200 further includes a step of generating a second plurality of weight control signals based on a second plurality of neural network weights. In some cases, the artificial neural network computation request further includes a second plurality of neural network weights. In general, an ANN has one or more hidden layers in addition to the input and output layers. For ANN with two hidden layers, the second plurality of neural network weights can correspond, for example, to the connectivity between the first layer of the ANN and the second layer of the ANN. To process the first digital input vector through the two hidden layers of the ANN, the first digital input vector can first be processed according to the process 200 up to step 260, at which the result of processing the first digital input vector through the first hidden layer of the ANN is stored in the memory unit 120. The controller 110 then reconfigures the OMNI unit 150 to perform the matrix multiplication corresponding to the second plurality of neural network weights associated with the second hidden layer of the ANN. Once the OMM unit 150 is reconfigured, the process 200 can generate the plurality of modulator control signals based on the first transformed digital output vector, which generates an updated optical input vector corresponding to the output of the first hidden layer. The updated optical input vector is then processed by the reconfigured OMM unit 150 which corresponds to the second hidden layer of the ANN. In general, the described steps can be repeated until the digital input vector has been processed through all hidden layers of the ANN.

As previously described, in some implementations of the OMNI unit 150, the reconfiguration rate of the OMM unit 150 can be significantly slower than the modulation rate of the modulator array 144. In such cases, the throughput of the ANN computation system 100 can be adversely impacted by the amount of time spent in reconfiguring the OMNI unit 150 during which ANN computations cannot be performed. To mitigate the impact of the relatively slow reconfiguration time of the OMNI unit 150, batch processing techniques can be utilized in which two or more digital input vectors are propagated through the OMM unit 150 without a configuration change to amortize the reconfiguration time over a larger number of digital input vectors.

Figure 5:
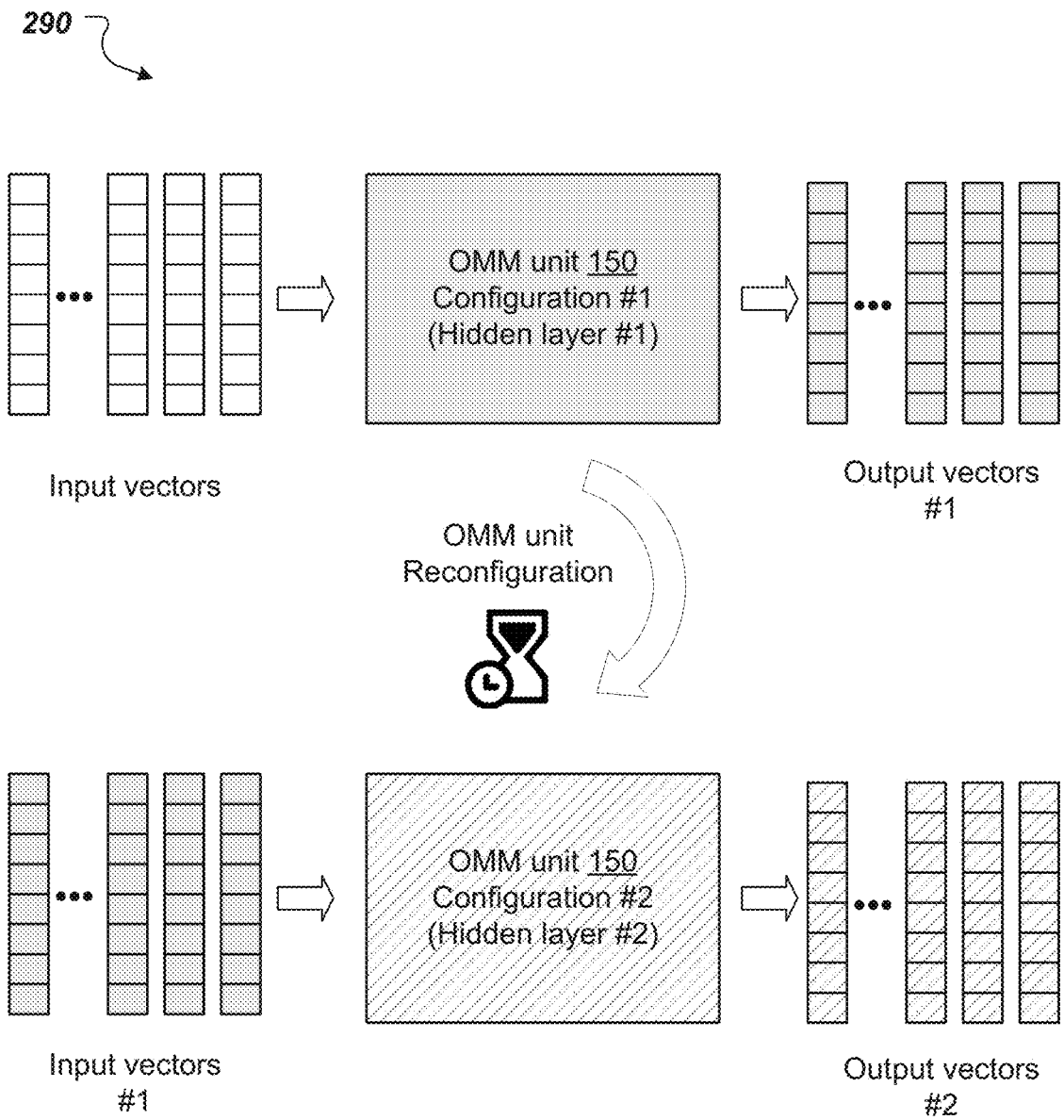
FIG. 5 is a diagram illustrating an aspect of the method of FIG. 4.

FIG. 5 shows a diagram 290 illustrating an aspect of the process 200 of FIG. 4. For an ANN with two hidden layers, instead of processing the first digital input vector through the first hidden layer, reconfiguring the OMM unit 150 for the second hidden layer, processing the first digital output vector (from the previous hidden layer) through the reconfigured OMM unit 150, and repeating the same for the remaining digital input vectors, all digital input vectors of the input dataset can be first processed through the OMNI unit 150 configured for the first hidden layer (configuration #1) as shown in the upper portion of the diagram 290. Once all digital input vectors have been processed by the OMNI unit 150 having configuration #1, the OMNI unit 150 is reconfigured into configuration #2, which corresponds to the second hidden layer of the ANN. This reconfiguration can be significantly slower than the rate at which the input vectors can be processed by the OMNI unit 150. Once the OMM unit 150 is reconfigured for the second hidden layer, the output vectors from the previous hidden layer can be processed by the OMM unit 150 in a batch. For large input datasets having tens or hundreds of thousands of digital input vectors, the impact of the reconfiguration time can be reduced by approximately the same factor, which can substantially reduce the portion of the time spent by the ANN computation system 100 in reconfiguration.

To implement batch processing, in some implementations, the process 200 further includes steps of generating, through the MC unit 130, a second plurality of modulator control signals based on the second digital input vector; obtaining, from the ADC unit, a second plurality of digitized optical outputs corresponding to the optical output vector of the optical matrix multiplication unit, the second plurality of digitized optical outputs forming a second digital output vector; performing a nonlinear transformation on the second digital output vector to generate a second transformed digital output vector; and storing, in the memory unit, the second transformed digital output vector. The generating of the second plurality of modulator control signals can follow the step 260, for example. Further, the ANN output of step 270 in this case is now based on both the first transformed digital output vector and the second transformed digital output vector. The obtaining, performing, and storing steps are analogous to the steps 240 through 260.

The batch processing technique is one of several techniques for improving the throughput of the ANN computation system 100. Another technique for improving the throughput of the ANN computation system 100 is through parallel processing of multiple digital input vectors by utilizing wavelength division multiplexing (WDM). WDM is a technique of simultaneously propagating multiple optical signals of different wavelengths through a common propagation channel, such as a waveguide of the OMM unit 150. Unlike electrical signals, optical signals of different wavelengths can propagate through a common channel without affecting other optical signals of different wavelengths on the same channel. Further, optical signals can be added (multiplexed) or dropped (demultiplexed) from a common propagation channel using well-known structures such as optical multiplexers and demultiplexers.

Figure 6:
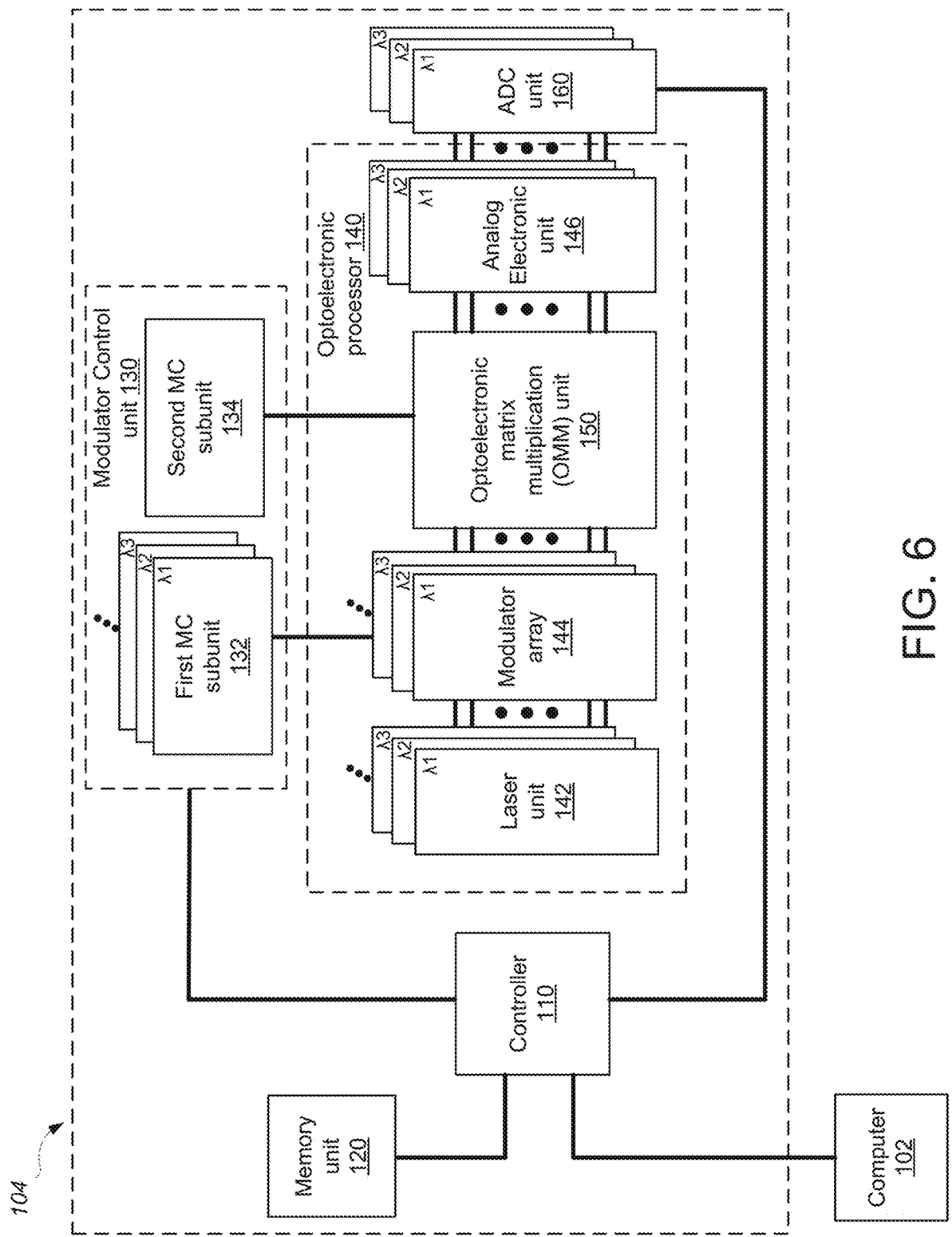
FIG. 6 is a schematic diagram of an example of a wavelength division multiplexed ANN computation system.

In the context of the ANN computation system 100, multiple optical input vectors of different wavelengths can be independently generated, simultaneously propagated through the OMM unit 150, and independently detected to enhance the throughput of the ANN computation system 100. Referring to FIG. 6, a schematic diagram of an example of a wavelength division multiplexed (WDM) artificial neural network (ANN) computation system 104 is shown. The WDM ANN computation system 104 is similar to the ANN computation system 100 unless otherwise described. In order to implement the WDM technique, in some implementations of the ANN computation system 104, the laser unit 142 is configured to generate multiple wavelengths, such as $\lambda 1$, $\lambda 2$, and $\lambda 3$. The multiple wavelengths can preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm can allow simple multiplexing and demultiplexing. On the other hand, the range between the shortest wavelength and the longest wavelength of the multiple wavelengths ("WDM bandwidth") can preferably be sufficiently small such that the characteristics or performance of the OMM unit 150 remain substantially the same across the multiple wavelengths. Optical components are typically dispersive, meaning that their optical characteristics change as a function of wavelength. For example, a power splitting ratio of an MZI can change over wavelength. However, by designing the OMNI unit 150 to have a sufficiently large operating wavelength window, and by limiting the wavelengths to be within that operating wavelength window, the optical output vector output by the OMM unit 150 at each wavelength can be a sufficiently accurate result of the matrix multiplication implemented by the OMNI unit 150. The operating wavelength window can be, for example, 1 nm, 2 nm, 3 nm, 4 nm, 5 nm, 10 nm, or 20 nm.

Figure 7:
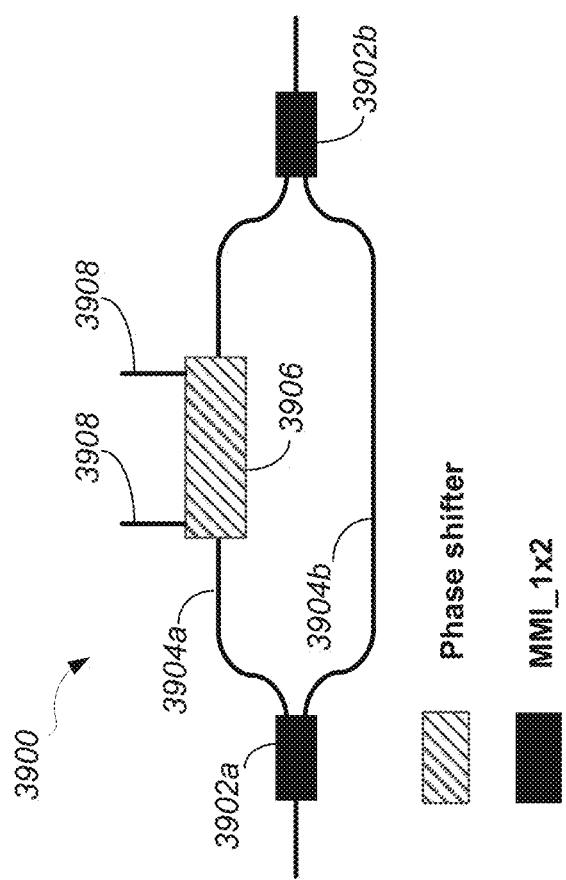
FIG. 7 is a diagram of an example of a Mach-Zehnder modulator.

FIG. 7 shows a diagram of an example of a Mach-Zehnder modulator 3900 that can be used to modulate the amplitude of an optical signal. The Mach-Zehnder modulator 3900 includes two 1×2 port multi-mode interference couplers (MMI_1×2) 3902a and 3902b, two balanced arms 3904a and 3904b, and a phase shifter 3906 in one arm (or one phase shifter in each arm). When a voltage is applied to the phase shifter in one arm through signal lines 3908, there will be a phase difference between the two arms 3904a and 3904b that will convert to the amplitude modulation. The 1×2 port multi-mode interference couplers 3902a and 3902b and the phase shifter 3906 are configured to be broadband photonic components, and the optical path lengths of the two arms 3904a and 3904b are configured to be equal. This enables the Mach-Zehnder modulator 3900 to work in a broad wavelength range.

Figure 8:
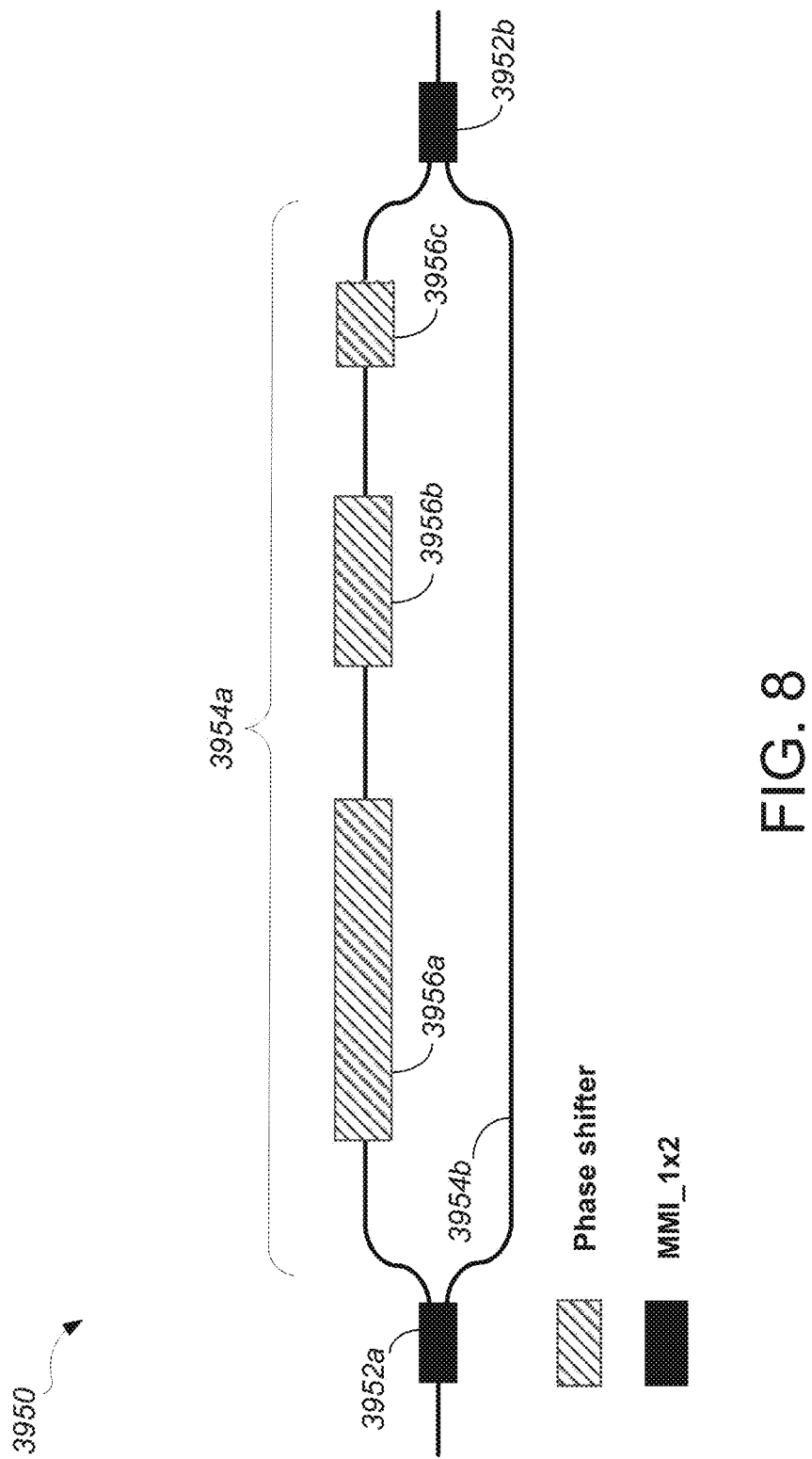
FIG. 8 is a diagram of an example of a Mach-Zehnder modulator using a segmented design.

FIG. 8 shows a diagram of another example of Mach-Zehnder modulator 3950 that can be used to modulate the amplitude of an optical signal. The Mach-Zehnder modulator 3950 includes two 1×2 port multi-mode interference couplers (MMI_1×2) 3952a and 3952b, two balanced arms 3954a and 3954b, and a set of phase shifters 3956a, 3956b, and 3956c in one arm (or a set of phase shifters in each arm). The modulator 3950 uses a segmented design to provide optical digital-to-analog conversion using separate phase shifters for each bit of a digital input signal. For example, a digital input port can be configured to receive a series of digital input values over successive time intervals, each digital input value including three bits. For example, the digital input port can also be configured to receive the digital input values in parallel. The multiple phase shifters 3956a, 3956b, and 3956c can be implemented by forming different respective diode sections along the optical waveguide of the arm 3954a. In this example, the diode section of each respective phase shifter 3956a, 3956b, and 3956c includes a semiconductor diode and electrical contacts for applying an electrical signal to the semiconductor diode in a forward-biased state to provide carrier injection for modulating the refractive index of the waveguide segment corresponding to the phase shifter. This enables the refractive index of each diode section to be modulated in response to a value of a different corresponding bit of the three-bit digital input value. The relative lengths of the diode sections are selected to correspond to a bit position of each bit. Thus, in this example in which each digital input value has three bits, the most-significant bit is used to apply a binary (0 or 1) modulation to the phase shifter 3956a with length 4L, the next bit is used to apply a binary (0 or 1) modulation to the phase shifter 395b with length 2L, and the least-significant bit is used to apply a binary (0 or 1) modulation to the phase shifter 3956c with a length L. Together, the diode sections apply different respective modulation contributions to an optical wave propagating through the optical waveguide portion to provide the appropriate digital-to-analog conversion.

A phase shifter is a type of optical modulator. In this document the term "modulator" depending on context can refer to, e.g., the overall modulator 3950, the phase shifter 3956, or an optical amplitude modulator.

Figure 9:
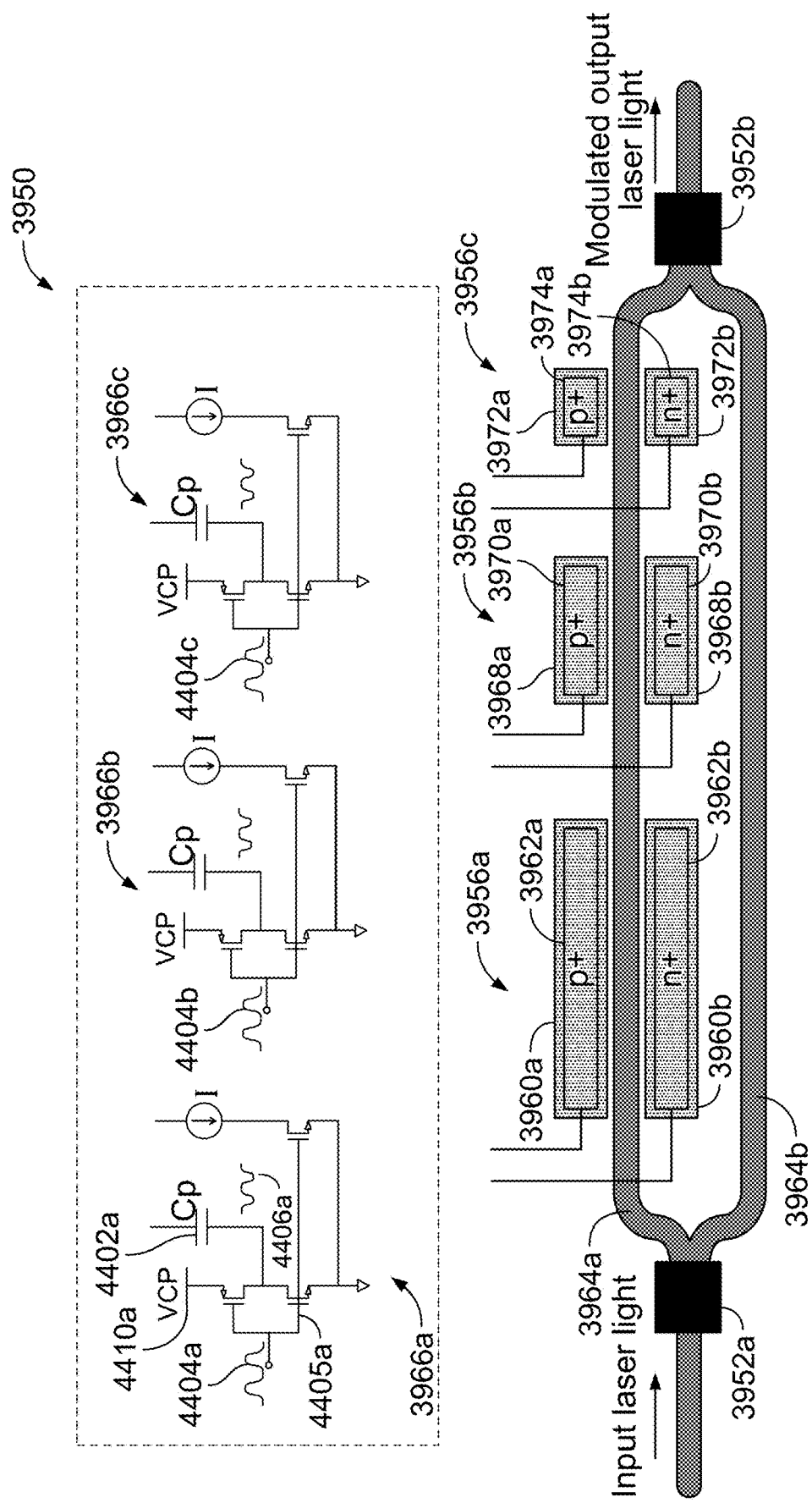
FIG. 9 is a diagram of the Mach-Zehnder modulator of FIG. 8 and corresponding driving circuitry.

Referring to FIG. 9, in some implementations, the modulator 3950 includes a first ridge or rib waveguide 3964a in the first arm 3954a and a second ridge or rib waveguide 3964b in the second arm 3954b. The first and second ridge or rib waveguides 3964a, 3964b are formed on a semiconductor substrate (e.g., silicon substrate). The phase shifter 3956a includes a heavily doped p+ region 3960a and a heavily doped n+ region 3960b having a length 4L and formed in the substrate on two sides of a first segment of the first ridge or rib waveguide 3964a. The p+ region, the intrinsic region between the p+ and n+ regions, and the n+ region form a p+-i-n+ (PIN) diode. A first electrode (anode) 3962a is electrically coupled to the p+ region 3960a, and a second electrode (cathode) 3962b is electrically coupled to the n+ region 3960b.

The first and second electrodes 3962a, 3962b can be driven by a driving circuit 3966a that is similar to the circuit shown in FIG. 3. The driving circuit 3966a is configured move a predetermined amount of charge to or from the phase shifter 3956a to control the corresponding optical phase shift applied by the phase shifter 3956a. The driving circuit 3966a includes a pump capacitor 4402a that has a capacitance $C_{p\_a}$. A control voltage waveform 4404a is provided to an inverter circuit 4405a to generate a driving voltage waveform 4406a whose amplitude can be precisely calibrated to move a predetermined amount of charge to or from the phase shifter 3956a via the pump capacitor 4402a. The PIN diode of the phase shifter 3956a is forward-biased by applying a constant voltage VDD_IO at a terminal 4408a. A charge-pump control voltage VCP is applied at a terminal 4410a of the inverter 4405a to control the amount of charge pumped upon transitions in the driving voltage waveform 4406a, and the corresponding optical phase shift applied by the phase shifter 3956a. For clarity of illustration, the detailed connections between the various driving circuits 3966 and the phase shifters 3956 are omitted in the figure. For example, the constant voltage VDD_IO can be applied to the electrode (anode) 3962a, 3970a, 3974a that are electrically coupled to the p+ regions. The upper plate of the capacitor Cp 4402 and the upper terminal of the current source 4412 of the driving circuit 3966a are electrically coupled to the electrode (cathode) 3962b electrically coupled to the n+ region 3960b of the phase shifter 3956a. The upper plate of the capacitor Cp 4402 and the upper terminal of the current source 4412 of the driving circuit 3966b are electrically coupled to the electrode (cathode) 3970b electrically coupled to the n+ region 3968b of the phase shifter 3956b. The upper plate of the capacitor Cp 4402 and the upper terminal of the current source 4412 of the driving circuit 3966c are electrically coupled to the electrode (cathode) 3974b electrically coupled to the n+ region 3972b of the phase shifter 3956c.

The phase shifter 3956b includes a heavily doped p+ region 3968a and a heavily doped n+ region 3968b having a length 2L and formed in the substrate on two sides of a second segment of the first ridge or rib waveguide 3964a. The p+ region, the intrinsic region between the p+ and n+ regions, and the n+ region form a p+-i-n+ (PIN) diode. A third electrode (anode) 3970a is electrically coupled to the p+ region 3968a, and a fourth electrode (cathode) 3970b is electrically coupled to the n+ region 3968b. The third and fourth electrodes 3970a and 3970b can be driven by a driving circuit 3966b, which is similar to the driving circuit 3966a. A control voltage waveform 4404b is provided to an inverter circuit to generate a driving voltage waveform whose amplitude can be precisely calibrated to move a predetermined amount of charge to or from the phase shifter 3956b via a pump capacitor. The driving circuit 3966b is configured move a predetermined amount of charge to or from the phase shifter 3956b to control the corresponding optical phase shift applied by the phase shifter 3956b.

The phase shifter 3956c includes a heavily doped p+ region 3972a and a heavily doped n+ region 3972b having a length L and formed in the substrate on two sides of a third segment of the first ridge or rib waveguide 3964a. The p+ region, the intrinsic region between the p+ and n+ regions, and the n+ region form a p+-i-n+ (PIN) diode. A fifth electrode (anode) 3974a is electrically coupled to the p+ region 3972a, and a sixth electrode (cathode) 3974b is electrically coupled to the n+ region 3972b. The fifth and sixth electrodes 3974a and 3974b can be driven by a driving circuit 3966c, which is similar to the driving circuit 3966a. A control voltage waveform 4404c is provided to an inverter circuit to generate a driving voltage waveform whose amplitude can be precisely calibrated to move a predetermined amount of charge to or from the phase shifter 3956c via a pump capacitor. The driving circuit 3966c is configured move a predetermined amount of charge to or from the phase shifter 3956c to control the corresponding optical phase shift applied by the phase shifter 3956c.

The doped p+ and n+ regions of the phase shifters 3956a, 3956b, and 3956c have lengths 4L, 2L, and L, respectively. The driving circuits 4404a, 4404b, and 4404c provide binary signals that represent 3-bit digital input values to the phase shifters 3956a, 3956b, and 3956c, which impart optical phase shifts weighted according to a 4:2:1 ratio to the light propagating in the first, second, and third waveguide segments. For example, when a binary value of '1' is applied to applied to the phase shifter 3956a and the phase shifter 3956c, the phase shifter 3956a will impart an amount of optical phase shift that is four times the amount of optical phase shift imparted by the phase shifter 3956c. Similarly, when a binary value of '1' is applied to applied to the phase shifter 3956b and the phase shifter 3956c, the phase shifter 3956b will impart an amount of optical phase shift that is twice the amount of optical phase shift imparted by the phase shifter 3956c. This way, the MZI 3950 converts the 3-bit digital input value to an analog output signal having 3-bit precision without the use of a digital-to-analog converter circuitry, which would be needed if the MZI 3900 of FIG. 7 is used. High speed digital-to-analog converters are difficult to implement, so the MZI 3950 having the segmented design allows digital electrical signals to be converted to analog optical signals at a higher speed, as compared to using the MZI 3900.

As described above, in some examples of ANN computations, such as when batch processing techniques are used, the modulator array 144 is reconfigured at a faster rate than the rate at which the OMM unit 150 is reconfigured. For example, the modulator array 144 can use a plurality of the Mach-Zehnder modulators 3950 having the segmented design for modulating the optical waves received from the laser unit 142 to provide an optical input vector of length N based on encoded input data (e.g., digital input data) provided by the first MC subunit 132, and the optical input vector propagates to the OMM unit 150. Because the OMNI unit 150 can be reconfigured at a slower rate, in some examples the OMM unit 150 include a plurality of Mach-Zehnder modulators 3900 that do not use the segmented design. The circuitry for driving the MZI 3900 can be simpler than the circuitry for driving the multiple segments of the MZI 3950. The OMM unit 150 can have a large number of MZIs, so using the MZIs 3900 in the OMM unit 150 can reduce the complexity of the driving circuitry in the OMM unit 150.

In some implementations, the optoelectronic processor 140 is configured to perform ANN computations that require the OMM unit 150 to also be updated at a fast rate comparable to that of the modulator array 144. In this case, the OMNI unit 150 can also use a plurality of MZIs 3950 that use the segmented design.

In some implementations, the modulator array 144 includes a plurality of MZIs 3900 that do not use the segmented design, and the OMNI unit 150 includes a plurality of MZIs 3950 that use the segmented design.

In some implementations, the phase shifters within an optical modulator can have the same length, and the charge-pump bandwidth enhancement circuit pumps different charges to provide different levels of modulation? The amount of charges pumped to the diode section depends in part on the charge pump control voltage VCp and the capacitance of the pump capacitor Cp 4402. By using different charge pump control voltages VCp and/or pump capacitors Cp 4402 with different capacitances for the different diode sections in the same optical modulator, the phase shifters can apply binary weighted phase shift contributions to the optical signals being modulated.

For example, in some implementations, the phase shifters 3956*a*, 3956*b*, 3956*c* can all have the same length, but the charge pump circuit 3966*a* pumps more charges to the phase shifter 3956*a* than the charges pumped by the charge pump circuit 3966*b* to the phase shifter 3956*b*, and the charge pump circuit 3966*b* pumps more charges to the phase shifter 3956*b* than the charges pumped by the charge pump circuit 3966*c* to the phase shifter 3956*c*, comparable results can be achieved as using phase shifters of different lengths. For example, the charge pump circuit 3966*a* uses charge-pump control voltage VCp1, the charge pump circuit 3966*b* uses charge-pump control voltage VCp2, the charge pump circuit 3966*c* uses charge-pump control voltage VCp3, and VCp1>VCp2>VCp3. For example, the charge pump circuit 3966*a* uses a charge pump capacitor having a capacitance Cp1, the charge pump circuit 3966*b* uses a charge pump capacitor having a capacitance Cp2, the charge pump circuit 3966*c* uses a charge pump capacitor having a capacitance Cp3, and Cp1>Cp2>Cp3. The advantage of this design is to reduce the overall length of the modulator 3950.

In some examples, the phase shifter 3956*b* can be longer than the phase shifter 3956*c*, but less than twice the length of the phase shifter 3956*c*. The charge pump control voltage VCp2 and/or the charge pump capacitance Cp2 of the phase shifter 3956*b* is larger than the charge pump control voltage VCp3 and/or the charge pump capacitance Cp3 of the phase shifter 3956*c*, such that in response to a digital input value of '1', the phase shift imparted by the phase shifter 3956*b* to the optical wave traveling in the waveguide 3964*a* is twice the phase shift imparted by the phase shifter 3956*c*. Similarly, the phase shifter 3956*a* can be longer than the phase shifter 3956*b*, but less than twice the length of the phase shifter 3956*b*. The charge pump control voltage VCp1 and/or the charge pump capacitance Cp1 of the phase shifter 3956*a* can be larger than the charge pump control voltage VCp2 and/or the charge pump capacitance Cp2 of the phase shifter 3956*b*, such that in response to a digital input value of '1', the phase shift imparted by the phase shifter 3956*a* to the optical wave traveling in the waveguide 3964*a* is twice the phase shift imparted by the phase shifter 3956*b*. The highest charge pump control voltage VCp can depend on the semiconductor process used to fabricate the optoelectronic processor.

Figure 10:
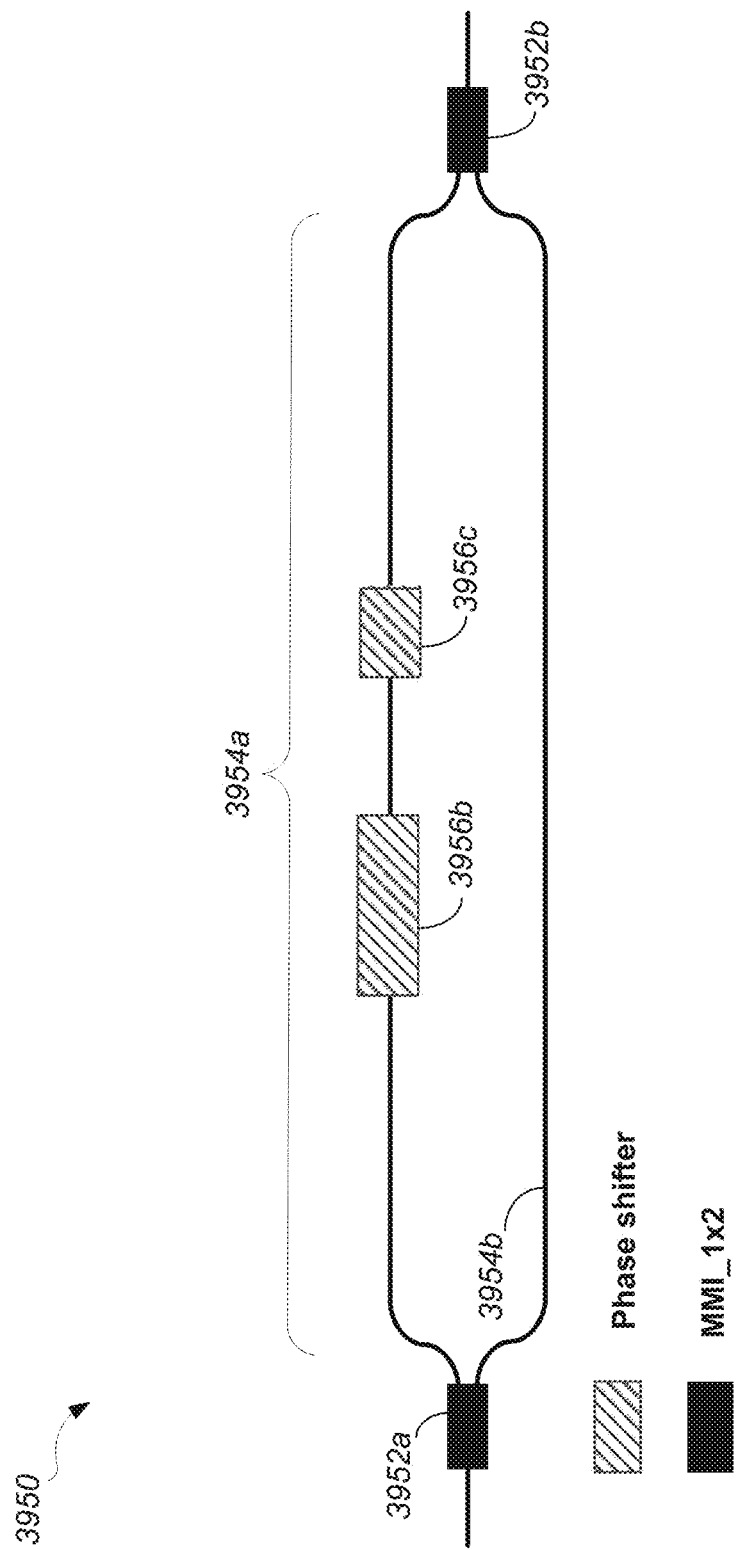

Referring to FIG. 10, in some implementations, the Mach-Zehnder modulator 3950 is used in an ANN system in which each digital input value has two bits. In this example, the arm 3954*a* is configured to have a set of two phase shifters, including a first phase shifter 3956*b* having a length of 2L and a second phase shifter 3956*c* having a length of L.

Figure 11:
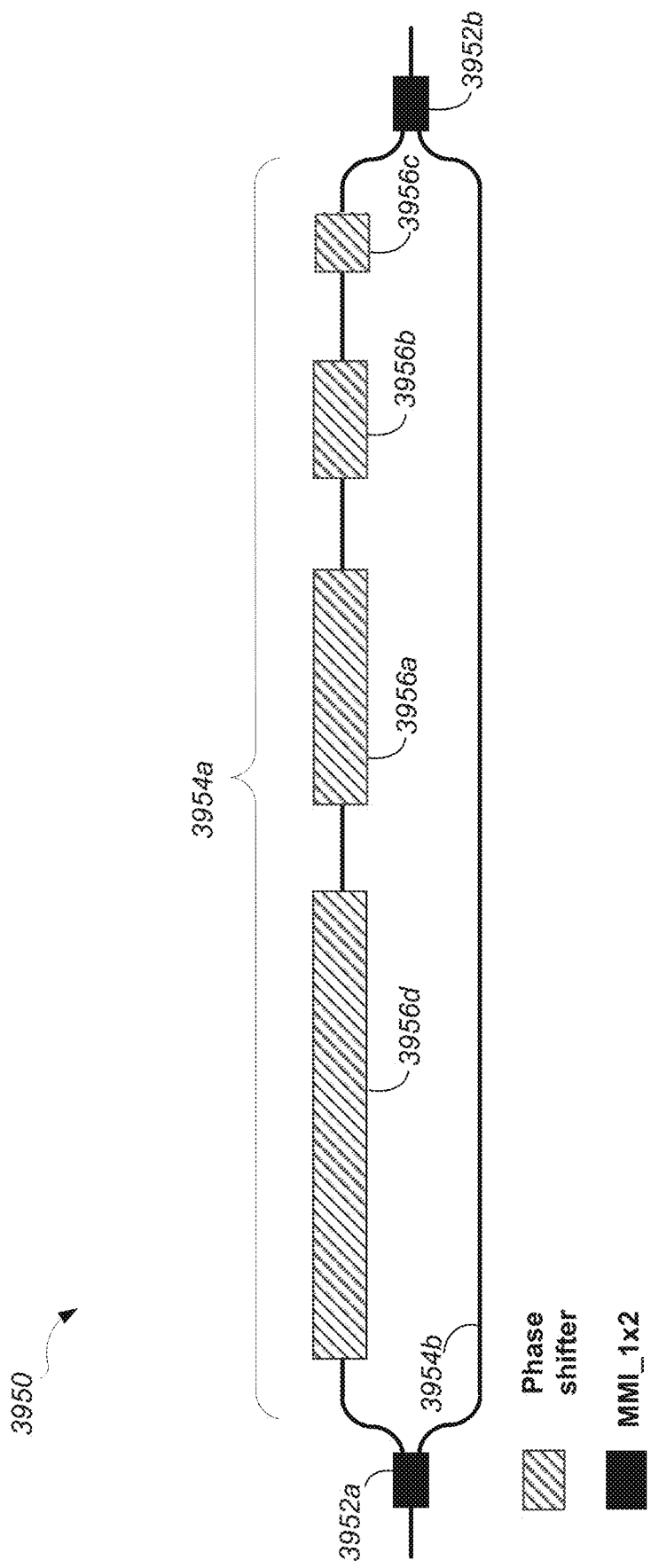

Referring to FIG. 11, in some implementations, the Mach-Zehnder modulator 3950 is used in an ANN system in which each digital input value has four bits. In this example, the arm 3954*a* is configured to have a set of four phase shifters, including a first phase shifter 3956*d* having a length of 8L, a second phase shifter 3956*a* having a length of 4L, a third phase shifter 3956*c* having a length of 2L, and a fourth phase shifter 3956*d* having a length of L.

In some implementations, each digital input value has N bits, and the arm 3954*a* is configured to have a set of N phase shifters, including a first phase shifter having a length of $2^{N-1}$L, a second phase shifter having a length of $2^{N-2}$L, . . . , and an N-th phase shifter having a length of L.

In the examples shown in FIGS. 8 to 11, the phase shifters are substantially aligned in a straight line. In some examples, the waveguide in the arm 3954*a* can have one or more curves or bends to reduce the overall length of the MZI 3950.

Figure 14:
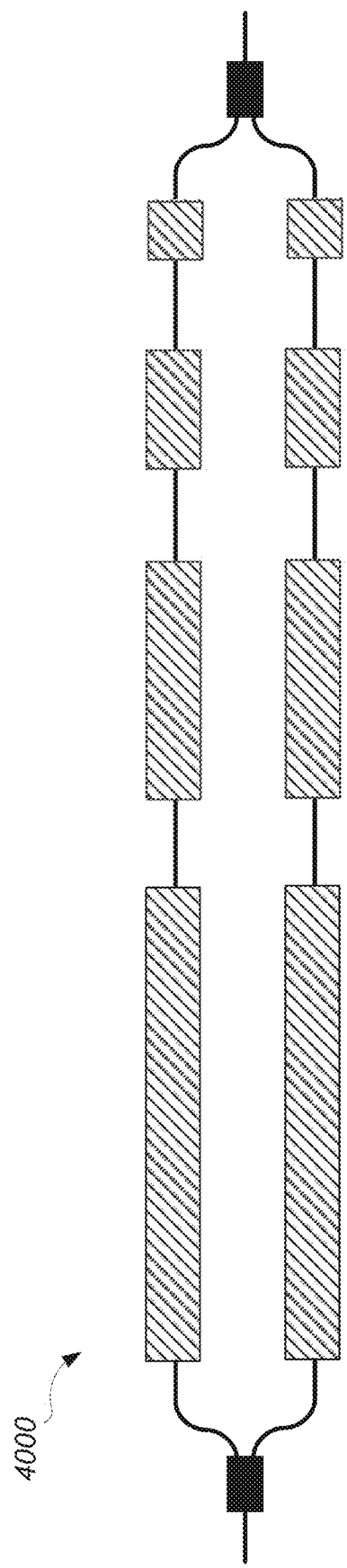

In some implementations, the MZI having segmented design can have phase shifters on both arms (e.g., 3954*a* and 3954*b*). FIG. 12 is a diagram of an example MZI 3980 that includes a set of two phase shifters in each of two arms. FIG. 13 is a diagram of an example MZI 3990 that includes a set of three phase shifters in each of two arms. FIG. 14 is a diagram of an example MZI 4000 that includes a set of four phase shifters in each of two arms.

Figure 15:
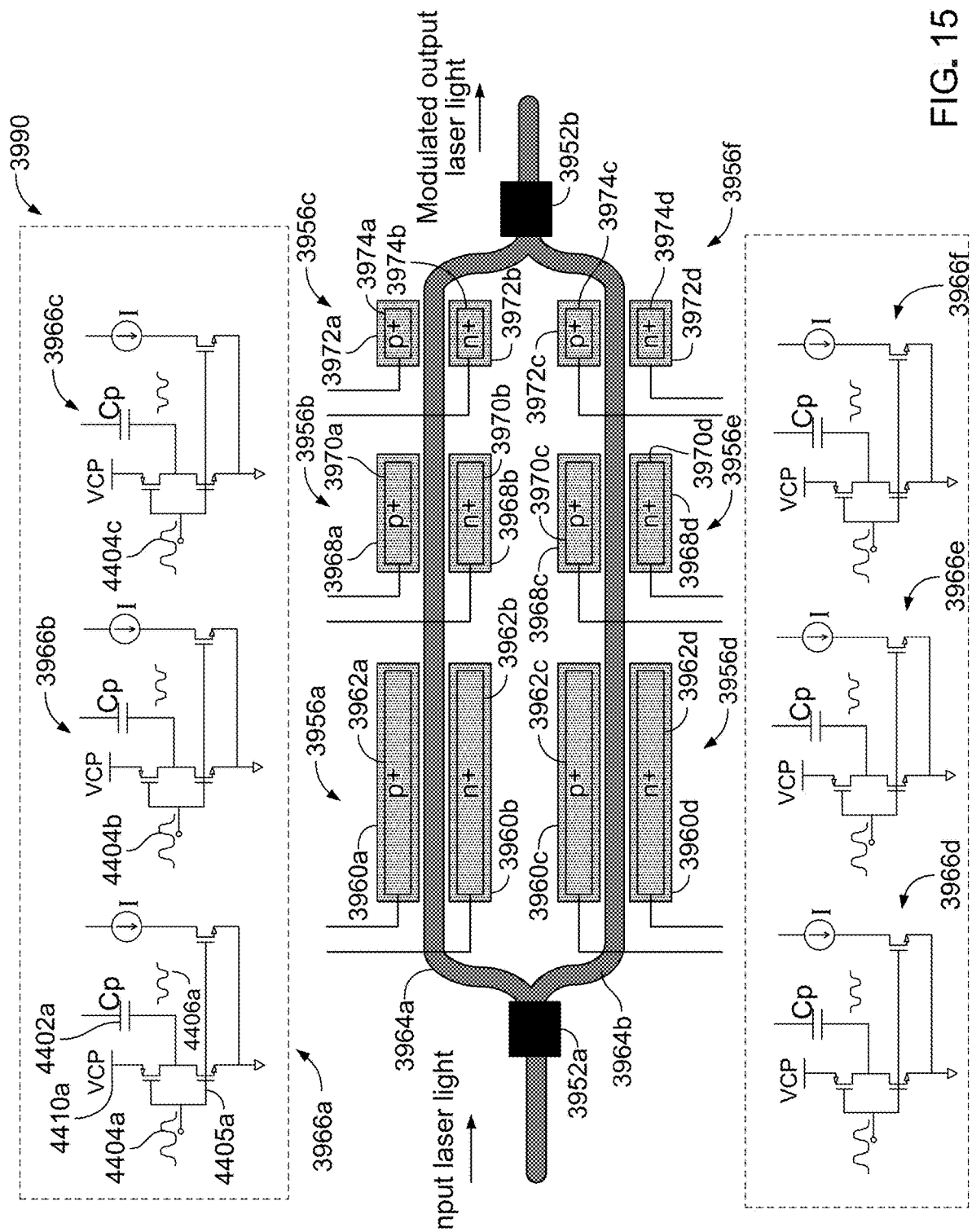

FIG. 15 is a diagram showing an example of the circuitry for driving the phase shifters of the MZI 3990 of FIG. 13 that includes a set of three phase shifters in each arm. The arm 3964*b* includes three phase shifters 3956*d*, 3956*e*, and 3956*f* that are configured similarly to the phase shifters 3956*a*, 3956*b*, and 3956*c*, respectively. The phase shifters 3956*d*, 3956*e*, 3956*f* are driven by driving circuits 3966*d*, 3966*e*, and 3966*f*, respectively. The driving circuits 3966*d*, 3966*e*, and 3966*f* are similar to the driving circuits 3966*a*, 3966*b*, and 3966*c*, respectively. The inputs to the driving circuits

3966a and 3966d are driven in a push pull manner to cause the phase shifters 3956a and 3956d to impart optical phase shifts that are complementary of each other. For example, if the driving circuit 3966a drives the phase shifter 3956a to impart a phase shift of θ to the light propagating in the arm 3954a, the driving circuit 3966d drives the phase shifter 3956d to impart a phase shift of −θ to the light propagating in the arm 3954b. The inputs to the driving circuits 3966b and 3966e are driven in a push pull manner to cause the phase shifters 3956b and 3956e to impart optical phase shifts that are complementary of each other. Similarly, the inputs to the driving circuits 3966c and 3966f are driven in a push pull manner to cause the phase shifters 3956c and 3956f to impart optical phase shifts that are complementary of each other. For clarity of illustration, the detailed connections between the various driving circuits 3966 and the phase shifters 3956 are omitted in the figure.

In some implementations, the number of phase shifters in the arm 3954a is different from the number of bits in each digital input value. In this case, the diode sections apply different respective modulation contributions to the optical wave propagating through the optical waveguide portion to provide partial digital-to-analog conversion. Additional circuitry can be used to complete the digital-to-analog conversion.

Figure 16:
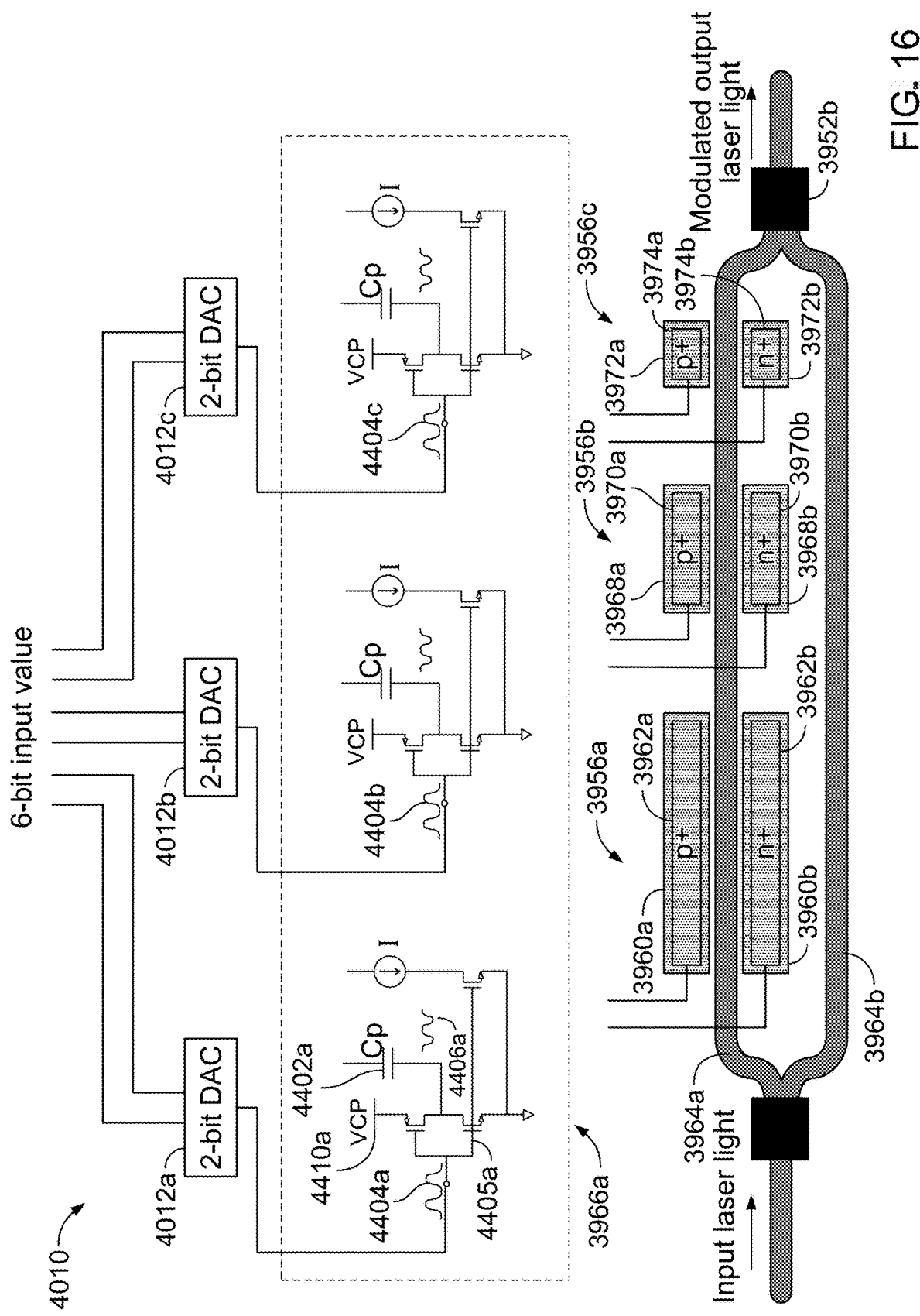

Referring to FIG. 16, in some implementations, a Mach-Zehnder modulator 4010 is configured to convert a 6-bit digital electric signal to an analog optical signal having 6 bit precision. The Mach-Zehnder modulator 4010 is similar to the Mach-Zehnder modulator 3950 of FIG. 9, except that the control voltage waveforms 4404a, 4404b, and 4404c are provided by 2-bit digital-to-analog converters 4012a, 4012b, and 4012c (collectively referenced as 4012), respectively. For clarity of illustration, the detailed connections between the charge-pump bandwidth enhancement circuits and the phase shifters have been omitted in the figure. For example, using the same digital to analog conversion architecture, a 2-bit DAC can operate faster than a 6-bit DAC. Thus, an ANN system that uses the 2-bit DACs 4012 to drive the MZI 4010 having three phase shifters 956 can operate faster than an ANN system that uses a 6-bit DAC to drive the MZI 3900 that does not have the segmented design. An MZI that has a set of six phase shifters (each driven by a corresponding driving circuit) in one arm can be longer than an MZI that has a set of three phase shifters. Thus, the ANN system that uses the 2-bit DACs 4012 to drive the MZI 4010 having three phase shifters 956 can be made shorter than an ANN system that uses binary signals to drive an MZI that includes a set of six phase shifters in one arm.

In general, a module that needs to convert an N-bit digital electric signal to an analog optical signal that has N-bit precisions can use p-bit DACs to drive an MZI having a set of q phase shifters in one arm, in which p×q=N. The selection of p and q depends on how fast the MZI needs to be reconfigured, and how much area is available to accommodate the multiple phase shifters of the MZI. A smaller p results in a faster reconfiguration rate, and a smaller q results in a shorter MZI.

In some implementations, the semiconductor diodes are operated in a forward-biased state to take advantage of index modulation effects of carrier injection, which can be implemented using a relatively short optical path length (e.g., less than about 1.0 mm, or less than about 0.5 mm, or less than about 0.1 mm). This short optical path length enables compact modulator arrangement within an integrated optical device that can use many MZIs or other types of modulators.

In addition to the interferometric optical modulators such as the MZI 3950, non-interferometric optical modulators can also be used to implement segmented design for digital-to-analog conversion. For example, absorption modulators can be used along a single optical waveguide instead of phase shifters in one or more arms of an MZI. A segmented design also facilitates use of signal conditioning for bandwidth enhancement, such as pre-emphasis and/or de-emphasis, which can be implemented independently for each segment.

Figure 17:
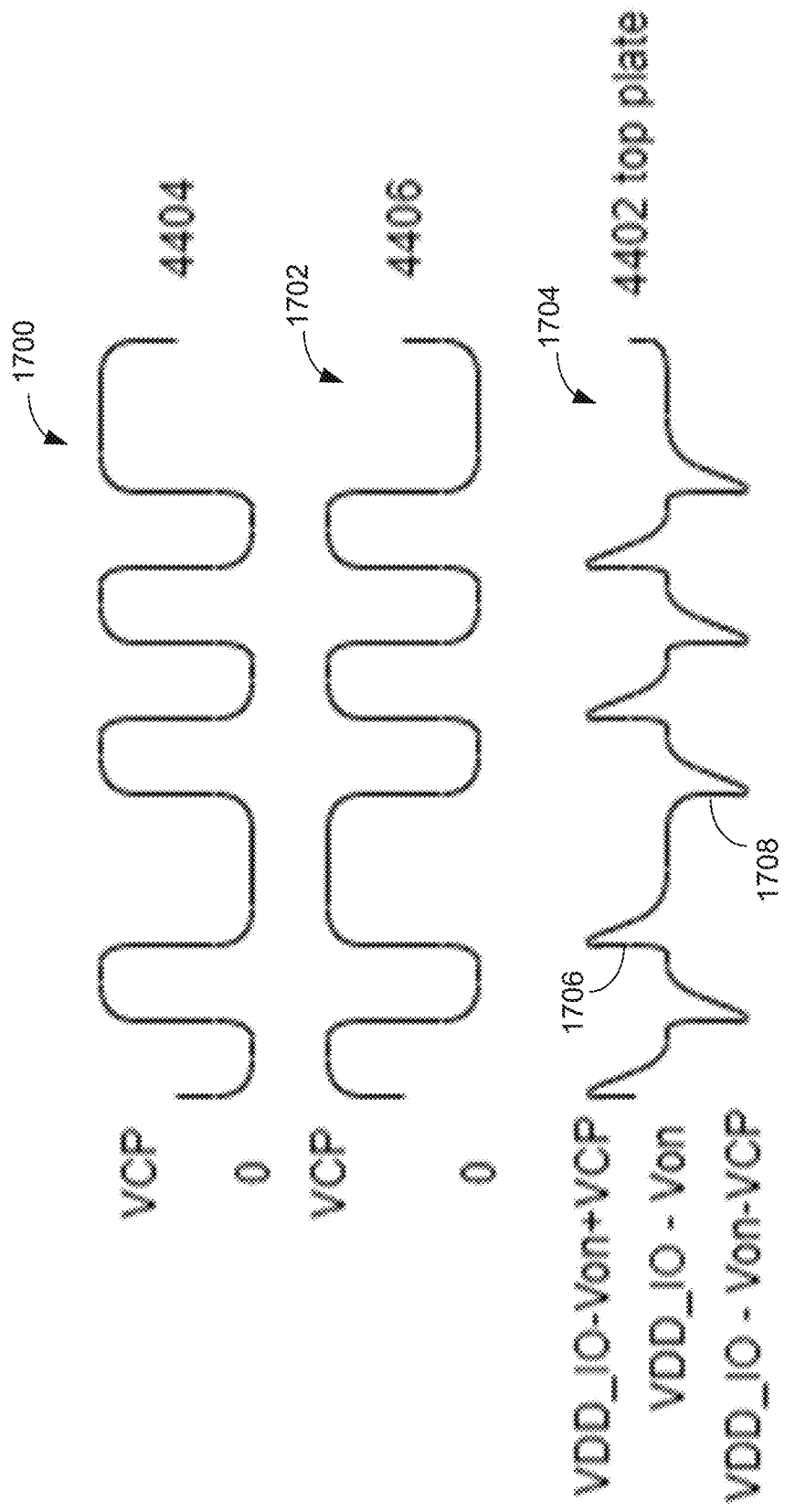
FIG. 17 is a timing diagram for the charge-pump bandwidth enhancing circuit of FIG. 3.

FIG. 17 shows the timing diagrams of pre-emphasis and de-emphasis for the charge-pump bandwidth enhancing circuit 4416 of FIG. 3. In some implementations, the inverter circuit 4405 is driven by input data (waveform 4404 shown in graph 1700). The bottom plate of the capacitor Cp 4402 will track the output of the inverter 4405, i.e., the driving voltage waveform 4406 (shown in graph 1702), which has a level between 0V and VCP. The driving voltage waveform 4406 will push or pull the charges held inside the capacitor Cp 4402 to modulator the diode as the waveform 4406 changes. The voltage at the top plate of the capacitor Cp 4402 is shown in graph 1704. The voltage waveform at the top plate of the capacitor Cp 4402 can swing between VDD_IO−Von+VCp and VDD_IO−Von−VCp, which can be much higher or lower than only driving by current mode DAC or current source 4412. Von is the turn-on voltage of the diode. As can been seen from the graph 1704, the control voltage waveform 4404 (FIGS. 3, 9, 16) that is used to control the amount of charge pumped to or pulled from the modulator circuit 4400 via the pump capacitor 4402 is pre-emphasized or de-emphasized to quickly move the required amount of charge to or quickly remove the required amount of charge from the modulator circuit 4400.

The term "pre-emphasis" refers to the part in which the charge-pump circuit 4416 quickly pumps charges to the modulator circuit 4400 via the capacitor Cp 4402 to cause the waveform at the top plate of the capacitor Cp 4402 to rise quickly, e.g., 1706, to a level greater than the steady state voltage. The term "de-emphasis" refers to the part in which the charge-pump circuit 4416 quickly removes charges from the modulator circuit 4400 via the capacitor Cp 4402 to cause the waveform at the top plate of the capacitor Cp 4402 to drop quickly, e.g., 1708, to a level lower than the steady state voltage.

The charge-pump bandwidth enhancement circuit 4416 can have a number of advantages compared to the conventional pre-emphasis circuit that uses voltage driving. For example, some pre-emphasis conventional circuit can only perform pre-emphasis, whereas the charge-pump bandwidth enhancement circuit 4416 can perform both pre-emphasis and de-emphasis. For example, some conventional circuit pre-emphasis circuit that uses voltage driving requires a much higher voltage source from an external source and bias the modulator at half of the supply voltage, or requires a complex voltage boost circuit. By comparison, the charge-pump bandwidth enhancement circuit 4416 can use a lower voltage source and does not require a complex voltage boost circuit. In addition, because the conventional pre-emphasis circuit is voltage driven, in order to ensure that the modulator is not driven over a targeted phase, the convention circuit can require implementing an additional control phase to stop the emphasis circuit. By comparison, the charge-pump bandwidth enhancement circuit 4416 can move precise amounts of electric charges to or from the capacitor Cp 4402 and can accurately control the voltage applied to the modulator, and thus does not need to implement the additional control phase to stop the emphasis circuit.

Figure 54:
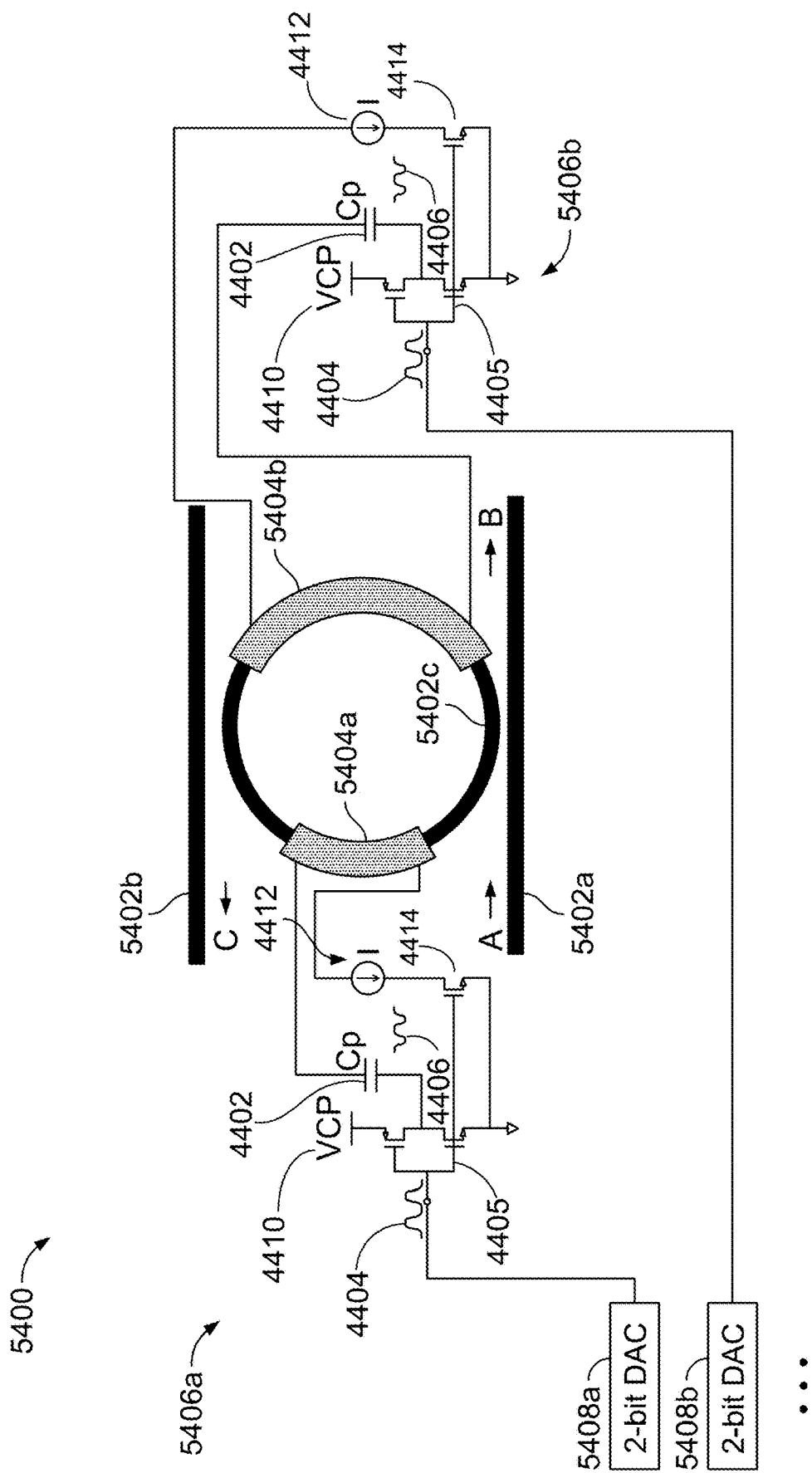
FIG. 54 is a diagram of an example of a ring resonator modulator that has a segmented design.

FIG. 54 is a diagram of an example of a ring resonator modulator 5400 that has a segmented design. The ring resonator modulator 5400 includes a first optical waveguide 5402a, a second optical waveguide 5402b, and a closed loop optical waveguide 5402c. Two phase shifters, including a first phase shifter 5404a and a second phase shifter 5404b are provided to modulate an optical wave propagating in the closed loop optical waveguide 5402c. The first and second phase shifters 5404a and 5404b have different lengths. In this example, the second phase shifter 5404b has a length that is twice the length of the first phase shifter 5404a. The phase shifters 5404a, 5404b apply different respective modulation contributions to the optical wave propagating through the optical waveguide portions associated with the phase shifters 5404a, 5404b to provide the appropriate digital-to-analog conversion. The ring resonator modulator 5400 includes two phase shifters and will be referred to as a two-segment ring resonator modulator.

For example, an input optical wave that enters the optical waveguide 5402a at a port A can propagate to a port B of the optical waveguide 5402a, or be coupled to a port C of the optical waveguide 5402b through the ring waveguide 5402c. The modulations imparted by the phase shifters 5404a and 5404b to the optical wave propagating in the ring waveguide 5402c modulates the amplitude of the optical wave at port B of the optical waveguide 5402a. The two phase shifters 5404a and 5404b effectively perform a 2-bit digital-to-analog conversion.

For example, the first phase shifter 5404a is driven by a first charge-pump bandwidth enhancing circuit 5406a, and the second phase shifter 5404b is driven by a second charge-pump bandwidth enhancing circuit 5406b. The charge-pump bandwidth enhancing circuits 5406a, 5406b are similar to the charge-pump bandwidth enhancing circuit shown in FIG. 3. For clarity of illustration, some of the signal connections for the charge-pump bandwidth enhancing circuits 5406a, 5406b are omitted from the figure.

For example, the first charge-pump bandwidth enhancing circuit 5406a is driven by a 2-bit DAC 5408a, and the second charge-pump bandwidth enhancing circuit 5406b is driven by a 2-bit DAC 5408b. The combination of the use of 2-bit DACs 5408a and 5408b and the two-segment ring resonator modulator 5400 allows a 4-bit digital input signal to be converted to an analog optical signal having 4-bit precision.

In some examples, there are n phase shifters that modulate the optical waves propagating in the ring waveguide 5402c, and the modulator is referred to as an n-segment ring resonator modulator. If each of the phase shifters is driven by a charge-pump bandwidth enhancing circuit that is in turn driven by a m-bit DAC (m≥1), then the combination of the m-bit DACs and the n-segment ring resonator modulator can convert an m×n bit digital input signal to an analog optical signal having m×n bit precision. In general, the smaller the number m is, the faster the m-bit DAC can operate, and the faster the ring resonator modulator can be reconfigured.

Figure 39:
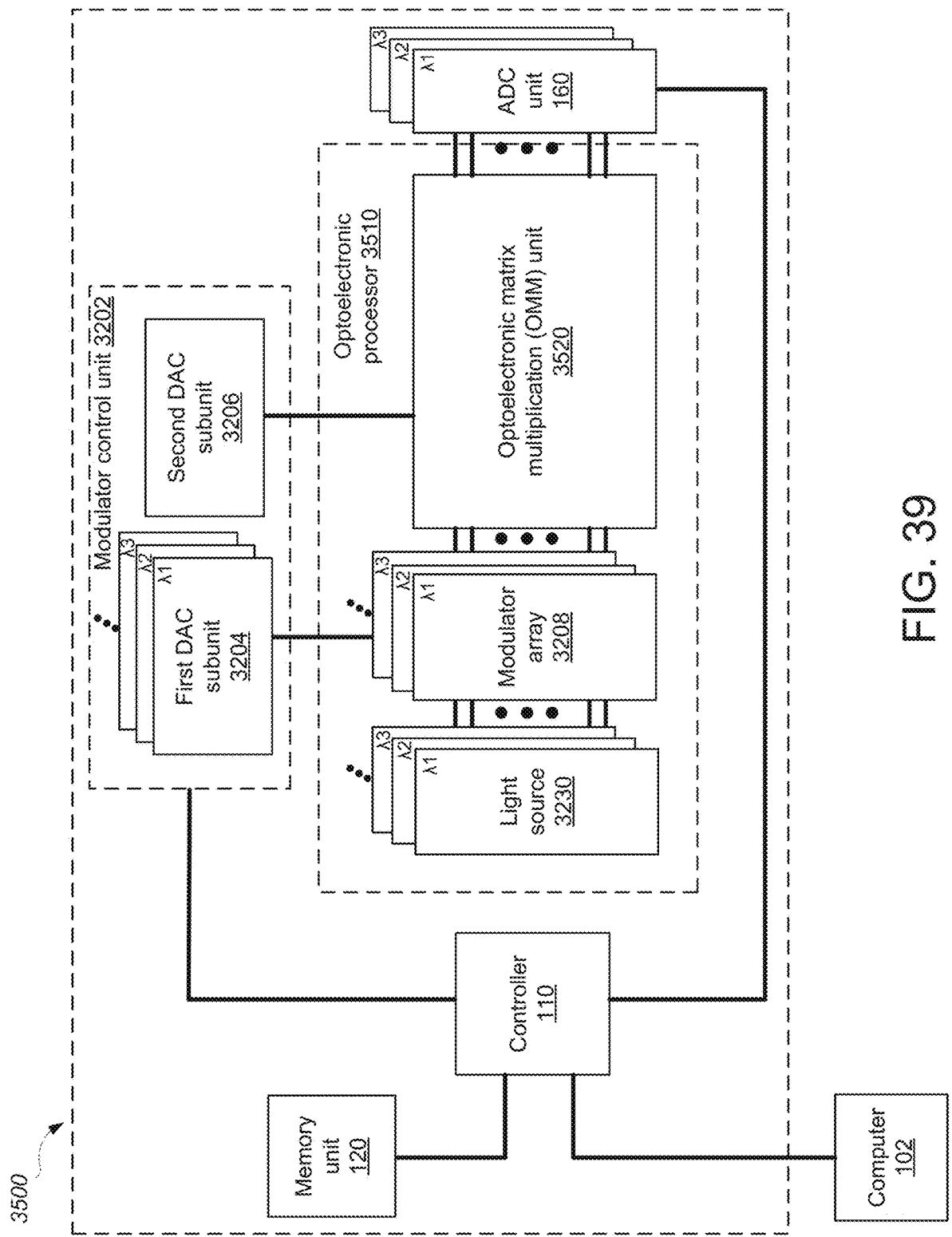
FIG. 39 is a schematic diagram of an example of a wavelength division multiplexed ANN computation system that uses an optoelectronic processor.
Figure 51:
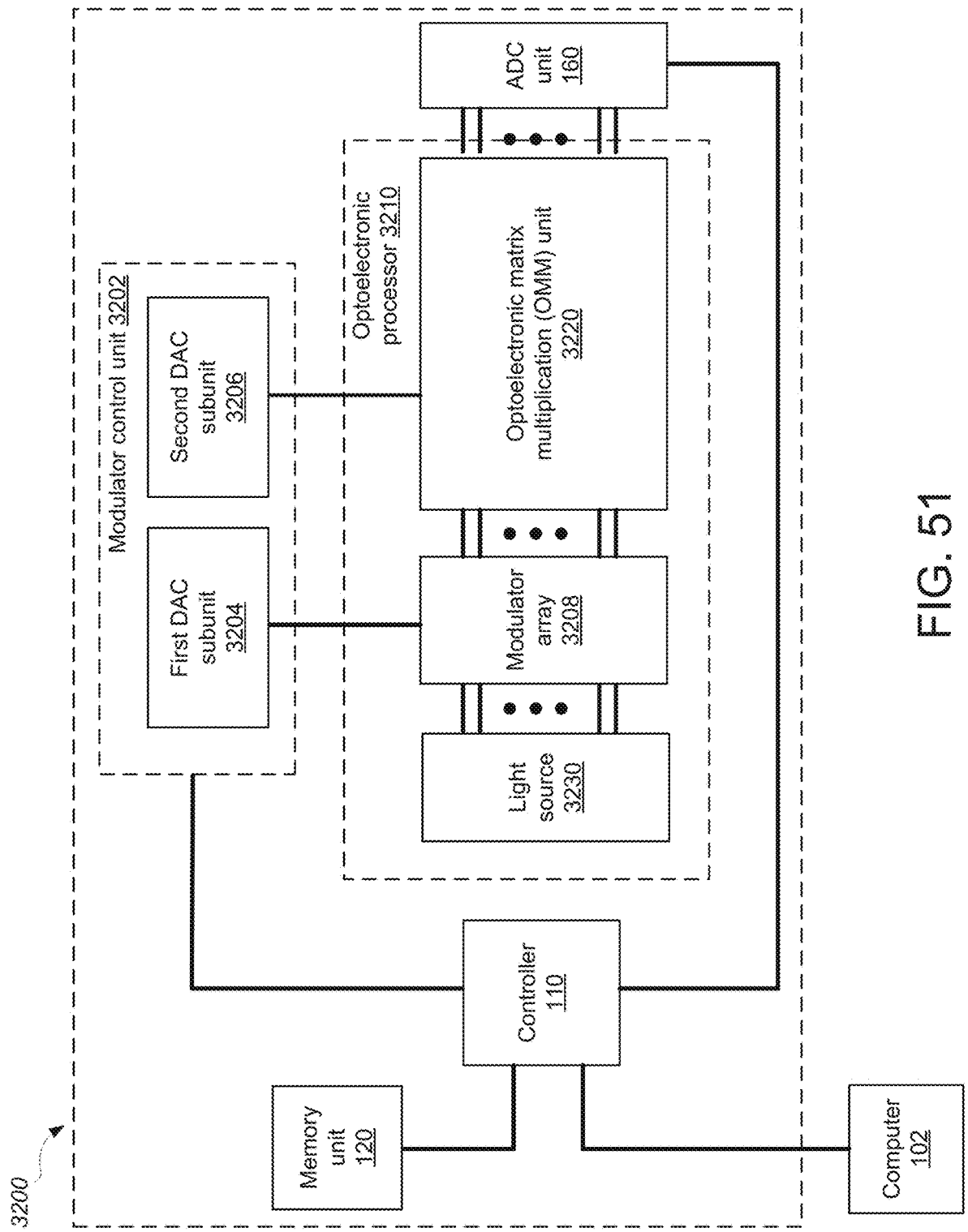
FIG. 51 is a schematic diagram of an example of an artificial neural network (ANN) computation system.

In some implementations, the ring resonator modulator 5400 can be used in the modulator array 144 of FIGS. 1 and 6, and the modulator array 3208 of FIGS. 39 and 51. In some implementations, the ring resonator modulator 5400 can also be used in the OMNI unit 150 of FIGS. 1 and 6, and the OMM unit 3520 of FIGS. 39 and 51. The number m of the m-bit DAC and the number n of the n-segment ring resonator modulator can be selected based on a number of criteria, such as the desired reconfiguration frequencies of the modulator array and the OMNI unit, and the complexity of the circuits for driving the phase shifters.

In some implementations, in a non-segmented design of an optical modulator driven by an electrical DAC signal, a single phase shifter in an interferometric modulator can also take advantage of signal conditioning for bandwidth enhancement. For example, if the interferometric modulator is a ring resonator (e.g., such as ring resonator 2222 of FIG. 29), the small size of the ring can result in insufficient space for multiple segments of appropriate lengths. Ring resonators can be useful as a modulator, for example, to provide wavelength selectivity that avoids the need for additional optical multiplexers and demultiplexers that would be used for other kinds of modulators.

Signal conditioning in a non-segmented design is potentially more complex than in a segmented design when there is pulse amplitude modulation (PAM) with more than two levels (i.e., for a digital value with more than 2 bits). In an interferometric modulator (e.g., the MZI modulator 3900 of FIG. 7), an optical interference portion of the modulator (e.g., the coupler 3902b of the MZI modulator 3900) provides a level of destructive optical interference that results in a predetermined amplitude reduction based on the modulation of a refractive index of a phase shifter (e.g., 3906 of FIG. 7). The electrical DAC signal driving the phase shifter can be processed using circuitry that shapes an amplitude change (e.g., using pre-emphasis of an initial amplitude, and/or de-emphasis of a trailing amplitude) for a corresponding change between successive digital input values in the series of digital input values. Rather than applying a simple pre-emphasis/de-emphasis scheme for switching between two levels, there is a more complex form of pre-emphasis/de-emphasis for switching among 4 or more levels in a non-segmented design.

In some implementations, nonlinearity can occur in a modulator when mapping different modulator input values to different resulting amplitude reductions of the modulator. There are techniques for compensating for such nonlinearity, but the nonlinearity compensation process can be relatively slow and/or consume a relatively large amount of power. Techniques for faster and more power efficient pre-emphasis/de-emphasis signal conditioning with nonlinearity compensation can be achieved by combining different signal conditioning paths when forming the electrical signal that drives the single phase shifter in an interferometric modulator. A given number of bits for a series of input values (e.g., n bits), or a parallel n-bit value, can be used to control each of $2^n$ single-level DACs. For example, the $2^n$ single-level DACs can be included in the first MC subunit 132 (if the MZIs having segmented design are used for the modulator array 144), the second MC subunit 134 (if the MZIs having segmented design are used for the OMNI unit 150), or both (if the MZIs having segmented design are used for both the modulator array 144 and the OMM unit 150. Each single-level DAC is configured to provide an electrical signal having an amplitude for only one of the $2^n$ bit values, and corresponding pre-emphasis and de-emphasis for that amplitude, that are appropriately conditioned for a given nonlinearity of the modulator at that amplitude. The electrical signal that provides a modulator input value is then selected from an appropriate one of the conditioned single-level DAC outputs.

For example, a first signal conditioning path from one of the single-level DACs providing a given modulator input value can be configured to provide an unconditioned electrical signal corresponding to the series of digital input values that drive that DAC, where for a given type of DAC (e.g., a current-steering DAC), the output can be scaled appropriately based on a known nonlinearity of the modulator at that modulator input value. A second signal conditioning path can be configured to provide a delayed, scaled, and/or inverted version of the unconditioned electrical signal (to provide pre-emphasis). A third signal conditioning path can be configured to provide a delayed, scaled, and/or inverted version of the unconditioned electrical signal (to provide de-emphasis). Any number of additional signal conditioning paths can be used, as needed, to provide the appropriate amount of pre-emphasis and/or de-emphasis when those different versions of the unconditioned electrical signal are added to the unconditioned electrical signal. The resulting electrical signals, which have been scaled to compensate for nonlinearity and have been conditioned to provide appropriate amounts of pre-emphasis and de-emphasis, can then be applied as modulator input values to result in equalized and bandwidth enhanced optical signals with different optical amplitudes evenly spaced over the 4 or more levels being used.

Figure 18:
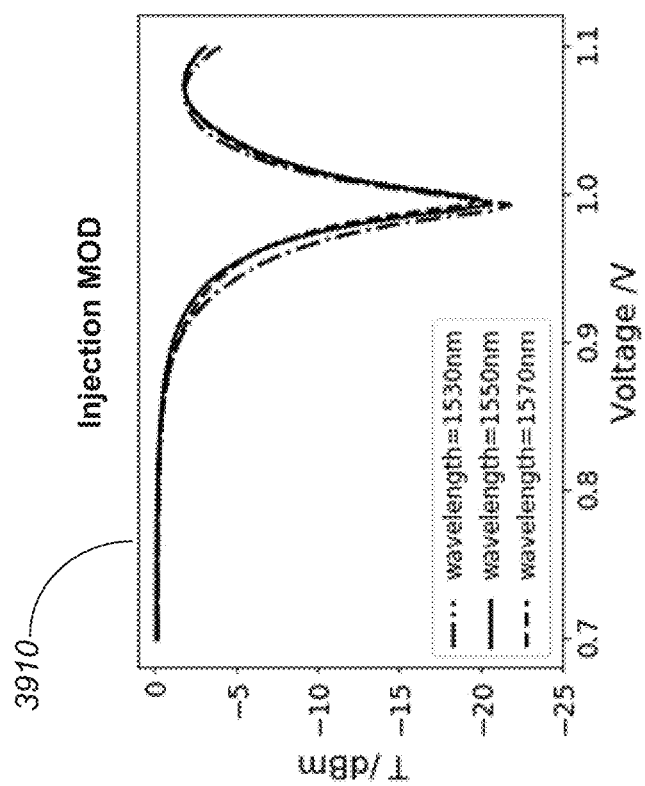
FIG. 18 is a graph showing the intensity-vs-voltage curves for the Mach-Zehnder modulator of FIG. 7.

FIG. 18 is a graph 3910 that shows the intensity-vs-voltage curves for the Mach-Zehnder modulator 3900 using the configuration shown in FIG. 7 for wavelengths 1530 nm, 1550 nm, and 1570 nm. The graph 3910 shows that the Mach-Zehnder modulator 3900 has similar intensity-vs-voltage characteristics for different wavelengths in the range from 1530 nm to 1570 nm.

Referring back to FIG. 6, the modulator array 144 of the WDM ANN computation system 104 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., λ1, λ2, and λ3), the modulator array 144 can have 3 banks of 32 modulators each. Further, the modulator array 144 also includes an optical multiplexer configured to combine the plurality of optical input vectors into a combined optical input vector including the plurality of wavelengths. For example, the optical multiplexer can combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

Additionally, the analog electronic unit 146 of the WDM ANN computation system 104 is further configured to demultiplex the multiple wavelengths and to generate a plurality of demultiplexed output voltages. For example, the analog electronic unit 146 can include a demultiplexer configured to demultiplex the three wavelengths contained in each of the 32 signals of the multi-wavelength optical output vector, and route the 3 single-wavelength optical output vectors to three banks of photodetectors coupled to three banks of transimpedance amplifiers.

Additionally, the ADC unit 160 of the WDM ANN computation system 104 includes banks of ADCs configured to convert the plurality of demultiplexed output voltages of the analog electronic unit 146. Each of the banks corresponds to one of the multiple wavelengths, and generates respective digitized demultiplexed optical outputs. For example, the banks of ADCs can be coupled to the banks of transimpedance amplifiers of the analog electronic unit 146.

The controller 110 can implement a method analogous to the process 200 but expanded to support the multi-wavelength operation. For example, the method can include the steps of obtaining, from the ADC unit 160, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some examples, the ANN can be specifically designed, and the digital input vectors can be specifically formed such that the multi-wavelength optical output vector can be detected without demultiplexing. In such examples, the analog electronic unit 146 can be a wavelength-insensitive detection unit that does not demultiplex the multiple wavelengths of the multi-wavelength optical output vector. As such, each of the photodetectors of the analog electronic unit 146 effectively sums the multiple wavelengths of an optical signal into a single photocurrent, and each of the voltages output by the analog electronic unit 146 corresponds to an element-by-element sum of the matrix multiplication results of the multiple digital input vectors.

So far, the nonlinear transformations of the weighted sums performed as part of the ANN computation were performed in the digital domain by the controller 110. In some examples, the nonlinear transformations can be computationally intensive or power hungry, add significantly to the complexity of the controller 110, or otherwise limit the performance of the ANN computation system 100 or 104 in terms of throughput or power efficiency. As such, in some implementations of the ANN computation system 100 or 104, the nonlinear transformation can be performed in the analog domain through analog electronics.

In some implementations, the analog electronic unit 146 is configured to apply a nonlinear transfer function, and output transformed output voltages to the ADC unit 160. As the ADC unit 160 receives voltages that have been nonlinearly transformed by the analog electronic unit 146, the controller 110 can obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 110 can be omitted, reducing the computation burden by the controller 110. The first transformed voltages obtained directly from the ADC unit 160 can then be stored as the first transformed digital output vector in the memory unit 120.

The analog electronic nonlinear transformation performed by the analog electronic unit 146 can be implemented in various ways. For example, high-gain amplifiers in feedback configuration, comparators with adjustable reference voltage, nonlinear IV (current-voltage) characteristics of a diode, breakdown behavior of a diode, nonlinear CV (capacitance-voltage) characteristics of a variable capacitor, or nonlinear IV characteristics of a variable resistor can be used.

Use of the analog nonlinear transformation can improve the performance, such as throughput or power efficiency, of the ANN computation system 104 by reducing a step to be performed in the digital domain. The moving of the nonlinear transformation step out of the digital domain can allow additional flexibility and improvements in the operation of the ANN computation systems. For example, in a recurrent neural network, the output of the OMNI unit 150 is activated, and recirculated back to the input of the OMM unit 150. In the examples in which the activation is performed by the controller 110 in the ANN computation system 100, it is necessary to digitize the output voltages of the detection unit 146 at every pass through the OMNI unit 150. In the examples in which the activation is performed prior to digitization by the ADC unit 160, it is possible to reduce the number of ADC conversions needed in performing recurrent neural network computations.

In some implementations, the analog nonlinear transformation can be performed by the ADC unit 160. For example, a nonlinear ADC unit can be a linear ADC unit with a nonlinear lookup table that maps the linear digitized outputs of the linear ADC unit into desired nonlinearly transformed digitized outputs.

Some implementations of the optoelectronic processor 140 of the ANN computation system 100 in FIG. 1 include a laser unit 142 that generates N light outputs that have the same wavelength and are optically coherent. In these implementations, the optical matrix multiplication unit 150 performs an N×N matrix multiplication in the optical domain, in which the optical signals remain coherent from the input of the OMNI unit 150 to the output of the OMM unit 150. The advantages of the OMM unit 150 in performing the matrix multiplication in the optical domain have been described above. In other implementations, the OMNI unit 150 is able to process non-coherent or low-coherent optical signals in performing matrix computations. The following describes optoelectronic computing systems that do not require the optical signals to be coherent throughout the entire matrix multiplication process, in which some portions of the computations are performed in the optical domain, and some portions of the computations are performed in the electrical domain.

The optoelectronic computing system can produce a computational result using different types of operations that are each performed on signals (e.g., electrical signals or optical signals) for which the underlying physics of the operation is most suitable (e.g., in terms of energy consumption and/or speed). For example, copying can be performed using optical power splitting, summation can be performed using electrical current-based summation, and multiplication can be performed using optical amplitude modulation. An example of a computation that can be performed using these three types of operations is multiplying a vector by a matrix (e.g., as employed by artificial neural network computations). A variety of other computations can be performed using these operations, which represent a set of general linear operations from which a variety of computations can be performed, including but not limited to: vector-vector dot products, vector-vector element-wise multiplication, vector-scalar element wise multiplication, or matrix-matrix element-wise multiplication.

Figure 19:
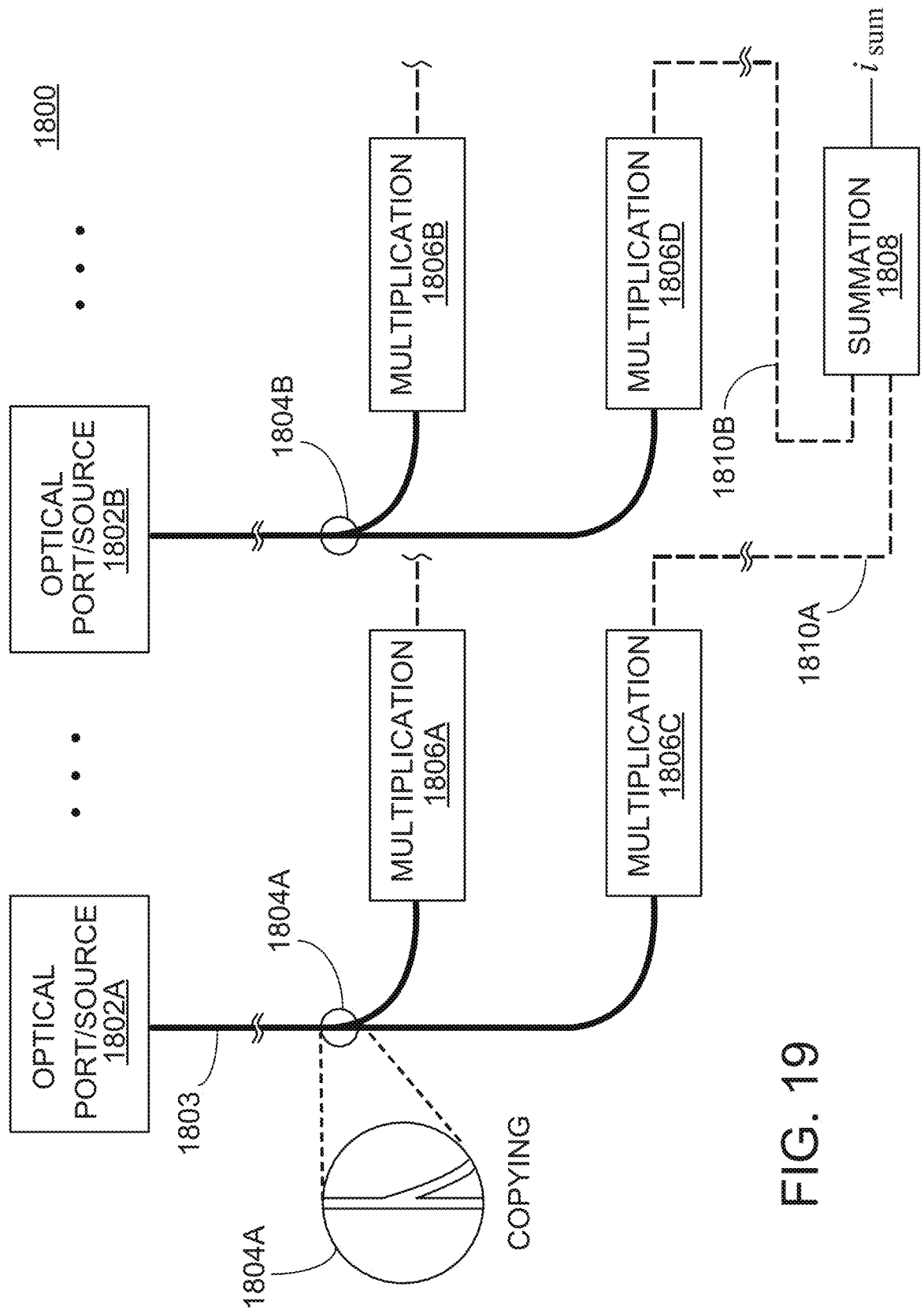
FIG. 19 is a schematic diagram of an example optoelectronic computing system.

Referring to FIG. 19, an example of an optoelectronic computing system 1800 includes a set of optical ports or sources 1802A, 1802B, etc. that provide optical signals. For example, in some implementations, the optical port/source 1802A can include an optical input coupler that provides an optical signal that is coupled to an optical path 1803. In other implementations, the optical port/source 1802A can include a modulated optical source, such as a laser (e.g., for coherence-sensitive implementations) or a light emitting diode (LED) (e.g., for coherence-insensitive implementations), which generates an optical signal that is coupled to the optical path 1803. Some implementations can include a combination of ports that couple optical signals into the system 1800 and sources that generate optical signals within the system 1800. The optical signals can include any optical wave (e.g., an electromagnetic wave having a spectrum that includes wavelengths in the range between about 100 nm and about 1 mm) that has been, or is in the process of being, modulated with information using any of a variety of forms of modulation. The optical path 1803 can be defined, for example, based on a guided mode of an optical waveguide (e.g., a waveguide embedded in a photonic integrated circuit (PIC), or an optical fiber), or based on a predetermined free-space path between the optical port/source 1802A and another module of the system 1800.

In some implementations, the optoelectronic computing system 1800 is configured to perform a computation on an array of input values that are encoded on respective optical signals provided by the optical ports or sources 1802A, 1802B, etc. For example, for various machine learning applications based on neural networks, the computation can implement vector-matrix multiplication (or vector-by-matrix multiplication) where an input vector is multiplied by a matrix to yield an output vector as a result. The optical signals can represent elements of a vector, including possibly only a subset of selected elements of the vector. For example, for some neural network models, the size of a matrix used in the computation can be larger than the size of a matrix that can be loaded into a hardware system (e.g., an engine or co-processor of a larger system) that performs a vector-matrix multiplication portion of the computation. So, part of performing the computation can involve dividing the matrix and the vector into smaller segments that can be provided to the hardware system separately.

The modules shown in FIG. 19 can be part of a larger system that performs vector-matrix multiplication for a relatively large matrix (or submatrix), such as a 64×64-element matrix. But, for purposes of illustration, the modules will be described in the context of an example computation that performs vector-matrix multiplication using a 2×2-element matrix. The modules referenced in this example include two copy modules 1804A and 1804B, four multiplication modules 1806A, 1806B, 1806C, and 1806D, and two summation modules, only one of which, summation module 1808, is shown in FIG. 19. These modules enable multiplication of an input vector $$x = \begin{bmatrix} x_A \\ x_B \end{bmatrix}$$

by a matrix $$\overline{\overline{M}} = \begin{bmatrix} M_A & M_B \\ M_C & M_D \end{bmatrix}$$

to produce an output vector $$y = \begin{bmatrix} y_A \\ y_B \end{bmatrix}.$$

For this vector-matrix multiplication $\overline{y} = \overline{\overline{M}} \overline{x}$, each of the two elements of the output vector $\overline{y}$ can be represented by a different equation, as follows.

$$y_A = M_A x_A + M_B x_B \quad \text{(Equ. 1)}$$

$$y_B = M_C x_A + M_D x_B \quad \text{(Equ. 2)}$$

The equations (1) and (2) can be broken down into separate steps that can be performed in the system 1800 using a set of basic operations: a copying operation, a multiplication operation, and a summation operation. In these equations, each element of the input vector appears twice, so there are two copying operations. There are also four multiplication operations, and there are two summation operations. The number of operations performed would be larger for systems that implement vector-matrix multiplication using a larger matrix, and the relative number of instances of each operation would be different using a matrix that is not square matrix in shape (i.e., with the number of rows being different from the number of columns).

In this example, the copying operations are performed by copying modules 1804A and 1804B. The elements of the input vector $x_A$ and $x_B$ are represented by values encoded on optical signals from the optical port/source 1802A and 1802B, respectively. Each of these values is used in both equations, so each value is copied to provide the resulting two copies to different respective multiplication modules. A value can be encoded in a particular time slot, for example, using optical wave that has been modulated to have a power from a set of multiple power levels, or having a duty cycle from a set of multiple duty cycles, as described in more detail below. A value is copied by copying the optical signal on which that value is encoded. The optical signal encoded with the value representing element $x_A$ is copied by copying module 1804A, and the optical signal encoded with the value representing element $x_B$ is copied by copying module 1804B. Each copying module can be implemented, for example, using an optical power splitter, such as a waveguide optical splitter that couples a guided mode in an input waveguide to each of two output waveguides over a Y-shaped splitter that gradually (e.g., adiabatically) splits the power, or a free-space beam splitter that uses a dielectric interface or thin film with one or more layers to transmit and reflect, respectively, two output beams from an input beam.

In this document, when we say that the optical signal encoded with the value representing element $x_A$ is copied by the copying module 1804A, we mean that multiple copies of signals that represent element $x_A$ are produced based on the input signal, not necessarily that the output signals of the copying module 1804A have the same amplitude as that of the input signal. For example, if the copying module 1804A splits the input signal power evenly between two output signals, then each of the two output signals will have a power that is equal to or less than 50% of the power of the input signal. The two output signals are copies of each other, while the amplitude of each output signal of the copying module 1804A is different from the amplitude of the input signal. Also, in some embodiments that have a group of multiple copying modules used for copying a given optical signal, or subset of optical signals, each individual copying module does not necessarily split power evenly among its generated copies, but the group of copying modules can be collectively configured to provide copies that have substantially equal power to the inputs of downstream modules (e.g., downstream multiplication modules).

In this example, the multiplication operations are performed by four multiplication modules 1806A, 1806B, 1806C, and 1806D. For each copy of one of the optical signals, one of the multiplication modules multiplies that copy of the optical signal by a matrix element value, which can be performed using optical amplitude modulation. For example, the multiplication module 1806A multiplies the input vector element $x_A$ by the matrix element $M_A$. The value of the vector element $x_A$ can be encoded on optical signal, and the value of the matrix element $M_A$ can be encoded as an amplitude modulation level of an optical amplitude modulator.

The optical signal encoded with the vector element $x_A$ can be encoded using different forms of amplitude modulation. The amplitude of the optical signal can correspond to a particular instantaneous power level $P_A$ of a physical optical wave within a particular time slot, or can correspond to a particular energy $E_A$ of a physical optical wave over a particular time slot (where the power integrated over time yields total energy). For example, the power of a laser source can be modulated to have a particular power level from a predetermined set of multiple power levels. In some implementations, it can be useful to operate electronic circuitry near an optimized operation point, so instead of varying the power over many possible power levels, an optimized "on" power level is used with the signal being modulated to be "on" and "off" (at zero power) for particular fractions of a time slot. The fraction of time that the power is at the "on" level corresponds to a particular energy level. Either of these particular values of power or energy can be mapped to a particular value of the element $x_A$ (using a linear or nonlinear mapping relationship). The actual integration over time, to yield a particular total energy level, can occur downstream in the system 1800 after signals are in the electrical domain, as described in more detail below.

Additionally, the term "amplitude" can refer to the magnitude of the signal represented by the instantaneous or integrated power in the optical wave, or can also equivalently refer to the "electromagnetic field amplitude" of the optical wave. This is because the electromagnetic field amplitude has a well-defined relationship to the signal amplitude (e.g., by integrating an electromagnetic field intensity, which is proportional to the square of the electromagnetic field amplitude, over a transverse size of a guided mode or free-space beam to yield the instantaneous power). This leads to a relationship between modulation values, since a modulator that modulates the electromagnetic field amplitude by a particular value $\sqrt{M}$ can also be considered as modulating the power-based signal amplitude by a corresponding value M (since the optical power is proportional to the square of the electromagnetic field amplitude).

The optical amplitude modulator used by the multiplication module to encode the matrix element $M_A$ can operate by changing the amplitude of the optical signal (i.e., the power in the optical signal) using any of a variety of physical interactions. For example, the modulator can include a ring resonator, an electro-absorption modulator, a thermal electro-optical modulator, or a Mach-Zehnder Interferometer (MZI) modulator. In some techniques a fraction of the power is absorbed as part of the physical interaction, and in other techniques the power is diverted using a physical interaction that modifies another property of the optical wave other than its power, such as its polarization or phase, or modifies coupling of optical power between different optical structures (e.g., using tunable resonators). For optical amplitude modulators that operate using interference (e.g., destructive and/or constructive interference) among optical waves that have traveled over different paths, coherent light sources such as lasers can be used. For optical amplitude modulators that operate using absorption, either coherent or non-coherent or low-coherence light sources such as LEDs can be used.

In one example of a waveguide 1×2 optical amplitude modulator, a phase modulator is used to modulate the power in an optical wave by placing the phase modulator in one of multiple waveguides of the modulator. For example, the waveguide 1×2 optical amplitude modulator can split an optical wave guided by an input optical waveguide into first and second arms. The first arm includes a phase shifter that imparts a relative phase shift with respect to a phase delay of the second arm. The modulator then combines the optical waves from the first and second arms. In some embodiments, different values of the phase delay provide multiplication of the power in the optical wave guided by the input optical waveguide by a value between 0 to 1 through constructive or destructive interference. In some embodiments, the first and second arms are combined into each of two output waveguides, and a difference between photocurrents generated by respective photodetectors receiving light waves from the two output waveguides provides a signed multiplication result (e.g., multiplication by a value between −1 to 1), as described in more detail below (see FIG. 28). By suitable choice of amplitude scaling of the encoded optical signals, the range of the matrix element value can be mapped to an arbitrary range of positive values (0 to M), or signed values (−M to M).

In this example, the summation operations are performed by two summation modules, with the summation module 1808, shown in FIG. 19, used for performing the summation in the equation (2) for computing the output vector element $y_B$. A corresponding summation module (not shown) is used for performing the summation in the equation (1) for computing the output vector element $y_A$. The summation module 1808 produces an electrical signal that represents a sum of the results of the two multiplication modules 1806C and 1806D. In this example, the electrical signal is in the form of a current $i_{sum}$ that is proportional to the sum of the powers in the output optical signals generated by multiplication modules 1806C and 1806D, respectively. The summation operation that yields this current $i_{sum}$ is performed in the optoelectronic domain in some embodiments, and is performed in the electrical domain in other embodiments. Or, some embodiments can use optoelectronic domain summation for some summation modules and electrical domain summation for other summation modules.

In embodiments in which the summation is performed in the electrical domain, the summation module 1808 can be implemented using: (1) two or more input conductors that each carries an input current whose amplitude represents a result of one of the multiplication modules, and (2) at least one output conductor that carries a current that is the sum of the input currents. For example, this occurs if the conductors are wires that meet at a junction. Such a relationship can be understood, for example (without being bound by theory), based on Kirchhoff's current law, which states that current flowing into a junction is equal to current flowing out of the junction. For these embodiments, the signals 1810A and 1810B provided to the summation module 1808 are input currents, which can be produced by photodetectors that are part of the multiplication modules that generate a respective photocurrent whose amplitude is proportional to the power in a received optical signal. The summation module 1808 then provides the output current $i_{sum}$. The instantaneous value of that output current, or the integrated value of that output current, can then be used to represent the quantitative value of the sum.

In embodiments in which the summation is performed in the optoelectronic domain, the summation module 1808 can be implemented using a photodetector (e.g., a photodiode) that receives the optical signals generated by different respective multiplication modules. For these embodiments, the signals 1810A and 1810B provided to the summation module 1808 are input optical signals that each comprise an optical wave whose power represents a result of one of the multiplication modules. The output current $i_{sum}$ in this embodiment is the photocurrent generated by the photodetector. Since the wavelengths of the optical waves are different (e.g., different enough such that no significant constructive or destructive interference occurs between them), the photocurrent will be proportional to the sum of the powers of the received optical signals. The photocurrent is also substantially equal to the sum of the individual currents that would result for the individual detected optical powers detected by separate equivalent photodetectors. The wavelengths of the optical waves are different, but close enough to have substantially the same response by the photodetector (e.g., wavelengths within a substantially flat detection bandwidth of the photodetector). As mentioned above, summation in the electrical domain, using current summation, can enable a simpler system architecture by avoiding the need for multiple wavelengths.

Figure 20:
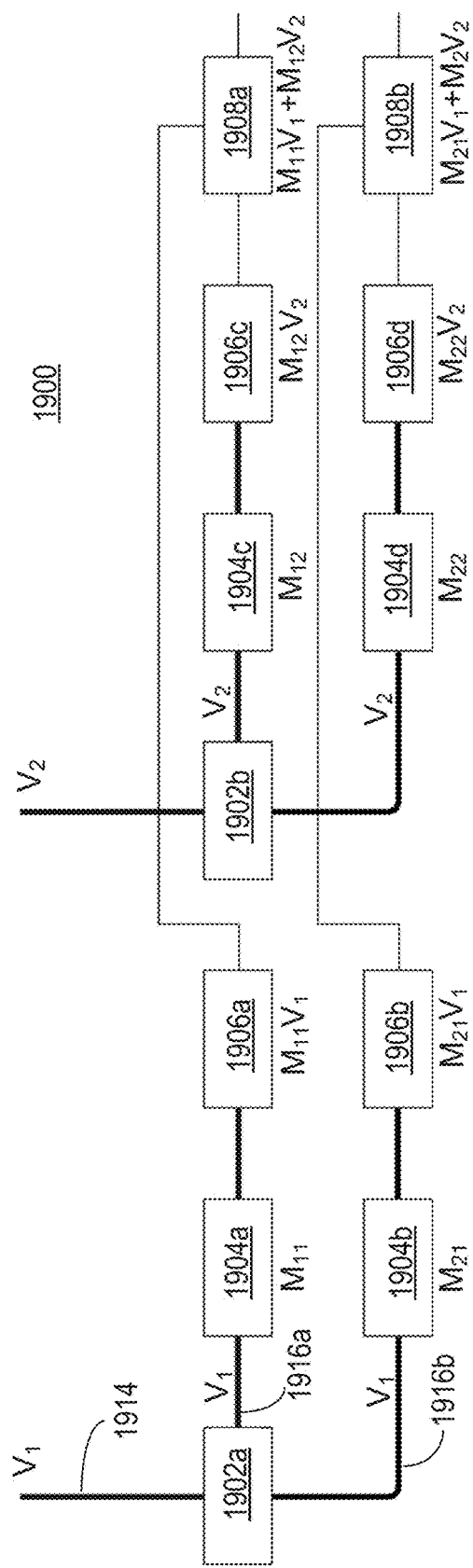
FIGS. 20 and 21 are schematic diagrams of example system configurations.

FIG. 20 shows an example of a system configuration 1900 for an implementation of the system for performing vector-matrix multiplication using a 2×2-element matrix, with the summation operation performed in the electrical domain. In this example, the input vector is $$v = \begin{bmatrix} v_1 \\ v_2 \end{bmatrix},$$

and the matrix is $$\overline{\overline{M}} = \begin{bmatrix} M_{11} & M_{12} \\ M_{21} & M_{22} \end{bmatrix}.$$

Each of the elements of the input vector is encoded on a different optical signal. Two different copying modules 1902a, 1902b (collectively referenced as 1902) perform an optical copying operation to split the computation over different paths (e.g., an "upper" path and a "lower" path, in which the term "upper" and "lower" refer to the relative positions of the paths in the figure). There are four multiplication modules 1904a, 1904b, 1904c, 1904d (collectively referenced as 1904) that each multiply by a different matrix element using optical amplitude modulation. At the output of each multiplication module 1904, there is an optical detection module 1906 (e.g., 1906a, 1906b, 1906c, 1906d) that converts an optical signal to an electrical signal in the form of an electrical current. Both upper paths of the different input vector elements (e.g., including the outputs of 1906a and 1906c) are combined using a summation module 1908a, and both lower paths of the different input vector elements (including the outputs of 1906b and 1906d) are combined using a summation module 1908b. The summation modules 1908a and 1908b (collectively referenced as 1908) perform summation in the electrical domain. So, each of the elements of output vector is encoded on a different electrical signal. As shown in FIG. 20, as the computation progresses, each component of an output vector is incrementally generated to yield the following results for the upper and lower paths, respectively.

$M_{11}v_1 + M_{12}v_2$ $M_{21}v_1 + M_{22}v_2$

At different portions of the system, the same optical power can represent different values. For example, the copying module 1902a receives an input signal on an input waveguide 1914 and provides output signals on output waveguides 1916a and 1916b. The amplitude of the optical signal on the output waveguide 1916a or 1916b that represents the value v1 has an amplitude that is approximately half of the amplitude of the optical signal on the input waveguide 1914 that represents the value v1.

In some implementations, if a copying module performs an optical copying operation to split the computation over three paths, then the optical signal on the output waveguide of the optical splitter that represents a particular value has an amplitude that is approximately one-third of the amplitude of the optical signal on the input waveguide of the optical splitter that represents the particular value. Similarly, if a copying module performs an optical copying operation to split the computation over four paths, then the optical signal on the output waveguide of the optical splitter that represents a particular value has an amplitude that is approximately one-fourth of the amplitude of the optical signal on the input waveguide of the optical splitter that represents the particular value, and so forth.

In some implementations, a photonic integrated circuit includes different types of copying modules, e.g., a first copying module that performs an optical copying operation to split the computation over two paths, a second copying module that performs an optical copying operation to split the computation over three paths, a third copying module that performs an optical copying operation to split the computation over four paths, and a fourth copying module that performs an optical copying operation to split the computation over eight paths. Signals derived from the outputs of the first, second, third, and fourth copying modules are scaled before they are combined.

For example, suppose vout1 is a value of a vector resulting from a vector-matrix multiplication using a 2×2-element matrix, in which a 1-to-2 splitter is used in the optical copying operation, and vout2 is a value of a vector resulting from a vector-matrix multiplication using a 4×4-element matrix, in which a 1-to-4 splitter is used in the optical copying operation. If the photonic integrated circuit is configured such that vout1 is combined with vout2, then vout2 is scaled to twice its value before being combined with vout1.

The system configuration 1900 can be implemented using any of a variety of optoelectronic technologies. In some implementations, there is a common substrate (e.g., a semiconductor such as silicon), which can support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. In FIGS. 20 to 22 and 25 to 38, unless otherwise indicated, the thicknesses of the lines representing paths are used to differentiate between optical paths, represented by thicker lines, and electrical paths, represented by thinner lines or dashed lines. Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can provide communication channels to send optical signals among multiple devices used to implement the overall system. Those optical signals can represent different subsets of an input vector that is provided when performing vector-matrix multiplication, and/or different subsets of intermediate results that are computed when performing vector-matrix multiplication, as described in more detail below.

In this document, a figure can show an optical waveguide crossing an electrical signal line, it is understood that the optical waveguide does not intersect the electrical signal line. The electrical signal line and the optical waveguide can be disposed at different layers of the device.

Figure 21:
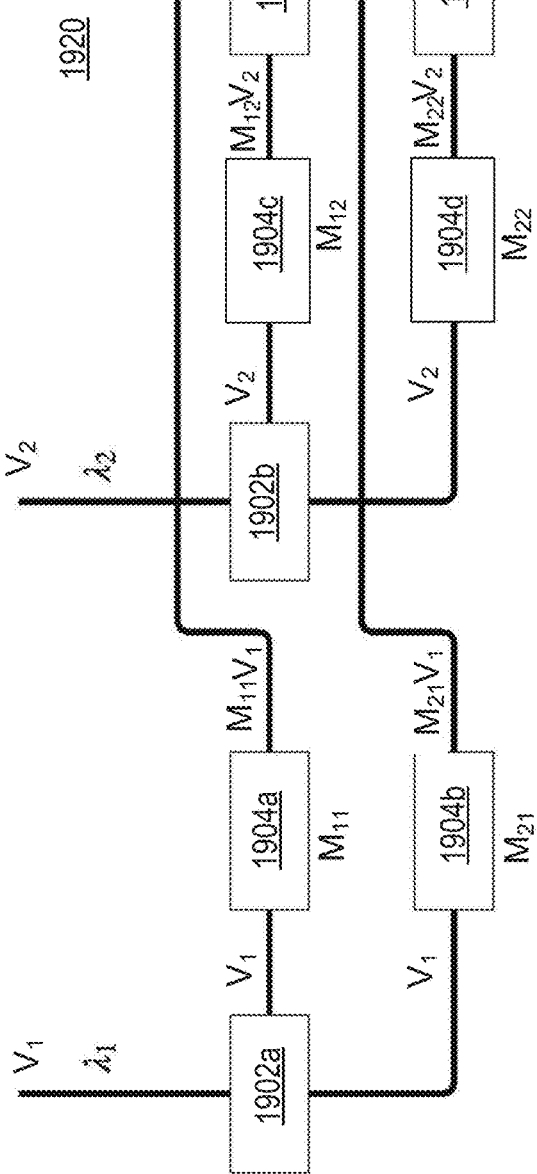

FIG. 21 shows an example of a system configuration 1920 for an implementation of the system for performing vector-matrix multiplication using a 2×2-element matrix, with the summation operation performed in the optoelectronic domain. In this example, the different input vector elements are encoded on optical signals using two different respective wavelengths $\lambda_1$ and $\lambda_2$. The optical output signals of the multiplication modules 1904a and 1904c are combined in the optical combiner module 1910a, and the optical output signals of the multiplication modules 1904b and 1904d are combined in the optical combiner module 1910b. An optical waveguide 1914a guides optical signals on both wavelengths $\lambda_1$ and $\lambda_2$ from the optical combiner module 1910a to an optoelectronic summation module 1912a. Similarly, an optical waveguide 1914b guides optical signals on both wavelengths $\lambda_1$ and $\lambda_2$ from the optical combiner module 1910b to an optoelectronic summation module 1912b. The optoelectronic summation modules 1912a and 1912b can be implemented using photodetectors, as used for the optical detection modules 1906 in the example of FIG. 20. In this example, the summation is represented by the photocurrent representing the power in both wavelengths instead of by the current leaving a junction between different conductors.

In this document, when a figure shows two optical waveguides crossing each other, whether the two optical waveguides are actually optically coupled to each other will be clear from the description. For example, two waveguides that appear to cross each other from a top view of the device can be implemented in different layers and thus not intersect with each other. For example, in FIG. 21, the optical path that provides the optical signal $\lambda_2$ as input to the copying module 1902b and the optical path that provides the optical signal $M_{11}V_1$ from the multiplication module 1904a to the optical combiner module 1910a are not optically coupled to each other, even though in the figure they can appear to cross each other. Similarly, the optical path that provides the optical signal $\lambda_2$ from the copying module 1902b to the multiplication module 1904d and the optical path that provides the optical signal $M_{21}V_1$ from the multiplication module 1904b to the optical combiner module 1910b are not optically coupled to each other, even though in the figure they can appear to cross each other.

The system configurations shown in FIGS. 20 and 21 can be extended to implement a system configuration for performing vector-matrix multiplication using an m×n-element matrix. In this example, the input vector is $$v = \begin{bmatrix} v_1 \\ \vdots \\ v_n \end{bmatrix},$$

and the matrix is $$\overline{M} = \begin{bmatrix} M_{11} & \cdots & M_{1n} \\ \vdots & \ddots & \vdots \\ M_{m1} & \cdots & M_{mn} \end{bmatrix}.$$

For example, the input vector elements $v_1$ to $v_n$ are provided by n waveguides, and each input vector element is processed by one or more copying modules to provide m copies of the input vector element to m respective paths. There are m×n multiplication modules that each multiply by a different matrix element using optical amplitude modulation to produce an electrical or optical signal representing $M_{ij} \cdot v_j$ (i=1 . . . m, j=1 . . . n). The signals representing $M_{ij} \cdot v_j$ (j=1 . . . n) are combined using an i-th summation module (i=1 . . . m) to produce the following results for the m paths, respectively.

$$M_{11}v_1 + M_{12}v_2 + \ldots + M_{1n}v_n$$
$$M_{21}v_1 + M_{22}v_2 + \ldots + M_{2n}v_n$$
$$\ldots$$
$$M_{m1}v_1 + M_{m2}v_2 + \ldots + M_{mn}v_n$$

Since optical amplitude modulation is able to reduce the power in an optical signal from its full value to a lower value, down to zero (or near zero) power, multiplication by any value between 0 and 1 can be implemented. However, some computations can call for multiplication by values greater than 1 and/or multiplication by signed (positive or negative) values. First, for extending the range to 0 to $M_{max}$ (where $M_{max} > 1$), the original modulation of the optical signals can include an explicit or implicit scaling of an original vector element amplitude by $M_{max}$ (or equivalently, scaling the value mapped to a particular vector element amplitude in a linear mapping by $1/M_{max}$) such that the range 0 to 1 for matrix element amplitudes corresponds quantitatively in the computation to the range 0 to $M_{max}$. Second, for extending the positive range 0 to $M_{max}$ for matrix element values to a signed range $-M_{max}$ to $M_{max}$, a symmetric differential configuration can be used, as described in more detail below. Similarly, a symmetric differential configuration can also be used to extend a positive range for the values encoded on the various signals to a signed range of values.

Figure 22:
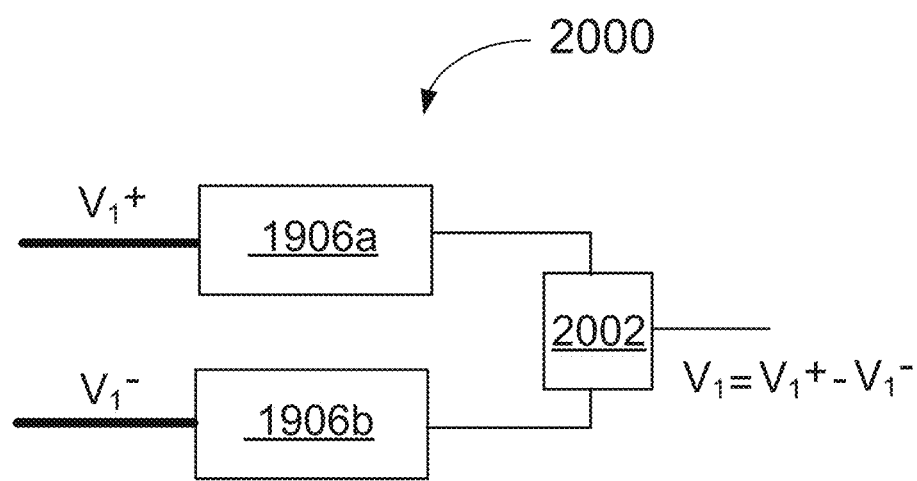
FIG. 22 is a schematic diagram of an example of a symmetric differential configuration.

FIG. 22 shows an example of a symmetric differential configuration 2000 for providing a signed range of values for values that are encoded on optical signals. In this example, there are two related optical signals encoding unsigned values designated as $V_1^+$ and $V_1^-$, in which each value is assumed to vary between 0 (e.g., corresponding to an optical power near zero) and $V_{max}$ (e.g., corresponding to an optical power at a maximum power level). The relationship between the two optical signals is such that when one optical signal is encoded with a "main" value $V_1^+$ the other optical signal is encoded with a corresponding "anti-symmetric" value $V_1^-$ such that as the main value $V_1^+$ encoded on one optical signal monotonically increases from 0 to $V_{max}$, the anti-symmetric $V_1^-$ value encoded on the paired optical signal monotonically decreases from $V_{max}$ to 0. Or, conversely, as the main value $V_1^+$ encoded on one optical signal monotonically decreases from $V_{max}$ to 0, the anti-symmetric value $V_1^-$ encoded on the paired optical signal monotonically increases from 0 to $V_{max}$. After the optical signals in the upper and lower paths are converted to electrical current signals by respective optical detection modules 1906a and 1906b, a difference between the current signals can be produced by a current subtraction module 2002. The difference between the current signals encoding $V_1^+$ and $V_1^-$ results in a current that is encoded with a signed value $V_1$ given as:

$$V_1 = V_1^+ - V_1^-$$

where the signed value $V_1$ monotonically increases between $-V_{max}$ and $V_{max}$ as the unsigned main value $V_1^+$ monotonically increases from 0 to $V_{max}$ and its paired anti-symmetric value $V_1^-$ monotonically decreases from $V_{max}$ to 0. There are various techniques that can be used for implementing the symmetric differential configuration of FIG. 22, as shown in FIGS. 23 and 24.

Figure 23:
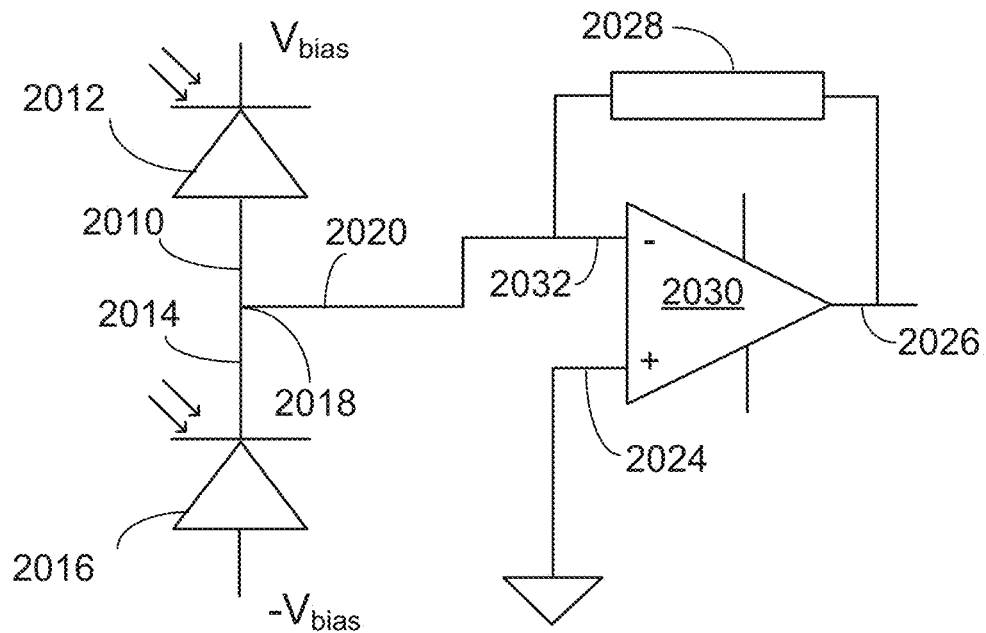
FIGS. 23 and 24 are circuit diagrams of examples of system modules.

In FIG. 23, the optical signals are detected in a common-terminal configuration where two photodiode detectors are connected to a common terminal 2032 (e.g., the inverting terminal) of an op-amp 2030. In this configuration, a current 2010 generated from a first photodiode detector 2012 and a current 2014 generated from a second photodiode detector 2016 combine at a junction 2018 among three conductors to produce a difference current 2020 between the current 2010 and the current 2014. The currents 2010 and 2014 are provided from opposite sides of the respective photodiodes, which are connected at the other ends to voltage sources (not shown) providing bias voltages at the same magnitude $V_{bias}$ but of opposite signs, as shown in FIG. 22. In this configuration the difference is generated due to the behavior of currents that meet at the common junction 2018. The difference current 2020 represents the signed value encoded on an electrical signal corresponding to the difference between the unsigned values encoded on detected optical signals. The op-amp 2030 can be configured in a transimpedance amplifier (TIA) configuration in which the other terminal 2024 is grounded and an output terminal 2026 is fed back to the common terminal 2032 using a resistive element 2028 that provides a voltage proportional to the difference current 2020. Such a TIA configuration provides the resulting value as an electrical signal in the form of a voltage signal.

In some embodiments of a detector that uses a TIA to convert a photocurrent to a voltage, techniques are used to mitigate the effects of the internal capacitance of the photodiodes used as the photodetectors 2012 and 2016. The internal capacitance $C_d$ of a photodiode can be modeled as a capacitor in parallel with an ideal photodiode. One consequence is that the capacitor acts as a short circuit when the current changes quickly, which could limit the bandwidth of the detector. Generally, the time constant $\tau$ associated with changes resulting from the input current 220 to the op-amp 2030 should be kept small to avoid a significant bandwidth limitation. Without mitigation, this time constant would be approximately equal to the capacitance $C_d$ multiplied by the input resistance $R_{in}$ of the op-amp 2030, which is approximately the feedback resistance $R_f$ due to the resistive element 2028 divided by the op-amp gain A, yielding: $\tau = C_d R_f / A$. The effect could be particularly detrimental in a system that has a large number of photodiodes in parallel with each other as in some of the systems described herein, since capacitances in parallel with each other add to a large effective capacitance. But, achieving a large op-amp gain A to reduce this time constant takes a significant amount of power in a system that uses a large number of such TIA circuits. To mitigate the bandwidth limitations without requiring as much power, a voltage follower circuit (also called a unity-gain amplifier or a buffer amplifier) can be placed in parallel with each photodiode by connecting a given voltage follower to the input and output terminals of a given photodiode. The voltage follower provides current as needed to maintain an approximately equal voltage at its input and output terminals, which has the effect of preventing the internal capacitance of the photodiode from acting as a short circuit when the current changes quickly, achieving a near-zero time constant τ. Use of the voltage followers enables the op-amp gain A in the TIA circuits to be relatively low (e.g., lower than 1000 or lower than 100), reducing the power requirements of the system.

Figure 24:
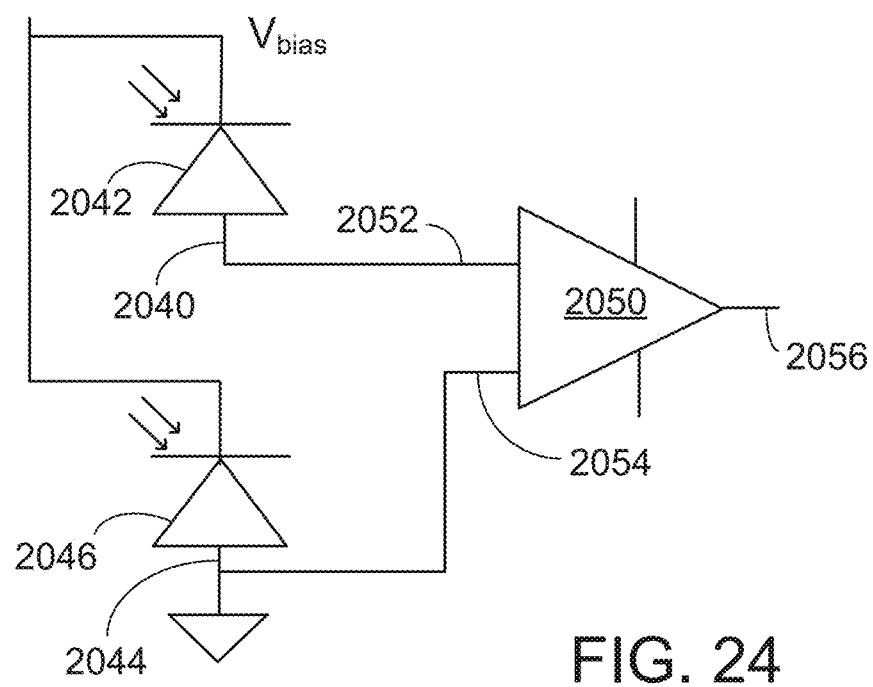

In FIG. 24, the optical signals are detected in a differential-terminal configuration where two photodiode detectors are connected to different terminals of an op-amp 2050. In this configuration, a current 2040 generated from a first photodiode detector 2042 is connected to an inverting terminal 2052, and a current 2044 generated from a second photodiode detector 2046 is connected to a non-inverting terminal 2054. The currents 2040 and 2044 are provided from the same ends of the respective photodiodes, which are connected at the other ends to a voltage source (not shown) providing a bias voltage at the same magnitude $v_{bias}$ and same sign, as shown in FIG. 24. The output terminal 2056 of the op-amp 2050 in this configuration provides a current proportional to the difference between the current 2040 and the current 2044. In this configuration, the difference is generated due to the behavior of the circuitry of the op-amp 2050. The difference current flowing from the output terminal 2056 represents the signed value encoded on an electrical signal corresponding to the difference between the unsigned values encoded on the detected optical signals.

Figure 25:
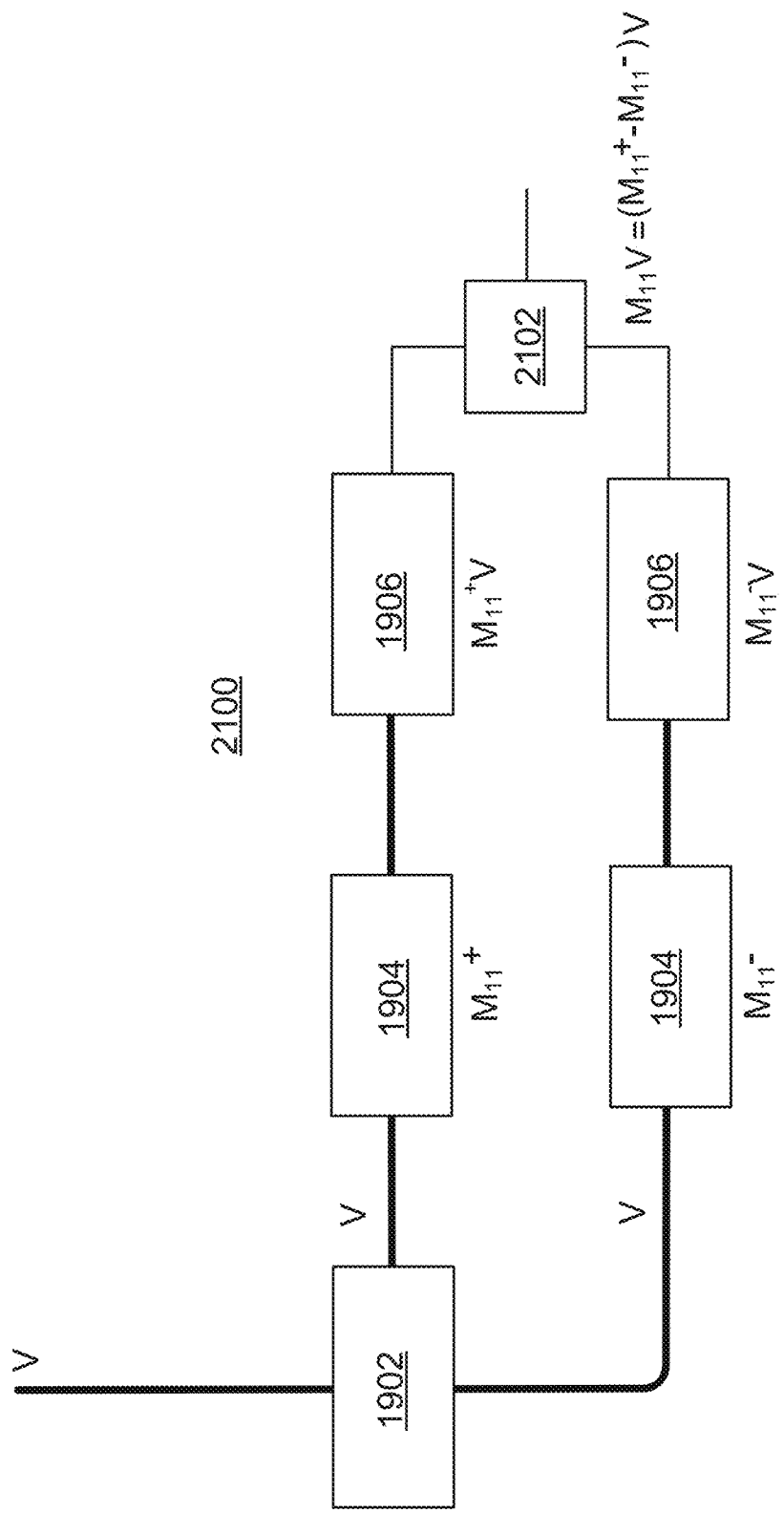
FIG. 25 is a schematic diagram of an example of a symmetric differential configuration.

FIG. 25 shows an example of a symmetric differential configuration 2100 for providing a signed range of values for values that are encoded as modulation levels of optical amplitude modulators implementing the multiplication modules 1904. In this example, there are two related modulators configured to modulate by unsigned values designated as $M_{11}^+$ and $M_{11}^-$, where each value is assumed to vary between 0 (e.g., corresponding to an optical power modulated to be reduced to near zero) and $M_{max}$ (e.g., corresponding to an optical power preserved near a maximum power level). The relationship between the two modulation levels is such that when one modulation level is configured at a "main" value $M_{11}^+$ the other modulation level is configured at a corresponding "anti-symmetric" value $M_{11}^-$ such that as the main value $M_{11}^+$ of one modulator monotonically increases from 0 to $M_{max}$, the anti-symmetric value $M_{11}^-$ of the other modulator monotonically decreases from $M_{max}$ to 0. Or, conversely, as the main value $M_{11}^+$ of one modulator monotonically decreases from $M_{max}$ to 0, the anti-symmetric $M_{11}^-$ value of the other modulator monotonically increases from 0 to $M_{max}$. After an input optical signal encoding a value V has been copied by a copying module 1902, each of the modulators provides a modulated output optical signal to a corresponding optical detection module 1906. The multiplication module 1904 in the upper path includes a modulator that multiplies by $M_{11}^+$ and provides an optical signal encoded with the value $M_{11}^+V$. The multiplication module 1904 in the lower path includes a modulator that multiplies by $M_{11}^-$ and provides an optical signal encoded with the value $M_{11}^-V$. After the optical signals are converted to electrical current signals by the respective optical detection modules 1906, a difference between them can be produced by a current subtraction module 2102. The difference between the current signals encoding $M_{11}^+V$ and $M_{11}^-V$ results in a current that is encoded with V multiplied by a signed value $M_{11}$ given as:

$$M_{11}V = M_{11}^+V - M_{11}^-V$$

where the signed value $M_{11}$ monotonically increases between $-M_{max}$ and $M_{max}$ as the unsigned main value $M_{11}^+$ monotonically increases from 0 to $M_{max}$ and its paired anti-symmetric value $M_{11}^-$ monotonically decreases from $M_{max}$ to 0.

Figure 26:
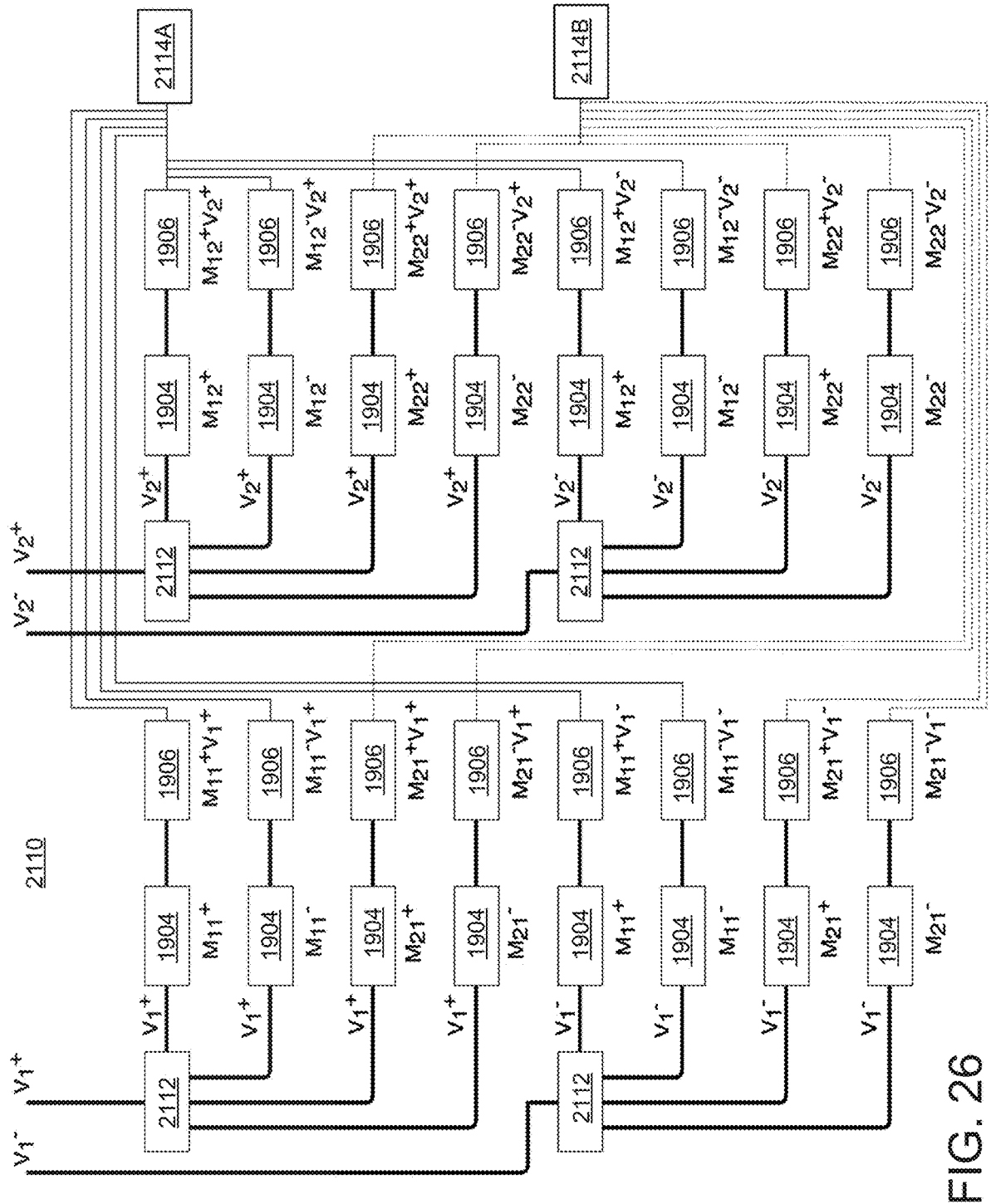
FIG. 26 is a schematic diagram of an example of a system configuration.

FIG. 26 shows an example of a system configuration 2110 for an implementation of the system 1800 for performing vector-matrix multiplication using a 2×2-element matrix, with the summation operation performed in the electrical domain, and with signed elements of an input vector and signed elements of the matrix. In this example, for each signed element of the input vector, there are two related optical signals encoding unsigned values. There are two unsigned values designated as $V_1^+$ and $V_1^-$ for the first signed input vector element value $V_1$, and there are two unsigned values designated as $V_2^+$ and $V_2^-$ for the second signed input vector element value $V_2$. Each unsigned value encoded on an optical signal is received by a copying module 2112 performing one or more optical copying operations that yields four copies of the optical signal over four respective optical paths. In some implementations of the copying module 2112, there are three different Y-shaped waveguide splitters that are each configured to split using a different power ratio (which can be achieved, for example, using any of a variety of photonic devices). For example, a first splitter could split using a 1:4 power ratio to divert 25% (¼) of the power to a first path, a second splitter could split using a 1:3 power ratio to divert 25% (¼=⅓×¾) of the power to a second path, and a third splitter could split using a 1:2 power ratio to divert 25% (¼=½×⅔×¾) of the power to a third path and the remaining 25% of the power to a fourth path. The individual splitters that are part of the copying module 2112 could be arranged in different parts of a substrate, for example, to appropriately distribute the different copies to different pathways within the system. In other implementations of the copying module 2112 there could be a different number of paths being split with different splitting ratios, as appropriate. For example, a first splitter could split using a 1:2 power ratio to provide two intermediate optical signals. Then, one of those intermediate optical signals could be split using a second splitter having a 1:2 power ratio to divert 25% of the power to each of a first path and a second path, and the other of those intermediate optical signals could be split using a third splitter having a 1:2 power ratio to divert 25% of the power to each of a third path and a fourth path.

The system configuration 2110 also includes other modules arranged as shown in FIG. 26 to provide two different output electrical signals that represent an output vector that is the result of the vector-matrix multiplication performed by system 100. There are 16 different multiplication modules 1904 modulating different copies of the optical signals representing the input vector, and there are 16 different optical detection modules 1906 to provide electrical signals representing intermediate results of the computation. There are also two different summation modules 2114A and 2114B that compute the overall summation for each of the output electrical signals. In the figure, the signal lines electrically coupling the optical detection modules 1906 to the summation module 2114B are shown in dashed lines. Because each overall summation can include some anti-symmetric terms that are being subtracted from paired main terms from any symmetric differential configurations for vector elements and/or matrix elements, the summation modules 2114A and 2114B can include a mechanism for some terms of the summation to be added after being inverted (equivalently, being subtracted from the non-inverted terms). For example, in some implementations the summation modules 2114A and 2114B include both inverting and non-inverting input ports such that the terms that are to be added within the overall summation can be connected to the non-inverting input port, and terms that are to be subtracted within the overall summation can be connected to the inverting input port. One example implementation of such a summation module is an op-amp where a non-inverting terminal is connected to wires conducting currents representing signals to be added, and an inverting terminal is connected to wires conducting currents representing signals to be subtracted. Alternatively, inverting input ports can be unnecessary on the summation modules if the inversion of the anti-symmetric terms is performed by other means. The summation modules 2114A and 2114B yield the following summation results, respectively, to complete the vector-matrix multiplication.

$$M_{11}V_1 + M_{12}V_2 = (M_{11}^+ - M_{11}^-)(V_1^+ - V_1^-) + (M_{12}^+ - M_{12}^-)(V_2^+ - V_2^-)$$

$$M_{21}V_1 + M_{22}V_2 = (M_{21}^+ - M_{21}^-)(V_1^+ - V_1^-) + (M_{22}^+ - M_{22}^-)(V_2^+ - V_2^-)$$

In this document, when a figure shows two electrical signal lines crossing each other, whether the two electrical signal lines are electrically coupled to each other will be clear from the description. For example, the signal line carrying the $M_{21}^+ V_1^+$ signal is not electrically coupled to the signal line carrying the $M_{11}^+ V_1^-$ signal or the signal line carrying the $M_{11}^- V_1^-$ signal.

The system configuration shown in FIG. 26 can be extended to implement a system configuration for performing vector-matrix multiplication using an m×n-element matrix, in which the input vector and the matrix include signed elements.

Figure 27:
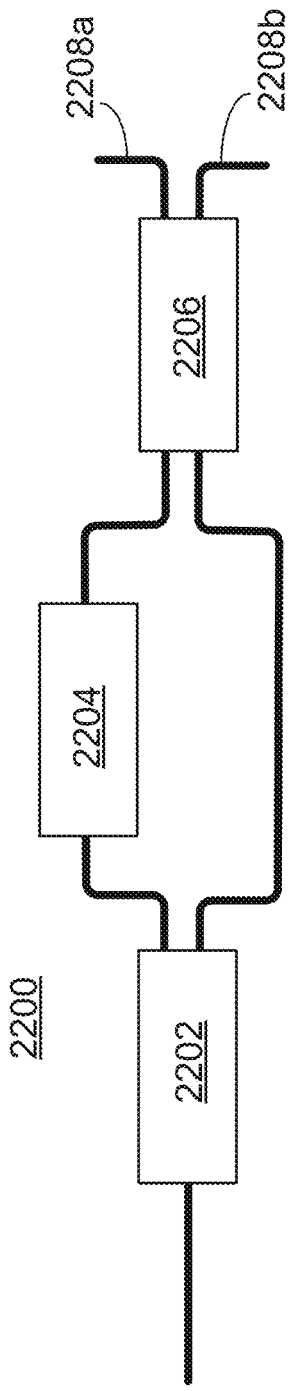
FIG. 27 is a schematic diagram of an example optical amplitude modulator.

There are various techniques that can be used for implementing the symmetric differential configuration of FIG. 26. Some of those techniques make use of 1×2 optical amplitude modulators for implementing the multiplication modules 1904, and/or for providing pairs of optical signals that are related as main and anti-symmetric pairs. FIG. 27 shows an example of a 1×2 optical amplitude modulator 2200. In this example, the 1×2 optical amplitude modulator 2200 includes an input optical splitter 2202 that splits an incoming optical signal to provide 50% of the power to a first path that includes a phase modulator 2204 (also called a phase shifter), and 50% of the power to a second path that does not include a phase modulator. The paths can be defined in different ways, depending on whether the optical amplitude modulator is implemented as a free-space interferometer or as a waveguide interferometer. For example, in a free-space interferometer, one path is defined by transmission of a wave through a beam splitter and the other path is defined by reflection of a wave from the beam splitter. In a waveguide interferometer, each path is defined by a different optical waveguide that has been coupled to an incoming waveguide (e.g., in a Y-shaped splitter). The phase modulator 2204 can be configured to impart a phase shift such that the total phase delay of the first path differs from the total phase delay of the second path by a configurable phase shift value (e.g., a value that can be set to phase shift somewhere between 0 degrees to 180 degrees).

The 1×2 optical amplitude modulator 2200 includes a 2×2 coupler 2206 that combines the optical waves from first and second input paths using optical interference or optical coupling in a particular manner to divert power into first and second output paths in different ratios, depending on the phase shift. For example, in a free-space interferometer, a phase shift of 0 degrees causes substantially all of the input power that was split between the two paths to constructively interfere to exit from one output path of a beam splitter implementing the coupler 2206, and a phase shift of 180 degrees causes substantially all of the input power that was split between the two paths constructively interfere to exit from the other output path of the beam splitter implementing the coupler 2206. In a waveguide interferometer, a phase shift of 0 degrees causes substantially all of the input power that was split between the two paths to couple to one output waveguide (e.g., 2208a) of the coupler 2206, and a phase shift of 180 degrees causes substantially all of the input power that was split between the two paths to couple to the other output waveguide (e.g., 2208b) of the coupler 2206. Phase shifts between 0 degrees and 180 degrees can then provide multiplication of the power in an optical wave (and the value encoded on the optical wave) by a value between 0 and 1 through partial constructive or destructive interference, or partial waveguide coupling. Multiplication by any value between 0 to 1 can then be mapped to multiplication by any value between 0 to $M_{max}$ as described above.

Figure 28:
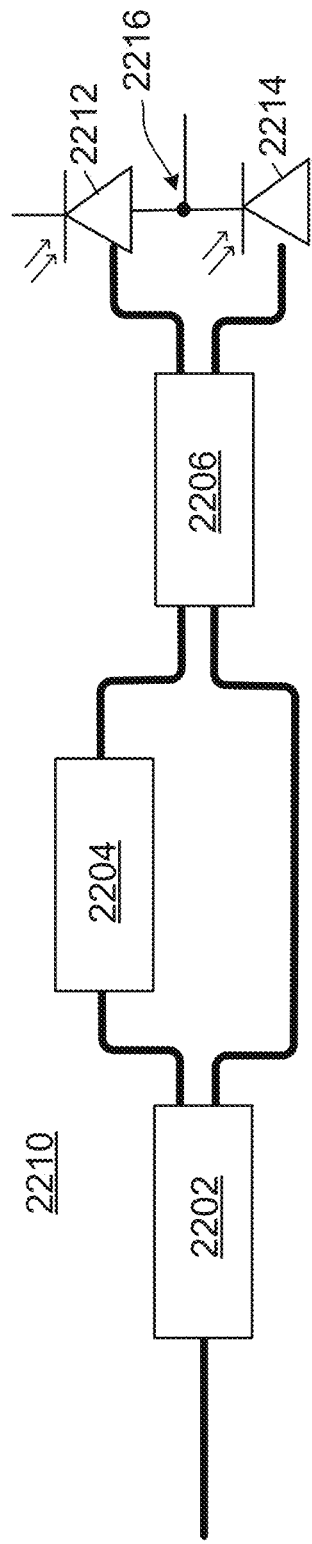
FIGS. 28-30 are schematic diagrams of examples of optical amplitude modulators with optical detection in a symmetric differential configuration.

Additionally, the relationship between the power in the two optical waves emitted from the modulator 2200 follows that of the main and anti-symmetric pairs described above. When the amplitude of the optical power of one signal increases, the amplitude of the optical power of the other signal decreases, so a difference between detected photocurrents can yield a signed vector element, or multiplication by a signed matrix element, as described herein. For example, the pair of related optical signals can be provided from the two output ports of the modulator 2200 such that a difference between amplitudes of the related optical signals corresponds to a result of multiplying an input value by a signed matrix element value. FIG. 28 shows a symmetric differential configuration 2210 of the 1×2 optical amplitude modulator 2200 arranged with the optical signals at the output to be detected in the common-terminal version of the symmetric differential configuration of FIG. 23. The current signals corresponding to the photocurrent generated by a pair of photodetectors 2212 and 2214 are combined at a junction 2216 to provide an output current signal whose amplitude corresponds to the difference between the amplitudes of the related optical signals. In other examples, such as in the symmetric differential configuration of FIG. 24, the photocurrents detected from the two optical signals at the output can be combined using different electrical circuitry.

Figure 29:
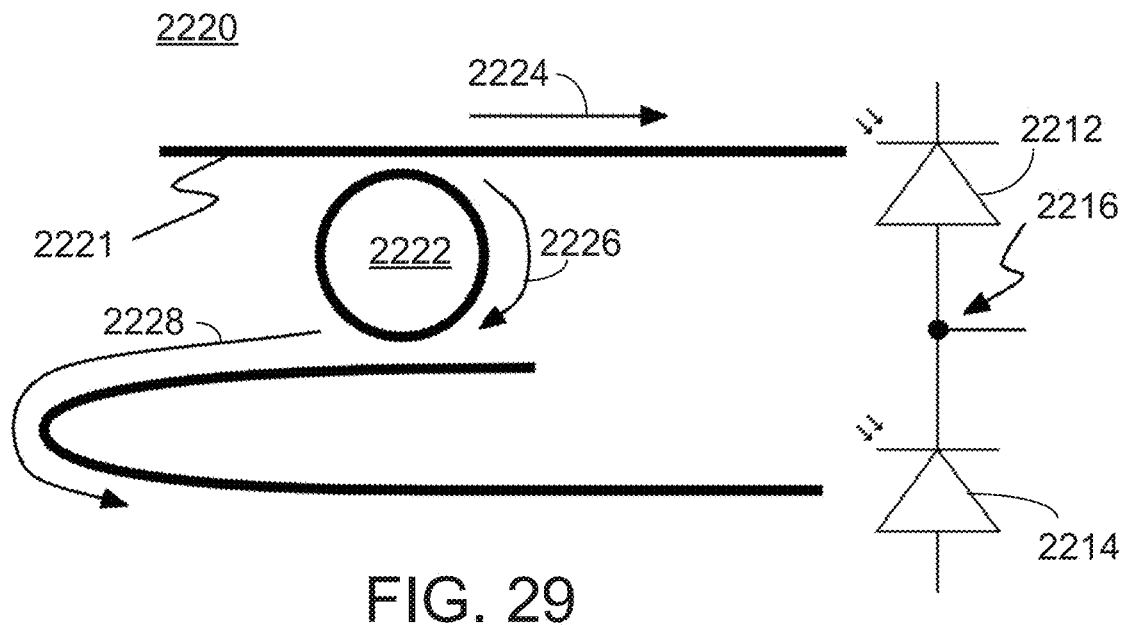

Other techniques can be used to construct 1×2 optical amplitude modulators for implementing the multiplication modules 1904, and/or for providing pairs of optical signals that are related as main and anti-symmetric pairs. FIG. 29 shows another example of a symmetric differential configuration 2220 of another type of 1×2 optical amplitude modulator. In this example, the 1×2 optical amplitude modulator includes a ring resonator 2222 that is configured to split the optical power of an optical signal at an input port 2221 to two output ports. The ring resonator 2222 (also called a "microring") can be fabricated, for example, by forming a circular waveguide on a substrate, where the circular waveguide is coupled to a straight waveguide corresponding to the input port 2221. When the wavelength of the optical signal is near a resonant wavelength associated with the ring resonator 2222, the optical wave that is coupled into the ring circulates around the ring on a clockwise path 2226 and destructively interferes at the coupling location such that a reduced-power optical wave exits over a path 2224 to a first output port. The circulating optical wave is also coupled out of the ring such that another optical wave exits over a path 2228 through a curved waveguide that guides an optical wave out of a second output port.

Since the time scale over which the optical power circulates around the ring resonator 2222 is small compared to the time scale of the amplitude modulation of the optical signals, an anti-symmetric power relationship is quickly established between the two output ports, such that the optical wave detected by the photodetector 2212 and the optical wave detected by the photodetector 2214 form main and anti-symmetric pairs. The resonance wavelength of the ring resonator 2222 can be tuned to monotonically decrease/increase the main/anti-symmetric signals to achieve a signed result, as described above. When the ring is completely off-resonance all of the power exits over the path 2224 out of the first output port, and when it is completely on-resonance, with certain other parameters (e.g., quality factor, and coupling coefficient) appropriately tuned, all of the power exits over the path 2228 out of the second output port. In particular, to achieve complete power transfer, the coupling coefficient characterizing the coupling efficiency between the waveguide and the ring resonator should be matched. In some embodiments, it is useful to have a relatively shallow tuning curve, which can be achieved by reducing the quality factor of the ring resonator 2222 (e.g., by increasing the loss) and correspondingly increasing the coupling coefficients into and out of the ring. A shallow tuning curve provides less sensitivity of the amplitude to the resonance wavelength. Techniques such as temperature control can also be used for tuning and/or stability of the resonance wavelength.

Figure 30:
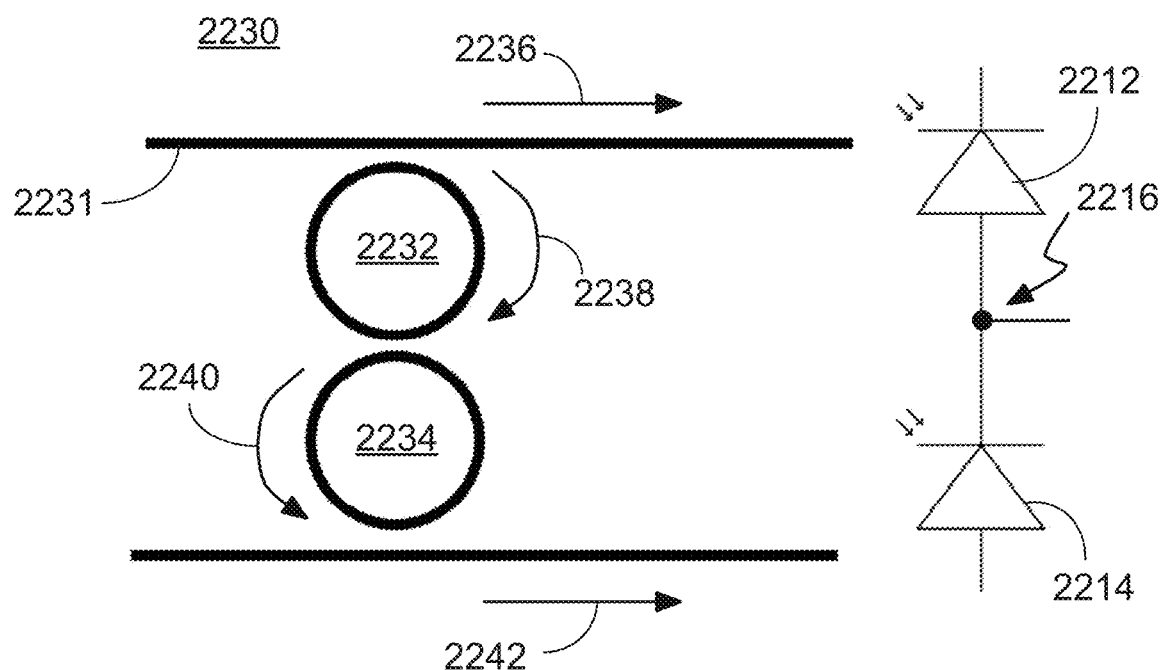

FIG. 30 shows another example of a symmetric differential configuration 2230 of another type of 1×2 optical amplitude modulator. In this example, the 1×2 optical amplitude modulator includes two ring resonators 2232 and 2234. The optical power of an optical signal at an input port 2231 is split to two ports. When the wavelength of the optical signal is near a resonant wavelength associated with both ring resonators 2232 and 2234, a reduced-power optical wave exits over a path 2236 to a first output port. A portion of the optical wave is also coupled into the ring resonator 2232 circulating around the ring on a clockwise path 2238, and is also coupled into the ring resonator 2234 circulating around the ring on a counter-clockwise path 2240. The circulating optical wave is then coupled out of the ring such that another optical wave exits over a path 2242 out of a second output port. The optical wave detected by the photodetector 2212 and the optical wave detected by the photodetector 2214 also form main and anti-symmetric pairs in this example.

Figure 31:
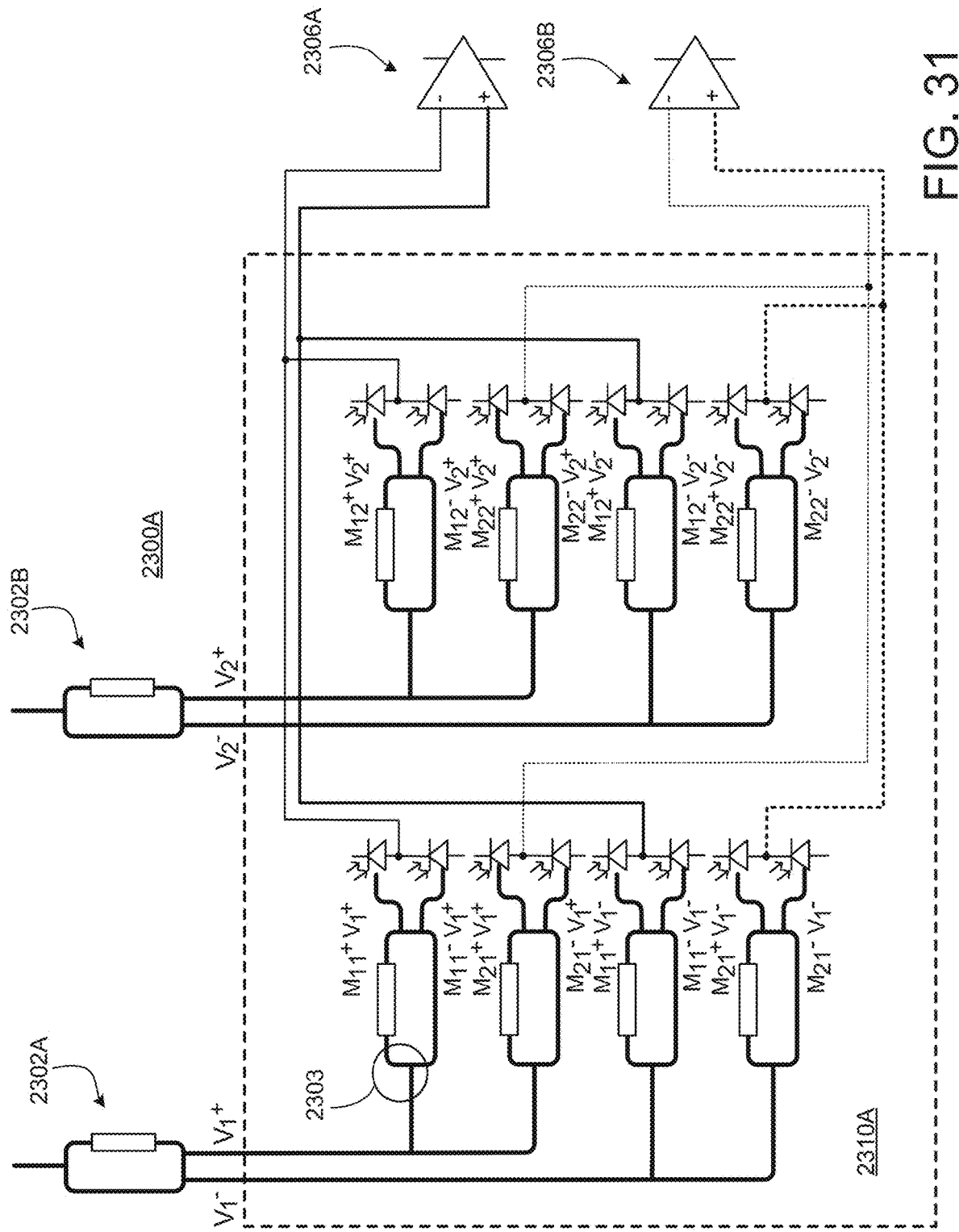
FIGS. 31-33 are optoelectronic circuit diagrams of example system configurations.
Figure 32:
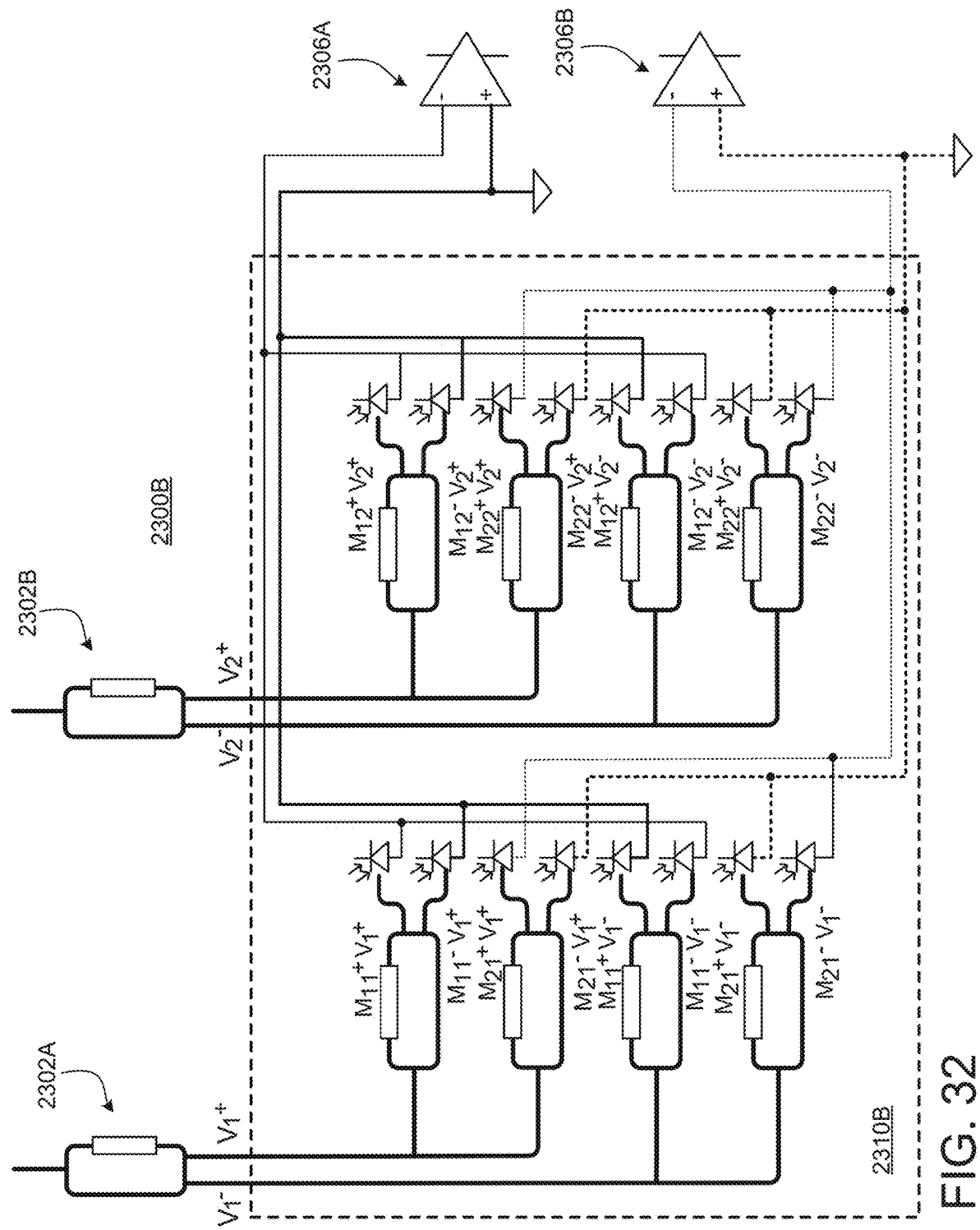

FIGS. 31 and 32 show different examples of the use of optical amplitude modulators such as the 1×2 optical amplitude modulator 2200 for an implementation of the system 1800 for performing vector-matrix multiplication for a 2×2-element matrix. FIG. 31 shows an example of an optoelectronic system configuration 2300A that includes optical amplitude modulators 2302A and 2302B providing values representing the signed vector elements of the input vector. The modulator 2302A provides a pair of optical signals that encode a pair of values $V_1^+$ and $V_1^-$ for a first signed vector element, and the modulator 2302B provides a pair of optical signals that encode a pair of values $V_2^+$ and $V_2^-$ for a second signed vector element. A vector-matrix multiplier (VMM) subsystem 2310A receives the input optical signals, performs the splitting operations, multiplication operations, and some of the summation operations as described above, and provides output current signals to be processed by additional circuitry. In some examples, the output current signals represent partial sums that are further processed to produce the ultimate sums that result in the signed vector elements of the output vector. In this example, some of the final summation operations are performed as a subtraction between different partial sums represented by the current signals at inverting and non-inverting terminals of op-amps 2306A and 2306B. The subtractions are used to provide the signed values, as described above (e.g., with reference to FIG. 26). This example also illustrates how some elements can be part of multiple modules. In particular, the optical copying performed by a waveguide splitter 2303 can be considered to be part of a copying module (e.g., one of the copying modules 2112 in FIG. 26) and part of a multiplication module (e.g., one of the multiplication modules 1904 in FIG. 26). The optical amplitude modulators that are used within the VMM subsystem 2310A are configured for detection in the common-terminal configuration shown in FIG. 23.

FIG. 32 shows an example of an optoelectronic system configuration 2300B similar to that of the optoelectronic system configuration 2300A shown in FIG. 31. But, the VMM subsystem 2310B includes optical modulators that are configured for detection in the differential-terminal configuration shown in FIG. 24. In this example, the output current signals of the VMM subsystem 2310B also represent partial sums that are further processed to produce the ultimate sums that result in the signed vector elements of the output vector. The final summation operations that are performed as a subtraction between different partial sums represented by the current signals at inverting and non-inverting terminals of op-amps 2306A and 2306B are different than in the example of FIG. 31. But, the final subtractions still result in providing the signed values, as described above (e.g., with reference to FIG. 26).

Figure 33:
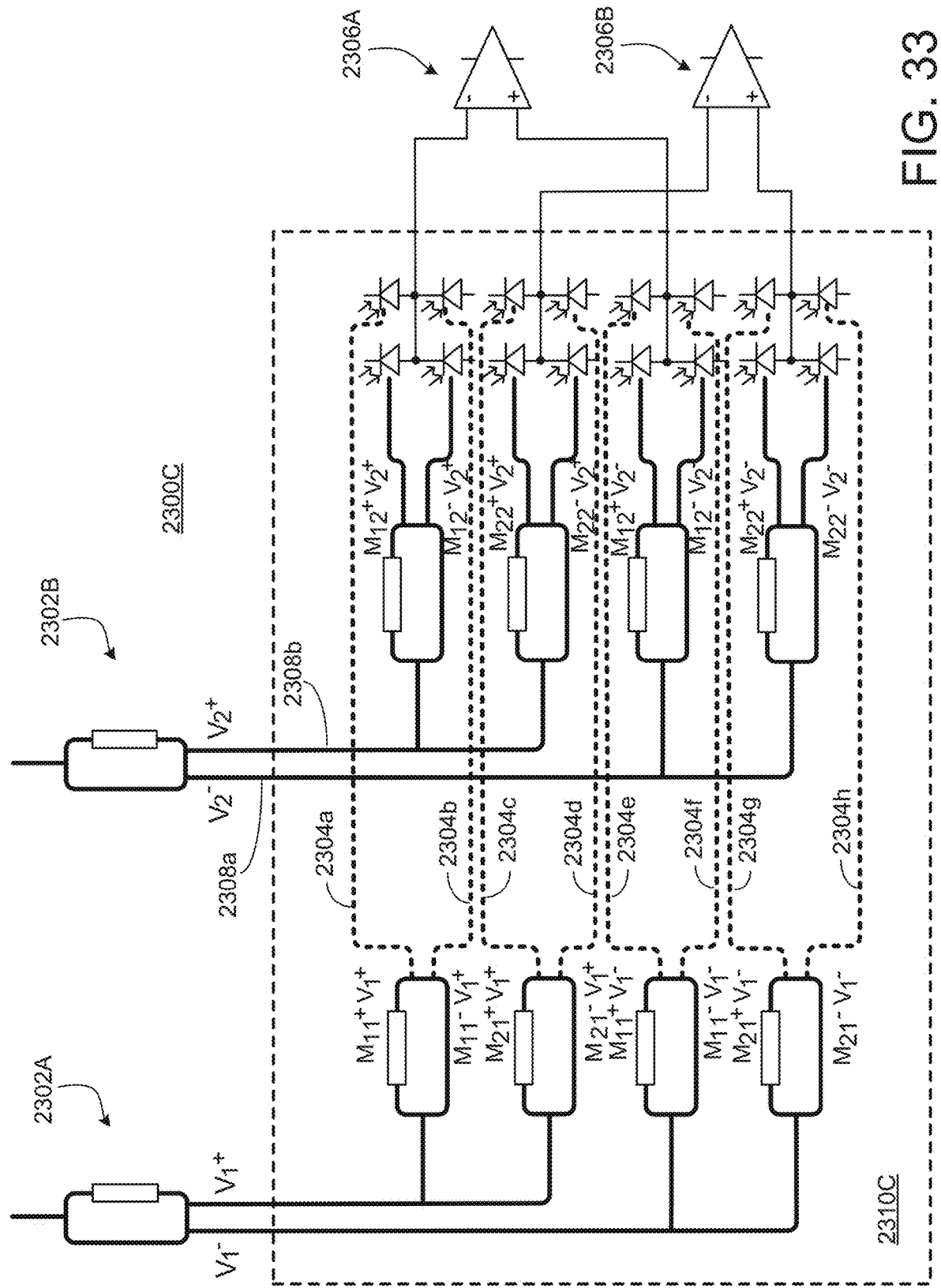

FIG. 33 shows an example of an optoelectronic system configuration 2300C that uses an alternative arrangement of a VVM subsystem 2310C with detection in the common-terminal configuration, as in the VVM subsystem 2310A shown in FIG. 31, but with optical signals carrying results of multiplication modules routed through the subsystem within waveguides (e.g., in a semiconductor substrate) to a portion of the substrate that includes detectors arranged to convert the optical signals to electrical signals. In FIG. 33, optical waveguides 2304a, 2304b, 2304c, 2304d, 2304e, 2304f, 2304g, and 2304h (collectively referenced as 2304) are shown in thick dashed lines. In some embodiments, this grouping of the detectors allows the electrical paths to be shortened, potentially reducing electrical cross-talk or other impairments due to the long electrical paths that would otherwise be used. In some implementations, the optical waveguides can be routed within one layer of the substrate, or routed within multiple layers of the substrate to allow more flexibility in routing paths that cross in two dimensions of the substrate but don't cross in a third dimension (of depth in the substrate). A variety of other changes can be made in the system configuration, including changes in what components are included in a VMM subsystem. For example, the optical amplitude modulators 2302A and 2302B can be included as part of the VMM subsystem. Alternatively, the VMM subsystem can include optical input ports for receiving paired main and anti-symmetric optical signals generated by modules other than optical amplitude modulators, or for interfacing with other kinds of subsystems.

Figure 34:
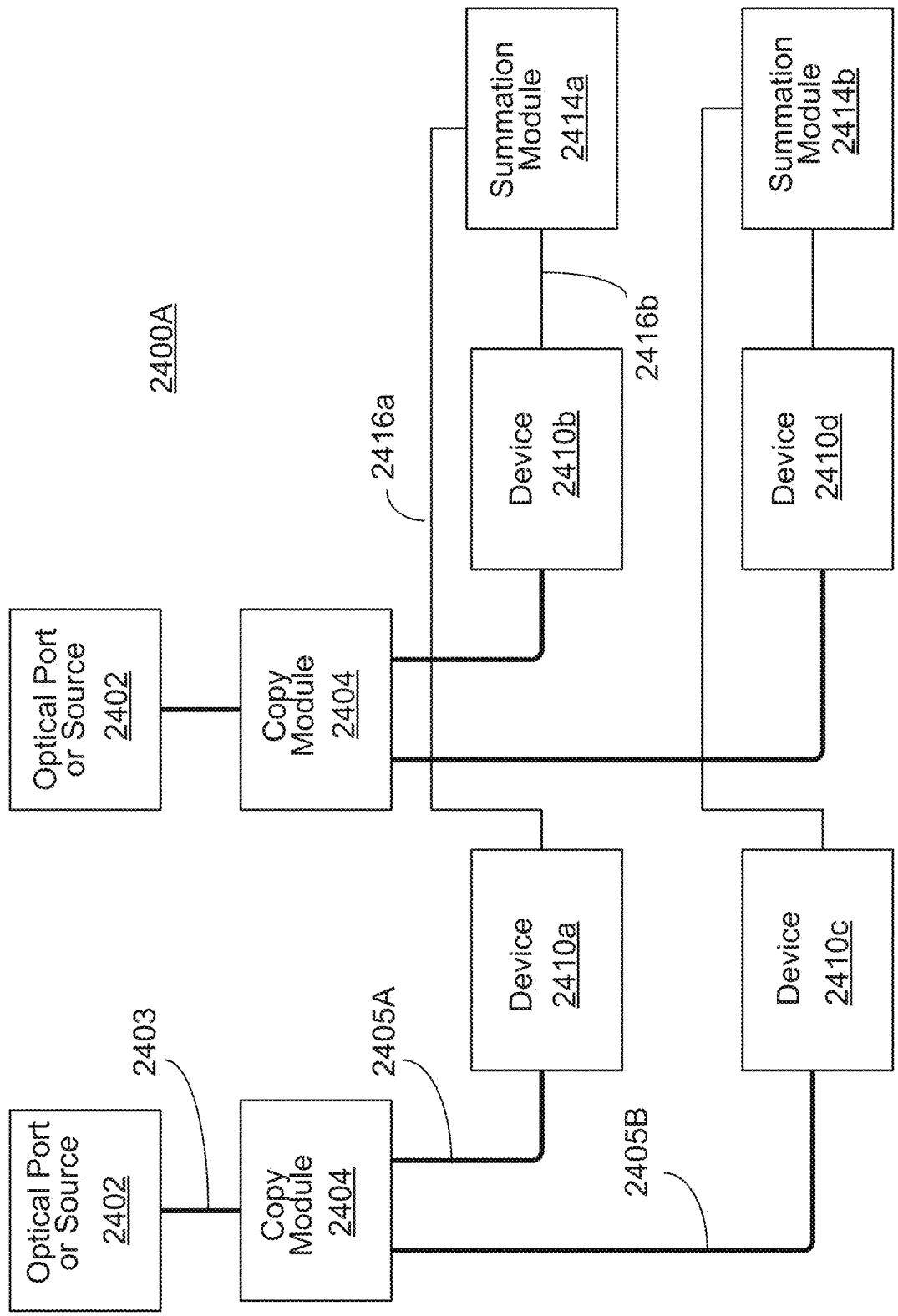
FIGS. 34-38 are schematic diagrams of example computing systems using multiple optoelectronic subsystems.

FIG. 34 shows an example of a system configuration 2400A for an implementation of the system 1800 in which there are multiple devices 2410 that host different ones of the multiplication modules (e.g., the multiplication modules 1806A, 1806B, 1806C, and 1806D), which are each configured as a VMM subsystem to perform vector-matrix multiplication on a different subset of vector elements by a different submatrix of a larger matrix. For example, each multiplication module can be configured similar to the system configuration 2110 (FIG. 26), but instead of implementing a VMM subsystem using a 2×2-element matrix, each multiplication module can be configured to implement a VMM subsystem using a matrix that has as large a size as can be efficiently fabricated on a single device having a common substrate for the modules within that device. For example, each multiplication module can implement a VMM subsystem using a 64×64-element matrix.

The different VMM subsystems are arranged so that the results of each submatrix are appropriately combined to yield results for the larger combined matrix (e.g., elements of a 128-element vector resulting from multiplication by a 128×128-element matrix). Each set of optical ports or sources 2402 provides a set of optical signals that represent different subsets of vector elements of a larger input vector. Copy modules 2404 are configured to copy all of the optical signals within a received set of optical signals encoded on optical waves guided in a set 2403 of 64 optical waveguides, and provide that set of optical signals to each of two different sets of optical waveguides, which in this example are a set 2405A of 64 optical waveguides and a set 2405B of 64 optical waveguides. This copying operation can be performed, for example, by using an array of waveguide splitters, each splitter in the array copying one of the elements of the subset of input vector elements (e.g., a subset of 64 elements for each copy module 2404) by splitting an optical wave in the set 2403 of optical waveguides into a first corresponding optical wave in the set 2405A of optical waveguides and a second corresponding optical wave in the set 2405B of optical waveguides.

If multiple wavelengths are used in some embodiments (e.g., W wavelengths), the number of separate waveguides (and thus the number of separate ports or sources in 2402) can be reduced, for example, by a factor of 1/W. Each VMM subsystem device 2410 performs vector-matrix multiplication, providing its partial results as a set of electrical signals (for a subset of elements of the output vector), with corresponding partial result pairs from different devices 2410 being added together by the summation modules 2414 as shown in FIG. 34, using any of the techniques described herein, such as current summation at a junction among conductors. In this example, the output of the device 2410a is transmitted to the summation module 2414a through an electric wire 2416a, and the output of the device 2410b is transmitted to the summation module 2414a through an electric wire 2416b.

In some implementations, vector-matrix multiplications using a desired matrix can be performed, recursively, by combining results from smaller submatrices, for any number of levels of recursion, ending by using the single element optical amplitude modulator at the root level of the recursion. At different levels of recursion the VMM subsystem device can be more compact (e.g., different data centers connected by long distance optical fiber networks at one level, different multi-chip devices connected by optical fibers within a data center at another level, different chips within a device connected by optical fibers at another level, and different sections of modules on the same chip connected by on-chip waveguides at another level).

Figure 35:
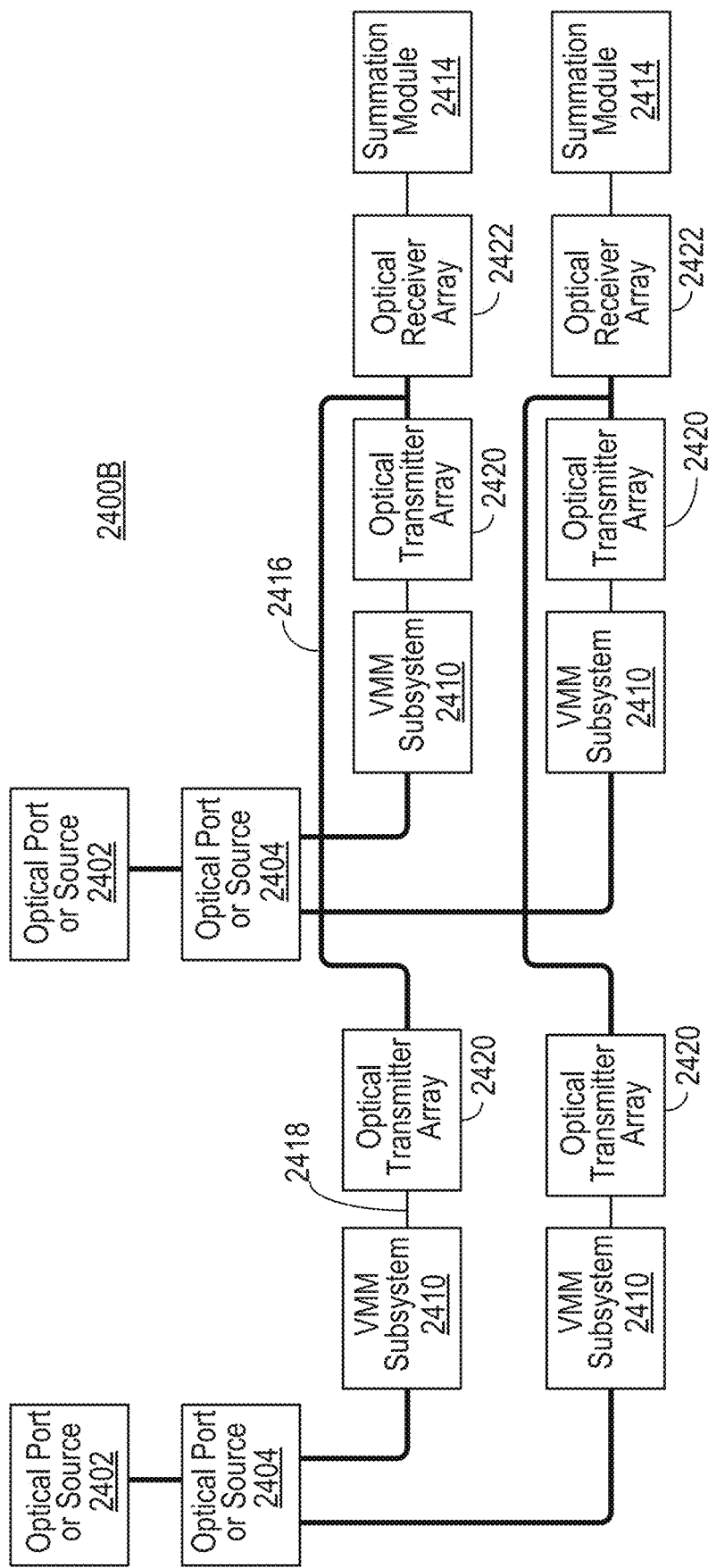

FIG. 35 shows another example of a system configuration 2400B in which additional devices are used for optical transmission and reception for each VMM subsystem 2410. In some implementations, different vector-matrix multiplier subsystems 2410 are hosted by separate devices and/or distributed in separate, remote locations. In this example, at the output 2418 of each VMM subsystem 2410 (the output 2418 providing electric signals), an optical transmitter array 2420 is used to convert the electric signals to optical signals, and couple each optical signal to a channel within an optical transmission line, e.g., an optical fiber in a fiber bundle 2416 between VMM subsystems 2410 that can be hosted by separate devices and/or distributed in remote locations. The optical transmitter array 2420 can include, e.g., an array of laser diodes that convert the electric signals at the output of the vector-matrix multiplier subsystem 2410 into optical signals. In some implementations, different vector-matrix multiplier subsystems 2410 are at different regions on an integrated device, such as a system-on-a-chip, that hosts the vector-matrix multiplier subsystems 2410 on a common substrate. In this example, at the output 2418 of each vector-matrix multiplier subsystem 2410, an optical transmitter array 2420 is used to convert the electric signals at the output 2418 to optical signals, and couple each optical signal to a channel within a waveguide in a set of waveguides 2416 between the different regions on the integrated device. An optical receiver array 2422 is used for each subset of output vector elements to convert the optical signals to electrical signals before corresponding pairs of partial results are summed by the summation modules 2414.

Figure 36:
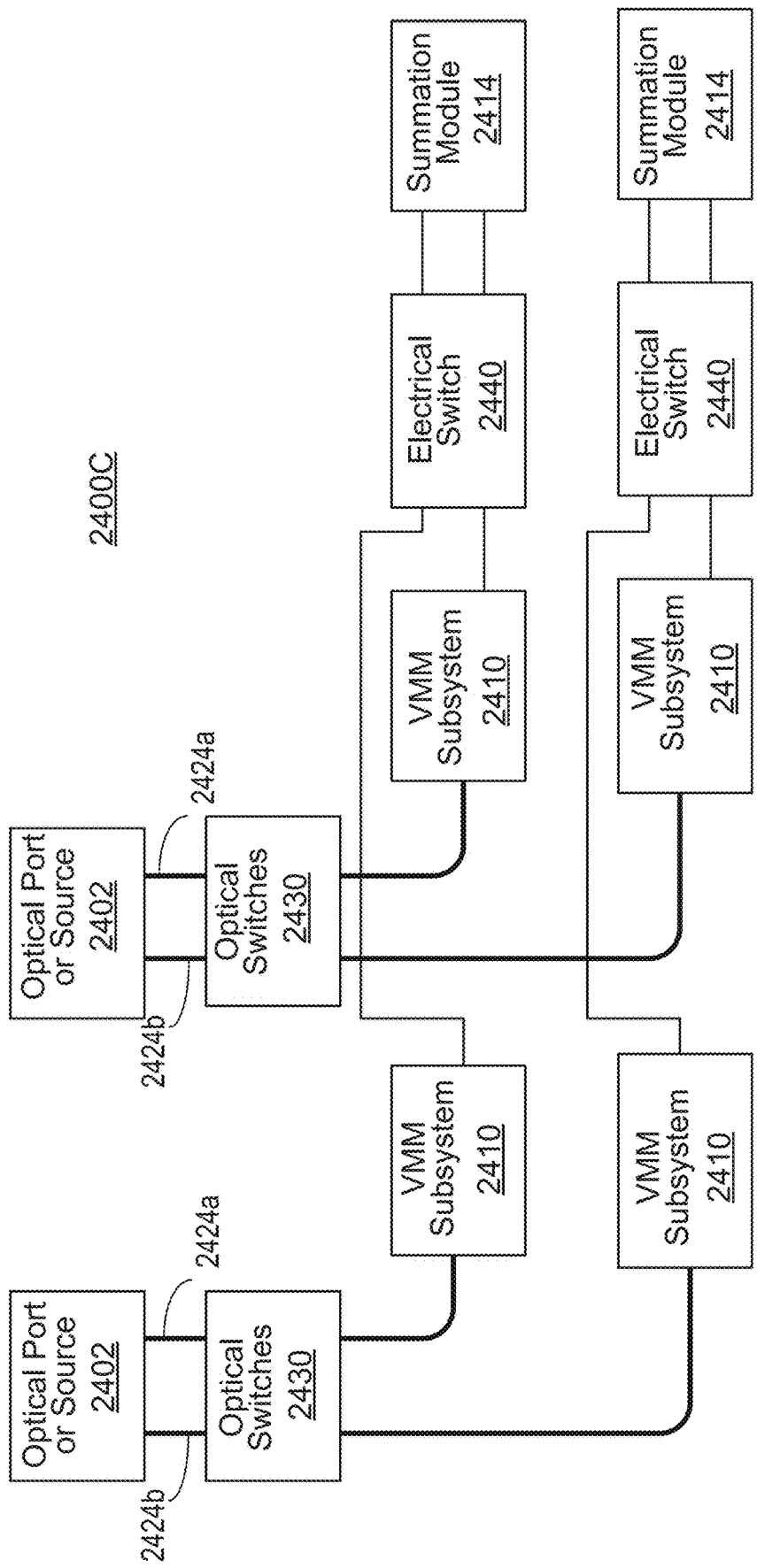

FIG. 36 shows another example of a system configuration 2400C in which the VMM subsystems 2410 can be reconfigured to enable the different vector-matrix multiplications for different submatrices to be rearranged in different ways. For example, the shape of the larger matrix that is formed by combining different submatrices can be configurable. The user can dynamically configure how the different submatrices are combined based on the requirements of the computations. This provides more flexibility in the operation of the optical processor. In this example, two different subsets of optical signals 2424a and 2424b are provided from each set of optical ports or sources 2402 to optical switches 2430. There are also electrical switches 2440 that are able to rearrange subsets of electrical signals representing partial results to be summed by the summation modules 2414 to provide an output vector, or separate output vectors, for a desired computation. For example, instead of vector-matrix multiplication using a matrix of size 2m×2n composed of four submatrices of size m×n, the VMM subsystems 2410 can be rearranged to use a matrix of size 2m×n or a matrix of size m×2n.

Figure 37:
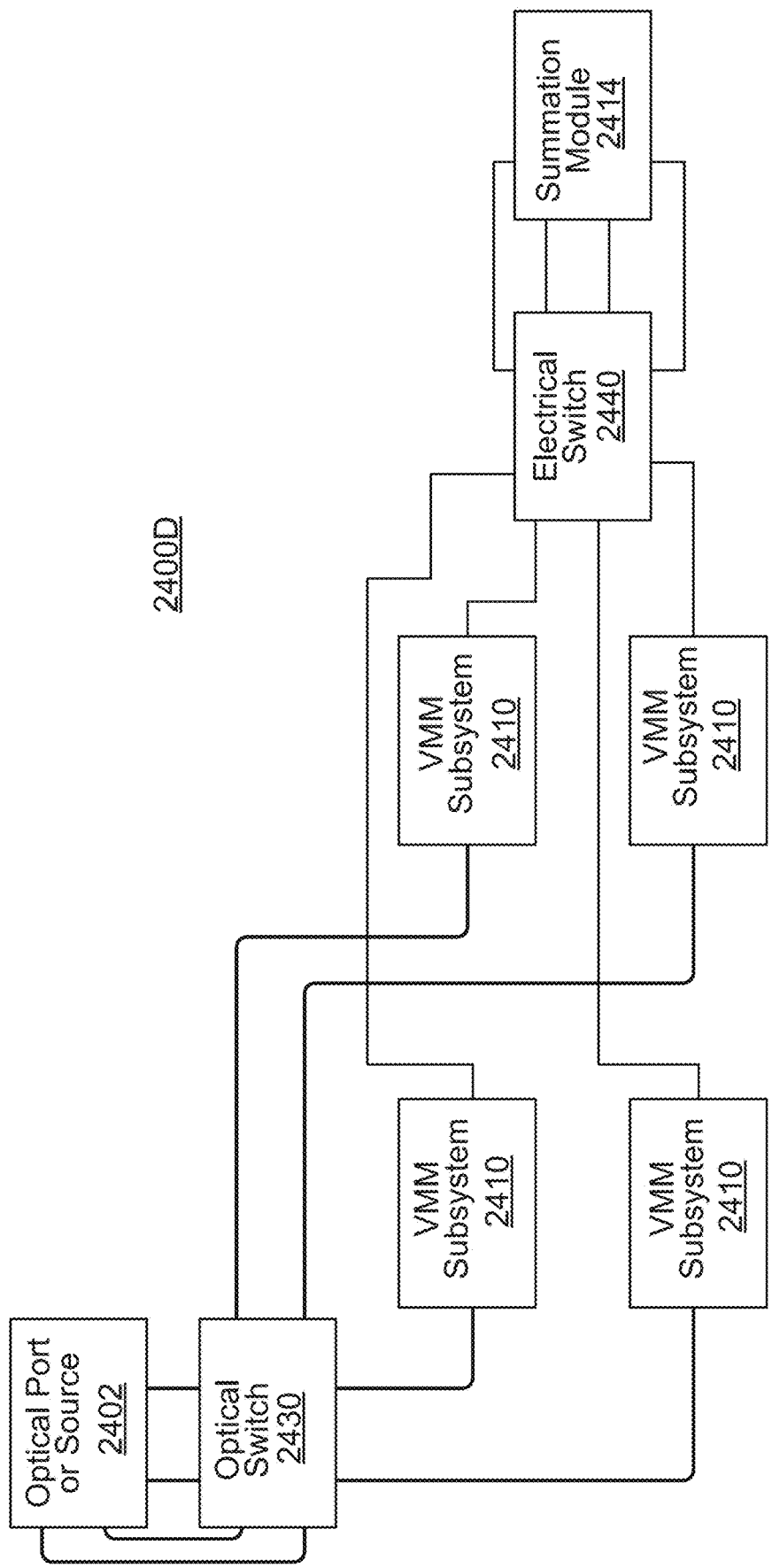

FIG. 37 shows another example of a system configuration 2400D in which the VMM subsystems 2410 can be reconfigured in additional ways. The optical switches 2430 can receive up to four separate sets of optical signals, and can be configured to provide different sets of optical signals to different VMM subsystems 2410, or to copy any of the sets of optical signals to multiple VMM subsystems 2410. Also, the electrical switches 2440 can be configured to provide any combination of the sets of electrical signals received to the summation modules 2414. This greater reconfigurability enables a wider variety of different vector-matrix multiplication computations, including multiplication using a matrix of size: m×3n, 3m×n, m×4n, 4m×n.

Figure 38:
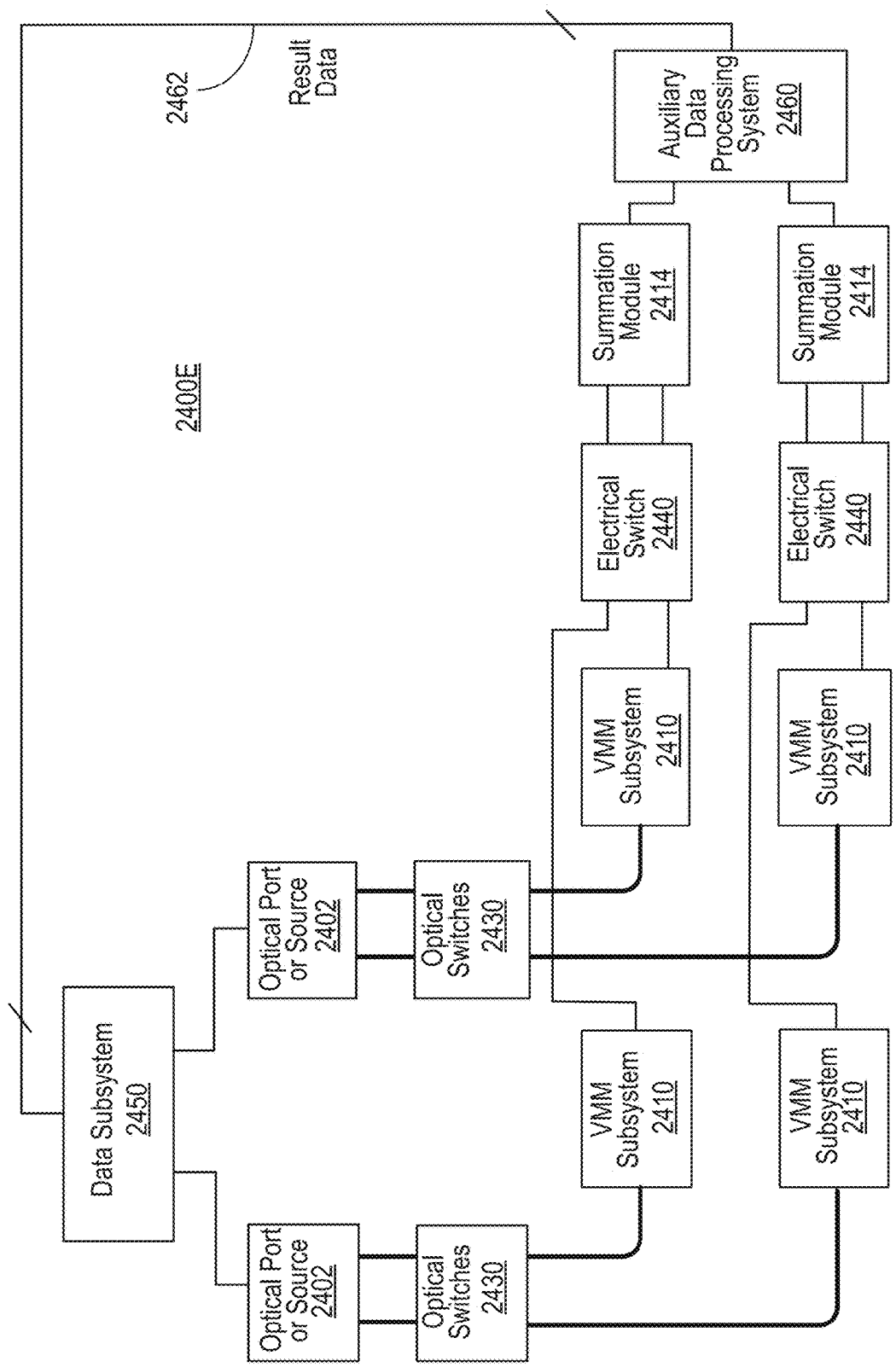

FIG. 38 shows another example of a system configuration 2400E that includes additional circuitry that can perform various operations (e.g., digital logic operations), to enable the system configuration 2400E to be used (e.g., for a complete optoelectronic computing system, or for an optoelectronic subsystem of a larger computing platform) for implementing computational techniques such as artificial neural networks or other forms of machine learning. A data storage subsystem 2450 can include volatile storage media (e.g., SRAM, and/or DRAM) and/or non-volatile storage media (e.g., solid state drives, and/or hard drives). The data storage subsystem 2450 can also include hierarchical cache modules. The data that is stored can include, for example, training data, intermediate result data, or production data used to feed online computational systems. The data storage subsystem 2450 can be configured to provide concurrent access to input data for modulation onto different optical signals provided by the optical ports or sources 2402. The conversion of data stored in digital form to an analog form that can be used for the modulation can be performed by circuitry (e.g., digital-to-analog converters) that is included at the output of the data storage subsystem 2450, or the input of the optical ports or sources 2402, or split between both. An auxiliary processing subsystem 2460 can be configured to perform auxiliary operations (e.g., nonlinear operations, data shuffling, etc.) on data that can be cycled through multiple iterations of vector-matrix multiplication using the VMM subsystems 2410. Result data 2462 from those auxiliary operations can be sent to the data storage subsystem 2450 in digital form. The data retrieved by the data storage subsystem 2450 can be used for modulating optical signals with appropriate input vectors, and for providing control signals (not shown) used to set modulation levels of optical amplitude modulators in the VMM subsystems 2410. The conversion of data encoded on electrical signals in analog form to a digital form can be performed by circuitry (e.g., analog-to-digital converters) within the auxiliary processing subsystem 2460.

In some implementations, a digital controller (not shown in the figure) is provided to control the operations of the data storage subsystem 2450, the hierarchical cache modules, various circuitry such as the digital-to-analog converters and analog-to-digital converters, the VMM subsystems 2410, and the optical sources 2402. For example, the digital controller is configured to execute program code to implement a neural network having several hidden layers. The digital controller iteratively performs matrix processing associated with various layers of the neural network. The digital controller performs a first iteration of matrix processing by retrieving first matrix data from the data storage subsystem 2450 and setting the modulation levels of the optical amplitude modulators in the VMM subsystems 2410 based on the retrieved data, in which the first matrix data represent coefficients of a first layer of the neural network. The digital controller retrieves a set of input data from the data storage subsystem and sets the modulation levels for the optical sources 2402 to produce a set of optical input signals that represent elements of a first input vector.

The VMM subsystems 2410 perform matrix processing based on the first input vector and the first matrix data, representing the processing of signals by the first layer of the neural network. After the auxiliary processing subsystem 2450 has produced a first set of result data 2462, the digital controller performs a second iteration of matrix processing by retrieving second matrix data from the data storage subsystem that represent coefficients of a second layer of the neutral network, and setting the modulation levels of the optical amplitude modulators in the VMM subsystems 2410 based on the second matrix data. The first set of result data 2462 is used as a second input vector to set the modulation levels for the optical sources 2402. The VMM subsystems 2410 perform matrix processing based on the second input vector and the second matrix data, representing the processing of signals by the second layer of the neural network, and so forth. At the last iteration, the output of the processing of signals by the last layer of the neural network is produced.

In some implementations, when performing computations associated with hidden layers of a neural network, the result data 2462 are not sent to the data storage subsystem 2450, but are used by the digital controller to directly control digital-to-analog converters that produce control signals for setting the modulation levels of the optical amplitude modulators in the VMM subsystems 2410. This reduces the time needed for storing data to and accessing data from the data storage subsystem 2450.

Other processing techniques can be incorporated into other examples of system configurations. For example, various techniques used with other kinds of vector-matrix multiplication subsystems (e.g., subsystems using optical interference without the electrical summation or signed multiplication described herein) can be incorporated into some system configurations, such as some of the techniques described in U.S. Patent Publication No. 2017/0351293, incorporated herein by reference.

Referring to FIG. 51, in some implementations, an artificial neural network (ANN) computation system 3200 includes a modulator array 3208 that uses a segmented modulator design, e.g., segmented MZI modulators such as those shown in FIGS. 8 to 16 and 47-50. For example, when the digital input vectors each has a length 4, the modulator array 3208 can be configured similar to the modulator array 5000 of FIG. 50. The ANN computation system 3200 includes an optoelectronic matrix multiplication unit 3220 that has, e.g., the copying modules, multiplication modules, and summation modules shown in FIGS. 19 to 37 to enable processing non-coherent or low-coherent optical signals in performing matrix computations. The artificial neural network computation system 3200 includes a controller 110, a memory unit 120, and an ADC unit 160, similar to those of the system 100 of FIG. 1. The artificial neural network computation system 3200 includes a modulator control unit 3202, which includes a first DAC subunit 3204 and a second DAC subunit 3206. The first DAC subunit 3204 includes high speed 1-bit DACs, in which each 1-bit DAC drives a phase shifter, e.g., 3956 of FIGS. 8, 10, 11, and 15, 3960, 3968, 3972 of FIG. 9, 4714 of FIGS. 47-49, or sub-modulators 5022, 5024, 5026, 5028 of FIG. 50. For example, each 1-bit DAC can generate 1-bit modulator control signals. The 1-bit DAC can directly receive a binary digital output from the controller 110 and condition the binary signal into a two-level voltage or current output suitable for driving a corresponding phase shifter in the modulator array 3208. The first DAC subunit 3204 can include charge pump driving circuits, such as those shown in FIGS. 3, 9, 15, and 48, for moving charges to or from the phase shifters. For example, the first DAC subunit 3204 can be configured to perform pre-emphasis and de-emphasis to enhance the bandwidth as described above. The controller 110 receives requests from a computer 102 and sends the computation outputs to the computer 102, similar to that shown in FIG. 1.

In some examples, the OMM unit 3220 includes MZIs without the segmented design, and the second DAC subunit 3206 can be similar to the second DAC subunit 134 of FIG.

1. This configuration is useful for performing ANN computations in which the OMNI unit 3220 is reconfigured at a rate that is slower than the reconfiguration rate of the modulator array 3208.

In some examples, the OMM unit 3220 includes MZIs having the segmented design, and the second DAC subunit 3206 can include 1-bit DACs similar to the first DAC subunit 3204. The second DAC subunit 3206 can also include the charge pump driving circuits and perform pre-emphasis and de-emphasis to enhance the bandwidth, similar to the first DAC subunit 3204.

An optoelectronic processor 3210 includes a light source 3230, which can be similar to the laser unit 142 of FIG. 1 in which the multiple output signals of the laser source 3230 are coherent. The light source 3230 can also use light emitting diodes to produce multiple output signals that are not coherent or have low coherency. The modulator array 3208 receives modulator control signals that are generated based on an input vector by the first DAC subunit 3204. The outputs of the modulator array 3208 are comparable to the outputs of the optical ports/sources 1802 in FIG. 19. The optoelectronic matrix multiplication unit 3220 processes the light signals from the modulator array 3208 in a manner similar to the way that the copy modules 1804, the multiplication modules 1806, and the summation modules 1808 process the optical signals from the optical ports/sources 1802 in FIG. 19.

Figure 52:
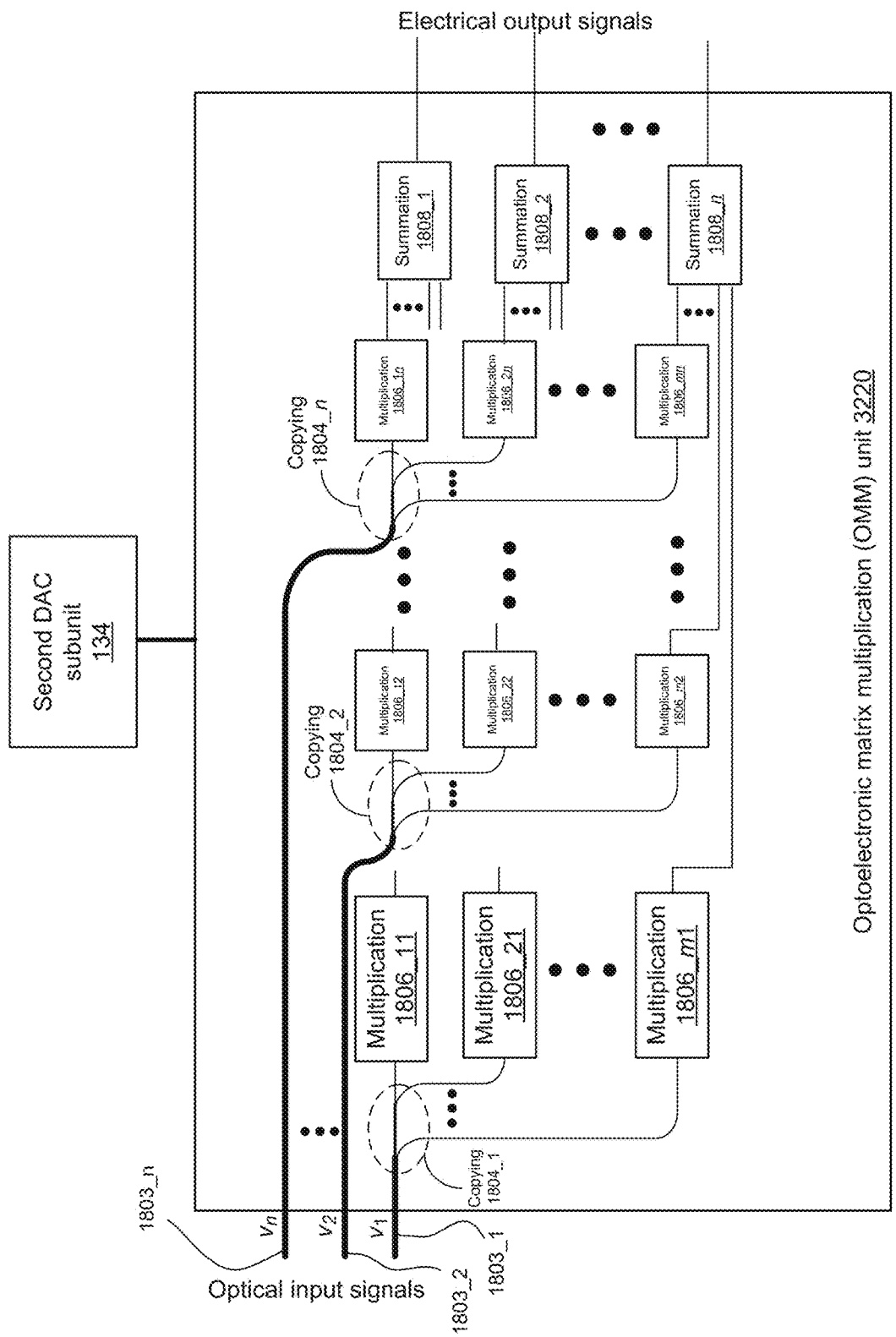
FIG. 52 is a schematic diagram of an example of wavelength division multiplexed optoelectronic matrix multiplication units.

Referring to FIG. 52, the optoelectronic matrix multiplication unit 3220 receives an input vector $$v = \begin{bmatrix} v_1 \\ \vdots \\ v_n \end{bmatrix},$$

and multiplies the input vector with a matrix $$\overline{M} = \begin{bmatrix} M_{11} & \cdots & M_{1n} \\ \vdots & \ddots & \vdots \\ M_{m1} & \cdots & M_{mn} \end{bmatrix}$$

to produce an output vector $$\overline{y} = \begin{bmatrix} M_{11}v_1 + M_{12}v_2 + \ldots + M_{1n}v_n \\ M_{21}v_1 + M_{22}v_2 + \ldots + M_{2n}v_n \\ \cdots \\ M_{m1}v_1 + M_{m2}v_2 + \ldots + M_{mn}v_n \end{bmatrix}.$$

The optoelectronic matrix multiplication unit 3220 includes m optical paths 1803_1, 1803_2, ..., 1803_m (collectively referenced as 1803) that carry the optical signals representing the input vector. A copying module 1804_1 provides copies of the input optical signal $v_1$ to multiplication modules 1806_11, 1806_21, ..., 1806_m1. A copying module 1804_2 provides copies of the input optical signal $v_2$ to multiplication modules 1806_12, 1806_22, ..., 1806_m2. A copying module 1804_n provides copies of the input optical signal $v_n$ to multiplication modules 1806_1n, 1806_2n, ..., 1806_mn.

As discussed above, the amplitudes of the copies of the optical signal $v_1$ provided by the copying module 1804_1 are the same (or substantially the same) relative to one another, but different from that of the optical signal $v_1$ provided by the modulator array 3208. For example, if the copying module 1804_1 splits the signal power of $v_1$ provided by the modulator array 3208 evenly among m signals, then each of the m signals will have a power that is equal to or less than 1/m of the power of $v_1$ provided by the modulator array 3208.

A multiplication module 1806_11 multiplies the input signal $v_1$ with a matrix element $M_{11}$ to produce $M_{11} \cdot v_1$. A multiplication module 1806_21 multiplies the input signal $v_1$ with a matrix element $M_{21}$ to produce $M_{21} \cdot v_1$. A multiplication module 1806_m1 multiplies the input signal $v_1$ with a matrix element $M_{m1}$ to produce $M_{m1} \cdot v1$. A multiplication module 1806_12 multiplies the input signal $v_2$ with a matrix element $M_{12}$ to produce $M_{12} \cdot v_2$. A multiplication module 1806_22 multiplies the input signal v2 with a matrix element $M_{22}$ to produce $M_{22} \cdot v_2$. A multiplication module 1806_m2 multiplies the input signal v2 with a matrix element $M_{m2}$ to produce $M_{N2} \cdot v_2$. A multiplication module 1806_1n multiplies the input signal $v_n$ with a matrix element $M_{1n}$ to produce $M_{1n} \cdot v_n$. A multiplication module 1806_2n multiplies the input signal $v_n$ with a matrix element $M_{2n}$ to produce $M_{2n} \cdot v_n$. A multiplication module 1806_mn multiplies the input signal $v_n$ with a matrix element $M_{mn}$ to produce $M_{mn} \cdot v_n$, and so forth.

The second DAC subunit 3206 generates control signals based on the values of the matrix elements, and sends the control signals to the multiplication modules 1806 to enable the multiplication modules 1806 to multiply the values of the input vector elements with the values of the matrix elements, e.g., by using optical amplitude modulation. For example, the multiplication module 1806_11 can include an optical amplitude modulator, and multiplying the input vector element $v_1$ by the matrix element $M_{11}$ can be achieved by encoding the value of the matrix element $M_{11}$ as an amplitude modulation level applied to the input optical signal representing the input vector element $v_1$.

A summation module 1808_1 receives the outputs of the multiplication modules 1806_11, 1806_12, ..., 1806_1n, and generates a sum $y_1$ equal to $M_{11}v_1 + M_{12}v_2 + \ldots M_{1n}v_n$. A summation module 1808_2 receives the outputs of the multiplication modules 1806_21, 1806_22, ..., 1806_2n, and generates a sum $y_2$ equal to $M_{21}v_1 + M_{22}v_2 + \ldots + M_{2n}v_n$. A summation module 1808_n receives the outputs of the multiplication modules 1806_m1, 1806_m2, ..., 1806_mn, and generates a sum $y_n$ equal to $M_{m1}v_1 + M_{m2}v_2 + \ldots + M_{mn}v_n$.

In the system 3200, the output of the optoelectronic matrix multiplication unit 3220 is provided to the ADC unit 160 without passing through a detection unit 146 as is the case in the system 100 of FIG. 1. This is because either the multiplication modules 1806 or the summation modules 1808 already converted the optical signals into electrical signals, so there is no need for a separate detection unit 146 in the system 3200.

Figure 53:
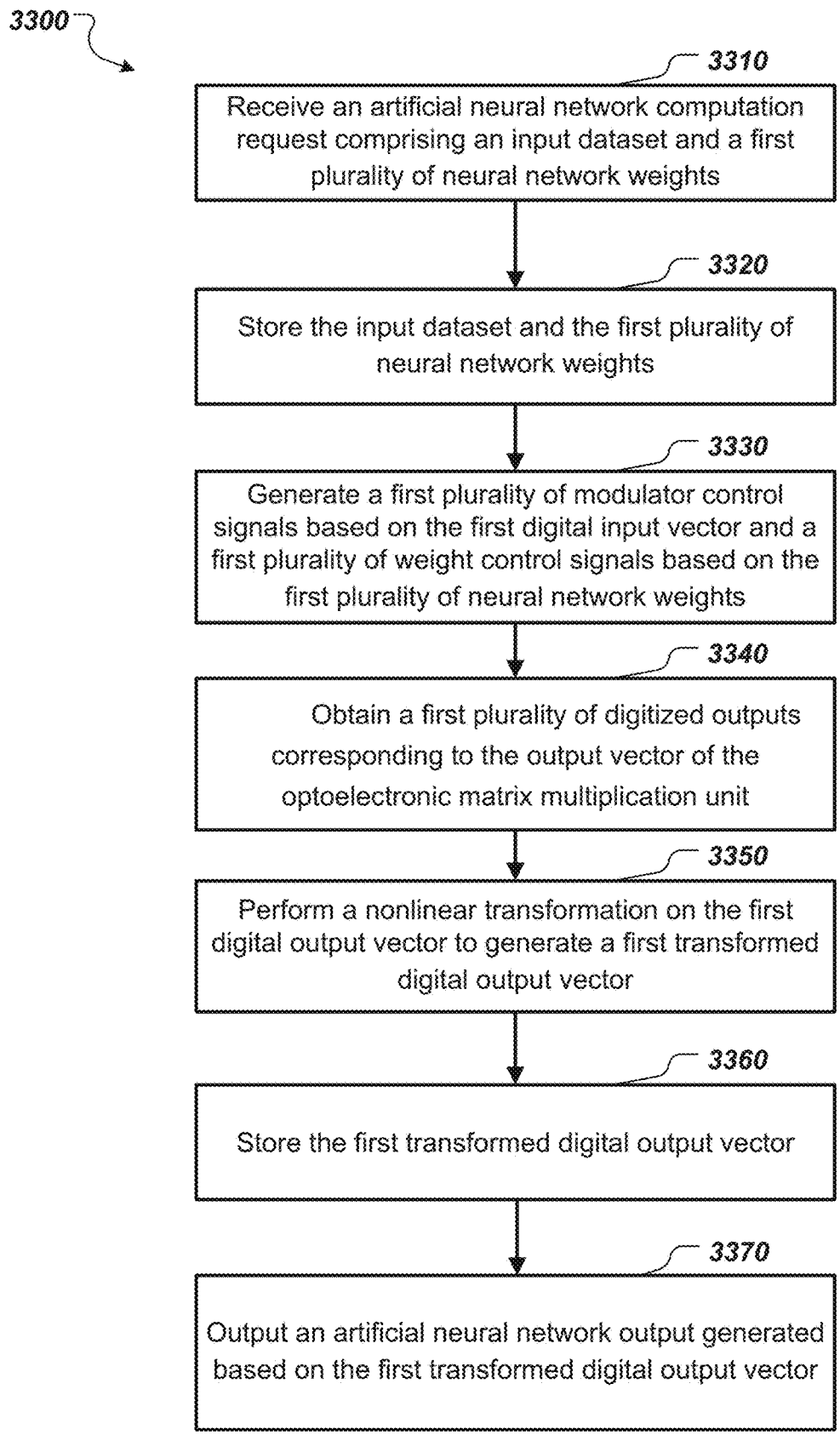
FIG. 53 is a flowchart showing an example of a method for performing an ANN computation.

FIG. 53 is a flow diagram of an example of a method 3300 for performing an ANN computation using the ANN computation system 3200 of FIG. 51. The steps of the process 3300 can be performed by the controller 110 of the system 3200. In some implementations, various steps of the method 3300 can run in parallel, in combination, in loops, or in any order.

At 3310, an artificial neural network (ANN) computation request comprising an input dataset and a first plurality of neural network weights is received. The input dataset includes a first digital input vector. The first digital input vector is a subset of the input dataset. For example, it can be a sub-region of an image. The ANN computation request can be generated by various entities, such as the computer 102 of FIG. 51. The computer 102 can include one or more of various types of computing devices, such as a personal computer, a server computer, a vehicle computer, and a flight computer. The ANN computation request generally refers to an electrical signal that notifies or informs the ANN computation system 3200 of an ANN computation to be performed. In some implementations, the ANN computation request can be divided into two or more signals. For example, a first signal can query the ANN computation system 3200 to check whether the system 3200 is ready to receive the input dataset and the first plurality of neural network weights. In response to a positive acknowledgement by the system 3200, the computer 102 can send a second signal that includes the input dataset and the first plurality of neural network weights.

At 3320, the input dataset and the first plurality of neural network weights are stored. The controller 110 can store the input dataset and the first plurality of neural network weights in the memory unit 120. Storing of the input dataset and the first plurality of neural network weights in the memory unit 120 can allow flexibilities in the operation of the ANN computation system 3200 that, for example, can improve the overall performance of the system. For example, the input dataset can be divided into digital input vectors of a set size and format by retrieving desired portions of the input dataset from the memory unit 120. Different portions of the input dataset can be processed in various order, or be shuffled, to allow various types of ANN computations to be performed. For example, shuffling can allow matrix multiplication by block matrix multiplication technique in cases where the input and output matrix sizes are different. As another example, storing of the input dataset and the first plurality of neural network weights in the memory unit 120 can allow queuing of multiple ANN computation requests by the ANN computation system 3200, which can allow the system 3200 to sustain operation at its full speed without periods of inactivity.

In some implementations, the memory unit 120 can include a first memory subunit and a second memory subunit. The first memory subunit can be a memory dedicated to storing of the input dataset and the digital input vectors, and can have an operating speed sufficient to support the modulation rate of the modulator array 3208. The second memory subunit can be a memory dedicated to storing of the neural network weights, and can have an operation speed sufficient to support the reconfiguration rate of the OMNI unit 3220. In some implementations, the first memory subunit can be implemented using SRAM and the second memory subunit can be implemented using DRAM. In some implementations, the first and second memory subunits can be implemented using DRAM. In some implementations, the first memory unit can be implemented as a part of or as a cache of the controller 110. In some implementations, the first and second memory subunits can be implemented by a single physical memory device as different address spaces. In some implementations, the input dataset can be stored in the first memory subunit, and the first plurality of neural network weights can be stored in the second memory subunit.

At 3330, a first plurality of modulator control signals is generated based on the first digital input vector and a first plurality of weight control signals is generated based on the first plurality of neural network weights. The controller 110 can send a first DAC control signal to the modulator control unit 3202 for generating the first plurality of modulator control signals. The first DAC subunit 3204 generates the first plurality of modulator control signals based on the first DAC control signal, and the modulator array 3208 generates the optical input vector representing the first digital input vector.

The first DAC control signal can include multiple digital values to be converted by the 1-bit DACs in the first DAC subunit 3204 into the first plurality of modulator control signals. The multiple digital values are generally in correspondence with the first digital input vector, and can be related through various mathematical relationships or look-up tables. For example, the multiple digital values can be linearly proportional to the values of the elements of the first digital input vector. As another example, the multiple digital values can be related to the elements of the first digital input vector through a look-up table configured to maintain a linear relationship between the digital input vector and the optical input vector generated by the modulator array 3208.

The controller 110 can send a second DAC control signal to the modulator control unit 3202 for generating the first plurality of weight control signals. The second DAC subunit 3206 generates the first plurality of weight control signals based on the second DAC control signal, and the optoelectronic matrix multiplication unit 3220 is reconfigured according to the first plurality of weight control signals, implementing a matrix corresponding to the first plurality of neural network weights.

The second DAC control signal can include multiple digital values to be converted by the second DAC subunit 3206 into the first plurality of weight control signals. The multiple digital values are generally in correspondence with the first plurality of neural network weights, and can be related through various mathematical relationships or look-up tables. For example, the multiple digital values can be linearly proportional to the first plurality of neural network weights. As another example, the multiple digital values can be calculated by performing various mathematical operations on the first plurality of neural network weights to generate weight control signals that can configure the optoelectronic matrix multiplication unit 3220 to perform a matrix multiplication corresponding to the first plurality of neural network weights.

At 3340, a first plurality of digitized outputs corresponding to the electronic output vector of the optoelectronic matrix multiplication unit 3220 is obtained. The optical input vector generated by the modulator array 3208 is processed by the optoelectronic matrix multiplication unit 3220 and transformed into an electrical output vector. The electrical output vector is converted into digitized values by the ADC unit 160. The controller 110 can, for example, send a conversion request to the ADC unit 160 to begin a conversion of the voltages output by the optoelectronic matrix multiplication unit 3220 into digitized outputs. Once the conversion is complete, the ADC unit 160 can send the conversion result to the controller 110. Alternatively, the controller 110 can retrieve the conversion result from the ADC unit 160. The controller 110 can form, from the digitized outputs, a digital output vector that corresponds to the result of the matrix multiplication of the input digital vector. For example, the digitized outputs can be organized, or concatenated, to have a vector format.

In some implementations, the ADC unit 160 can be set or controlled to perform an ADC conversion based on a DAC control signal issued to the modulator control unit 3202 by the controller 110. For example, the ADC conversion can be set to begin at a preset time following the generation of the modulation control signal by the modulator control unit

3202. Such control of the ADC conversion can simplify the operation of the controller 110 and reduce the number of necessary control operations.

At 3350, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN can implement various types of differentiable, nonlinear transformations. Examples of nonlinear transformation functions include a rectified linear unit (RELU) function, a Sigmoid function, a hyperbolic tangent function, an $X^2$ function, and a |X| function. Such nonlinear transformations are performed on the first digital output by the controller 110 to generate the first transformed digital output vector. In some implementations, the nonlinear transformations can be performed by a specialized digital integrated circuitry within the controller 110. For example, the controller 110 can include one or more modules or circuit blocks that are specifically adapted to accelerate the computation of one or more types of nonlinear transformations.

At 3360, the first transformed digital output vector is stored. The controller 110 can store the first transformed digital output vector in the memory unit 120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 3200 to perform and store additional computations on other digital input vectors of the input dataset to later be aggregated into a single ANN output.

At 3370, an artificial neural network output generated based on the first transformed digital output vector is output. The controller 110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but can further include additional transformed digital outputs that correspond to other portions of the input dataset. Once the ANN output is generated, the generated output is sent to a computer, such as the computer 102, that originated the ANN computation request.

In some implementations, the controller 110, the memory unit 120, the modulator control unit 3202, the ADC unit 160, and a microprocessor can be monolithically integrated on a semiconductor die. In some implementations, the controller 110, the memory unit 120, the modulator control unit 3202, the ADC unit 160, the microprocessor, and the system main memory can be integrated as system-on-chip. In such examples, two or more of the steps in the process 3300 can be performed by the various modules in the monolithic integrated circuit or system-on-chip.

Various performance metrics can be defined for the ANN computation system 3200 implementing the method 3300. Defining performance metrics can allow a comparison of performance of the ANN computation system 3200 that implements the optoelectronic processor 3210 with other systems for ANN computation that instead implement electronic matrix multiplication units. In one aspect, the rate at which an ANN computation can be performed can be indicated in part by a first loop period defined as a time elapsed between the step 3320 of storing, in the memory unit, the input dataset and the first plurality of neural network weights, and the step 3360 of storing, in the memory unit, the first transformed digital output vector. This first loop period therefore includes the time taken in converting the electrical signals into optical signals (e.g., step 3330), and performing the matrix multiplication in the optical and electrical domains (e.g., step 3340). Steps 3320 and 3360 both involve storing of data into the memory unit 120, which are steps shared between the ANN computation system 3200 and conventional ANN computation system systems without the optoelectronic processor 3210. As such, the first loop period measuring the memory-to-memory transaction time can allow a realistic or fair comparison of ANN computation throughput to be made between the ANN computation system 3200 and ANN computation systems without the optoelectronic processor 3210, such as systems implementing electronic matrix multiplication units.

Due to the rate at which the optical input vectors can be generated by the modulator array 3208 (e.g., at 25 GHz) and the processing rate of the optoelectronic matrix multiplication unit 3220 (e.g., >25 GHz), the first loop period of the ANN computation system 3200 for performing a single ANN computation of a single digital input vector can approach the reciprocal of the speed of the modulator array 3208, e.g., 40 ps. After accounting for latencies associated with the signal generation by the modulator control unit 3202 and the ADC conversion by the ADC unit 160, the first loop period can, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to $M^2-1$ processor clock cycles. For M=32, such multiplication would take approximately 1024 cycles, which at 3 GHz clock speed results in an execution time exceeding 300 ns, which is orders of magnitude slower than the first loop period of the ANN computation system 3200.

In some implementations, the method 3300 further includes a step of generating a second plurality of modulator control signals based on the first transformed digital output vector. In some types of ANN computations, a single digital input vector can be repeatedly propagated through, or processed by, the same ANN. As previously discussed, an ANN that implements multi-pass processing can be referred to as a recurrent neural network (RNN). A RNN is a neural network in which the output of the network during a (k)th pass through the neural network is recirculated back to the input of the neural network and used as the input during the (k+1)th pass. RNNs can have various applications in pattern recognition tasks, such as speech or handwriting recognition. Once the second plurality of modulator control signals are generated, the method 3300 can proceed from step 3340 through step 3360 to complete a second pass of the first digital input vector through the ANN. In general, the recirculation of the transformed digital output to be the digital input vector can be repeated for a preset number of cycles depending of the characteristics of the RNN received in the ANN computation request.

In some implementations, the method 3300 further includes a step of generating a second plurality of weight control signals based on a second plurality of neural network weights. In some cases, the artificial neural network computation request further includes a second plurality of neural network weights. As previously discussed, in general, an ANN has one or more hidden layers in addition to the input and output layers. For ANN with two hidden layers, the second plurality of neural network weights can correspond, for example, to the connectivity between the first layer of the ANN and the second layer of the ANN. To process the first digital input vector through the two hidden layers of the ANN, the first digital input vector can first be processed according to the method 3300 up to step 3360, at which the result of processing the first digital input vector through the first hidden layer of the ANN is stored in the memory unit 120. The controller 110 then reconfigures the optoelectronic matrix multiplication unit 3220 to perform the matrix multiplication corresponding to the second plurality of neural network weights associated with the second hidden layer of the ANN. Once the optoelectronic matrix multiplication unit 3220 is reconfigured, the method 3300 can generate the plurality of modulator control signals based on the first transformed digital output vector, which generates an updated optical input vector corresponding to the output of the first hidden layer. The updated optical input vector is then processed by the reconfigured optoelectronic matrix multiplication unit 3220 which corresponds to the second hidden layer of the ANN. In general, the described steps can be repeated until the digital input vector has been processed through all hidden layers of the ANN In some implementations of the optoelectronic matrix multiplication unit 3220, the reconfiguration rate of the optoelectronic matrix multiplication unit 3220 can be significantly slower than the modulation rate of the modulator array 3208. In such cases, the throughput of the ANN computation system 3200 can be adversely impacted by the amount of time spent in reconfiguring the optoelectronic matrix multiplication unit 3220 during which ANN computations cannot be performed. To mitigate the impact of the relatively slow reconfiguration time of the optoelectronic matrix multiplication unit 3220, batch processing techniques can be utilized in which two or more digital input vectors are propagated through the optoelectronic matrix multiplication unit 3220 without a configuration change to amortize the reconfiguration time over a larger number of digital input vectors.

Referring to FIG. 39, in some implementations, a wavelength division multiplexed (WDM) artificial neural network (ANN) computation system 3500 includes an optoelectronic processor 3510 that includes an optoelectronic matrix multiplication unit 3520 that has, e.g., the copying modules, multiplication modules, and summation modules shown in FIGS. 19 to 37 to enable processing non-coherent or low-coherent optical signals in performing matrix computations, in which the optical signals are encoded in multiple wavelengths. The WDM ANN computation system 3500 is similar to the ANN computation system 3200 except that the WDM technique is used in which, for some implementations of the ANN computation system 3500, the light source 3230 is configured to generate multiple wavelengths, such as $\lambda 1$, $\lambda 2$, and $\lambda 3$, similar to the system 104 of FIG. 6.

The multiple wavelengths can preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm can allow simple multiplexing and demultiplexing. On the other hand, the range between the shortest wavelength and the longest wavelength of the multiple wavelengths ("WDM bandwidth") can preferably be sufficiently small such that the characteristics or performance of the optoelectronic matrix multiplication unit 3520 remain substantially the same across the multiple wavelengths. Optical components are typically dispersive, meaning that their optical characteristics change as a function of wavelength. For example, a power splitting ratio of an MZI can change over wavelength. However, by designing the optoelectronic matrix multiplication unit 3520 to have a sufficiently large operating wavelength window, and by limiting the wavelengths to be within that operating wavelength window, the output electronic vector output by the optoelectronic matrix multiplication unit 3520 corresponding to each wavelength can be a sufficiently accurate result of the matrix multiplication implemented by the optoelectronic matrix multiplication unit 3520. The operating wavelength window can be, for example, 1 nm, 2 nm, 3 nm, 4 nm, 5 nm, 10 nm, or 20 nm.

The modulator array 144 of the WDM ANN computation system 3500 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., $\lambda 1$, $\lambda 2$, and $\lambda 3$), the modulator array 144 can have 3 banks of 32 modulators each. Further, the modulator array 144 also includes an optical multiplexer configured to combine the plurality of optical input vectors into a combined optical input vector including the plurality of wavelengths. For example, the optical multiplexer can combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

Figure 40:
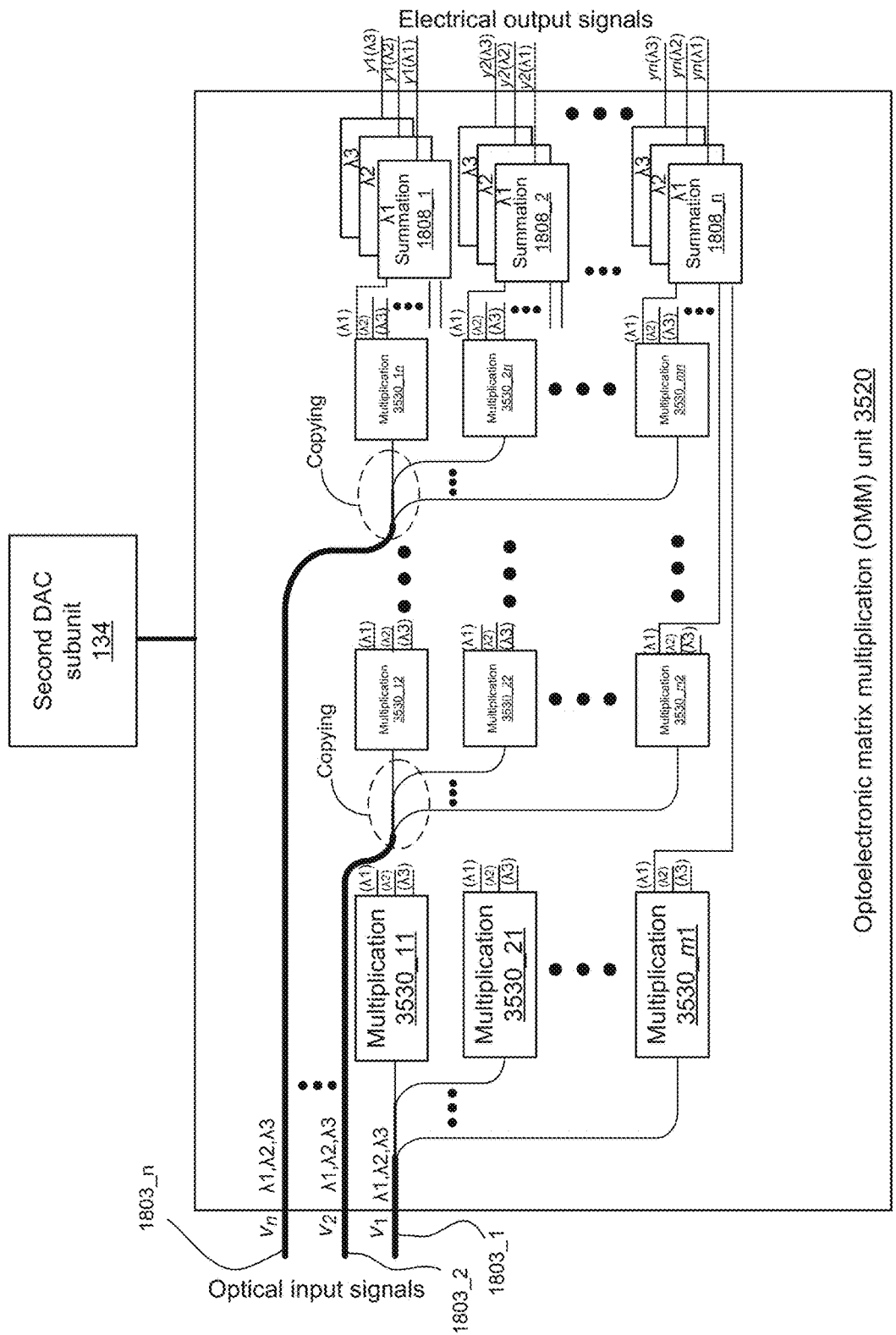
FIGS. 40 and 41 are schematic diagrams of examples of wavelength division multiplexed optoelectronic matrix multiplication units.

The optoelectronic processing components of the WDM ANN computation system 3500 are further configured to demultiplex the multiple wavelengths and to generate a plurality of demultiplexed output electric signals. Referring to FIG. 40, the optoelectronic matrix multiplication unit 3520 includes optical paths 1803 configured to receive from the modulator array 144 the combined optical input vector including the plurality of wavelengths. For example, the optical path 1803_1 receives the combined optical input vector element $v_1$ at the wavelengths $\lambda 1$, $\lambda 2$, and $\lambda 3$. Copies of the optical input vector element $v_1$ at the wavelengths $\lambda 1$, $\lambda 2$, and $\lambda 3$ are provided to the multiplication module 3530_11, 3530_21, . . . , and 3530_m1. In some implementations in which the multiplication modules 3530 output electrical signals, the multiplication module 3530_11 outputs three electrical signals representing $M_{11} \cdot v_1$ that correspond to the input vector element $v_1$ at the wavelengths $\lambda 1$, $\lambda 2$, and 3. The output electrical signals of the multiplication module 3530_11 that correspond to the input vector element $v_1$ at the wavelengths $\lambda 1$, $\lambda 2$, and $\lambda 3$ are shown as $(\lambda 1)$, $(\lambda 2)$, and $(\lambda 3)$, respectively. Similar notations apply to the outputs of the other multiplication modules. The multiplication module 3530_21 outputs three electrical signals representing $M_{21} \cdot v_1$ that correspond to the input vector element $v_1$ at the wavelengths $\lambda 1$, $\lambda 2$, and $\lambda 3$, respectively. The multiplication module 3530_m1 outputs three electrical signals representing $M_{m1} \cdot v_1$ that correspond to the input vector element $v_1$ at the wavelengths $\lambda 1$, $\lambda 2$, and $\lambda 3$.

Copies of the optical input vector element $v_2$ at the wavelengths $\lambda 1$, $\lambda 2$, and $\lambda 3$ are provided to the multiplication module 3530_12, 3530_22, . . . , and 3530_m2. The multiplication module 3530_12 outputs three electrical signals representing $M_{12} \cdot v_2$ that correspond to the input vector element $v_2$ at the wavelengths $\lambda 1$, $\lambda 2$, and $\lambda 3$. The multiplication module 3530_22 outputs three electrical signals representing $M_{22} \cdot v_2$ that correspond to the input vector element $v_2$ at the wavelengths λ1, λ2, and λ3. The multiplication module 3530_m2 outputs three electrical signals representing $M_{m2} \cdot v_2$ that correspond to the input vector element $v_2$ at the wavelengths λ1, λ2, and λ3.

Copies of the optical input vector element $v_n$ including the wavelengths λ1, λ2, and λ3 are provided to the multiplication module 3530_1n, 3530_2n, ..., and 3530_mn. The multiplication module 3530_1n outputs three electrical signals representing $M_{1n} \cdot v_n$ that correspond to the input vector element $v_n$ at the wavelengths λ1, λ2, and λ3. The multiplication module 3530_2n outputs three electrical signals representing $M_{2n} \cdot v_n$ that correspond to the input vector element $v_n$ at the wavelengths λ1, λ2, and λ3. The multiplication module 3530_mn outputs three electrical signals representing $M_{mn} \cdot v_n$ that correspond to the input vector element $v_n$ at the wavelengths λ1, λ2, and λ3, and so forth.

For example, each of the multiplication module 3530 can include a demultiplexer configured to demultiplex the three wavelengths contained in each of the 32 signals of the multi-wavelength optical vector, and route the 3 single-wavelength optical output vectors to three banks of photodetectors (e.g., photodetectors 2012, 2016 (FIG. 23) or 2042, 2046 (FIG. 24)) coupled to three banks of op-amps or transimpedance amplifiers (e.g., op-amps 2030 (FIG. 23) or 2050 (FIG. 24)).

Three banks of summation modules 1808 receive outputs from the multiplication modules 3530 and generate sums y that correspond to the input vector at the various wavelengths, For example, three summation modules 1808_1 receive the outputs of the multiplication modules 3530_11, 3530_12, ..., 3530_1n and generate sums $y_1(λ1)$, $y_1(λ2)$, $y_1(λ2)$ that correspond to the input vector element $v_1$ at the wavelengths λ1, λ2, and λ3, respectively, in which at each wavelength the sum $y_1$ is equal to $M_{11}v_1 + M_{12}v_2 + \ldots + M_{1n}v_n$. Three summation modules 1808_2 receive the outputs of the multiplication modules 3530_21, 3530_22, ..., 3530_2n, and generates sums $y_2(λ1)$, $y_2(λ2)$, $y_2(λ3)$ that correspond to the input vector element $v_2$ at the wavelengths λ1, λ2, and λ3, respectively, in which at each wavelength the sum $y_2$ is equal to $M_{21}v_1 + M_{22}v_2 + \ldots + M_{2n}v_n$. Three summation modules 1808_n receive the outputs of the multiplication modules 3530_m1, 3530_m2, ..., 3530_mn, and generates sums $y_n(λ1)$, $y_n(λ2)$, $y_n(λ3)$ that correspond to the input vector element $v_n$ at the wavelengths λ1, λ2, and λ3, respectively, in which at each wavelength the sum $y_n$ is equal to $M_{m1}v_1 + M_{m2}v_2 + \ldots + M_{mn}v_n$.

Referring back to FIG. 39, the ADC unit 160 of the WDM ANN computation system 3500 includes banks of ADCs configured to convert the plurality of demultiplexed output voltages of the optoelectronic matrix multiplication unit 3520. Each of the banks corresponds to one of the multiple wavelengths, and generates respective digitized demultiplexed outputs. For example, the banks of ADCs 160 can be coupled to the banks of the summation modules 1808.

The controller 110 can implement a method analogous to the method 200 (FIG. 4) but expanded to support the multi-wavelength operation. For example, the method can include the steps of obtaining, from the ADC unit 160, a plurality of digitized demultiplexed outputs, the plurality of digitized demultiplexed outputs forming a plurality of first digital output vectors, in which each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some cases, the ANN can be specifically designed, and the digital input vectors can be specifically formed such that the multi-wavelength products of the multiplication module 3530 can be added without demultiplexing. In such cases, the multiplication module 3530 can be a wavelength-insensitive multiplication module that does not demultiplex the multiple wavelengths of the multi-wavelength products. As such, each of the photodetectors of the multiplication module 3530 effectively sums the multiple wavelengths of an optical signal into a single photocurrent, and each of the voltages output by the multiplication module 3530 corresponds to a sum of the product of a vector element and a matrix element for the multiple wavelengths. The summation module 1808 (only one bank is needed) outputs an element-by-element sum of the matrix multiplication results of the multiple digital input vectors.

Figure 41:
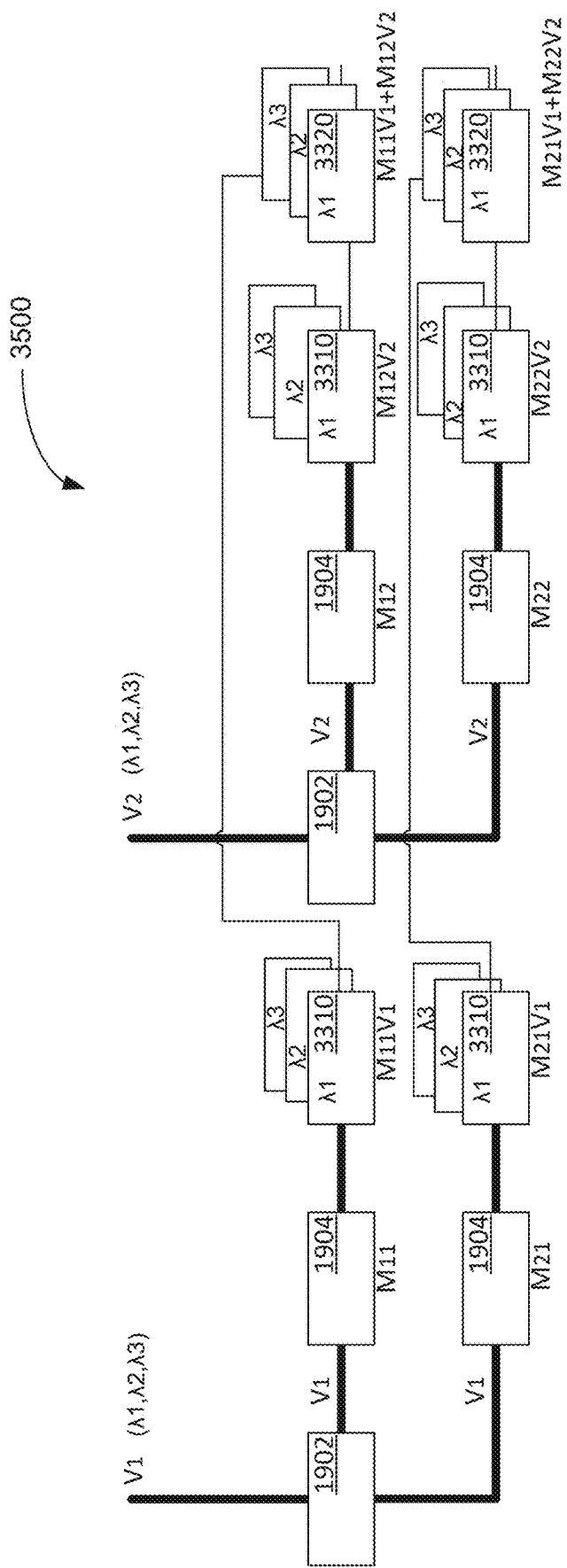

FIG. 41 shows an example of a system configuration 3500 for an implementation of the wave division multiplexed optoelectronic matrix multiplication unit 3520 for performing vector-matrix multiplication using a 2×2-element matrix, with the summation operation performed in the electrical domain. In this example, the input vector is $$v = \begin{bmatrix} v_1 \\ v_2 \end{bmatrix},$$

and the matrix is $$\overline{\overline{M}} = \begin{bmatrix} M_{11} & M_{12} \\ M_{21} & M_{22} \end{bmatrix}.$$

In this example, the input vector has multiple wavelengths λ1, λ2, and λ3, and each of the elements of the input vector is encoded on a different optical signal. Two different copying modules 1902 perform an optical copying operation to split the computation over different paths (e.g., an "upper" path and a "lower" path). There are four multiplication modules 1904 that each multiply by a different matrix element using optical amplitude modulation. The output of each multiplication module 1904 is provided to a demultiplexer and a bank of optical detection modules 3310 that convert a wavelength division multiplexed optical signal to electrical signals in the form of electrical currents associated with the wavelengths λ1, λ2, and λ3. Both upper paths of the different input vector elements are combined using a bank of summation modules 3320 associated with the wavelengths λ1, λ2, and λ3, and both lower paths of the different input vector elements are combined using a bank of summation modules 3320 associated with the wavelengths λ1, λ2, and λ3, in which the summation modules 3320 perform summation in the electrical domain. Thus, each of the elements of the output vector for each wavelength is encoded on a different electrical signal. As shown in FIG. 41, as the computation progresses, each component of an output vector is incrementally generated to yield the following results for the upper and lower paths, respectively, for each wavelength.

$M_{11}v_1 + M_{12}v_2$ $M_{21}v_1 + M_{22}v_2$

The system configuration 3500 can be implemented using any of a variety of optoelectronic technologies. In some implementations, there is a common substrate (e.g., a semiconductor such as silicon), which can be able to support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. (In FIG. 41, the thicknesses of the lines representing paths are used to differentiate between optical paths, represented by thicker lines, and electrical paths, represented by thinner lines or dashed lines.) Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can be used to provide communication channels to send optical signals among multiple devices used to implement the overall system. Those optical signals can represent different subsets of an input vector that is provided when performing vector-matrix multiplication, and/or different subsets of intermediate results that are computed when performing vector-matrix multiplication, as described in more detail below.

A variety of alternative system configurations or signal processing techniques can be used with various implementations of the different systems, subsystems, and modules described herein.

In some embodiments, it can be useful for some or all of the VMM subsystems to be replaceable with alternative subsystems, including subsystems that use different implementations of the various copying modules, multiplication modules, and/or summation modules. For example, a VMM subsystem can include the optical copying modules described herein and the electrical summation modules described herein, but the multiplication modules can be replaced with a subsystem that performs the multiplication operations in the electrical domain instead of the optoelectronic domain. In such examples, the array of optical amplitude modulators can be replaced by an array of detectors to convert optical signals to electrical signals, followed by an electronic subsystem (e.g., an ASIC, processor, or SoC). Optionally, if optical signal routing is to be used to the summation modules that are configured to detect optical signals, the electronic subsystem can include electrical to optical conversion, for example, using an array of electrically-modulated optical sources.

In some embodiments, it can be useful to be able to use a single wavelength for some or all of the optical signals being used for some or all of the VMM computations. Alternatively, in some embodiments, to help reduce the number of required optical input ports, an input port can receive a multiplexed optical signal that has different values encoded on different optical waves at different wavelengths. Those optical waves can then be separated at an appropriate location in the system, depending on whether any of the copying modules, multiplication modules, and/or summation modules are configured to operate on multiple wavelengths. But, even in the multi-wavelength embodiments, it can be useful to use the same wavelength for different subsets of optical signals, for example, used in the same VMM subsystem.

In some embodiments, an accumulator can be used to enable a time domain encoding of the optical and electrical signals received by the various modules, alleviating the need for the electronic circuitry to operate effectively over a large number of different power levels. For example, a signal that is encoded using binary (on-off) amplitude modulation with a particular duty cycle over N time slots per symbol, can be converted into a signal that has N amplitude levels per symbol after that signal is passed through the accumulator (an analog electronic accumulator that integrates the current or voltage of an electrical signal). So, if the optical devices (e.g., the phase modulators in the optical amplitude modulators) are capable of operating at a symbol bandwidth B, they can be operated instead at a symbol bandwidth B/100, where each symbol value uses N=100 time slots. An integrated amplitude of 50% has a 50% duty cycle (e.g., the first 50 time slots at the non-zero "on" level, followed by 50 time slots at the zero, or near zero, "off" level), whereas an integrated amplitude of 10% has a 10% duty cycle (e.g., the first 10 time slots at the non-zero "on" level, followed by 90 time slots at zero "off" level). In the examples described herein, such an accumulator can be positioned on the path of each electrical signal at any location within the VMM subsystem that is consistent for each electrical signal, such as for example, before the summation modules for all electrical signals in that VMM subsystem or after the summation modules for all electrical signals in that VMM subsystem. The VMM subsystem can also be configured such that there are no significant relative time shifts between different electrical signals preserving alignment of the different symbols.

Figure 42:
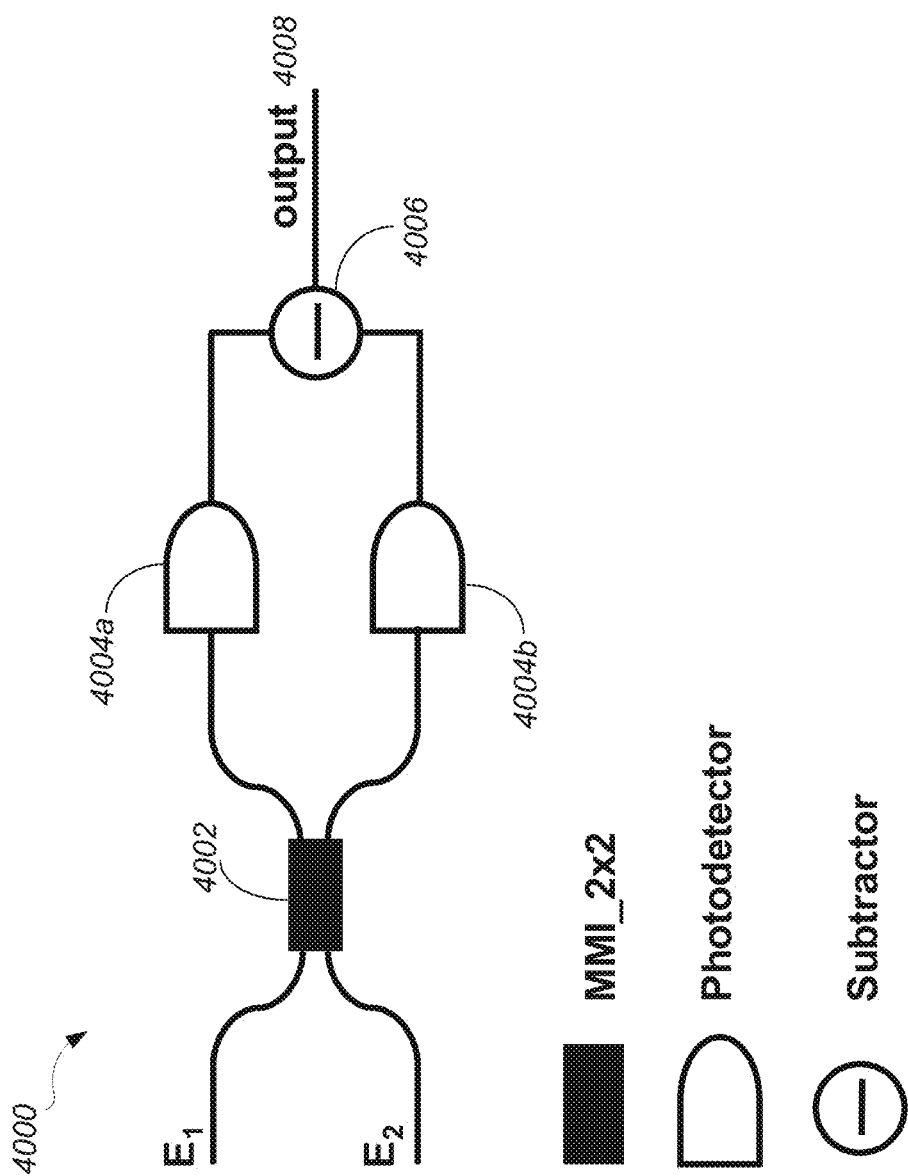
FIG. 42 is a schematic diagram of a homodyne detector.

Referring to FIG. 42, in some implementations, homodyne detection can be used to obtain the phase and the amplitude of the modulated signal. A homodyne detector 4000 includes a beam splitter 4002 that includes a 2×2 multi-mode interference (MMI) coupler, two photodetectors 4004*a* and 4004*b*, and a subtractor 4006. The beam splitter 4002 receives input signals $E_1$ and $E_2$, the outputs of the beam splitter 4002 are detected by the photodetectors 4004*a* and 4004*b*. For example, the input signal $E_1$ can be the signal to be detected, and the input signal $E_2$ can be generated by a local oscillator that has a constant laser power. The local oscillator signal $E_2$ is mixed with the input signal $E_1$ by the beam splitter 4002 before the signals are detected by the photodetectors 4004*a* and 4004*b*. The subtractor 4006 outputs the difference between the outputs of the photodetectors 4004*a* and 4004*b*. The output 4008 of the subtractor 4006 is proportional to $|E_1||E_2|\sin(\theta)$, in which $|E_1|$ and $|E_2|$ are the amplitudes of two input optical fields, $\theta$ is their relative phase. Since the output is related to the product of two optical fields, it can detect an extremely weak optical signal, even in single-photon level.

For example, the homodyne detector 4000 can be used in the systems shown in FIGS. 1, 6, 19-38, and 39-41. The homodyne detector 4000 provides gain on the signal and hence better signal noise ratio. For coherent systems, the homodyne detector 4000 provides the added benefit of revealing the phase information of the signal via the polarity of the detection result.

In the example of FIG. 21, the system 1920 includes a 2×2-element matrix, in which two input vector elements are encoded on two optical signals using two different respective wavelengths $\lambda_1$ and $\lambda_2$. The two optical signals can be provided to the system 1920 using, e.g., two optical fibers.

For example, a system that performs matrix processing on 4×4 matrices can receive four input optical signals carried on four optical fibers. Although more optical fibers can be used to carry more input optical signals for systems that process larger matrices, because the coupling between an optical fiber and an optoelectronics chip takes up considerable space, it is difficult to couple a large number of optical fibers to an optoelectronics chip.

Figure 43:
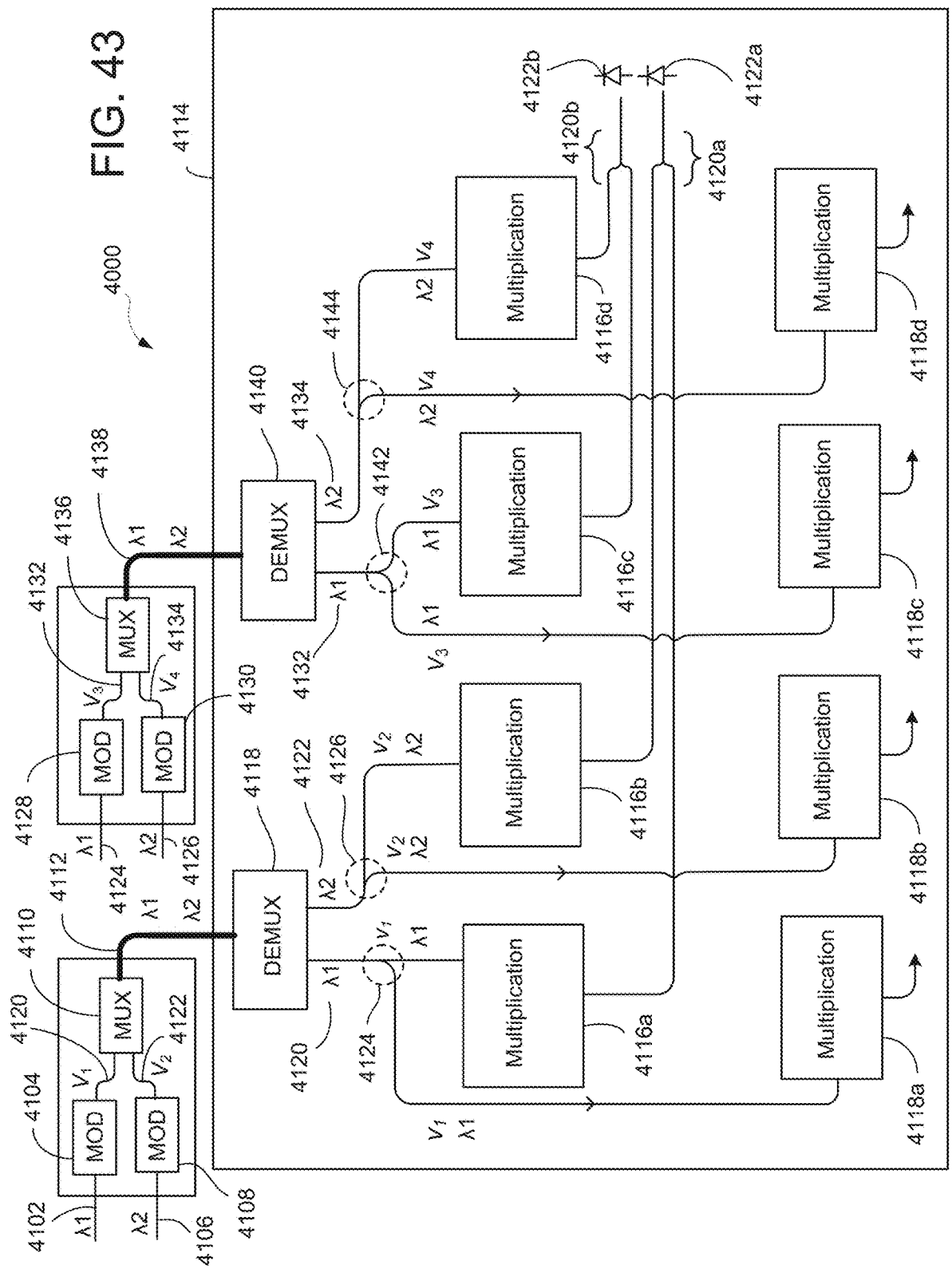
FIG. 43 is a schematic diagram of a computation system that includes optical fibers that each carry signals having multiple wavelengths.

A way to reduce the number of optical fibers required to carry optical signals to an optoelectronics chip is to use wavelength division multiplexing. Multiple optical signals having different wavelengths can be multiplexed and transmitted using a single optical fiber. For example, referring to FIG. 43, in a computation system 4100, a first light signal 4102 having a wavelength $\lambda_1$ is modulated by a first modulator 4104 to produce a first modulated optical signal 4120 representing a first input vector element V1. A second light signal 4106 having a wavelength $\lambda_2$ is modulated by a second modulator 4108 to produce a second modulated optical signal 4122 representing a second input vector element V2. The first and second modulated optical signals are combined by a multiplexer 4110 to produce a wavelength division multiplexed signal that is transmitted via an optical fiber 4112 to an optoelectronics chip 4114 that includes a plurality of matrix multiplication modules, e.g., 4116a, 4116b, 4116c, and 4116d (collectively referenced as 4116), and 4118a, 4118b, 4118c, and 4118d (collectively referenced as 4118).

Inside the optoelectronics chip 4114, the wavelength division multiplexed signal is demultiplexed by a demultiplexer 4118 to separate the optical signals 4120 and 4122. In this example, the optical signal 4120 is copied by a copying module 4124 to produce copies of optical signals that are sent to the matrix multiplication modules 4116a and 4118a. The optical signal 4122 is copied by a copying module 4126 to produce copies of optical signals that are sent to the matrix multiplication modules 4116b and 4118b. The outputs of the matrix multiplication units 4116a and 4116b are combined using an optical coupler 4120a, and the combined signal is detected by a photodetector 4122a.

A third light signal 4124 having a wavelength $\lambda_1$ is modulated by a third modulator 4128 to produce a third modulated optical signal 4132 representing a third input vector element V3. A fourth light signal 4126 having a wavelength $\lambda_2$ is modulated by a fourth modulator 4130 to produce a fourth modulated optical signal 4134 representing a fourth input vector element V4. The third and fourth modulated optical signals are combined by a multiplexer 4136 to produce a wavelength division multiplexed signal that is transmitted via an optical fiber 4138 to the optoelectronics chip 4114.

Inside the optoelectronics chip 4114, the wavelength division multiplexed signal provided by the optical fiber 4138 is demultiplexed by a demultiplexer 4140 to separate the optical signals 4132 and 4134. In this example, the optical signal 4132 is copied by a copying module 4142 to produce copies of optical signals that are sent to the matrix multiplication modules 4116c and 4118c. The optical signal 4134 is copied by a copying module 4144 to produce copies of optical signals that are sent to the matrix multiplication modules 4116d and 4118d. The outputs of the matrix multiplication units 4116c and 4116d are combined using an optical coupler 4120b, and the combined signal is detected by a photodetector 4122b. The outputs of the matrix multiplication units 4118a and 4118b are combined using an optical coupler, and the combined signal is detected by a photodetector. The outputs of the matrix multiplication units 4118c and 4118d are combined using an optical coupler, and the combined signal is detected by a photodetector.

In some examples, a multiplexer can multiplex optical signals having three or more (e.g., 10, or 100) wavelengths to produce a wavelength division multiplexed signal that is transported by a single optical fiber, and a demultiplexer inside the optoelectronics chip can demultiplex the wavelength division multiplexed signal to separate the signals having different wavelengths. This allows more optical signals be transmitted to the optoelectronics chip in parallel through the optical fibers, increasing the data processing throughput of the optoelectronics chip.

In some examples, the laser unit 142 of FIG. 1 includes a single laser that provides an optical wave that can be modulated with different optical signals. In that case, the optical waves in the various waveguides of the system have common wavelengths that are substantially identical to each other, within the resolution of the line width of the laser. For example, the optical waves can have wavelengths that are within 1 nm of one another. However, the laser unit 142 can also include multiple lasers that enable wavelength division multiplexed operation using different optical signals modulated onto different respective optical waves (e.g., each with a line width of 1 nm or less). The different optical waves can have peak wavelengths that are separated from each other by wavelength distances greater than the line widths of the individual lasers (e.g., by more than 1 nm). In some examples, wavelength division multiplexed systems can use optical signals modulated onto optical waves having wavelengths that are a few nanometers (e.g., 3 nm or more) apart. However, if the demultiplexer has better resolution, the differences between different wavelengths in the WDM system can also be less than 3 nm.

Figure 44:
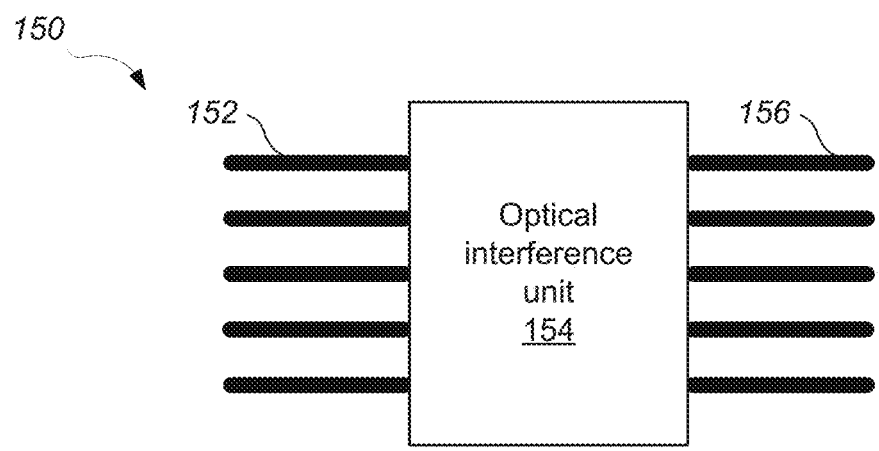
FIG. 44 is a schematic diagram of an example of an optical matrix multiplication unit.

FIG. 44 shows a schematic diagram of an example of the OMNI unit 150 of FIGS. 1 and 6. The OMM unit 150 can include an array of input waveguides 152 to receive the optical input vector; an optical interference unit 154 in optical communication with the array of input waveguides 152; and an array of output waveguides 156 in optical communication with the optical interference unit 154. The optical interference unit 154 performs a linear transformation of the optical input vector into a second array of optical signals. The array of output waveguides 156 guides the second array of optical signals output by the optical interference unit 154. At least one input waveguide in the array of input waveguides 152 is in optical communication with each output waveguide in the array of output waveguides 156 via the optical interference unit 154. For example, for an optical input vector of length N, the OMNI unit 150 can include N input waveguides 152 and N output waveguides 156.

Figure 45:
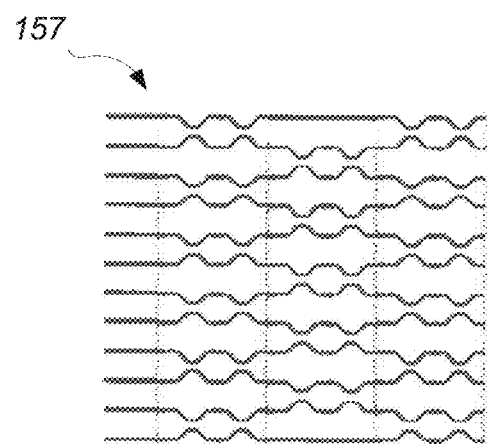
FIGS. 45 and 46 are schematic diagrams of example configurations of interconnected Mach-Zehnder interferometers (MZIs).
Figure 46:
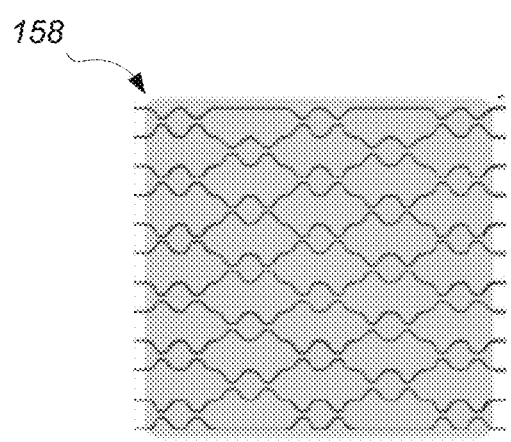

The optical interference unit 150 can include a plurality of interconnected Mach-Zehnder interferometers (MZIs). FIGS. 45 and 46 shows schematic diagrams of example configurations 157 and 158 of interconnected MZIs. The MZIs can be interconnected in various ways, such as in configurations 157 or 158 to achieve linear transformation of the optical input vectors received through the array of input waveguides 152. The MZIs can be implemented using the examples shown in FIGS. 2 and 7-16.

In the examples shown in FIGS. 7-16, each MZI includes two balanced arms 3904a and 3904b. When the phase shifters (e.g., 3906 of FIG. 7 and 3956 of FIGS. 8-11, 15, 16) do not impart optical phase shift to the light propagating in the arms 3904a, 3904b, the light propagating in the two balanced arms 3904a, 3904b should interfere constructively when combined at the multi-mode interference coupler (MMI 1×2) 3902*b*. However, due to fabrication tolerances, the two arms 3904*a* and 3904*b* can impart different amounts of optical phase shifts to the light propagating in the arms 3904*a*, 3904*b*, resulting in errors in the signal output from the multi-mode interference coupler 3902*b*. Such inaccuracies can be compensated by use of calibration phase shifters.

Figure 47:
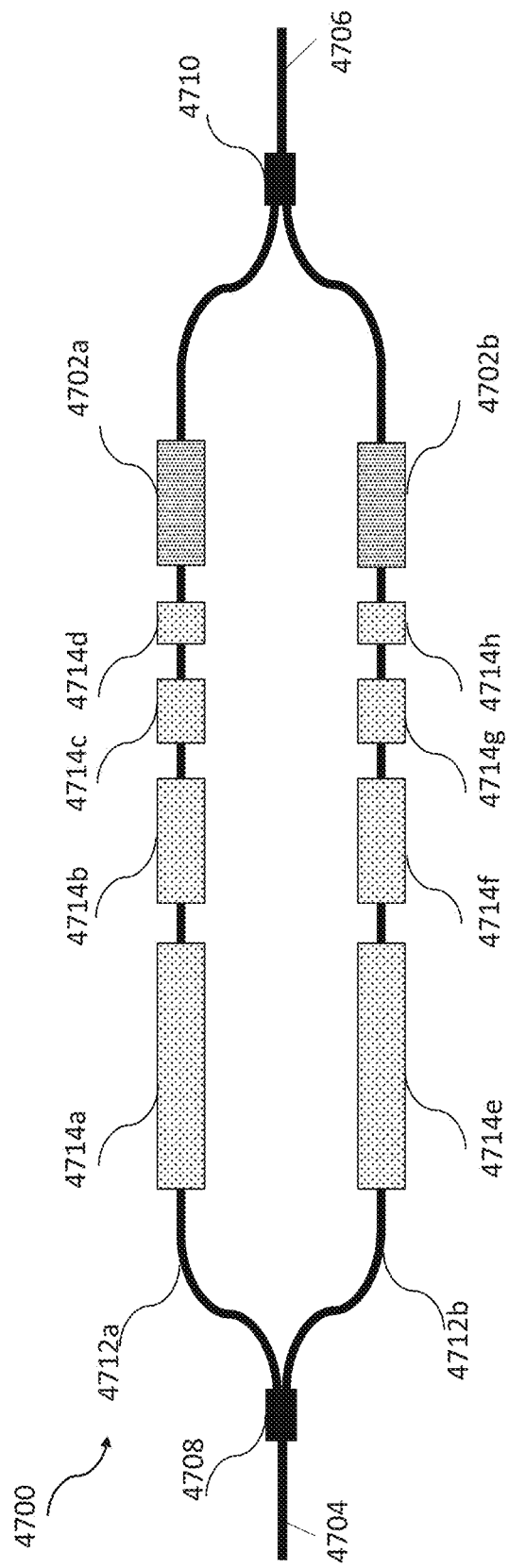
FIG. 47 shows a schematic diagram of a segmented MZI modulator that includes calibration phase shifters.

FIG. 47 shows a schematic diagram of a segmented MZI modulator 4700 that includes calibration phase shifters 4702*a* and 4702*b* (collectively referenced as 4702) that can compensate for imbalances between the two arms of the MZI modulator 4700. The segmented MZI modulator 4700 includes an input waveguide 4704, an output waveguide 4706, an input 1×2 MMI splitter 4708, an output 1×2 MMI splitter 4710, an upper arm waveguide 4712*a*, a lower arm waveguide 4712*b*, and a plurality of electro-optic phase shifters 4714*a*, 4714*b*, 4714*c*, 4714*d*, 4714*e*, 4714*f*, 4714*g*, and 4714*h* (collectively referenced as 4714).

During operation of the system, light propagates from the input waveguide 4704 to the 1×2 MMI splitter 4708, which generates two light portions. Each light portion is influenced by the electro-optic phase shifters 4714, then the two light portions combine at the 1×2 MMI 4710 to interfere so that optical intensity at the output waveguide 4706 will have a relationship with the relative phase difference between the two arms 4712*a* and 4712*b*. For example, the modulation phase shifters 4714 can be driven by a plurality of on-off electrical control signals that are generated by flip chip electrical circuits. By implementing different lengths of the phase shifters 4714, output light can encode multiple levels of electrical signals through several binary on-off keying digital inputs.

The upper arm waveguide 4712*a* and the lower arm waveguide 4712*b* can differ in waveguide width due to the fabrication process, and the waveguide width variation induced phase difference will accumulate along the propagation direction between the two arms so that the initial phase imbalance between the two arms 4712*a*, 4712*b* can make the MZI initial operating point far away from constructive inference. In addition, the plurality of electro-optic phase shifters 4714 can experience mask misalignment in fabrication that will also induce initial phase difference between the two arms 4712*a*, 4712*b*. The two calibration phase shifters 4702*a*, 4702*b* are used to cancel the fabrication induced phase imbalance.

For example, the calibration phase shifters 4702 can be implemented by thermo-optic phase effects (operated by heating the waveguide to change the refractive index) or electro-optic effects (operated by applying an electric field to change carrier distribution to influence the refractive index). For example, the calibration phase shifters 4702 are independently controlled by two low speed DACs through flip chip or wire bonding to the photonic chip that includes the MZI 4700.

For example, a tap waveguide is provided to guide a portion of the light signal at the output waveguide 4706 to a monitor photodetector that can provide a feedback signal indicating the intensity of the light propagating in the output waveguide 4706. To calibrate the MZI 4700, the phase shifters 4714 are driven with zero signals so that any imbalance between the phase of the light portions in the upper and lower arms is due to the differences between the waveguides 4712*a*, 4712*b* in the upper and lower arms. Based on the feedback provided by the monitor photodetector, the control signals applied to the calibration phase shifters 4702*a*, 4702*b* are adjusted so that the light portions from the upper and lower arms that reach the output 1×2 MMI splitter 4710 have the same phase and constructively interfere.

The phase difference between the upper and lower arms can be affected by ambient temperature, which can fluctuate over time, so the measurements by the monitor photodetector are performed periodically, and the control signals applied to the calibration phase shifters 4702 are updated periodically, e.g., once every fraction of a second, once very second, once every 10 seconds, or once every minute. The calibration phase shifters 4702 are configured to be able to compensate for phase imbalances in the two arms ranging from 0 to 2π radians. Because the control signals to the calibration phase shifters 4702 can be updated at a low frequency (e.g., 10 Hz or less), a high-precision multi-level DAC can be used to generate the control signals for the calibration phase shifters 4702.

Figure 48:
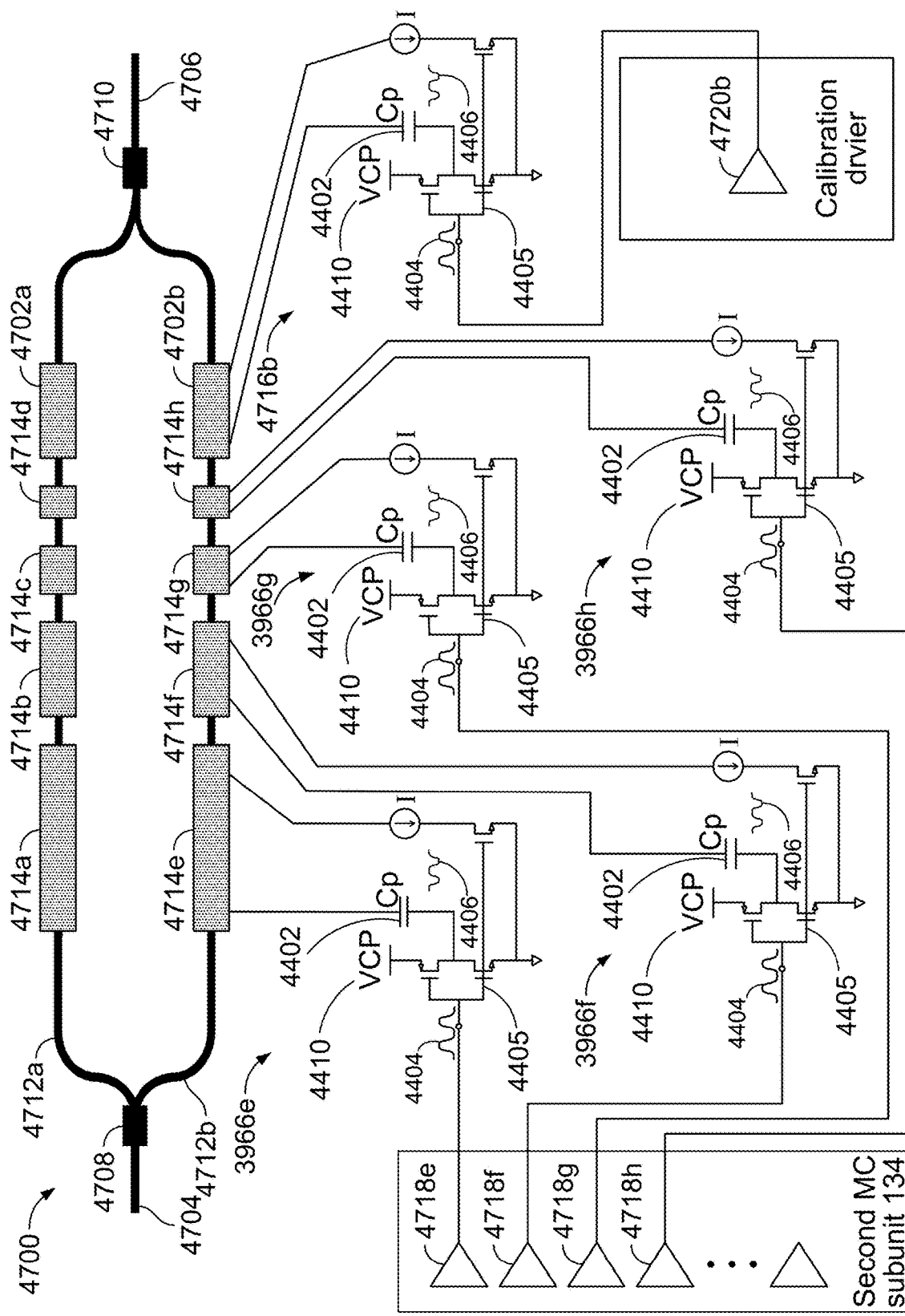
FIG. 48 shows a schematic diagram of the segmented MZI modulator of FIG. 47 and related driving circuitry.

Referring to FIG. 48, in some implementations, in the lower arum of the MZI 4700, the electro-optic phase shifters 4714*e*, 4714*f*, 4714*g*, and 4714*h* are driven by driver circuits 3966*e*, 3966*f*, 3966*g*, and 3966*h*, respectively. The calibration phase shifter 4702*b* can be driven by a driver circuit 4716*b*, which can be similar to the driver circuits 3966. For example, the driver circuits 3966*e*, 3966*f*, 3966*g*, 3966*h* can be driven by control signals provided by high speed 1-bit DACs 4718*e*, 4718*f*, 4718*g*, and 4718*h*, respectively. The driver circuit 4716*b* (for the calibration phase shifter 4702*b*) can be driven by control signals provided by a low speed multi-bit DAC 4720*b*. In the upper arm, the electro-optic phase shifters 4714*a*, 4714*b*, 4714*c*, 4714*d* and the calibration phase shifter 4702*a* can be controlled in a manner similar to the electro-optic phase shifters 4714*e*, 4714*f*, 4714*g*, 4714*h* and the calibration phase shifter 4702*b*, respectively.

Figure 49:
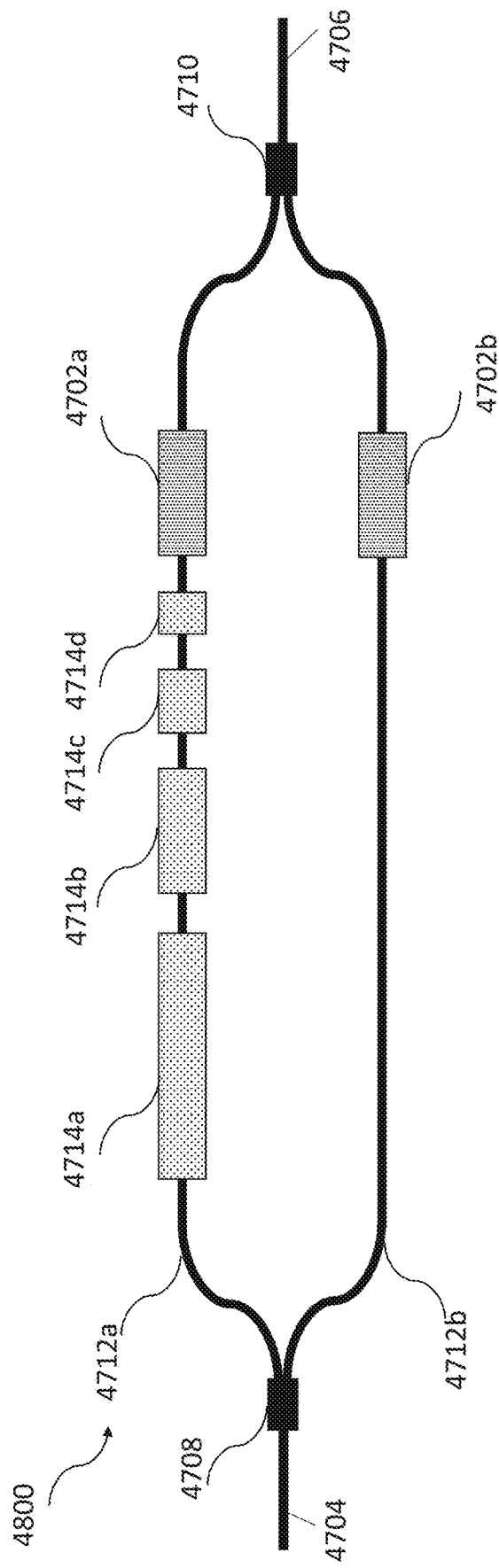
FIG. 49 shows a schematic diagram of a segmented MZI modulator that includes calibration phase shifters.

Referring to FIG. 49, in some implementations, an MZI 4800 includes electro-optic phase shifters 4714*a*, 4714*b*, 4714*c*, 4714*d* in the upper arm, and calibration phase shifters 4702*a*, 4702*b* in both the upper and lower arms. In some examples, an MZI can have electro-optic phase shifters 4714*a*, 4714*b*, 4714*c*, 4714*d* in the upper arm, electro-optic phase shifters 4714*e*, 4714*f*, 4714*g*, 4714*h* in the lower arm, and the calibration phase shifter 4702*a* in the upper arm without another calibration phase shifter in the lower arm.

In general, the electro-optic phase shifters for converting the digital electric signals to analog optical signals can be placed on a single arm of the MZI, or on both arms of the MZI. The MZI can include a single calibration phase shifter placed on a single arm, or include two calibration phase shifters placed on both arms, for compensating the phase imbalance between the two arms. In general, having phase shifters placed in both arms of the MZI allows each phase shifter to be shorter since each phase shifter only has to impart a smaller amount of optical phase shift, as compared to placing the phase shifters in only one arm of the MZI.

For example, the modulator that uses the segmented design in FIGS. 8-16 and 47-49 can be used in the modulator array 144 of FIGS. 1, 6, and 39, and the modulators 2302 of FIGS. 31 to 33. If the modulator array 144 uses modulators having the segmented design, the first MC subunit 132 is modified because it does not need a multi-bit digital-to-analog converter. In this case, the first MC subunit 132 includes circuitry to convert the digital input value from the controller 110 to suitable voltage signals that are applied to the individual segments of the modulator (this can be considered equivalent to a 1-bit DAC). An advantage of using the segmented design for the optical modulators is that by eliminating the digital-to-analog converter in the first MC subunit 132, the power consumption can be reduced for a given data rate, or the data rate can be increased for a given power consumption. An advantage of using modulators that are based on PIN diode structures forward-biased to use carrier injection for modulating the refractive index of waveguide segments is that the modulators are compatible with complementary metal-oxide-semiconductor (CMOS) technology.

Figure 50:
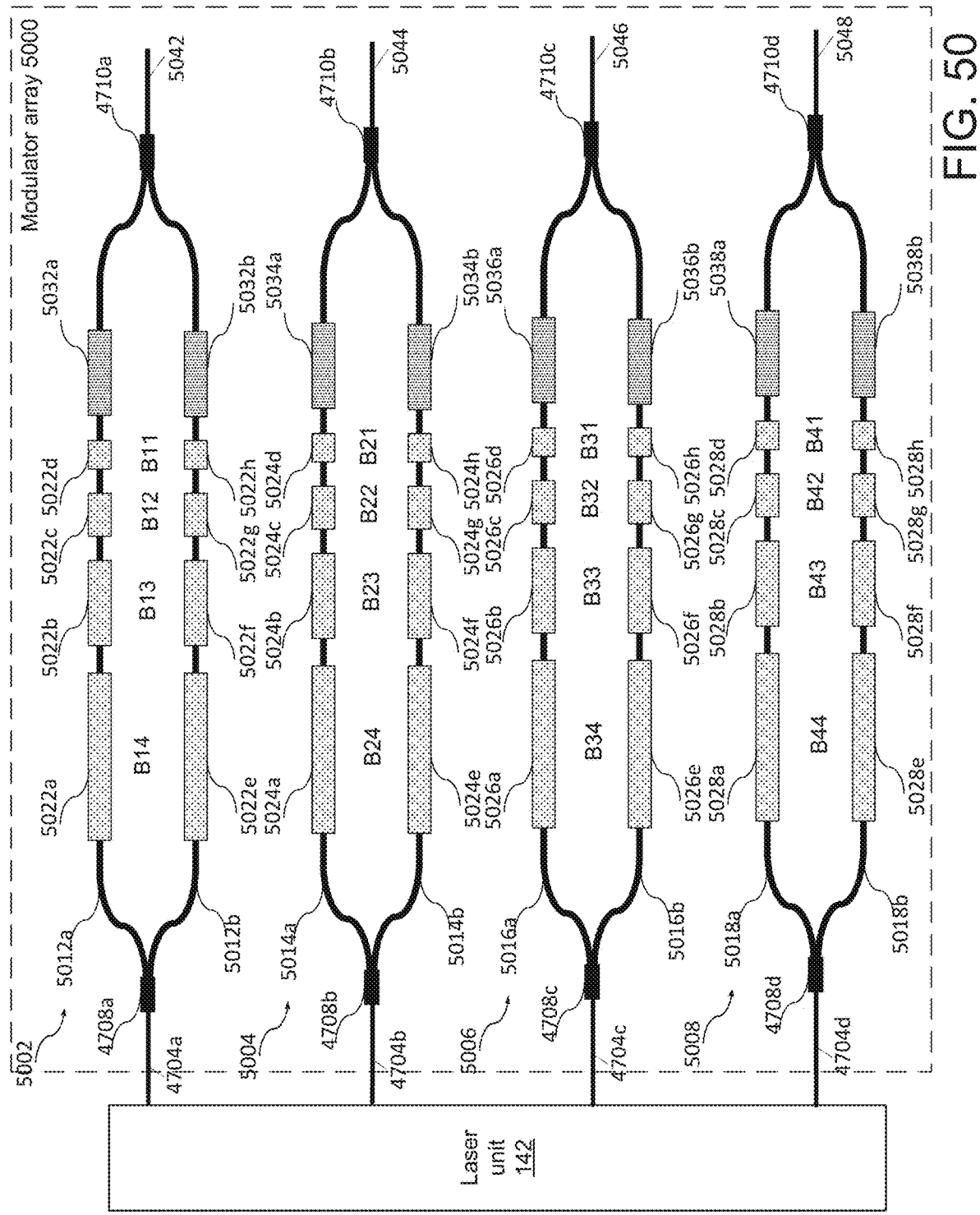
FIG. 50 shows an example of a modulator array having optical modulators of the segmented design.

FIG. 50 shows an example of a modulator array 5000 having optical modulators of the segmented design of FIG. 47. The modulator array 50000 performs a function similar to the modulator array 144 of FIG. 1. In this example, the modulator array 5000 is configured to process a digital input vector of length 4, the digital input vector includes four elements, and each element is a digital value that has four bits. The modulator array 5000 includes four optical modulators 5002, 5004, 5006, and 5008 having the segmented design, in which each optical modulator includes four sub-modulators or four phase shifters.

In this example, the laser unit 142 outputs four light signals on four optical waveguides 4704a, 4704b, 4704c, and 4704d. The light signal on the waveguide 4704a is modulated by the optical modulator 5002 according to the first 4-bit value of the digital input vector. The light signal on the waveguide 4704b is modulated by the optical modulator 5004 according to the second 4-bit value of the digital input vector. The light signal on the waveguide 4704c is modulated by the optical modulator 5006 according to the third 4-bit value of the digital input vector. The light signal on the waveguide 4704d is modulated by the optical modulator 5008 according to the fourth 4-bit value of the digital input vector.

The optical modulator 5002 includes two 1×2 port multimode interference couplers (MMI 1×2) 4708a and 4710a, two balanced arms 5012a and 5012b, and eight sub-modulators: 5022a, 5022b, 5022c, 5022d in the upper arm and 5022e, 5022f, 5022g, 5022h in the lower arum. For example, each sub-modulator can include a phase shifter. The sub-modulators 5022d and 5022h receive the LSB (B11) of the first value in the input vector. The sub-modulators 5022c and 5022g receive the $2^{nd}$-bit (B12) of the first value in the input vector. The sub-modulators 5022b and 5022f receive the $3^{rd}$-bit (B13) of the first value in the input vector. The sub-modulators 5022a and 5022e receive the MSB (B14) of the first value in the input vector. The optical modulator 5002 also includes calibration phase shifters 5032a and 5032b that are driven by multi-bit DACs.

The sub-modulator 5022d includes a first waveguide segment, the sub-modulator 5022c includes a second waveguide segment, the sub-modulator 5022b includes a third waveguide segment, and the sub-modulator 5022a includes a fourth waveguide segment. The second waveguide segment is approximately twice as long as the first waveguide segment, the third waveguide segment is approximately four times as long as the first waveguide segment, and the fourth waveguide segment is approximately eight times as long as the first waveguide segment.

Similarly, the sub-modulator 5022h includes a fifth waveguide segment, the sub-modulator 5022g includes a sixth waveguide segment, the sub-modulator 5022f includes a seventh waveguide segment, and the sub-modulator 5022e includes an eighth waveguide segment. The sixth waveguide segment is approximately twice as long as the fifth waveguide segment, the seventh waveguide segment is approximately four times as long as the fifth waveguide segment, and the eighth waveguide segment is approximately eight times as long as the fifth waveguide segment.

The optical modulator 5004 includes two 1×2 port multimode interference couplers (MMI 1×2) 4708b and 4710b, two balanced arms 5014a and 5014b, and eight sub-modulators: 5024a, 5024b, 5024c, 5024d in the upper arm and 5024e, 5024f, 5024g, 5024h in the lower arum. For example, each sub-modulator can include a phase shifter. The sub-modulators 5024d and 5024h receive the LSB (B21) of the second value in the input vector. The sub-modulators 5024c and 5024g receive the $2^{nd}$-bit (B22) of the second value in the input vector. The sub-modulators 5024b and 5024f receive the $3^{rd}$-bit (B23) of the second value in the input vector. The sub-modulators 5024a and 5024e receive the MSB (B24) of the second value in the input vector. The optical modulator 5004 also includes calibration phase shifters 5034a and 5034b that are driven by multi-bit DACs.

The optical modulators 5006 and 5008 are configured in a manner similar to the optical modulators 5002 and 5004.

The optical modulator 5002 modulates the optical signal in the input waveguide 4708a according to the four bits of the first value in the digital input vector, and generates an analog optical signal 5042 that represents the first value of the digital input vector. The optical modulator 5002 converts the first 4-bit value of the digital input vector to a first analog optical signal. The optical modulator 5004 modulates the optical signal in the input waveguide 4708b according to the four bits of the second value in the digital input vector, and generates an analog optical signal 5044 that represents the second value of the digital input vector. The optical modulator 3970 converts the second 4-bit value of the digital input vector to a second analog optical signal.

The optical modulator 5006 modulates the optical signal in the input waveguide 4708c according to the four bits of the third value in the digital input vector, and generates an analog optical signal 5046 that represents the third value of the digital input vector. The optical modulator 5006 converts the third 4-bit value of the digital input vector to a third analog optical signal. The optical modulator 5008 modulates the optical signal in the input waveguide 4708d according to the four bits of the fourth value in the digital input vector, and generates an analog optical signal 5048 that represents the fourth value of the digital input vector. The optical modulator 5008 converts the fourth 4-bit value of the digital input vector to a fourth analog optical signal. The analog optical signals 5042, 5044, 5046, 5048 together form an analog optical input vector that can be provided to, e.g., the optoelectronic matrix multiplication unit 150 of FIG. 1.

The ANN computation systems described above can be used in, e.g., personal computers, portable computers, mobile phones, tablet computers. The ANN computation systems described above can be implemented as a peripheral card that can be electrically coupled to a computer motherboard. The peripheral card can be, e.g., a PCIe card that complies with PCIe 3.0, PCIe 4.0, or later versions of the PCIe standard. The ANN computation systems can be used in, e.g., server computers, autonomous driving vehicles, autonomous trucks, autonomous trains, autonomous drones, autonomous ships, autonomous airplanes, autonomous space ships, satellites, data centers, and supercomputers.

The digital controller (e.g., for controlling the components shown in FIG. 38) and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Some background information for the various systems described in this specification is disclosed in U.S. application Ser. No. 16/431,167, filed on Jun. 4, 2019, incorporated herein by reference.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:
   at least one input optical waveguide configured to receive an optical wave;
   at least one digital input port configured to receive a series of digital input values over successive time intervals, each digital input value comprising two or more bits; and
   an optical modulator coupled to the input optical waveguide, the optical modulator comprising:
   an optical waveguide portion including multiple optical waveguide segments that are associated with multiple diode sections positioned along the corresponding optical waveguide segment, the optical waveguide segments being part of a continuous optical waveguide, in which the diode sections are configured to apply different respective modulation contributions to an optical wave propagating through the optical waveguide segments, and each respective diode section comprises: a semiconductor diode that is associated with an optical path length of less than about one millimeter, and electrical contacts for applying an electrical signal to the semiconductor diode in a forward-biased state in which an optical property of the optical waveguide segment associated with the diode section is modulated in response to a value of a corresponding bit of the digital input value, and
   signal conditioning circuitry configured to shape an amplitude change in an electrical signal applied to at least one of the semiconductor diodes in association with a corresponding change between successive digital input values in the series of digital input values.

2. The system of claim 1, wherein the signal conditioning circuitry is configured to shape the amplitude change by increasing a size of an amplitude change between a first electrical signal level associated with a first time interval and a second electrical signal level associated with a second time interval for an initial portion of the second time interval.

3. The system of claim 2, wherein the signal conditioning circuitry is configured to shape the amplitude change by decreasing a size of the amplitude change between the first electrical signal level and a second electrical signal level for a final portion of the second time interval.

4. The system of claim 1, wherein the signal conditioning circuitry is configured to shape the amplitude change by applying an electrical signal to the semiconductor diode through a matching electrical circuit that is configured to match an impedance associated with the semiconductor diode without significantly changing an amplitude of the applied electrical signal.

5. The system of claim 4, wherein the matching electrical circuit comprises a passive electrical circuit.

6. The system of claim 5, wherein the matching electrical circuit consists essentially of an inductor.

7. The system of claim 1, wherein the signal conditioning circuitry is configured to shape the amplitude change by applying an electrical signal to the semiconductor diode through circuitry configured to pump current between the semiconductor diode and a capacitor connected in series between the semiconductor diode and a circuit providing the series of digital input values, wherein a quantity of charge transferred by the pumped current is determined based at least in part on a voltage that is constant over a plurality of successive time intervals in which the series of digital input values are provided.

8. The system of claim 1, wherein the optical modulator comprises an interferometric optical modulator that further comprises an optical interference portion configured to provide a level of destructive optical interference that results in a predetermined amplitude reduction based on the cumulative modulation contributions of the optical waveguide segments associated with the diode sections.

9. The system of claim 8, wherein the optical interference portion comprises an optical combiner.

10. The system of claim 9, wherein the optical waveguide portion comprises: at least two optical waveguide arms that each: receives an optical wave split from the same optical splitter coupled to the input optical waveguide, and provides an optical wave to the optical combiner.

11. The system of claim 10, wherein the optical property of the optical waveguide segment associated with the diode section comprises an effective refractive index of the optical waveguide segment, and the different respective modulation contributions comprise different respective phase shifts.

12. The system of claim 11, wherein an optical path length of a first waveguide segment associated with a semiconductor diode of a first diode section is about twice an optical path length of a second waveguide segment associated with a semiconductor diode of a second diode section.

13. The system of claim 12, wherein the signal conditioning circuitry is configured to shape the amplitude change by applying, to electrical contacts of the first diode section and to electrical contacts of the second diode section, a first predetermined shape of an electrical signal amplitude in response to a change in a value of a corresponding bit from zero to one, and a second predetermined shape of an electrical signal amplitude in response to a change in a value of a corresponding bit from one to zero.

14. The system of claim 12, wherein the signal conditioning circuitry is configured to shape the amplitude change by applying an electrical signal to electrical contacts of the first diode section through a first matching electrical circuit that is configured to match an impedance associated with the first semiconductor diode, and applying an electrical signal to electrical contacts of the second diode section through a second matching electrical circuit that is configured to match an impedance associated with the second semiconductor diode.

15. The system of claim 14, wherein the first matching electrical circuit and the second matching electrical circuit each consist essentially of an inductor.

16. The system of claim 10, wherein the input optical waveguide is coupled to an optical demultiplexer that is configured to receive a wavelength multiplexed signal, and separate the wavelength multiplexed signal into at least a first optical signal having a first wavelength and a second optical signal having a second wavelength;
wherein the input optical waveguide is configured to receive the first optical signal having the first wavelength from the optical demultiplexer, the optical modulator is configured to receive the first optical signal from the input optical waveguide, and the diode sections are configured to apply different respective modulation contributions to the first optical signal propagating through the optical waveguide segments.

17. The system of claim 1, wherein the at least one input optical waveguide comprises a plurality of input optical waveguides, a plurality of optical modulators are each coupled to different respective input optical waveguides of the plurality of input optical waveguides, and outputs from the plurality of optical modulators are combined to provide a result of vector-matrix multiplication.

18. The system of claim 1 in which the optical modulator comprises at least one calibration phase shifter that is configured to compensate for an imbalance in optical phase shifts imparted by two waveguide arms of the optical modulator.

19. The system of claim 1, comprising an artificial neural network (ANN) computation system that comprises:
a first unit configured to generate a plurality of modulator control signals comprising a series of digital input values over successive time intervals, each digital input value comprising two or more bits;
a light source configured to provide a plurality of light outputs;
a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals;
wherein the plurality of optical modulators comprise the optical modulator that includes the optical waveguide portion and the signal conditioning circuitry; and
a matrix processing unit coupled to the plurality of optical modulators and the first unit, the matrix processing unit being configured to transform the optical input vector into an analog output vector based on a plurality of weight control signals.

20. The system of claim 19 in which the ANN computation system comprises:
a second unit coupled to the matrix processing unit and configured to convert the analog output vector into a digitized output vector; and
a controller comprising integrated circuitry configured to perform operations comprising:
receiving an artificial neural network computation request comprising an input dataset that comprises a first digital input vector;
receiving a first plurality of neural network weights; and
generating, through the first unit, a first plurality of modulator control signals based on the first digital input vector and a first plurality of weight control signals based on the first plurality of neural network weights.

21. The system of claim 19 in which the matrix processing unit comprises:
a plurality of copying modules, wherein each of the copying modules corresponds to a subset of one or more optical signals of the optical input vector and is configured to split the subset of one or more optical signals into two or more copies of the optical signals;
a plurality of multiplication modules, wherein each of the multiplication modules corresponds to a subset of one or more optical signals configured to multiply the one or more optical signals of the subset by one or more matrix element values using optical amplitude modulation; and
one or more summation modules, wherein each summation module is configured to produce an electrical signal that represents a sum of the results of two or more of the multiplication modules.

22. The system of claim 1, comprising at least one of a personal computer, a server computer, a vehicle computer, or a flight computer, in which the at least one input optical waveguide, the at least one digital input port, and the optical modulator are part of the personal computer, the server computer, the vehicle computer, or the flight computer.

23. A system, comprising:
at least one input optical waveguide configured to receive an optical wave;
at least one digital input port configured to receive a series of digital input values over successive time intervals, each digital input value comprising two or more bits; and
an optical modulator coupled to the input optical waveguide, the optical modulator comprising:
an optical waveguide portion including multiple diode sections positioned along the optical waveguide portion, in which the diode sections apply different respective modulation contributions to an optical wave propagating through the optical waveguide portion, and each respective diode section comprises: a semiconductor diode that has an optical path length of less than about one millimeter, and electrical contacts for applying an electrical signal to the semiconductor diode in a forward-biased state in which an optical property of the diode section is modulated in response to a value of a corresponding bit of the digital input value, and signal conditioning circuitry configured to shape an amplitude change in an electrical signal applied to at least one of the semiconductor diodes in association with a corresponding change between successive digital input values in the series of digital input values.

24. The system of claim 23, wherein shaping the amplitude changes in electrical signals applied to the semiconductor diodes in association with successive digital input values in the series of digital input values comprises: increasing a size of an amplitude change between a first electrical signal level associated with a first time interval and a second electrical signal level associated with a second time interval for an initial portion of the second time interval.

25. The system of claim 24, wherein shaping the amplitude changes in electrical signals applied to the semiconductor diodes in association with successive digital input values in the series of digital input values further comprises: decreasing a size of the amplitude change between the first electrical signal level and a second electrical signal level for a final portion of the second time interval.

26. The system of claim 23, wherein shaping the amplitude changes in electrical signals applied to the semiconductor diodes in association with successive digital input values in the series of digital input values comprises: applying an electrical signal to the semiconductor diode through a matching electrical circuit that is configured to match an impedance associated with the semiconductor diode without significantly changing an amplitude of the applied electrical signal.

27. The system of claim 26, wherein the matching electrical circuit comprises a passive electrical circuit.

28. The system of claim 27, wherein the matching electrical circuit consists essentially of an inductor.

29. The system of claim 23, wherein shaping the amplitude changes in electrical signals applied to the semiconductor diodes for successive digital input values in the series of digital input values comprises: applying an electrical signal to the semiconductor diode through circuitry configured to pump current between the semiconductor diode and a capacitor connected in series between the semiconductor diode and a circuit providing the series of digital input values, wherein a quantity of charge transferred by the pumped current is determined based at least in part on a voltage that is constant over a plurality of successive time intervals in which the series of digital input values are provided.

30. The system of claim 23, wherein the optical modulator comprises an interferometric optical modulator that further comprises an optical interference portion configured to provide a level of destructive optical interference that results in a predetermined amplitude reduction based on the cumulative modulation contributions of the diode sections.

31. The system of claim 30, wherein the optical interference portion comprises an optical combiner.

32. The system of claim 31, wherein the optical waveguide portion comprises: at least two optical waveguide segments that each: receives an optical wave split from the same optical splitter coupled to the input optical waveguide, and provides an optical wave to the optical combiner.

33. The system of claim 32, wherein the optical property of the diode section comprises an effective refractive index of the diode section, and the different respective modulation contributions comprise different respective phase shifts.

34. The system of claim 33, wherein an optical path length of a first semiconductor diode of a first diode section is about twice an optical path length of a second semiconductor diode of a second diode section.

35. The system of claim 34, wherein shaping the amplitude changes in electrical signals applied to the semiconductor diodes for successive digital input values in the series of digital input values comprises: applying, to electrical contacts of the first diode section and to electrical contacts of the second diode section, a first predetermined shape of an electrical signal amplitude in response to a change in a value of a corresponding bit from zero to one, and a second predetermined shape of an electrical signal amplitude in response to a change in a value of a corresponding bit from one to zero.

36. The system of claim 34, wherein shaping the amplitude changes in electrical signals applied to the semiconductor diodes for successive digital input values in the series of digital input values comprises: applying an electrical signal to electrical contacts of the first diode section through a first matching electrical circuit that is configured to match an impedance associated with the first semiconductor diode, and applying an electrical signal to electrical contacts of the second diode section through a second matching electrical circuit that is configured to match an impedance associated with the second semiconductor diode.

37. The system of claim 36, wherein the first matching electrical circuit and the second matching electrical circuit each consist essentially of an inductor.

* * * * *